(12) United States Patent
Aman et al.

(10) Patent No.: US 12,177,413 B2
(45) Date of Patent: Dec. 24, 2024

(54) MULTI-PLAYER AUDIO-VIDEO INTEGRATED WITH INTERACTIVE GAME BOARD

(71) Applicants: James Andrew Aman, Celebration, FL (US); Jeffrey Paul Cheesman, Hamburg, NJ (US); Delbert Jerard Aman, Daphne, AL (US); David James Aman, Lakewood, CO (US)

(72) Inventors: James Andrew Aman, Celebration, FL (US); Jeffrey Paul Cheesman, Hamburg, NJ (US); Delbert Jerard Aman, Daphne, AL (US); David James Aman, Lakewood, CO (US)

( * ) Notice: Subject to any disclaimer, the term of this patent is extended or adjusted under 35 U.S.C. 154(b) by 0 days.

(21) Appl. No.: 18/413,357

(22) Filed: Jan. 16, 2024

(65) Prior Publication Data
US 2024/0155099 A1 May 9, 2024

Related U.S. Application Data

(60) Division of application No. 17/693,828, filed on Mar. 14, 2022, now Pat. No. 11,917,122, which is a division of application No. 17/306,036, filed on May 3, 2021, now Pat. No. 11,310,484, which is a division of application No. 16/374,804, filed on Apr. 4, 2019, now Pat. No. 11,025,892, which is a continuation-in-part of application No. 15/975,236, filed on May 9, 2018, now Pat. No. 10,719,134, and a continuation-in-part of application No. 16/027,301, filed on Jul. 4, 2018, now Pat. No. 10,688,378, and a continuation-in-part of application No. 16/055,078, filed on Aug. 4, 2018, now Pat. No. 10,861,267, and (Continued)

(51) Int. Cl.
| | |
|---|---|
| H04N 13/337 | (2018.01) |
| A63F 13/69 | (2014.01) |
| H04N 13/30 | (2018.01) |
| H04N 13/366 | (2018.01) |
| H04N 21/4402 | (2011.01) |
| H04N 21/458 | (2011.01) |

(52) U.S. Cl.
CPC .......... *H04N 13/337* (2018.05); *A63F 13/69* (2014.09); *H04N 13/366* (2018.05); *H04N 21/44029* (2013.01); *H04N 21/458* (2013.01); *H04N 2013/403* (2018.05)

(58) Field of Classification Search
CPC ....................................................... A63F 13/69
See application file for complete search history.

(56) References Cited

U.S. PATENT DOCUMENTS

| | | | | |
|---|---|---|---|---|
| 5,853,327 | A * | 12/1998 | Gilboa | A63F 13/26 273/237 |
| 2007/0066396 | A1* | 3/2007 | Weston | A63F 13/235 463/39 |
| 2016/0375354 | A1* | 12/2016 | Francis | A63H 1/00 463/16 |

* cited by examiner

*Primary Examiner* — Gustavo Polo

(57) ABSTRACT

System and methods for providing simultaneous public and private audio-video integrated with an interactive board game, where a private viewer looking through an eye filter perceives the private video while a public viewer not looking through an eye filter perceives the public video all responsive to playing the interactive board game. Means for providing private audio simultaneous with the private video are also shown. The audio-video is selectively provided during game play based at least upon the tracked game state of the interactive board game. The video output component of the system can be implemented as either a display or a projector.

1 Claim, 51 Drawing Sheets

Related U.S. Application Data a continuation-in-part of application No. 16/144,161, filed on Sep. 27, 2018, now Pat. No. 10,974,135.

(60) Provisional application No. 62/652,486, filed on Apr. 4, 2018.

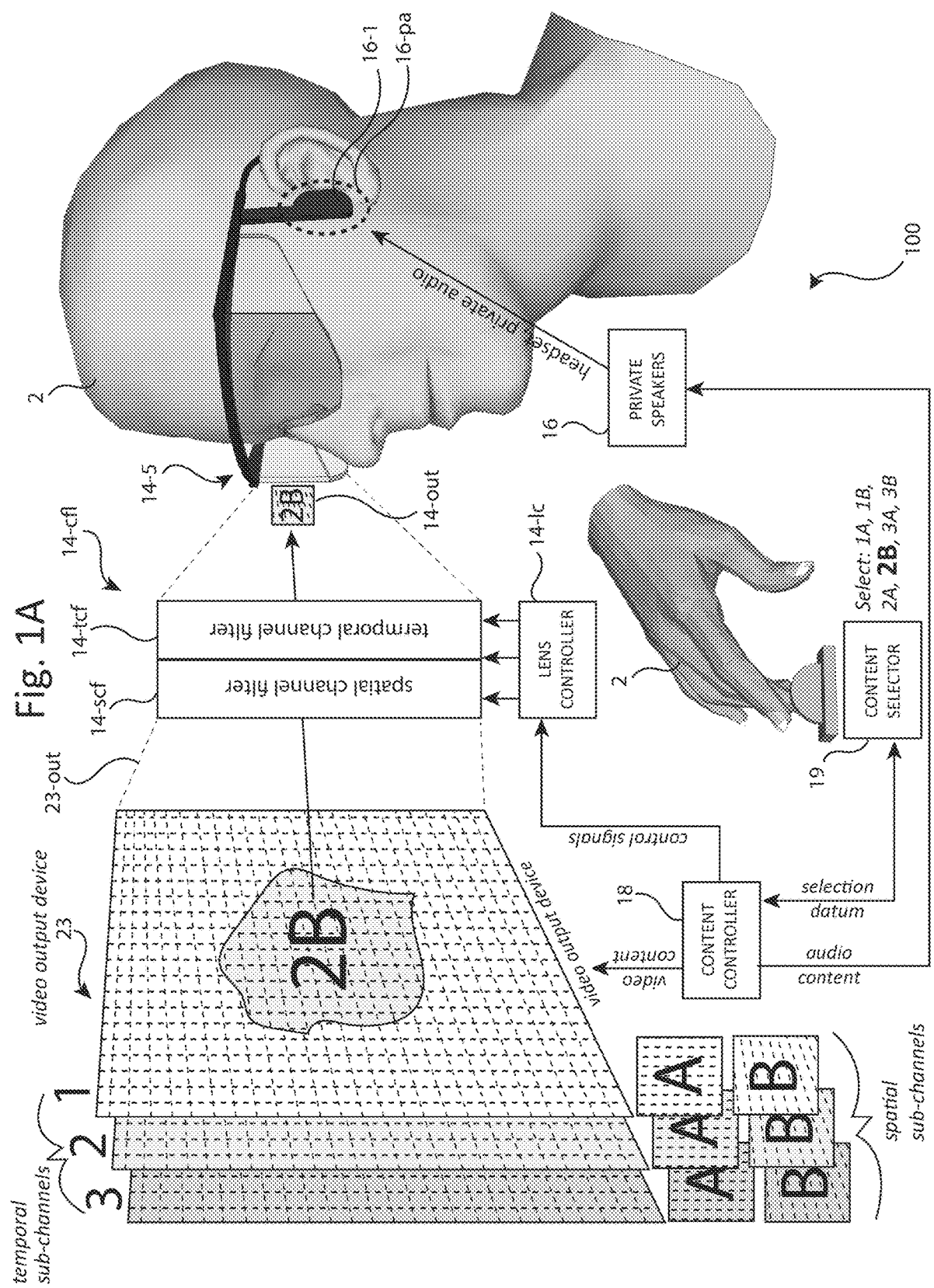

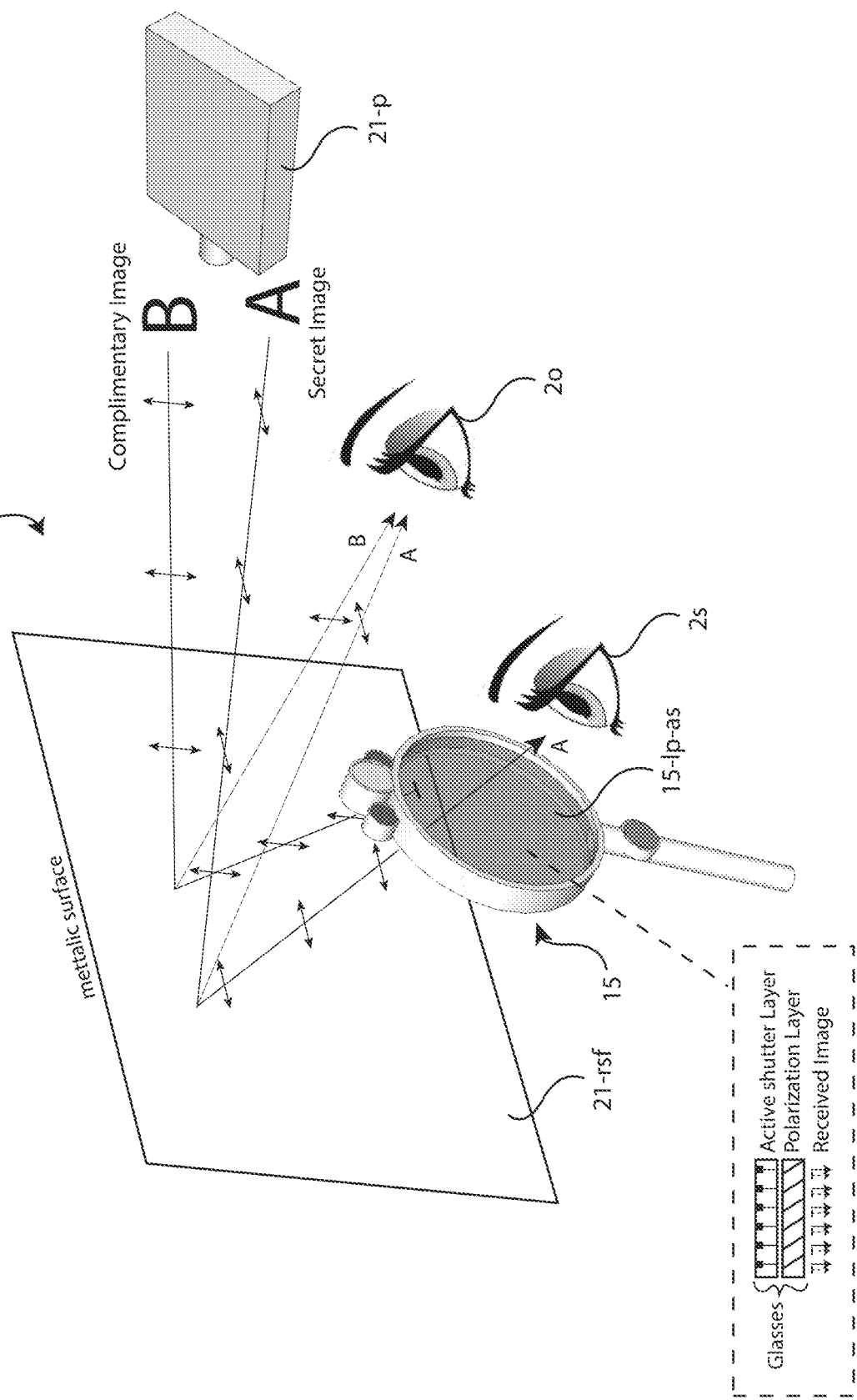

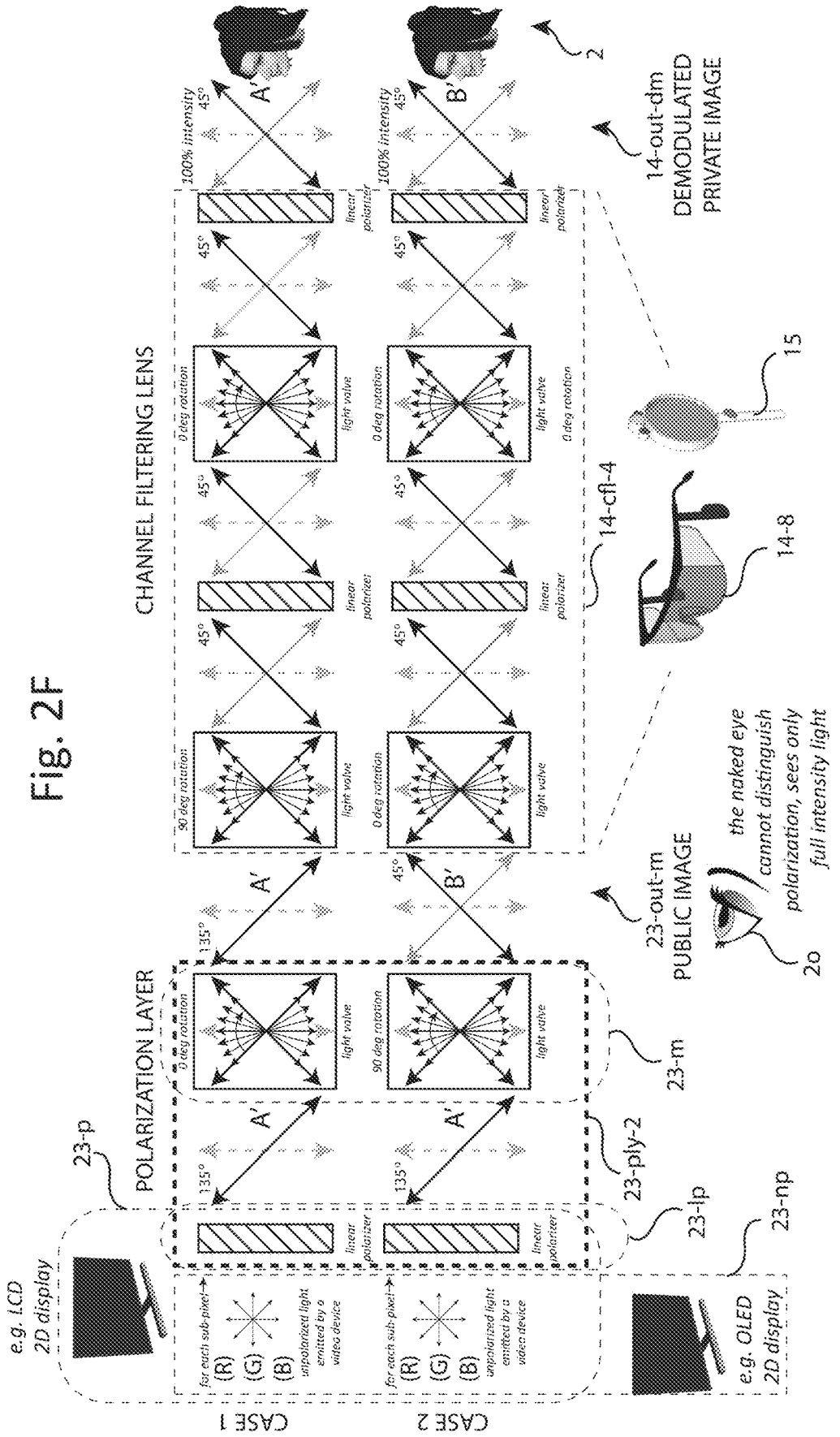

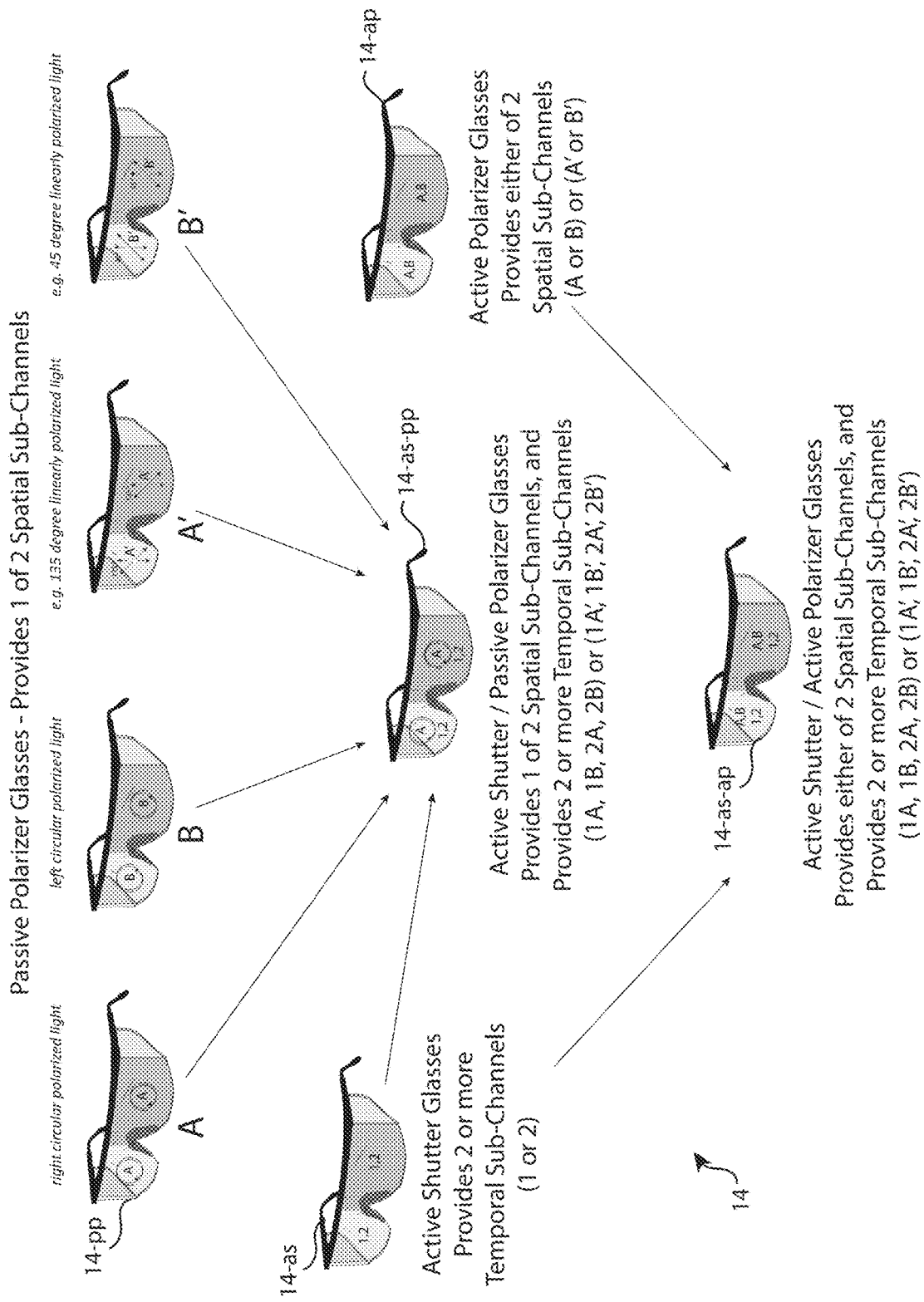

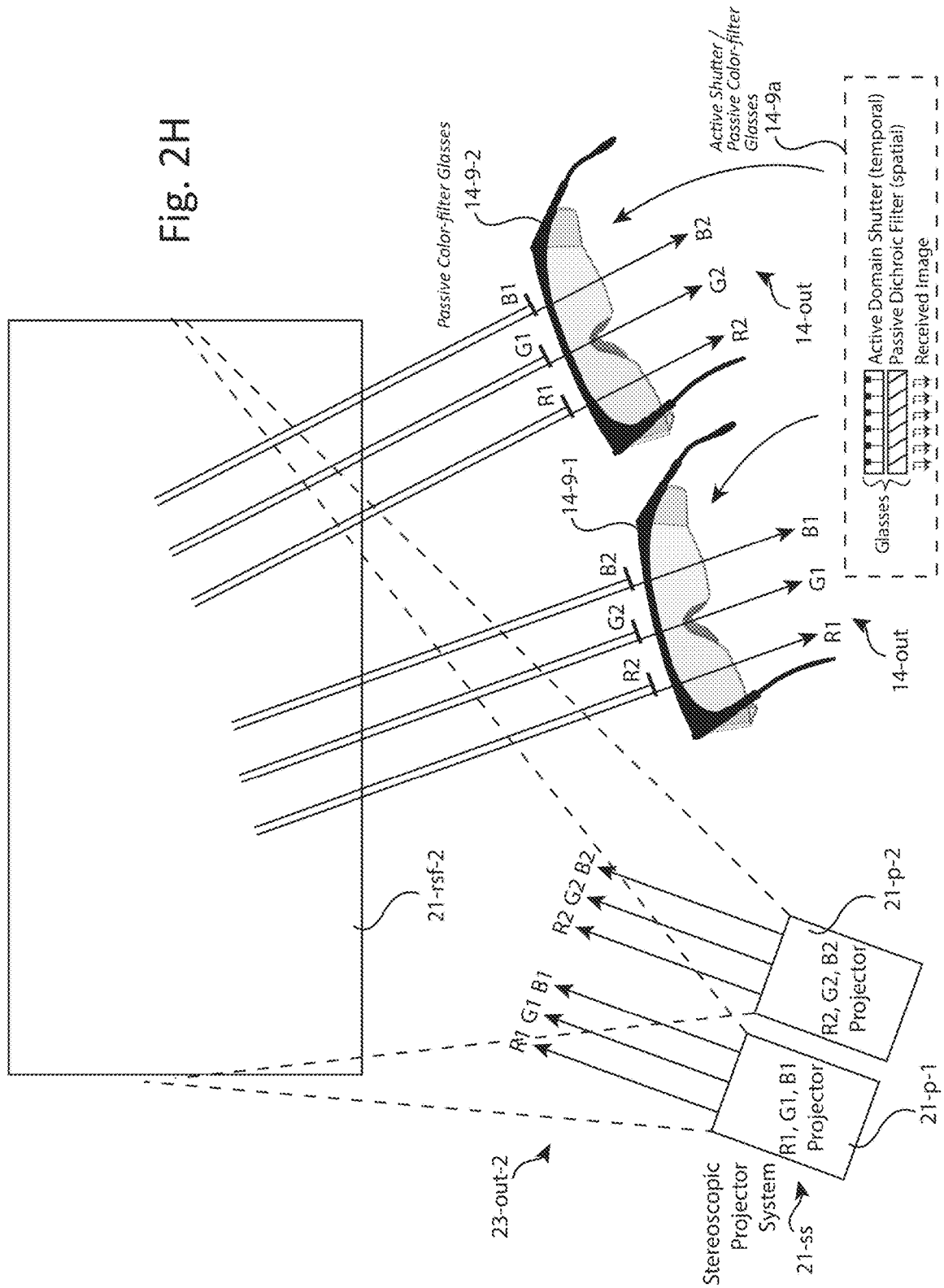

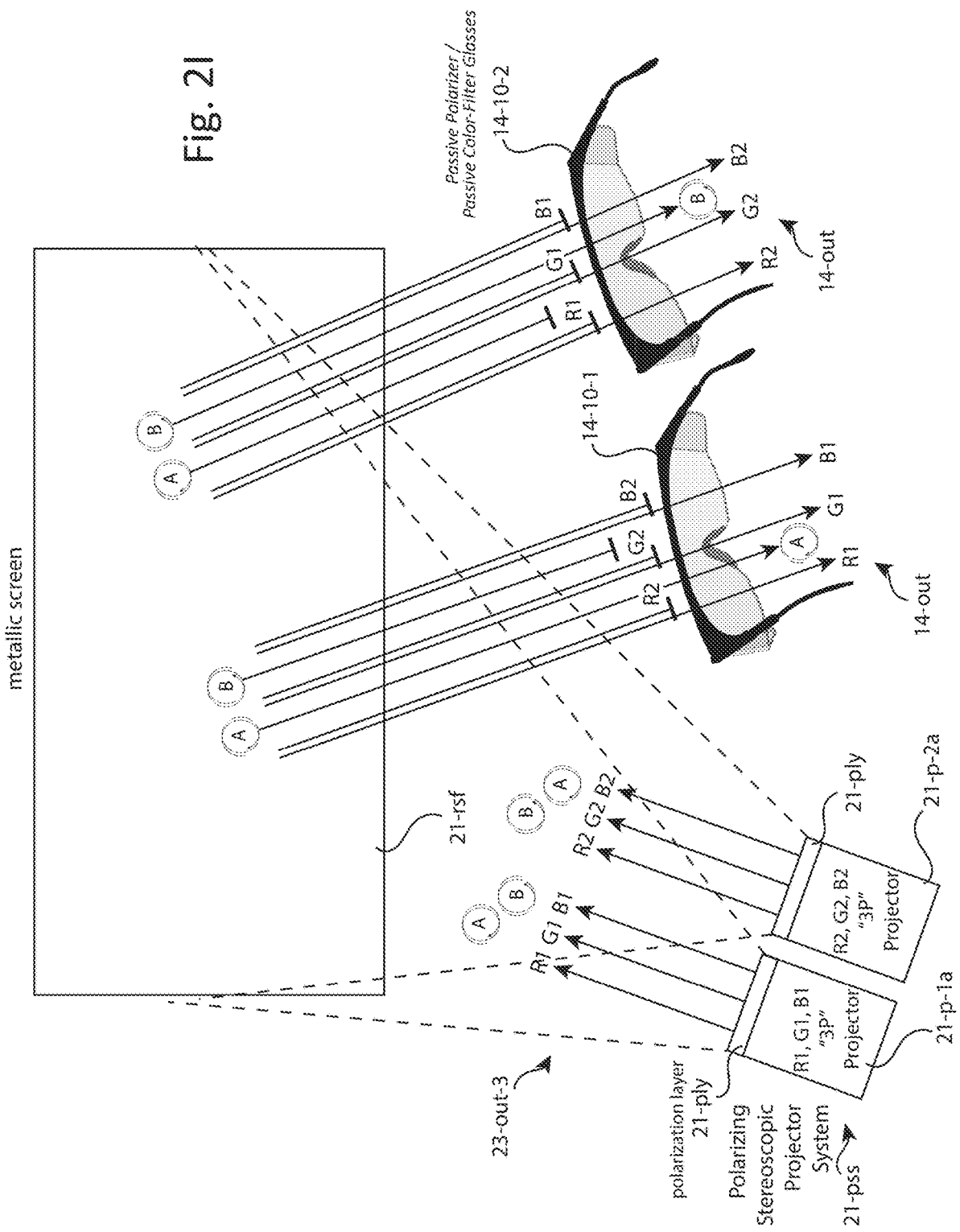

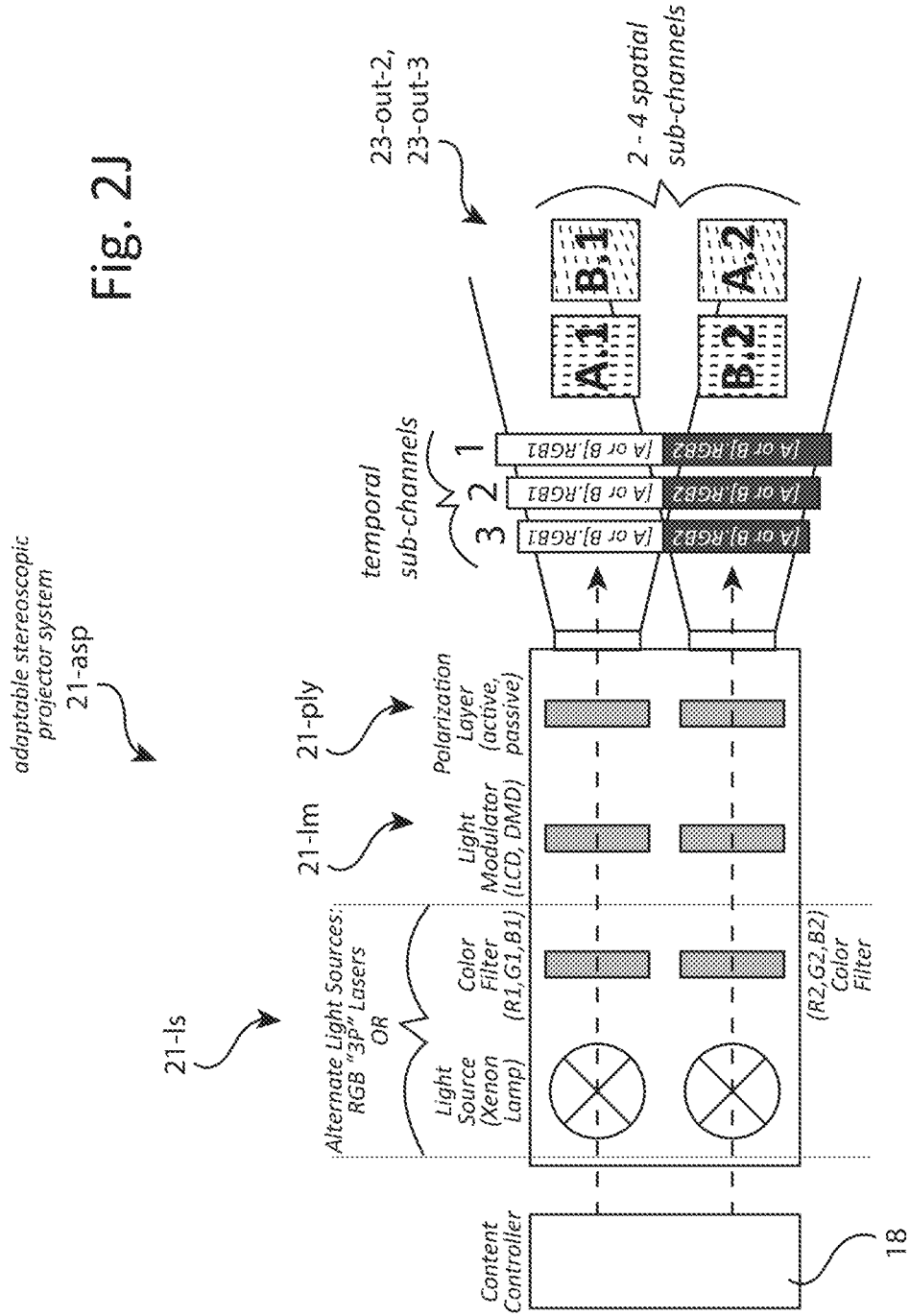

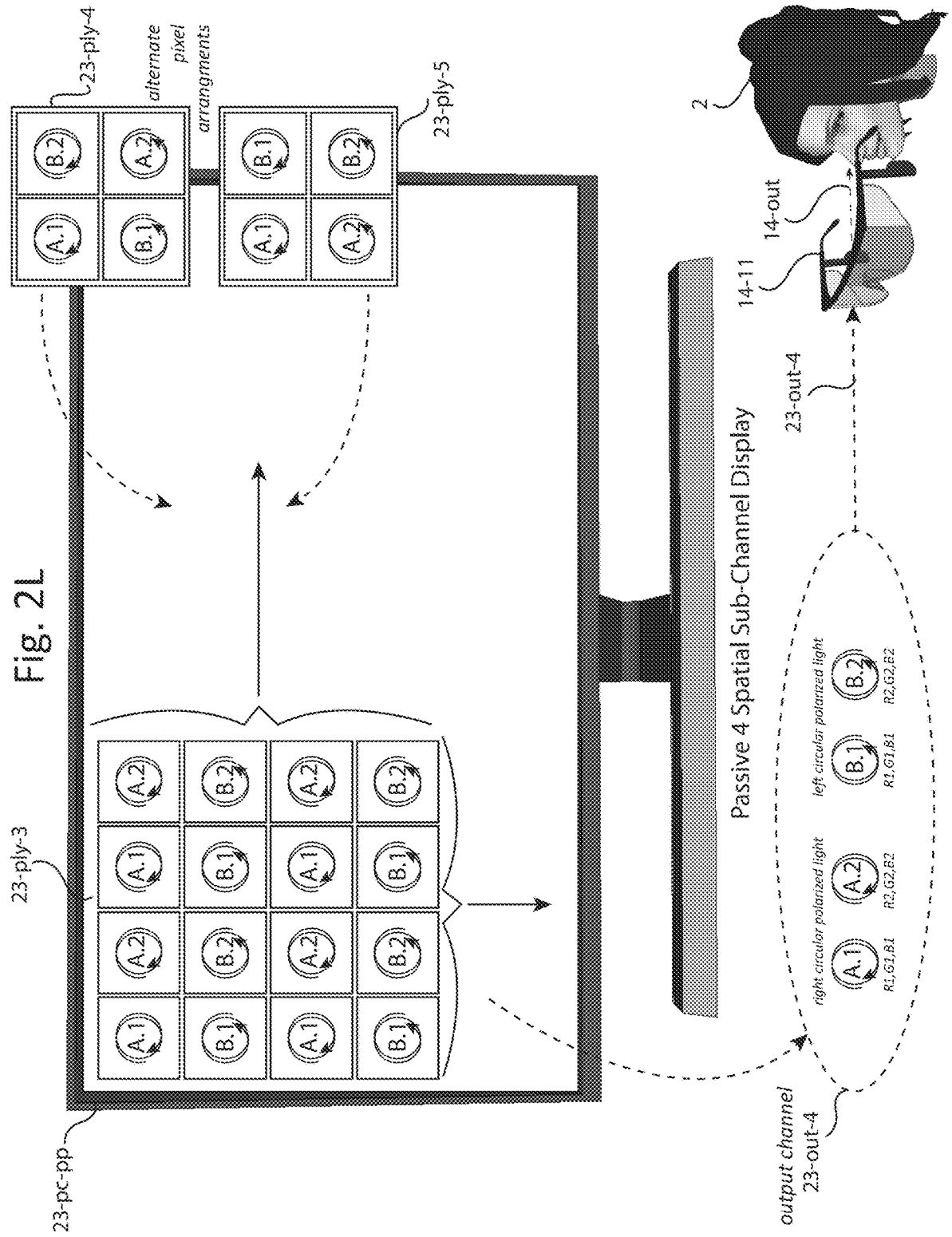

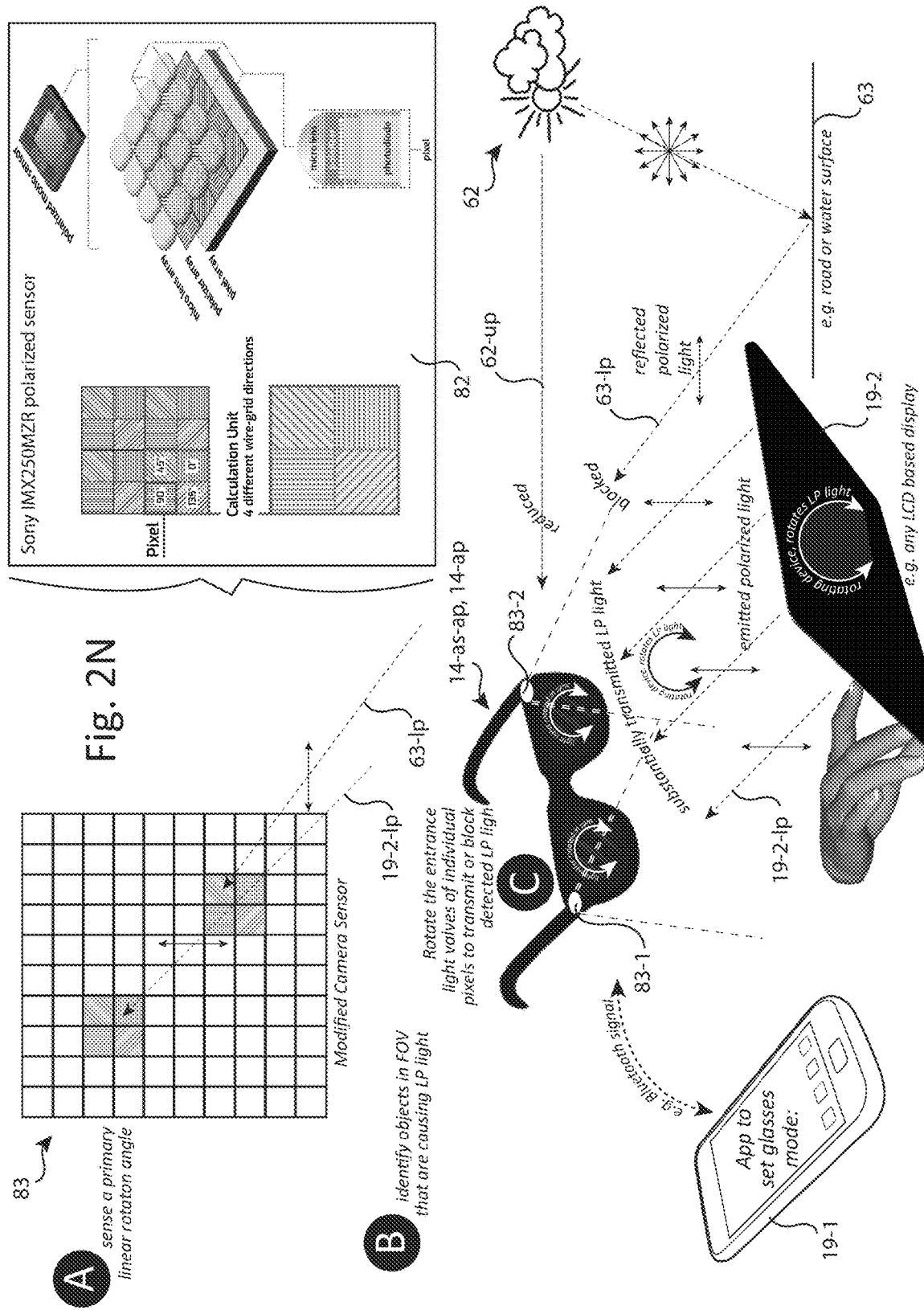

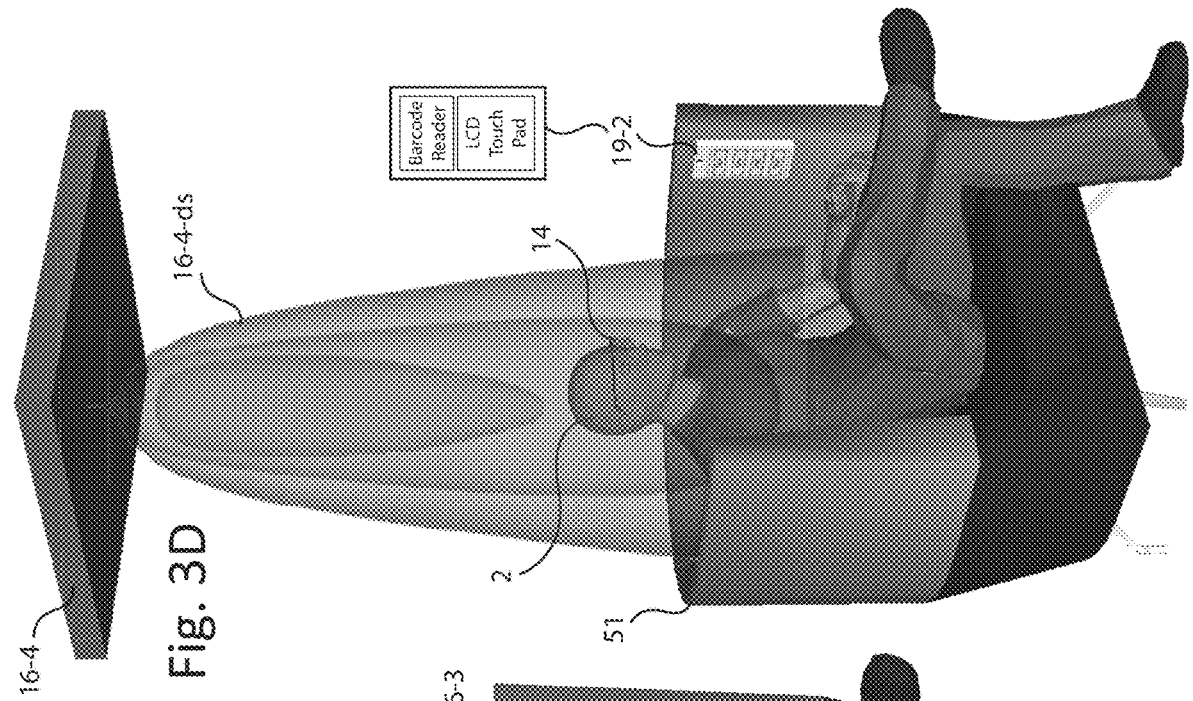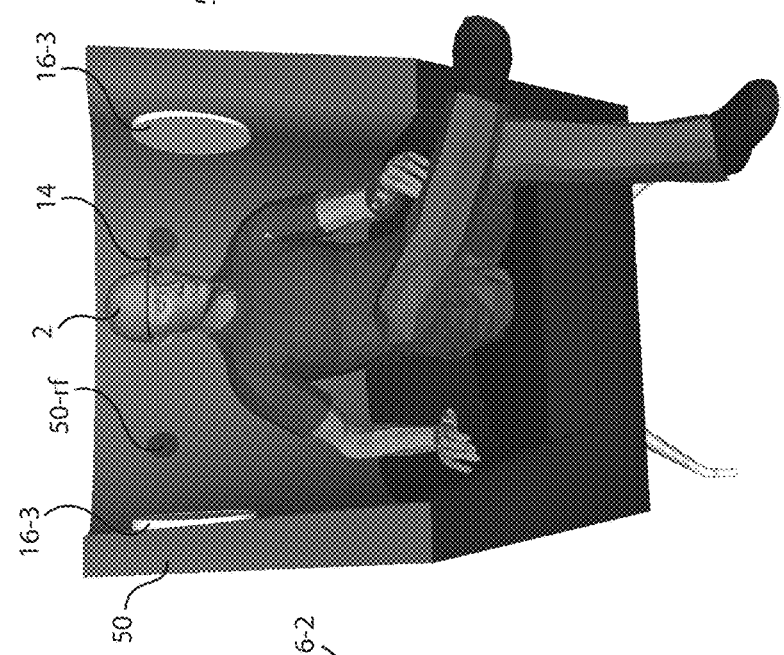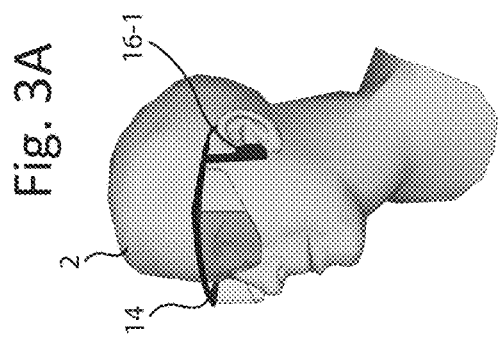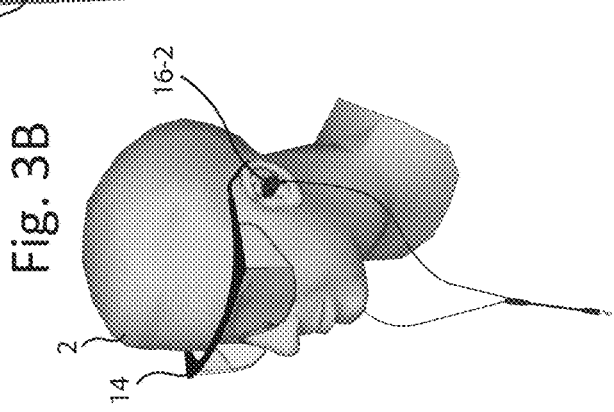

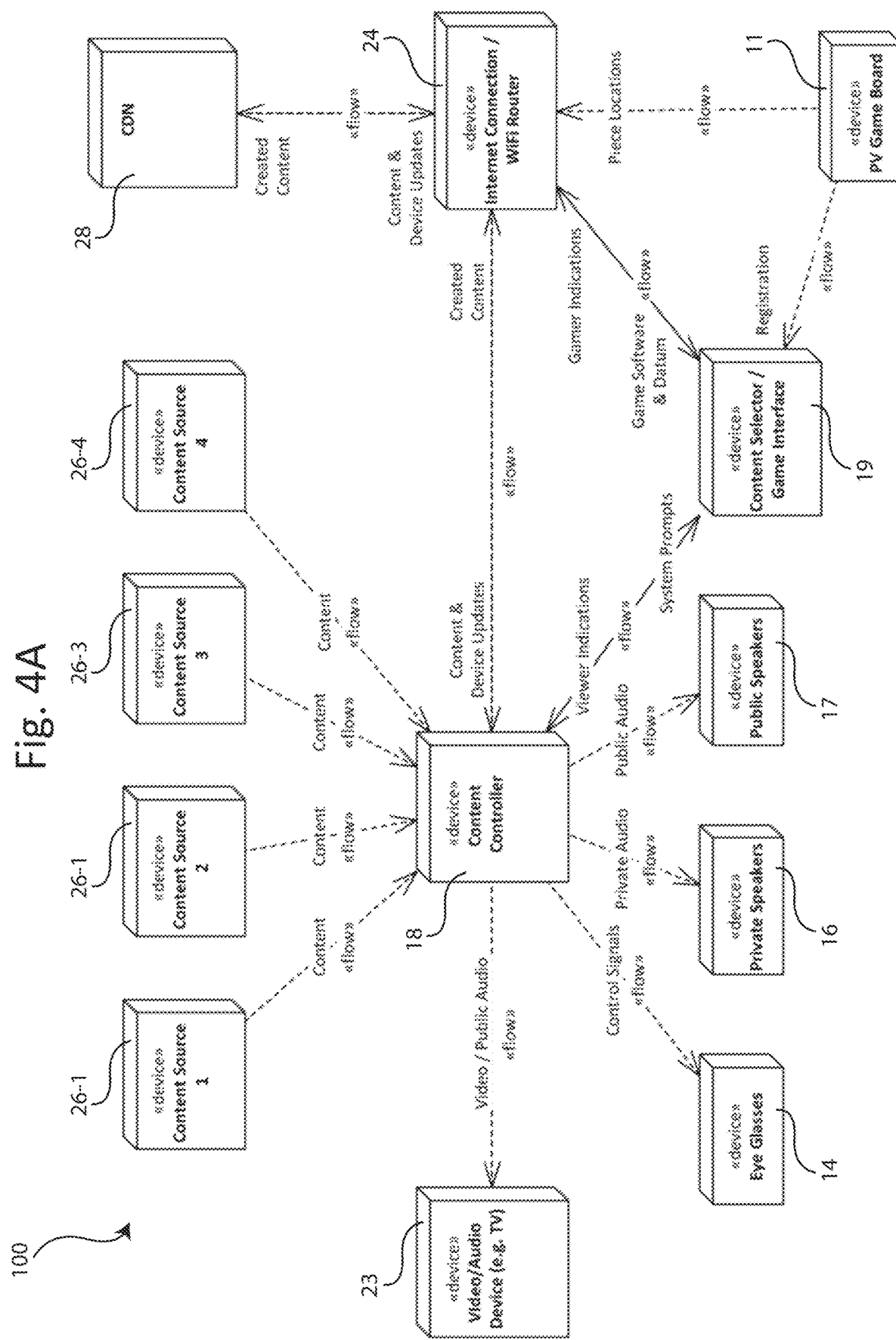

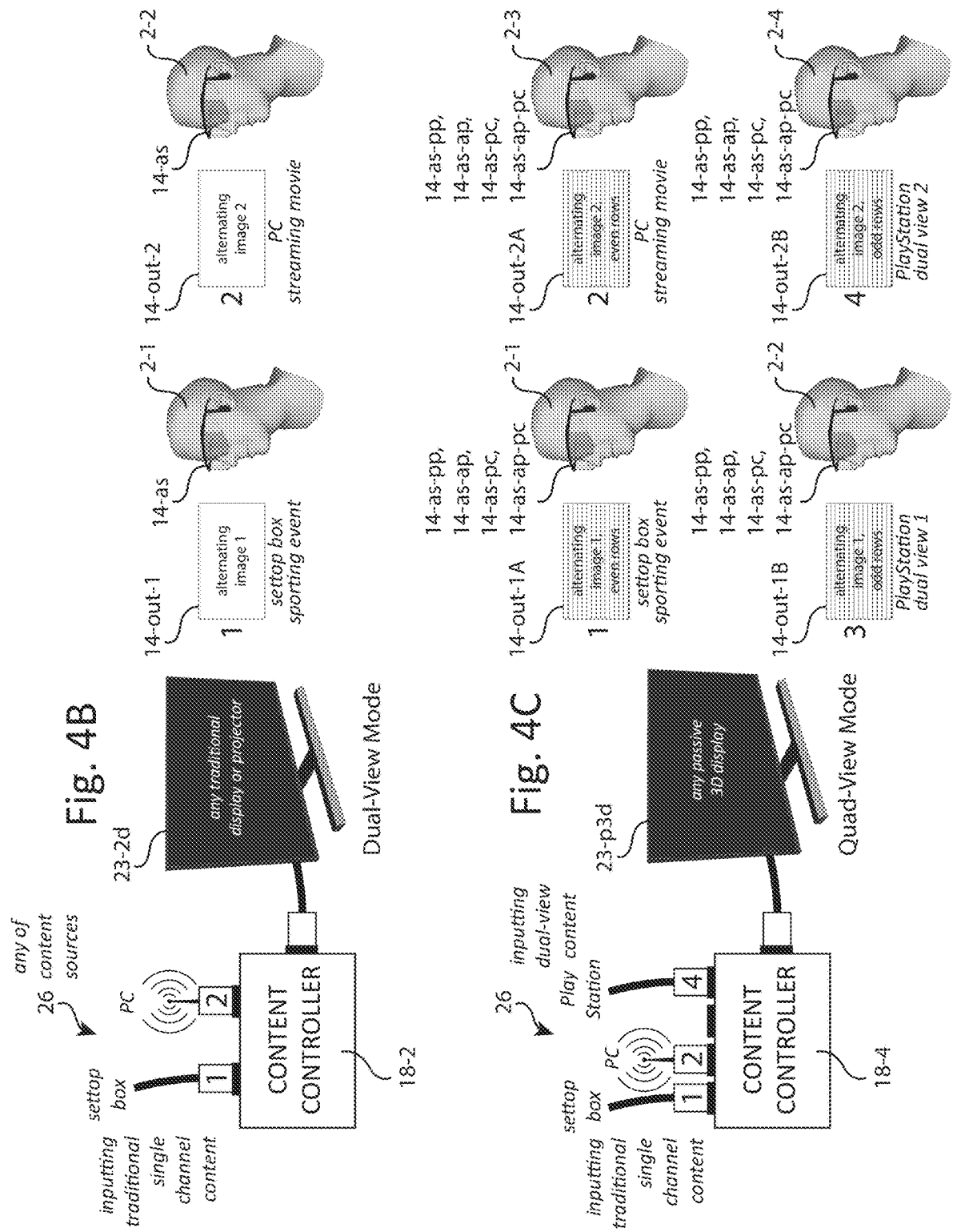

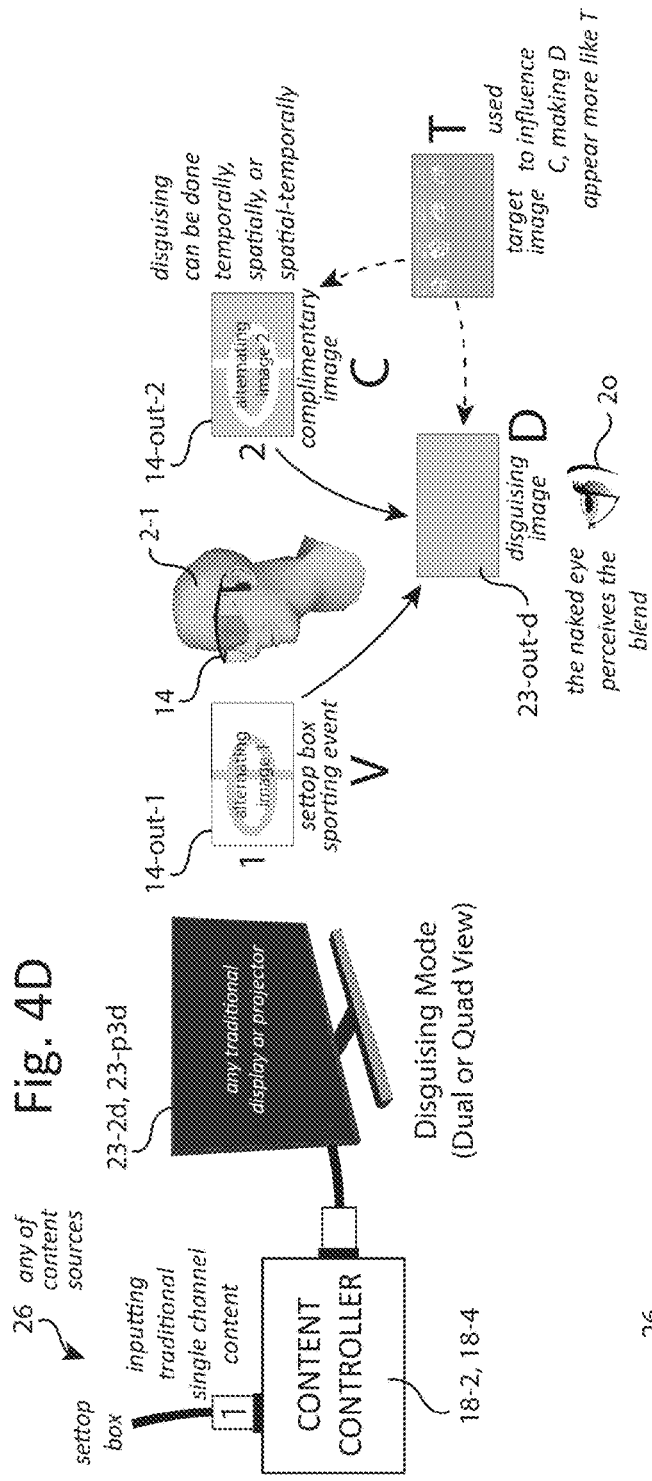
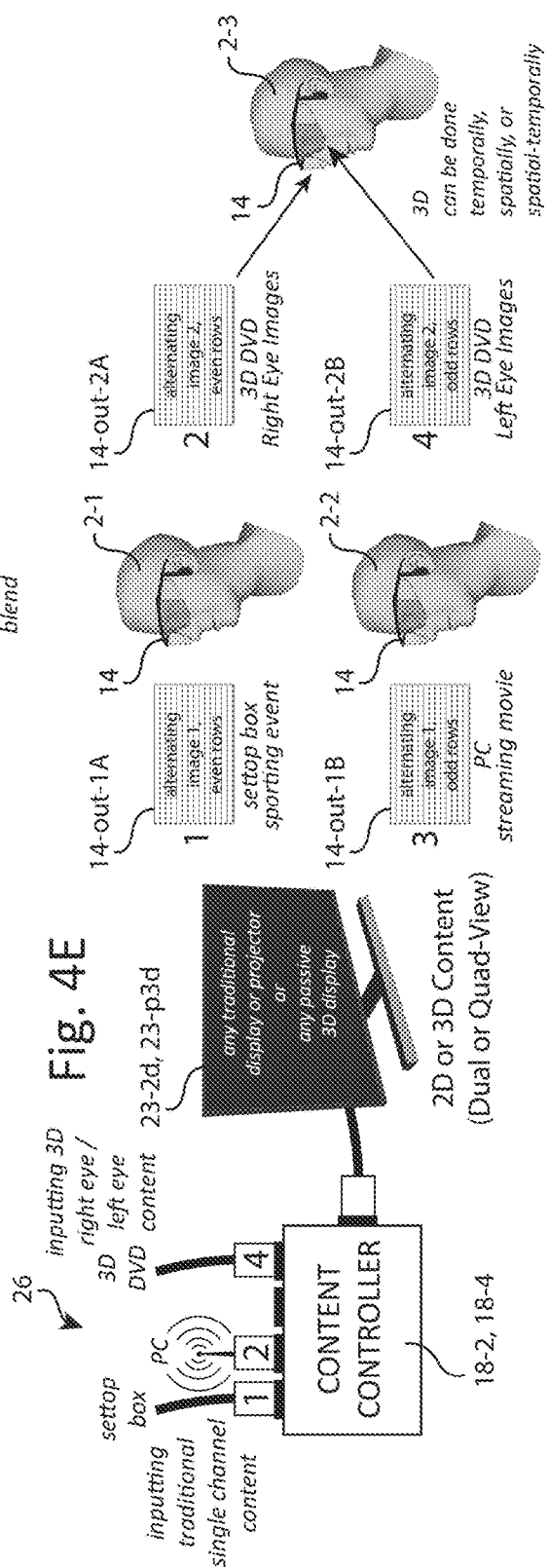

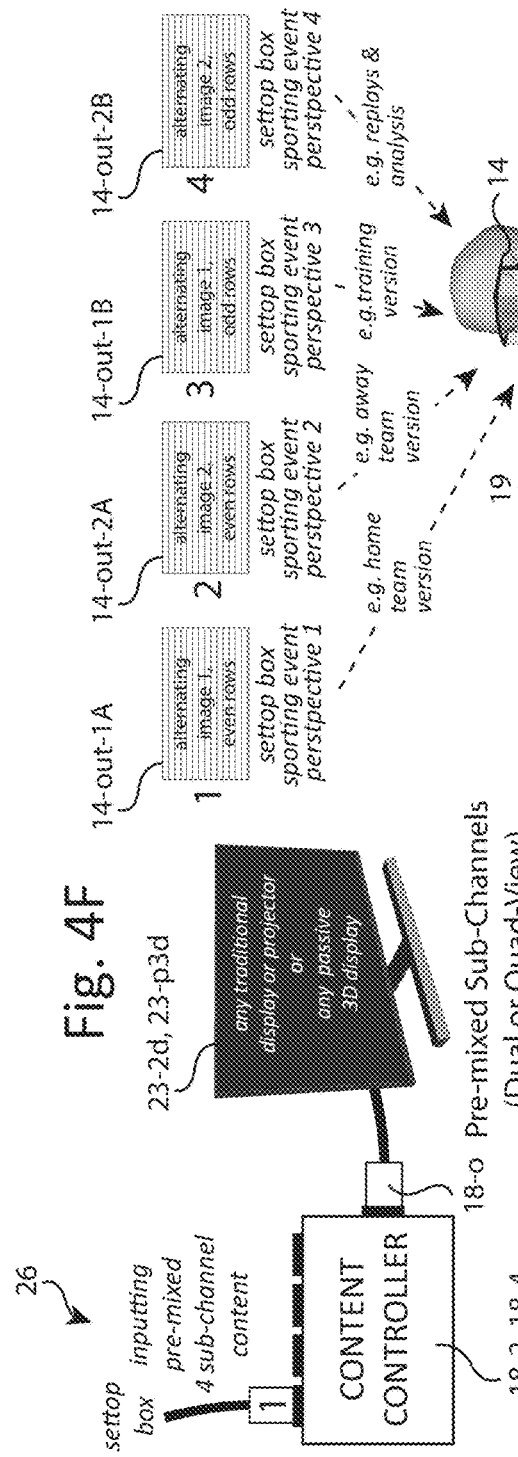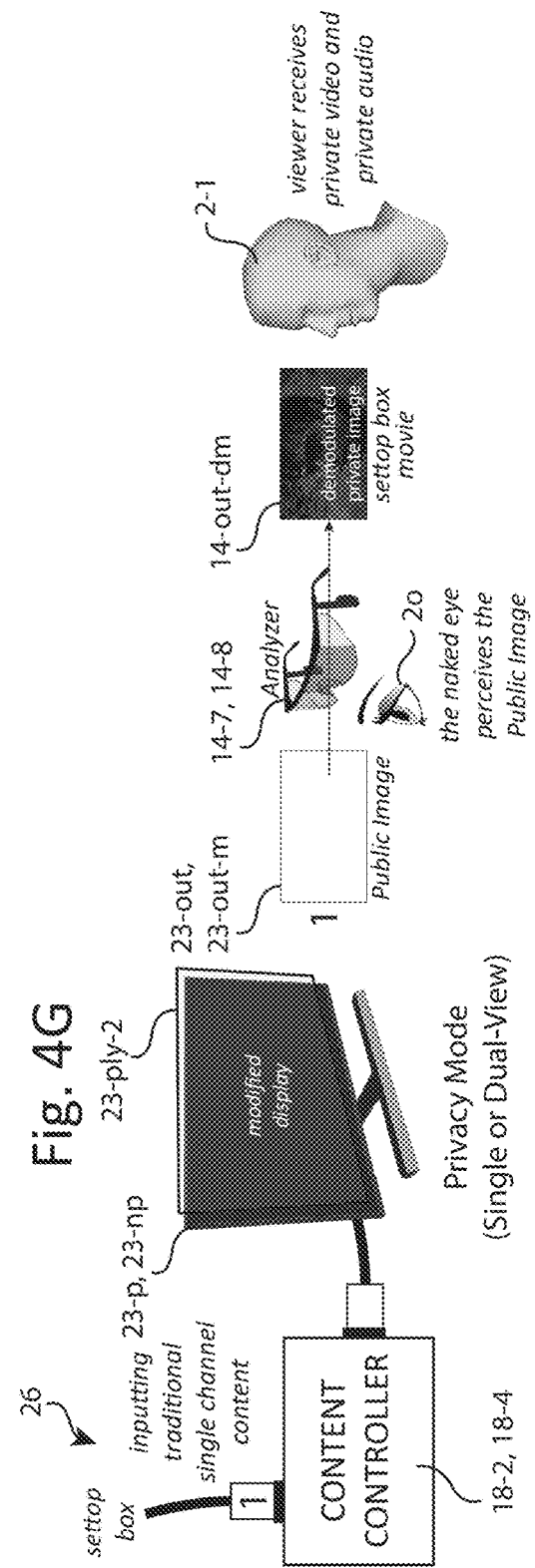

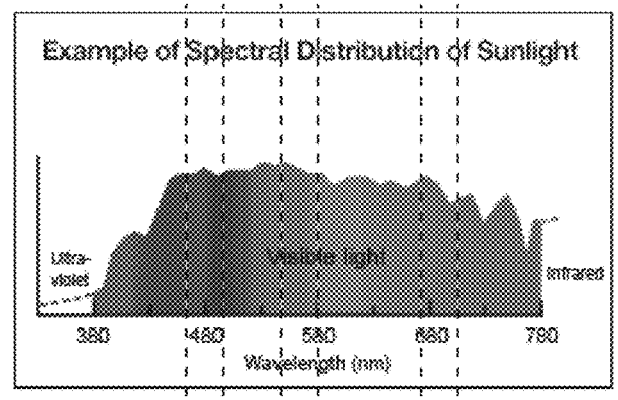
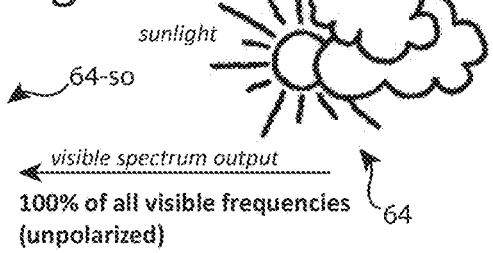
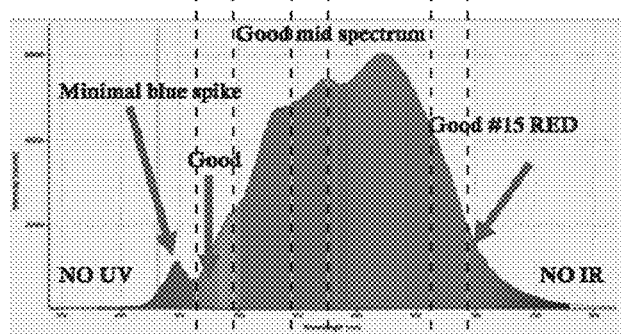
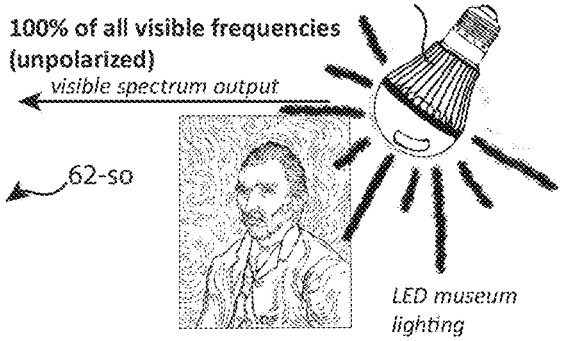
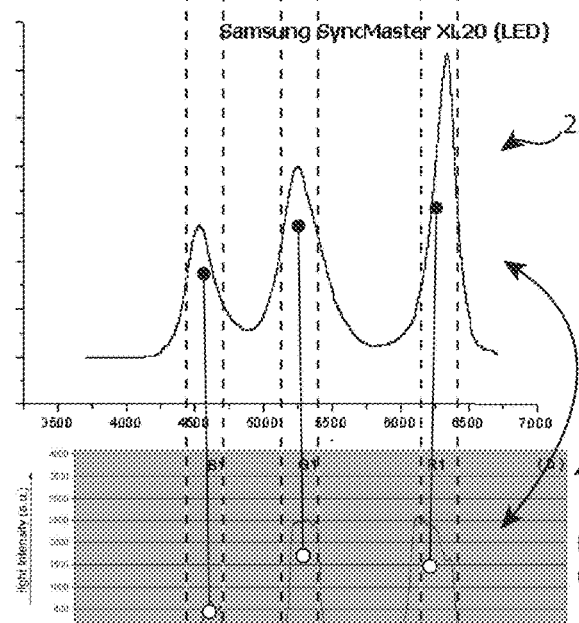
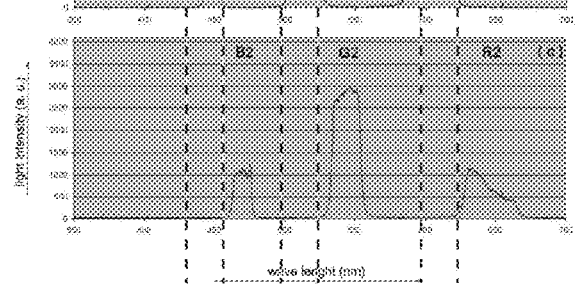
Fig. 5D

Fig. 5H

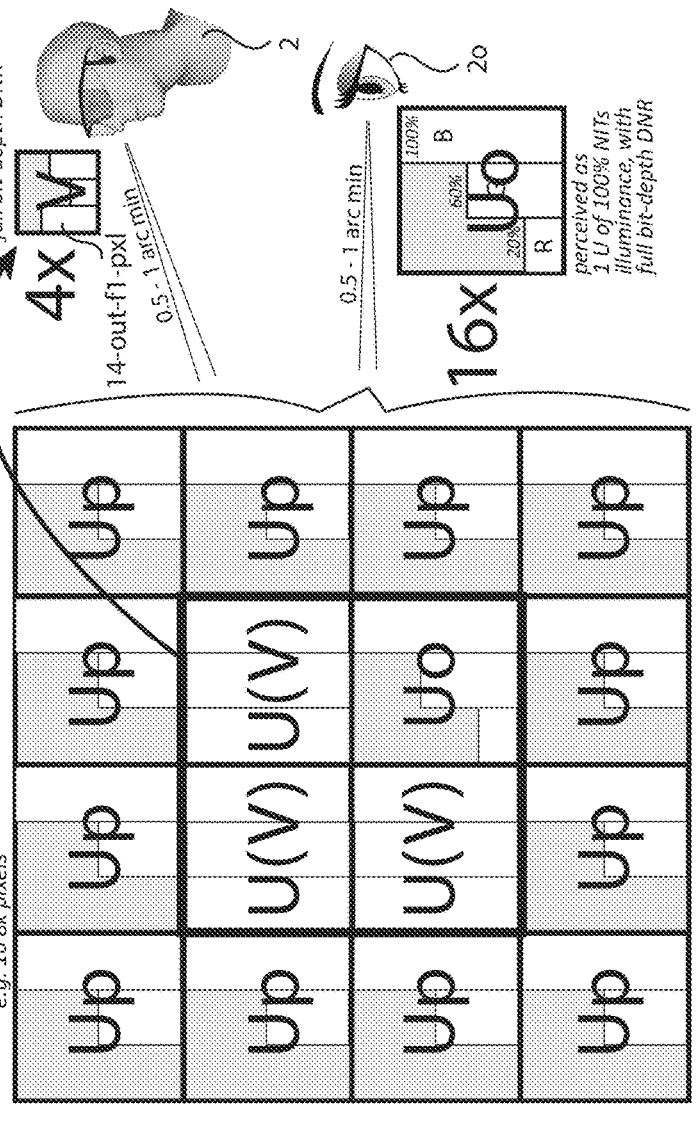
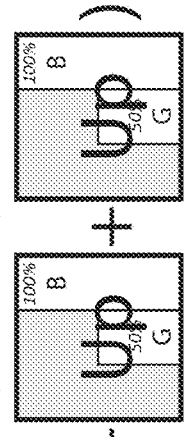
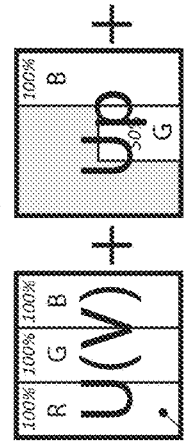
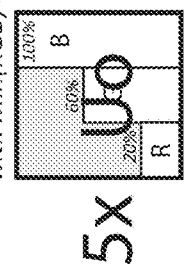
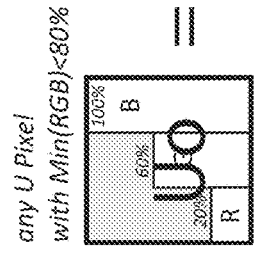
Fig. 51

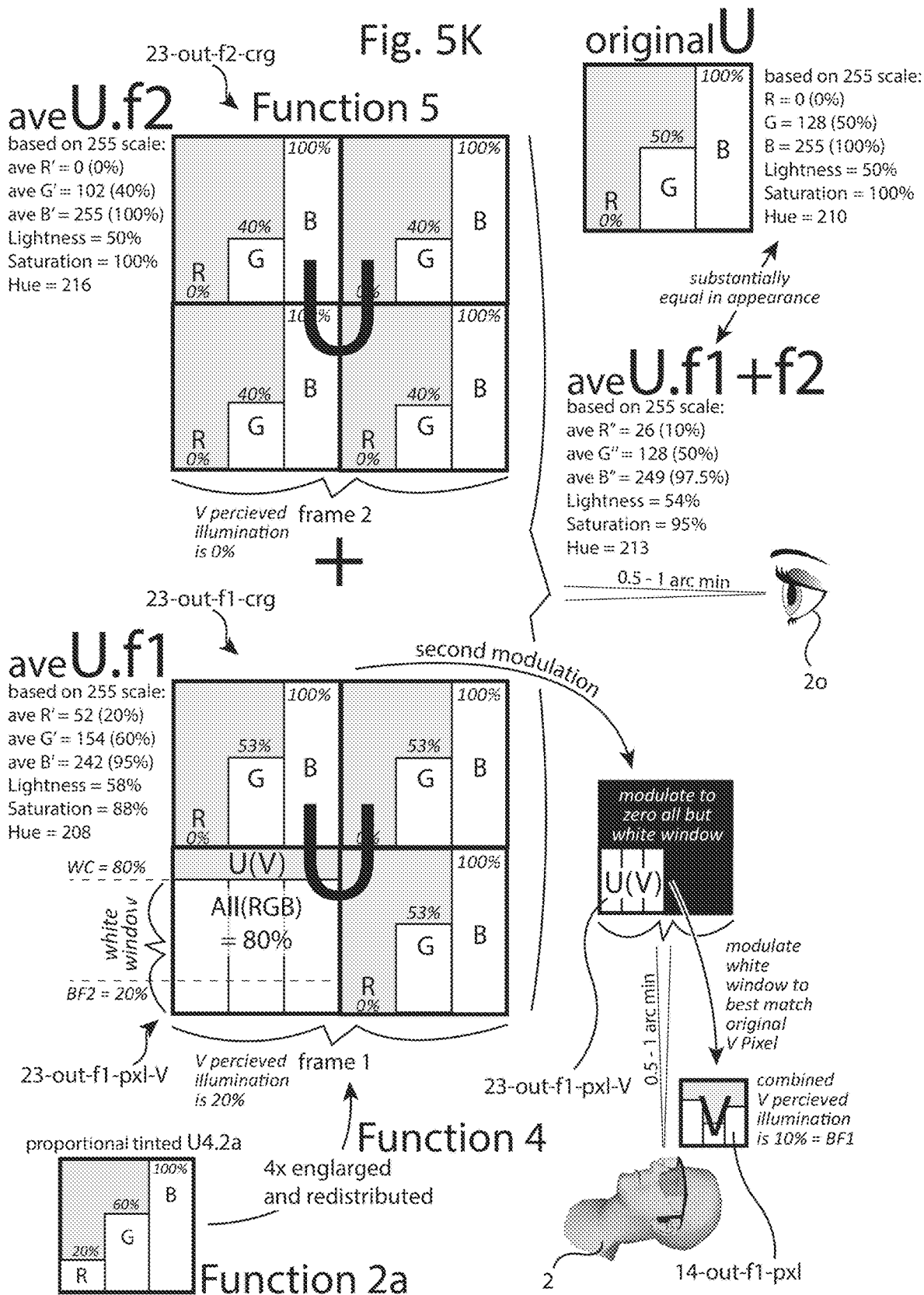

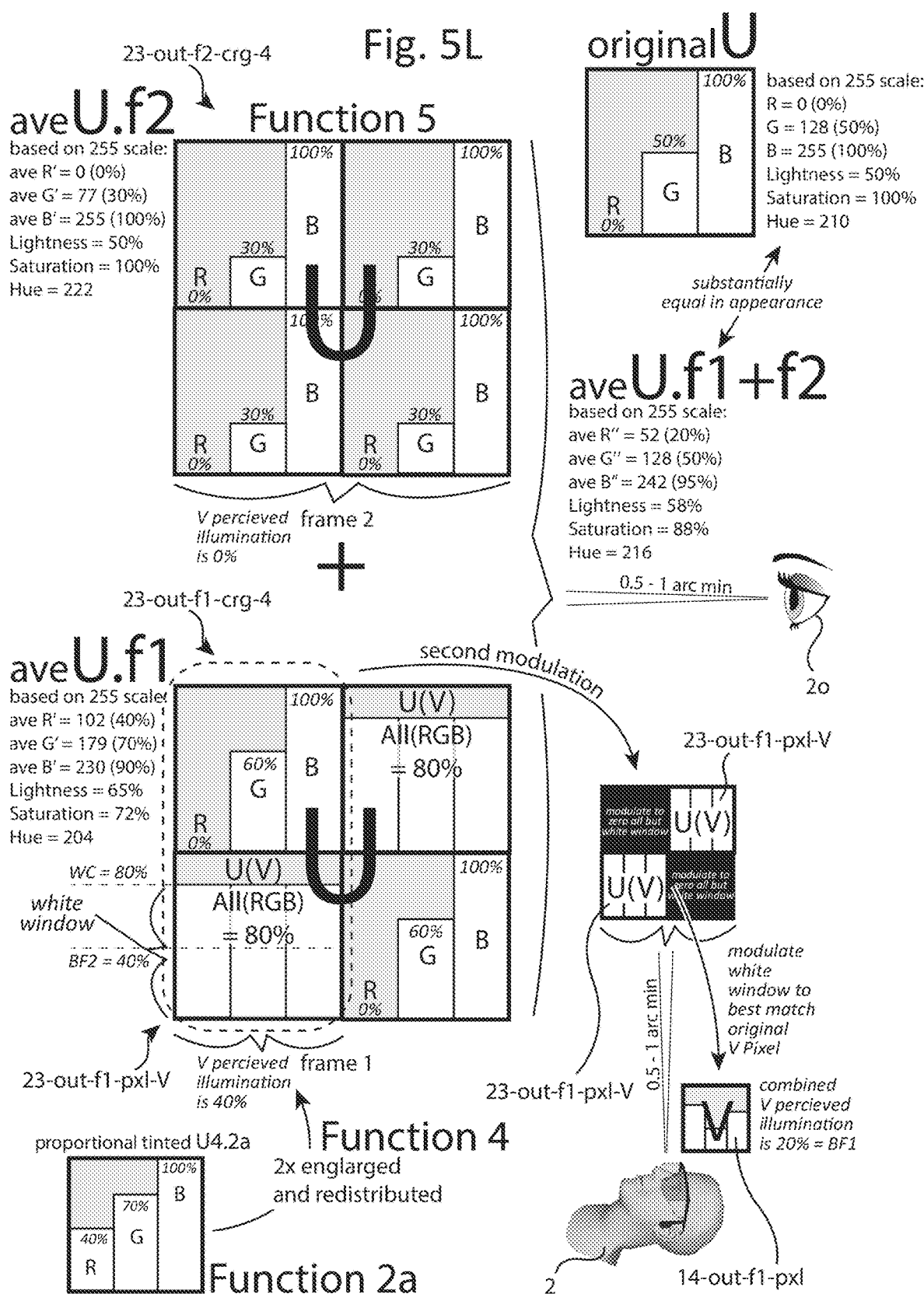

PRIVATE VIDEO V
reserved V illumination undergoes spatial aggregation only, no temporal aggregation, assume controlled to be favorable BF1 >= 20%

| Stream V1 | Stream V2 | Stream V3 |
|---|---|---|
| R(V1) | R(V2) | R(V3) |
| V1 | R(V2) | V3 |
| R(V1) | V2 | R(V3) |
| V1 | V2 | R(V3) |

Stream Combinations Table

| | | |
|---|---|---|
| 0 | 0000 | |
| 1 | 0001 | |
| 2 | 0010 | (viewer 2-v2) |
| 3 | 0011 | inverse of 9 |
| 4 | 0100 | |
| 5 | 0101 | (viewer 2-v1) |
| 6 | 0110 | |
| 7 | 0111 | inverse of 5 |
| 8 | 1000 | |
| 9 | 1001 | (viewer 2-v3) |
| 10 | 1010 | |
| 11 | 1011 | inverse of 5 |
| 12 | 1100 | |
| 13 | 1101 | |
| 14 | 1110 | |
| 15 | 1111 | | possible combinations of polarizer rotations given 3 streams

What Viewer 1 Sees

| Rotate | Transmitted Pixels | | |
|---|---|---|---|
| Light Valve? | Stream V1 | Stream V2 | Stream V3 |
| Yes | V1 | V2 | V3 |
| No | V1 | R(V2) | R(V3) |
| Yes | V1 | V2 | R(V3) |
| No | V1 | R(V2) | R(V3) |

What Viewer 2 Sees

| Rotate | Transmitted Pixels | | |
|---|---|---|---|
| Light Valve? | Stream V1 | Stream V2 | Stream V3 |
| Yes | V2 | V2 | V3 |
| No | R(V1) | V2 | R(V3) |
| Yes | V2 | V2 | R(V3) |
| No | R(V1) | V2 | R(V3) |

What Viewer 3 Sees

| Rotate | Transmitted Pixels | | |
|---|---|---|---|
| Light Valve? | Stream V1 | Stream V2 | Stream V3 |
| Yes | V3 | V3 | V3 |
| No | R(V1) | V2 | V3 |
| Yes | V2 | V2 | V3 |
| No | R(V1) | R(V2) | V3 |

PUBLIC VIDEO U — PUBLIC VIDEO U — PUBLIC VIDEO U — PUBLIC VIDEO U

| Private Stream 1 (of Type V1) | Private Stream 2 (of Type V2) | Private Stream 3 (of Type V3) | Private Stream 4 (of Type V1) | Private Stream 5 (of Type V2) | Private Stream 6 (of Type V3) | Private Stream 7 (of Type V1) | Private Stream 8 (of Type V2) | Private Stream 9 (of Type V3) |

Station 1, Station 2, Station 3, Station 4, Station 5, Station 6, Station 7, Station 8, Station 9

Game Access Point 30-1, 30-2

FOV arranged to limit view of other Type 2 pixels sees Private Video (V) as Stream 5 (can only see Type V2 pixels)

sees Public Video (U) across entire display polarized glasses only see U pixels overlaid with neutral gray [V + R(V)] pixels

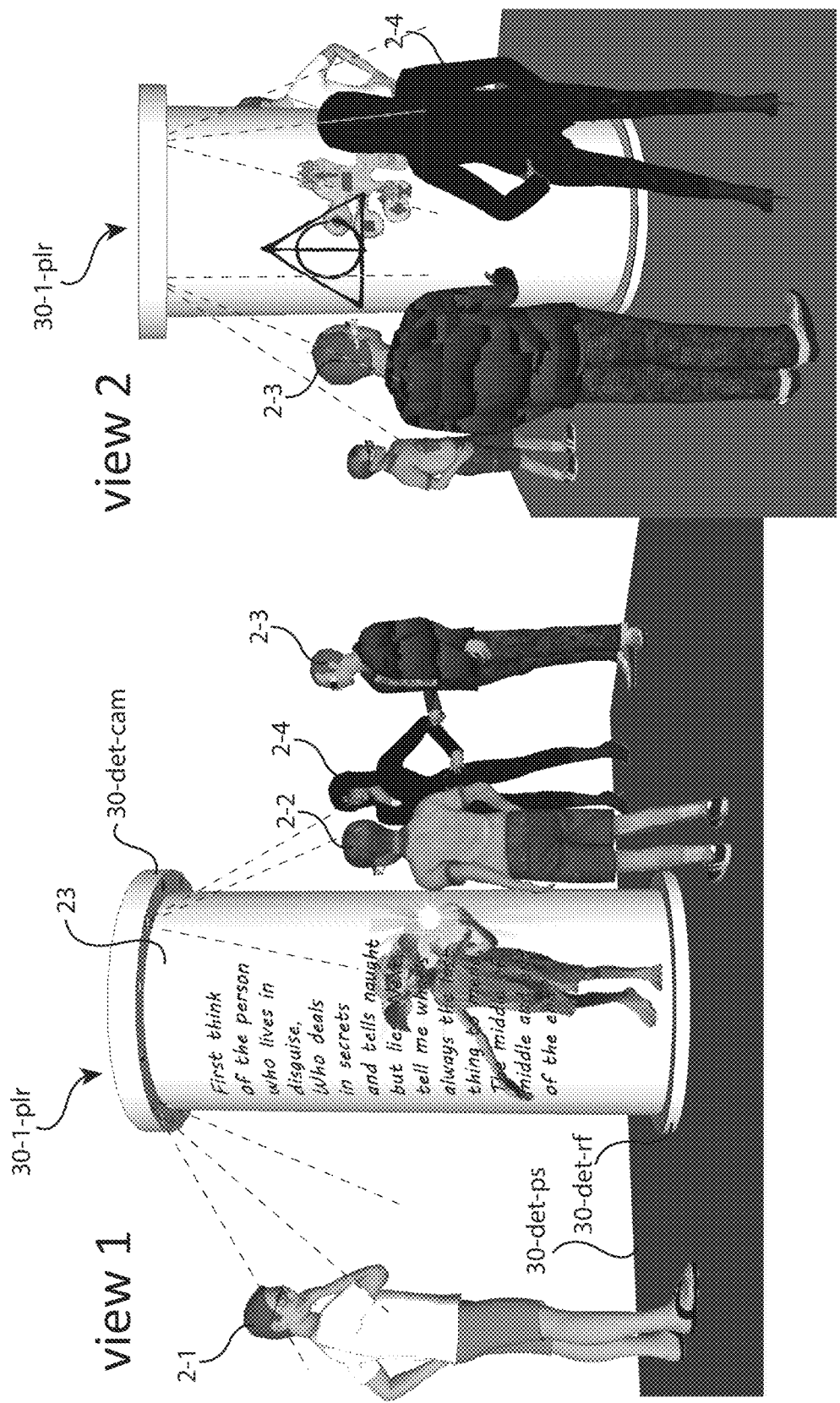

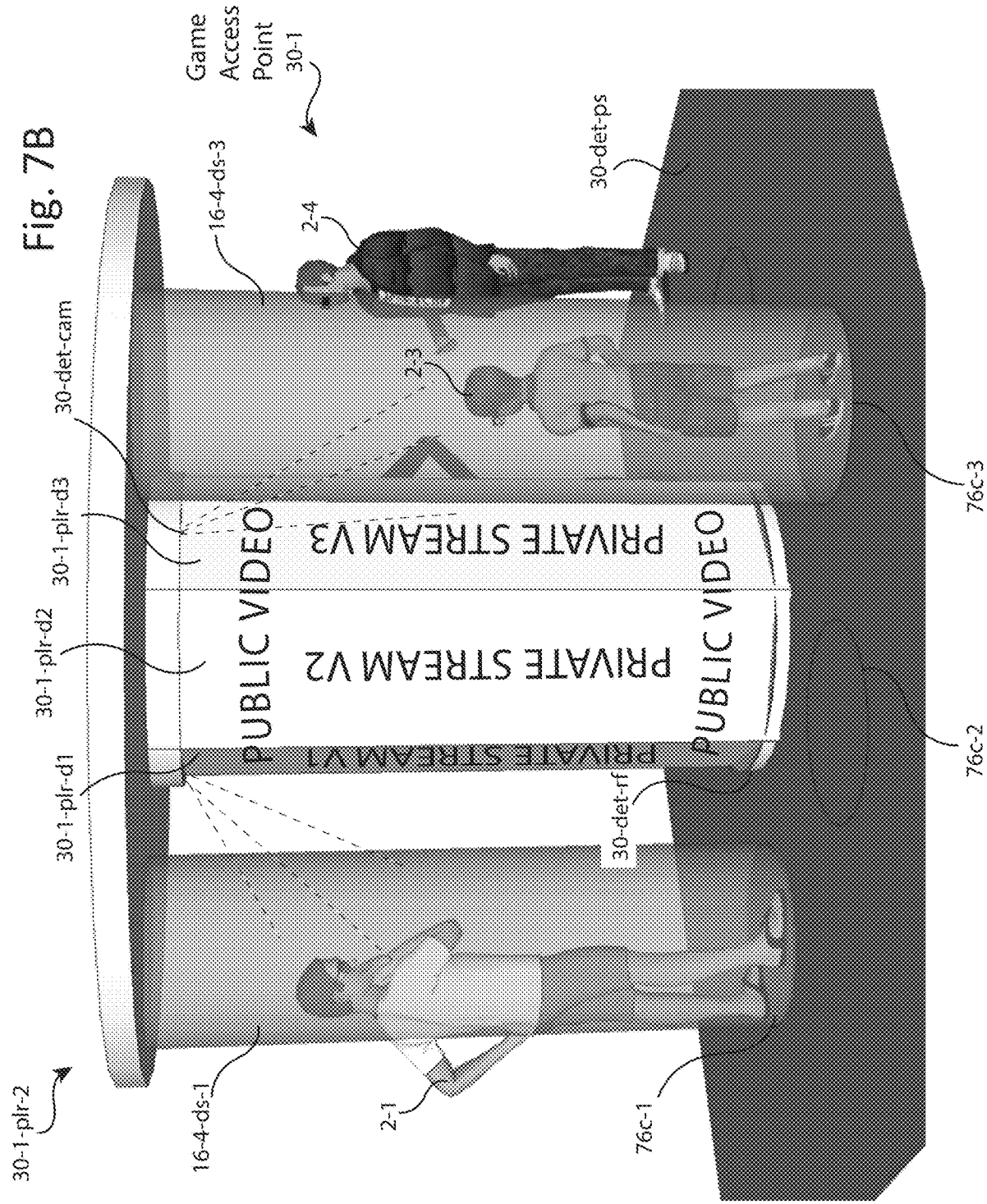

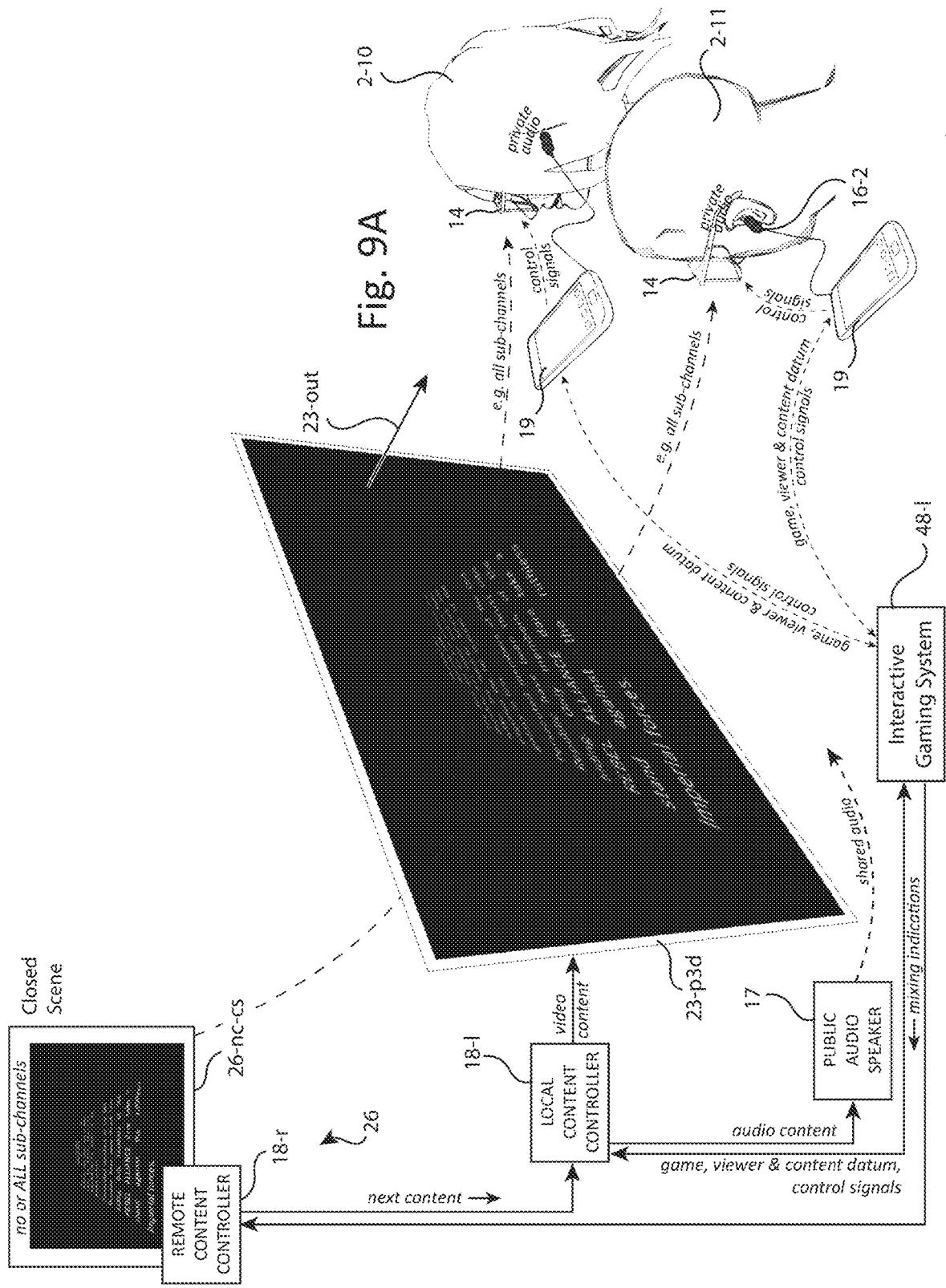

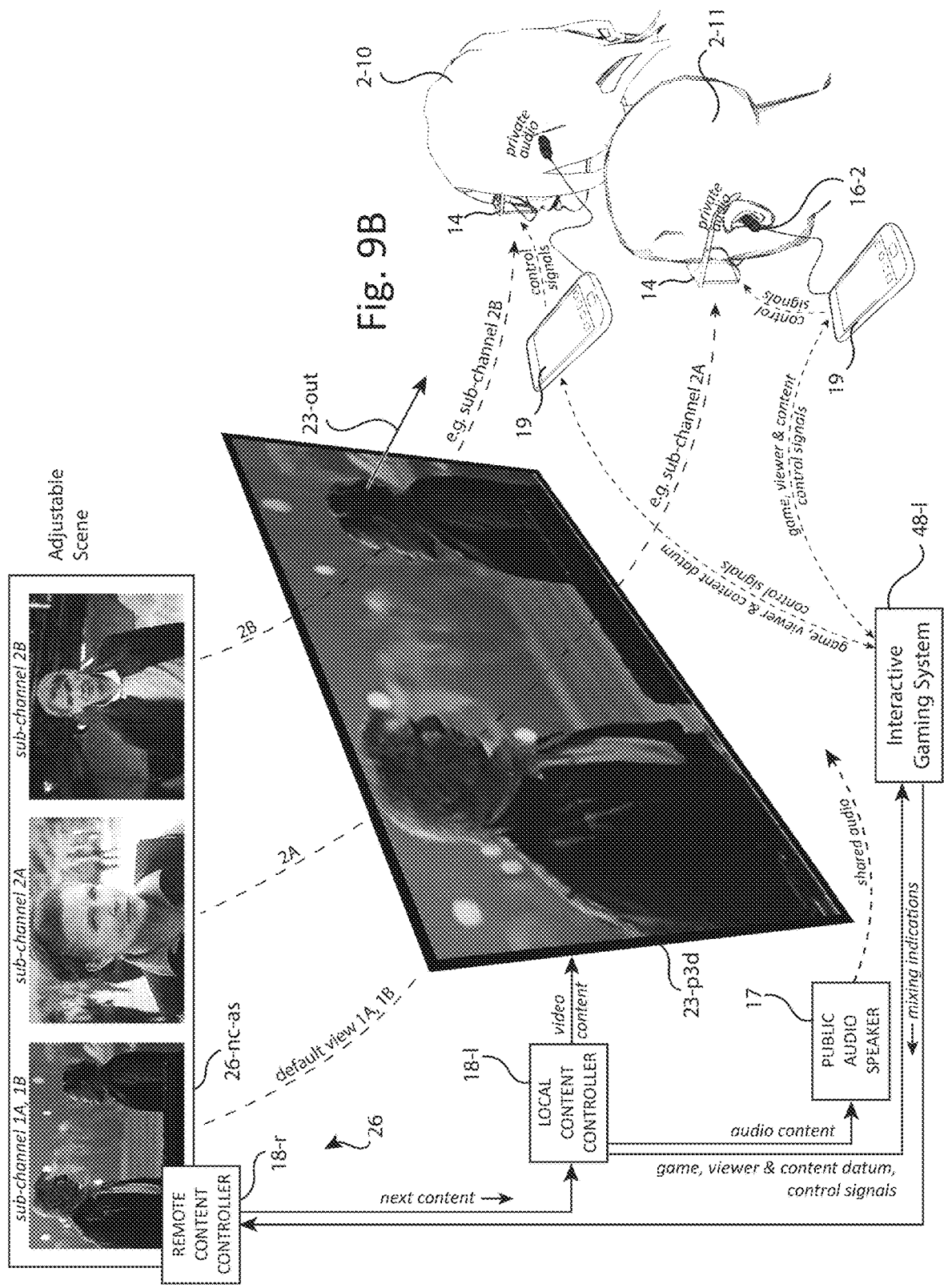

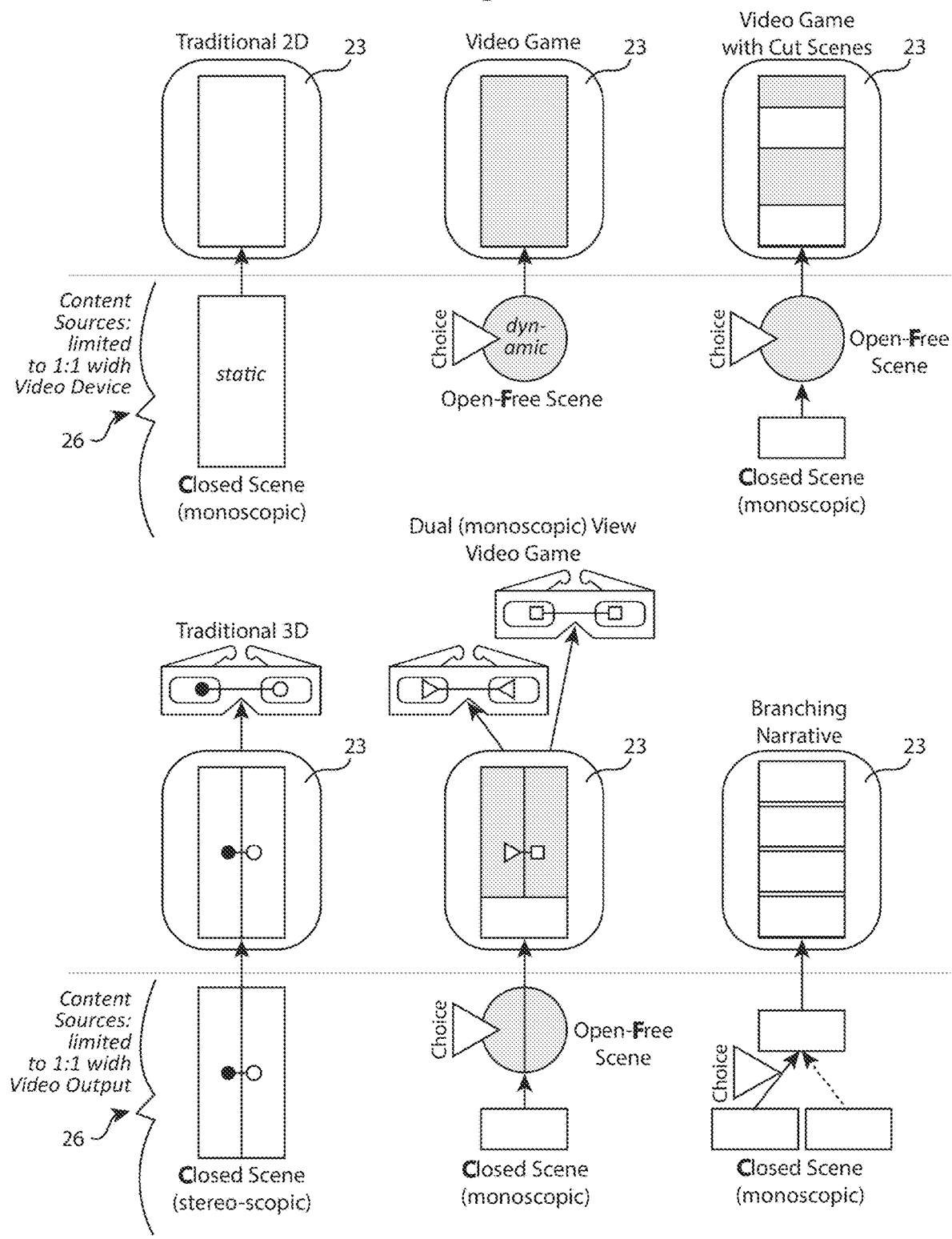

MULTI-PLAYER AUDIO-VIDEO INTEGRATED WITH INTERACTIVE GAME BOARD

CROSS-REFERENCE TO RELATED APPLICATIONS

This application claims the benefit of U.S. Provisional Application No. 62/652,486 entitled SUB-CHANNEL VIDEO-AUDIO PROVIDER FOR ADJUSTABLE STORIES AND GAMING SYSTEMS filed on Apr. 4, 2018. The present application is a continuation-in-part of the U.S. Non-Provisional application Ser. No. 15/975,236 entitled Interactive OBJECT TRACKING MIRROR-DISPLAY AND ENTERTAINMENT SYSTEM filed on May 9, 2018. The present application is a continuation-in-part of the U.S. Non-Provisional application Ser. No. 16/027,301 entitled PHYSICAL-VIRTUAL GAME BOARD AND CONTENT DELIVERY SYSTEM filed on Jul. 4, 2018. The present application is a continuation-in-part of the U.S. Non-Provisional application Ser. No. 16/055,078 entitled THEME PARK GAMIFICATION, GUEST TRACKING AND ACCESS CONTROL SYSTEM filed on Aug. 4, 2018. The present application is a continuation-in-part of the U.S. Non-Provisional application Ser. No. 16/144,161 entitled INTERACTIVE GAME THEATER WITH SECRET MESSAGE IMAGING SYSTEM filed on Sep. 27, 2018.

FIELD OF INVENTION

The present invention relates to a video-audio system that provides multiple sub-channels of video and audio content that are selectable within a single traditional channel. Using multiple sub-channels within a gaming system allows two or more gamers to receive a traditional video-audio channel over a single shared video-audio output device while still receiving private content based upon their own selections and game responses as well as the current game state. The present system has several forms including for use in homes and movie theaters where the system supports the implementation of adjustable storylines that differ from traditional movies and shows that are closed storylines and video games that are open storylines. Alternative uses are discussed for destinations such as theme parks in what a copending application describes as a game access point.

BACKGROUND OF THE INVENTION

For the purposes of the present invention, it is important to understand several ongoing trends applicable to: 1) video output; 2) video creation and video delivery networks, 4) private audio technologies; 5) video gaming; 6) movies; 7) hybrid tv, and 8) large group destination engagement.

With respect to video output, there continues to be a significant competition between manufacturers, where the competitive focus is on: a) increasing spatial resolution where 4k televisions are generally available, 8k are now coming to market and 16k to 32k are anticipated; b) increasing refresh rates where 120 Hz televisions are generally available, 240 Hz are now coming to market and 480 Hz are anticipated; c) increasing dynamic range though increased luminance as measured in Nits for displays and ANSI lumens for projectors, where an average television outputs 100 to 200 Nits and an HDR (high dynamic range) television outputs 400 to 1,000 Nits, and where televisions outputting 2,000 Nits are now coming to market and 4,000-10,000 Nits are anticipated, and d) increasing input image frames per second (fps) where 60 fps are generally available, 120 fps are now coming to market and 240 fps to 480 fps are anticipated.

These technology features can be directly related to two aspects of the human vision system known as spatial acuity and temporal acuity. Spatial acuity deals with the ability of the human eye to resolve image detail at a given distance, where for example the average human vision reaches a limit between 1 arc minute and 0.5 arc minutes (primarily taught in FIG. 1b.) A typical person with 20/20 vision can resolve image detail down to a 1 arc minute area measuring 1.35 mm×1.35 mm at 10' from a display. On a 65" display, this area equals 1 HD pixel, 4 4k pixels, 16 8k pixels and 64 16k pixels, where the 4k display is reaching the practical limit (i.e. 0.5 arch minutes) of human spatial acuity. Temporal acuity deals with the ability of the human eye to resolve fluctuations in the luminance of a light source, where for example the average human vision reaches a limit between 15 ms and 10 ms (primarily FIG. 1c.) A typical person perceives an image refresh rate of 60 Hz (i.e. 16 ms per image displayed) to be substantially "flicker-free," where displays that refresh at 120 Hz (i.e. 8 ms per image displayed) exceeds the practical limit of the average human temporal acuity. There is still a debate regarding the human vision system's ability to detect object motion, where a cinematic movie is presented in 24 fps of motion acuity, while new displays for video gamers claim effective rates of 144 fps (which is 6×24, the cinema rate.)

What is certain is that the competition amongst manufactures has reached the limits of the average human spatial and temporal acuity for providing pleasing images, where the future of displays and projectors now lies within the range of "visual high-fidelity." The present invention anticipates that similar to the transition from high-fidelity analog audio systems to pocket digital audio devices, the marketplace will prefer that the excess resolution, frame rates and brightness of future video output devices be used to provide new features such as multiple viewing sub-channels where for example a single 8k display could provide 2 to 16 concurrent viewers with their own private 4k, flicker-free, HDR video (primarily FIGS. 1a, 1e, 2k, 2l, 4b, 4c, 4e, 4f and 4h,) where these sub-channels are filtered for viewing by synchronized system eye glasses using various combinations of active shutters, passive polarizers, active polarizers and passive color filters (primarily FIGS. 1a, 2b, 2c, 2d, 2e, 2f, 2g, 2h, 2i, 2k, 2l and 2m.) The present invention anticipates controllably providing a private image to a select viewer on a first sub-channel and a complimentary image on a second sub-channel, where the select viewer wearing system glasses perceives the first sub-channel that is a private image and a viewer without glasses perceives the combination of sub-channels as a disguised image such as half-intensity white light (primarily FIGS. 2c, 2o and 4d.) The present invention further anticipates adding a second modulation layer of light values covering each sub-pixels of a traditional display, where the modulation layer provides for encoding of the public image to further comprise a private image that can only be seen using system glasses (primarily FIGS. 2d, 2e, 2f, 2k, 4g, 5b, 5c, 5d, 5e, 5f, 5g, 5h, 5i, 5j, 5k, 5l and 5m.)

With respect to video creation, cinematic movies are minimally captured at 35 mm resolutions, roughly equivalent to 4k-8k. IMAX film is known to be roughly 9 times larger than 35 mm, with a scanned image of roughly 18k, but is considered as too expensive for most productions. The jump from HD to 4k video also has a significant effect on the entire image processing workflow, as 4k video requires 4× the data storage and processing as compared to HD video.

With respect to video delivery networks such as cable and satellite, the majority of available video content is still HD in quality, with limited 4k channels and no 8k channels. However, with the upgrade to fiber optics, delivery networks can now provide at least 10× the data rates as compared to coaxial cable, although only 10% of the US market is fiber vs. cable. What is clear is that producers will struggle to create sufficient 4k and greater content even though the delivery networks can provide 4k and even 8k channels.

The present invention anticipates providing either a static pre-mix of multi sub-channel content within a single traditional channel (primarily FIG. 4f,) or a dynamic on-going mix of multi sub-channel content within a single traditional channel (primarily FIG. 4h.) Using a static pre-mix for example, a content source of a sporting event can provide 4 simultaneous views within a single traditional channel (primarily FIG. 4f.) Using a dynamic pre-mix for example, a content source of an interactive game can also provide 4 simultaneous views within a single traditional channel (primarily FIG. 4h,) where the views change at least in partial response to on-going indications from one or more viewers. Given the teachings herein, the number of sub-channels is not limited to 4 and is anticipated to reach as high as 16.

With respect to private audio technologies, there has been significant quality and price advancements in portable music speakers, including a technology referred to as bone speakers that create sound through vibrations made on the skull rather than through air reverberation directed into the auditory canal. Bone speakers are not placed over the auditory canal and therefore provide a person with the unique ability to receive both private audio and unobstructed shared audio (i.e. ambient audio being received into the auditory canal.) Significant advancements have also been made in what is referred to as directional sound that is designed to be focusable in a direction rather than being omni-directional as are all traditional speakers. Over the last 10-20 years, a technique referred to as modulated ultrasound has been perfected and creates directional sound within an audio field size of roughly 1 human body that can be projected for long distances exceeding 100'. Like bone speakers, modulated ultrasound provides private audio that is also combinable with shared audio as provided by traditional speakers. The present invention anticipates providing private audio corresponding to each sub-channel of private video (primarily FIGS. 1a, 3a, 3b, 3c, 3d, 3e and 3f.)

With respect to video gaming, it is currently estimated that the gaming industry has now surpassed the movie industry in terms of annual revenues, as more and more of the younger population engage this new form of media content. Over the last 10-15 years, there has been increasing effort and interest in promoting video gaming as a full-fledged sport with broadcasted events (for example, there is now a Major League of Gaming.) Gaming cafés and large gaming competitions are now normal, where spectators often pay to watch live competitions between competing teams on large video displays. Animated virtual worlds are provided from either of 2 perspectives referred to a "$3^{rd}$ person" or "$1^{st}$ person," where both views are of interest. On Dec. 6, 2016, Sony was awarded U.S. Pat. No. 9,516,292 for an IMAGE TRANSFER APPARATUS AND METHOD that repurposes active shutter 3D apparatus and methods to provide what is referred to in the patent as "dual-view" gaming and in the marketplaces as SimulView, where 2 gamers competing in a single virtual environment are each provided with private video sharing the same video output device, where for example the private video is a 1st-person view. Gaming consoles such as the Sony PlayStation 4 currently support up to 4 simultaneous gamers where future capacities and other gaming platforms will exceed 4 gamers.

The present invention anticipates supporting between 2-8 simultaneous gamers using 2-8 sub-channels (primarily FIG. 4c showing 4 sub-channels,) where each gamer is sharing the same video output device and receiving private audio. The present invention anticipates spectators selecting between 1 of 8 simultaneous views while attending a gaming competition, where for example 1 view is a $3^{rd}$ person view, 2 views are $1^{st}$ person for 2 highlighted players on each of 2 teams, 1 view includes on-going commentary and overlaid graphics, 1 view includes indexed key replays and analysis and the final 1 view is a multiple view compilation like a football or baseball game that is produced from all other views. The present invention anticipates that each separate viewing sub-channel will have private audio, where for example the 4 views of highlighted players each include live audio from the player.

With respect to movies, the current single video-channel format limits producers and storytellers to focusing on a single perspective that is typically "the hero's journey," where most movies feature a protagonist and an antagonist, each with a cadre of supporting roles. It is also well-known that most protagonists are Caucasian-males, where for example research by the Center for the Study of Women in Television and Film at San Diego University found that females comprised only 12% of protagonists in the top-grossing films of 2014. Demographics as of 2014 indicate that 56% of all movie goers are Caucasians, 25% Hispanics, 10% African Americas and 9% Asian/Other. Demographics also indicate that 53% of all movie goers are between the ages of 12-39, where over 75% of these frequent movie goers own at least four types of key technology include a mobile device. It is also well-known that the average R rated movie grosses half as much as the average PG or the average PG-13 rated movie. As of 2014, 58% of the cinema screens were digital 2D and 37% were digital 3D.

The present invention anticipates providing at least 2 sub-channels for digital 2D theaters (primarily FIG. 4b) and 4 sub-channels for digital 3D theaters (primarily FIGS. 2h, 2i, 2j, and 4c,) thus providing the opportunity for movies comprising at least 2-4 perspectives. For example, a single movie could be released in both PG-13 and R versions. Or, a single movie could be released where a movie goer selects to watch the female versus male, or antagonist versus protagonist perspective (primarily FIGS. 9a and 9b.) A G rated movie can be release with PG content targeted to the parents. Movie theaters typically separate actor conversation into what is known as the center speaker channel, where the present invention anticipates using any of private speakers to provide conversation as private audio. With private audio, it is possible to omit sub-titles. The present invention anticipates premier movie theaters equipping seats with private directional sound (primarily FIGS. 3d, 3e and 3f.) It is anticipated that a single movie showing will include some scenes comprising two very different settings, where these scenes will allow producers and storytellers to target their stories to a larger demographic. The present invention anticipates viewers using mobile devices participating in game sequences within a traditional movie sequence (primarily FIG. 9c,) where the results of the game effect what scenes are provided next to either the viewer or the entire audiences (primarily FIG. 10c.) The present invention also anticipates a movie theater presenting multiple lower budget movies or independent films simultaneously on different sub-channels, thus optimizing theater throughput or in a similar vein the exclusive upper-deck area of an airplane including a large area video display or projector that is used to simultaneously present 2-4 movies.

With respect to hybrid television, streaming services are now overtaking cable in terms of total audience. While the number of cable channels has increased enabled by advances in network bandwidth, adding streaming content has created a deluge of movies and shows to watch, where the costs of producing a credible movie or show have dropped significantly due in large part to technology. Over the last 10-15 years the mini-series has blossomed into multi-season stories such as Lost, Breaking Bad and Game of Thrones, where each series has developed hard-core fans. Research has noted that "physical board games are experiencing a gold age," where "many new board games capitalize on the popularity of trends in pop culture such as zombies and steampunk, or are directly derived from TV shows such as 'Battlestar Galactica,' 'Spartacus' and 'Game of Thrones.'" Television is also experiencing a merge with personal computing as it crosses into what are known as "branching narratives." One example of branching narrative technology is a app called Mosaic produced by PodOp in combination with HBO and the director Steven Soderbergh. The app allows viewers to self-select next scenes in the storyline that includes 7-plus-hours of content. In another hybrid of mobile devices and live streaming tv, the trivia show HQ airs twice a day for about 10 mins during which contestants use their cell phone HQ game app to compete.

The present invention anticipates multiplayer games combining mobile game interfaces with traditional tv style content (primarily FIG. 4h,) where contestants compete with both the larger audience and with each other at home, where each viewer-gamer interacts with the game on a private sub-channel and their own mobile device. The present invention anticipates streaming tv shows such as Game of Thrones remaining in the usual 1-hour format but including 2 to 4 perspectives, where for example each perspective provides different clues and information regarding the storyline. Fans watch the initial show picking a perspective where new types of social games are created to challenge fans in relation to the perspectives. All the additional content then remains available to become a single-view branching narrative like Mosaic. In the copending application for PHYSICAL-VIRTUAL GAME BOARD AND CONTENT DELIVERY SYSTEM the present inventor disclosed a hybrid physical board game that tracks game piece locations, where the tracked locations trigger the provision of private video and audio tied to the game theme (primarily FIG. 8.)

With respect to large group engagement, destinations such as theme parks, museums and resorts spend significant money on fixed assets to attract guests. The cost for a new ride at a theme or amusement park is in the range of $10M-$20M. These assets by nature provide repeated experiences that can bore guests. These experiences are also limited by destination location and times of access. Museums often include presentations that feel static and unexciting especially to younger visitors. Many new movies themes such as Harry Potter and Star Wars are becoming a part of theme park experiences, while other movie themes such as Night at the Museum present museums in a more fun light. There has also been a significant rise in reality tv shows where large audiences tune it to watch everyday people compete.

The present application anticipates the use of sub-channels in either disguising mode (primarily FIG. 2c, 2o, 4d) or privacy mode (primarily FIG. 4g, 5b, 5c, 5d, 5e, 5f, 5g, 5h, 5i, 5j, 5k, 5l and 5m) as a means for supporting a destination-wide physical-virtual gaming system where guests explore the destination on missions including receiving secret messages (primarily FIGS. 6a, 6b, 6c, 7a and 7b.) The present and copending application for and INTERACTIVE GAME THEATER WITH SECRET MESSAGE IMAGING SYSTEM anticipate providing clues, secret message and customized experiences at various game access points that include multi sub-channel private video and audio for example using system glasses or a magnifying glass (primarily FIGS. 2c and 2o.) The present and copending application for an INTERACTIVE OBJECT TRACKING MIRROR-DISPLAY AND ENTERTAINMENT SYSTEM anticipate a magic mirror for use in resorts associated with a theme park, where the mirror provides secret messages and engages guests beyond the limitations of the destination location and times of access.

What is important to see is that as display manufactures compete to increase resolution, refresh rates, input frames rates and luminance, like the resolution competition in digital cameras, the technology has reached and will exceed a practical human limit. The present invention teaches alternative advantageous uses for the additional spatial and temporal resolution beyond high-fidelity image quality. What is also important to see, is that like the change from analog to digital audio, the marketplace is often willing to exchange high-fidelity for convenience or new features.

Based upon these trends and the teachings provided herein, the present invention anticipates a new storytelling platform referred to as an adjustable story. The following is a background for understanding this new platform.

A traditional movie or television show is a limited pre-assembly of scenes that tell a fixed story without influence from the viewer, where the present invention refers to this as a closed story because the final content is predetermined by the producers and storytellers and not open for change as experienced by the viewer. Significant technology has been created to deliver closed stories to viewers in several basic settings including movie theaters, home rooms and now also mobile platforms. These technologies implement a paradigm where one or more viewers share a video-audio system such as a television or movie projector-screen, each receiving the same closed story content. There are well-known industry standards for encoding, delivering and decoding closed story content as well as apparatus and methods for converting the decoded content into visual and audible information for the viewer. These apparatus and methods fall into the two main categories of displays and projectors and are specifically designed to deliver a single movie or show to the viewers without then also providing any option for a single viewer to interact with the system such that at least one viewer might see and hear at least one scene that is different from any other viewer.

A traditional video game is a 3D virtual world providing a multiplicity of possible settings that suggest a possible storyline for final determination by the gamer, where the present invention refers to this as an open story because the content is not closed off by the producers and storytellers of the game but rather remains open for virtually limitless change by the gamer. Significant technology has been created to deliver open stories to gamers in typically an isolated setting such as a computer desktop or mobile platform operated by the single gamer. These technologies implement a paradigm where the single gamer controls a video-audio system such as a computer screen, where substantially only the single gamer receives the open story content. There are well-known industry standards for encoding, delivering and decoding open story content as well as apparatus and methods for converting the decoded content into visual and audible information for the viewer. These apparatus and methods technically encompass those created for the delivery of closed stories but typically are displays rather than projectors and are designed to deliver a single 3D world for unlimited open story exploration by a single gamer without then also providing any option for multiple gamers to share and individually explore the same 3D world using the same video-audio system, where each of the multiple gamers at least at some time receives private video and corresponding private audio.

While gaming technology does exist for allowing what is referred to as dual-view mode, these systems are limited to two views typically comprising a different viewpoint (e.g. first person of gamer 1 and first person of gamer 2) of the same on-going scene, where each viewpoint is pre-assigned to a gamer and remains set for the duration of the game (i.e. the second gamer 2 cannot switch to see the viewpoint of the $1^{st}$ gamer.) These systems have no provision for corresponding dual-hearing audio to match the dual-views which becomes especially problematic when the gamers are choosing to participate in entirely different scenes with entirely different audio. A typical dual view game is for a race track where each of two competing drivers can watch the track in their own first-person perspective while then seeing the other driver as would be the case in real-life. Some video games also include what are referred to as cut scenes within the video game, were for a short duration of time the gamer relinquishes control of the open scene 3D virtual world and instead watches a closed scene as would be included in a closed story, thus forming a combination of an open story comprising one or more closed scenes.

In comparison, closed stories comprise predetermined video-audio content that cannot be altered or changed based upon inputs from the viewer, where a closed story has a pre-known limited duration such as 1 or 2 hours, whereas open stores comprise predetermined settings (e.g. backgrounds) with variable viewpoints, characters, action, audio, etc. within which final video-audio content can be altered or changed by the viewer-gamer, where this variable content typically has no limits of duration and could for example last from 15 minutes to days. Closed stories typically comprise an ordered set of a multiplicity of closed scenes, where a closed scene can be conceptualized as a closed story with like-wise predetermined video-audio that has a shorter pre-known duration than the closed story, where the ordered set defines the sequence of presentation of each of the multiplicity of closed scenes, and where the total pre-known durations of the multiplicity of closed scenes make up the pre-known duration of the closed story. Open stories typically comprise an unordered set of a multiplicity of open scenes, where an open scene can be conceptualized as an open story with like-wise variable content that has a shorter unknown duration, where the unordered set does not define the sequence of presentation of each of the multiplicity of open scenes, and where the total unknown durations of the multiplicity of open scenes make up the unknown duration of the open story.

In the book entitled Glued To Games, (2011) Santa Barbara: Praeger, authors Scott Rigby and Richard M. Ryan breakdown their research into and understanding of the phycological motivations that compel video gamers, where these motivation include: competency, autonomy and relatedness. Competency is the acquiring and mastering of behavioral skills, for example where the behavior is any of physically operating inputs such as a game controller, virtually moving a character in a 3D world or devising and executing strategies for achieving goals within the scope of the game. There is no similar competency opportunity with closed stories. Autonomy includes the ability for self-expression at least in the formation of the sequence of events (or scenes) that become the story, with further autonomy comprising the ability to adopt character rolls (i.e. perspectives) and influence the outcome of a given scene through competency. There is no similar autonomy opportunity with closed stories. Competency and autonomy are logical experiences. i.e. thinking experiences, where the viewer relinquishes this thinking in closed stories. Relatedness is the sharing of experience with another entity, where this entity could be either biological or digital, and where over time the gamer begins to associate for example scene memories and competency opportunities with the entity therefore feeling a sense of relationship. Without opportunities for competency and autonomy to foster relatedness, closed stories must (and if successful do) achieve this third motivation of relatedness through other mechanisms.

In the online article entitled Roger Ebert on the Nature of Film: 'A Movie is Not a Logical Art Form,' Jul. 7, 2013, http://nofilmschool.com/2013/07/roger-ebert-movie-not-a-logical-art-form, author V Renee quotes Roger Ebert as saying: "I've always felt that movies are an emotional medium . . . a movie is not a logical art form. When we watch a film, the director is essentially standing behind us and saying, "Look here," and "Look there," "Hear this," and "Hear that," and "Feel this," and "Feel the way I want you to feel." And we give up conscious control over our intelligence. We become voyeurs. We become people absorbed into the story, if the story is working. And it's an emotional experience." This emotional experience is relatedness to a character(s) in the movie, often thought of as personal identification.

As prior mentioned, some video games include cut (i.e. closed) scenes, where the producers and storytellers of the video game are attempting to influence the emotional experience of the gamer vicariously in combination with the direct influences such as competency, autonomy and relatedness as provided by open scenes. There have been some experiments with closed story movies providing alternate endings. However, in these experiments the viewers are not making active, real-time and situational choices which then directly or indirectly effect the choice of the alternate ending, they are simply being presented prior to the closed story with an option of seeing perhaps a "theatrical cut" vs. "director's alternate ending." Alternate endings provide minimal autonomy for the viewer regarding choosing the storyline as represented by the video-audio content. Therefore, all closed stories, open stories, and open stories with closed scenes are well-known in the art.

What is desirable as a compliment to closed and open stories is an adjustable story that provides crossover features from both traditional movies and shows comprising closed scenes as well as video games comprising open scenes. An adjustable story should provide producers and storytellers with the ability to direct the emotional experience of the viewer through the use of pre-determined video-audio content while also affecting the logical and emotional experience of the viewer through the use of variable content. Preferably, the adjustable story can be either of a pre-known limited duration like a closed story, or unknown duration like an open story. Adjustable stories should include the potential for providing the viewer with increased feelings of competency, autonomy and relatedness as compared to closed stories without needing to become open stories that are essentially highly personal experiences with minimal emotional influence from the producers and storytellers. Adjustable stories should allow for both individual and group influence at least in part over the final video-audio content as received by any of the individuals, where the individuals and groups may even engage in competitions.

What is needed to accomplish adjustable stories are apparatus and methods capable of delivering a single traditional channel or stream of closed video-audio, such as a cable television or movie theater projection system delivering a closed story, where the video and audio of the single traditional channel are further sub-dividable into a multiplicity of selectable sub-channels, and where each sub-channel provides different video-audio to be received by any of a multiplicity of viewers. What is further necessary is that the number and timing of these sub-channels is controllable by the adjustable story producers and storytellers and that at least some input is received from at least one viewer, where the received input is used at least in part to determine which of the provided sub-channels is to be received by any of the multiplicity of viewers. What is also necessary is that the at least some input provided by the at least one viewer is accepted in relation to the number and timing of the provided sub-channels, and where the input supports any of competency, autonomy or relatedness.

The needed apparatus and methods should be usable with an interactive gaming system such that two or more viewer-gamers receive simultaneous video-audio content over a single channel delivery system as provided by a content source as a part of a game, where the simultaneous content is at some point in time perceived as different by a first viewer-gamer as compared to a second viewer-gamer, where the difference in perception is caused by the filtering of the simultaneously received content into a first sub-channel for receiving by the first viewer-gamer and a second sub-channel for receiving by the second viewer-gamer, and where on-going viewer-gamer inputs at least in part affect the number and timing of the sub-channels and therefore the possibility of received content. The needed apparatus and methods should also provide for the inclusion of open scenes of either limited or unlimited duration, where each of a multiplicity of gamers divided into a least two groups of one or more gamers controls and receives distinct sub-channel video-audio, where any number of open scenes are combinable with any number of closed or adjustable scenes in any ordered sequence.

An adjustable story provides a compromise between a fully crafted storyline line delivered to the specification of producers and storytellers, such as a movie or television show, and a limitless explorable world with a loose and never-ending storyline such as a computer game. Taken in combination, what is provided includes a fully crafted storyline that comprises multiple (but limited) content options, where each of multiple viewers or gamers share a single video output path and for example receive at least some of the same video-audio experience, and at least some of a different video-audio experience based at least in part upon their inputs.

As will be understood by those skilled in the art of storytelling, an adjustable storyline offers the possibility of creating storyline perspectives, where two or more viewers receive essentially the same overall story but from different perspectives and therefore are influenced to perceive the same overall story in perhaps dramatically different ways. For example, the producers and storytellers of a movie or show typically include a protagonist and an antagonist, such as a hero and a villain. The traditional closed storyline is considered more realistic when the hero and villain are multi-dimension, that is they are neither all-good nor all-bad. However, the closed storyline leaves no room for re-crafting the emotional experience of the viewer in closer alignment with the different perspectives and motivations of the hero and the villain, but rather provides a single and in general limited perspective of the overall story, where typically this perspective is the hero's journey as chosen by the storyteller. In an adjustable storyline, it is possible that a viewer selectively choses to experience the perspective and journey of for example either the hero or the villain, where each of the selectable journeys are still crafted by the producers and storytellers. In a rich story that is true-to-life, the same events that make up the foundation of any closed story can have vastly different interpretations based upon a chosen character perspective, where closed stories limit the producers and storytellers to a single perspective that is often alienating to at least some demographic of viewers, whereas an adjustable story affords a more substantial exploration of the storyline providing multiple perspectives, wherein each perspective may appeal to or challenge different populations of viewers.

Using the herein taught apparatus and methods, it is now possible for storytellers to provide viewers with multiple concurrent scenes each representative of different perspectives for a singular event in an overall story. Using this approach, a viewer of an adjustable movie could pre-select before the movie for example to follow the perspective of the hero, the hero's supporting friend, the villain, or the villain's supporting friend. Two or more viewers selecting different perspectives would for example receive 80% concurrent-identical video-audio as provided within closed scenes, and 20% concurrent-distinct video-audio as provided within adjustable scenes. After the movie or show experience has concluded, the various viewers from different perspectives might then come away with drastically different opinions and thoughts about the story and its meaning.

As will be well understood by those skilled in the art of gaming, an adjustable storyline offers the possibility of providing the viewer with some autonomy while also allowing the storyteller to focus the viewer based upon the storyteller's vision of the key events and perspectives. The traditional video game includes themes, characters and even storylines in a general sense, e.g. "the hero's mission is to lead the disheveled and despondent rebels on a quest stop the brutal regime of the controlling dictator." How this is done, i.e. in what order at what locations with what characters then becomes a part of the vast explorable open story that is the video game. In this sense the video game has essentially un-limited perspectives, one for each gamer. However, the open story video game leaves no room for the storytellers, e.g. the writers, directors and actors, to strongly influence and guide the gamer/viewer through the events. Video games are virtually limitless, but without limits the producers of movies and shows would lose control over time which is unacceptable to the traditional movie theater and cable industries. Without limits, the gamer/viewers lose the benefit of the detailed research and thought typically extended by the storytellers to highlight key aspects of the story that yield deeper meaning. In an open story the gamer is also required to expend significant energy to drive the open story forward as they explore the never-ending world of the video game.

What is further possible using an adjustable storyline for a game is that multiple gamers compete as they interact with the gaming system, where their interactions cause variations of the adjustable scenes to be provided in a semi-controllable sequence. For example, many viewers enjoy mysteries and detective shows where typically there is revealed in a first scene information that describes the mystery or crime, after which a viewer is lead through a fixed (closed) set of scenes showing how the hero solved the mystery or identified and captured the perpetrators. The present invention allows viewers of mysteries and crime dramas to become gamers and to compete to be the first amongst a multiplicity of gamers to Figure it out—whatever "it" may be. This could apply to a single episode of a crime drama that in a closed storyline is meant to be solved in 1 hour, where the producers and storytellers provide for example 3 hours of total content, and where two or more viewers-turn-gamers are watching the same video-audio output device in the same room while they make inputs on a selection device such as a cell phone and tablet. Based upon their selections, they may be seeing and hearing the same or different content from each other, all the while choosing which of an adjustable number of paths most quickly leads to the solution and correct answer. The total provision of this example adjustable story may still be limited to for example 1 hour, where each gamer has some control over the received content and may solve for "it" prior to the 1 hour, or perhaps determine the most complete answer by the end of any imposed time limit.

It is also possible that producers such as Netflix or Amazon would build a certain new amount of content each week in a typical television season, such that multiple gamers across multiple living room televisions continue to engage the semi-limited content choosing their own path building towards their own conclusion. The game would extend from week to week until some final necessary scenes are provided in the final week of the season after which gamers are scored for their final conclusions and efficiency, etc. During this same time, each week the producers might then also choose their own sequence of scenes for traditional consumption as a closed story, such that a gamer also watches this to compare choices with the storytellers, catch-up on missed material, or learn new information. This type of interaction presents significant new opportunities for passive viewers to become semi-active gamers and for producers, storytellers and advertisers to engage their market in new and exciting ways without fully releasing control of the storyline.

And finally with respect to the effects of new technology on storytelling, a recent article posted on www.phys.org-.com/news/2018-01-magic-movies-tied-latest-technology.html#jCp states:

"In his study, 'Drawing Snow White and Animating Buzz Lightyear: Technological Toolkits Characteristics and Creativity in Cross-Disciplinary Teams,' Pier Vittorio Mannucci of the London Business School looked at 218 animated movies produced in the U.S. and released in theaters between 1978 and 2012.

Of these 218 films, he focused on the core production team, consisting primarily of the producer, director, writer, editor, cinematographer, production designer, composer and art director. He then identified the technological tools that each core team member knew how to use, as well as their level of expertise with each one. He also took into account the primary animation tool utilized for in each movie, for example, cel animation, computer animation, motion capture, and clay or puppet animation.

To gauge the level of creativity achieved by a movie's team, Mannucci recruited two expert critics with extensive experience in movie review, particularly within the animation industry. Working anonymously and independently, the critics provided a rating for each of the 218 movies on a scale between 1-5. The higher the score, the more creative the film was considered to be. The study found that the most creatively successful teams were often the ones whose members possessed a wider variety of technological tools, even if their experience level was only moderate, or their technological toolkits were commonly represented in other movie production teams."

The many teachings provided herein including the adjustable story represent a new technology tool that will offer exciting creative possibilities for the core production team.

Along with the new platform of an adjustable story, the present invention anticipates opportunities for expanded and new types of gaming systems. The following is a background for understanding these new opportunities.

As those familiar with the state-of-the-art as well as anticipated display and projection system technology will understand, there are many important advancements beyond the prior state-of-the-art within which 3D systems first appeared in the marketplace. For example, original problems and concerns with 3D, and therefore dual-view systems included providing sufficient single view spatial and temporal resolution to ensure pleasing images as well as synchronization and switching speed of active shutter glasses to prohibit noticeable flicker. Regarding resolution, support for two views in any implementation essentially meant that each view was displayed at half-resolution, i.e. either half the pixels in a single image or half the frame rate. When prior reasonably priced displays output only 720p or 720i resolutions, or frame rates of less than 60 Hz, half-resolution becomes significantly problematic. However, given the state-of-the-art of 4K displays and projectors, with 8k already being demonstrated, 50% of the spatial resolution is still 2 to 4 times more than earlier displays. These newer displays and projectors also output images at 120 Hz and even 240 Hz such that 50% of the temporal resolution is still providing at least 60 image frames per second.

Furthermore, the state-of-the-art in LCD active shutters has continued to improve with higher switching speeds (thus supporting higher frame rates) resulting in currently available active shutter 3D systems that are flicker-free (i.e. switching at or above 60 Hz.) Dichroic filter lenses have also advanced as well as matching color filters for filtering the Xenon lamp white light source of a typical movie projector into what are known as "RGB triplets," where 3D movies are now shown by theaters such as IMAX that project a left image in a first distinct RGB triplet and the right image in a second distinct RGB triplet, where the viewer is wearing glasses that filter the left and right eye for the respective triplet resulting in a 3D experience without the use of polarization. Manufacturers such as Christie are now selling RGB triplet based stereoscopic projection systems based upon RGB lasers rather than Xenon lamps, there the lasers output roughly double the luminance with narrower bands of RGB triplets. The increased luminance supports the division of the total projected light into at least 2-4 sub-channels, where then each sub-channel maintains the movie industry standard of 14 fl of illumination per movie/sub-channel.

Given these advancements, it is now possible to subdivide the total frame rate of images and the total pixels per image into multiple temporal-spatial sub-channels where a viewer-gamer will still be receiving pleasing images, where a pleasing image is herein defined to be a minimum of HD resolution, 24-30 fps, 60 Hz with luminance of 400 Nits (for displays) and roughly 1,400 ANSI lumens (for projectors,) all as to be further discussed herein. The present inventor notes that prior work in 3D systems has proven that providing 2 temporal sub-channels (i.e. alternating left-eye and right-eye images) is undetectable to the average viewer. Prior systems have also proven that providing 2 spatial sub-channels (e.g. left-circular polarization of all even rows of an image and right-circular polarization of all odd rows of an image) is also undetectable to the average viewer. What has not been anticipated or built is a system that combines both the temporal and spatial sub-division, the combination of which would provide a minimum of 4 viewing sub-channels. For example, the Sony PlayStation currently supports a feature known as "simul-view" that allows 2 gamers to share the same display, each receiving alternating images at full-resolution filtered by active shutter glasses. It is noted that the PlayStation supports at least 4 concurrent gamers but that the simul-view is limited to 2 concurrently shared views. It is also noted that the combination of these 2 views to an observer not wearing system glasses in an unpleasing, incoherent image, that would for example be unacceptable as a display in a theme park for providing secret messages. The present invention anticipates supporting more than 2 simultaneous gamers using a combination of at least active polarization and active shutter, as well as providing at least one technique for causing the combination of the simultaneously displayed gamer views to be a pleasing image to the naked eye.

Over the last twenty years, there have also been significant advancements in two new types of private audio systems that both share the characteristic of not covering a listener's auditory canal while then also remain substantially undetectable even at close ranges such as a body width. The first advancement is with a technology referred to as bone conduction, where small headsets placed against the listeners head but outside of the auditory canal generate vibrations that conduct through the skull and into the ear creating high quality audio. The second advancement is with a technology referred to as modulated ultrasound, where ultrasound with wavelengths on the order of 0.5 inches are directed through the air towards a listener inside of a very narrow audio column, referred to by one manufacturer as an "audio spotlight." The shorter wavelength ultrasound transverses the air creating reverberations into second and third harmonic waves that are within the audible frequencies detectable by the human ear. The highly directional ultrasound travels for long distances with significantly less attenuation then audible frequencies such that sound can be beamed to specific seats/listeners from auditorium ceiling heights of 30 feet and more.

The present invention also supports the new style of physical-virtual gaming where gamers are no longer sitting, physically isolated, in front of screens for long periods of time. Examples of the new style of physical-virtual games include the popular Pokemon Go game, where gamers are physically moving as they explore the physical world using augmented reality (AR) provided by their cell phones to find virtual objects. There are several drawbacks to cell-phone based augmented reality, including: 1) cell phone ownership does not typically start until the age of 13, thus excluding the large demographic of children which is problematic for family based destinations such as theme parks and museums; 2) using a cell phone AR device is tiring and requires a gamer to walk about perhaps for an entire day scanning their surrounding for virtual objects, where for the destination marketplace such as theme parks and museums this distraction is potentially dangerous and pulls the gamers out of the destination's physical experience; 3) the computer network bandwidth for providing content to a large group of AR gamers is significant, as demonstrated by the network failures experienced in the Pokemon Go tournament held in Chicago during July of 2017, as hosted by Niantic, and 4) the cell phone (i.e. mobile) screen is necessarily small thus limiting the immersion effect. The following is a background for understanding the uses of the present invention to support physical-virtual gaming.

In addition to the present application for creating adjustable storylines, the present inventor in copending applications including THEME PARK GAMIFICATION, GUEST TRACKING AND ACCESS CONTROL SYSTEM and INTERACTIVE GAME THEATER WITH SECRET MESSAGE IMAGING SYSTEM has also taught significant systems for creating a physical-virtual gamification layer for embedding into a destination such as a theme park, museum, resort, university campus, casino, cruise line, etc. Amongst many novel features, the gamification layer describes a network of game access points where one or more gamers interacts with a gaming system preferably hosted on a remote platform with access to video-audio content, advertisements and social networks. Game access points are physically situated at various locations within the destination including public areas, enclosed spaces, rooms, ride lines, rides, etc. Each access point is in communications with the remote gaming system and has sufficient apparatus to automatically detect the presence and location of one or more gamers within a certain proximity. Gamers interact with access points by exchanging information, where the access point includes any of private video-audio output devices (such as herein described) and articulated devices. The copending INTERACTIVE OBJECT TRACKING MIRROR-DISPLAY AND ENTERTAINMENT SYSTEM taught several apparatus and methods for creating secret message video output systems using any of displays or projectors, where the secret messages can be restricted to a single gamer-viewer and where other on-lookers would perceive some entirely different and sensible image. The present teachings expand upon these copending applications and apply the multiple sub-channel video-audio output systems to game access points that for example automatically detect a gamer and the gamer's spatial relationship to the output system and then select both a viewing sub-channel and a sub-set of output pixels to transmit a secret message to that gamer as dedicated by the interactive gaming system.

BRIEF SUMMARY OF THE INVENTION

As those familiar with 3D movies and video systems will understand, there does already exist the ability to present two viewing perspectives for a single movie or show, where specifically the 2 perspectives are for the left and right eye where human vision combines these perspectives to generate the illusion of 3D. With this understanding, there has also been an effort to describe systems capable of providing multiple 2D/monoscopic images using the basic apparatus and methods known for providing 3D images, where in general there are temporal techniques and spatial techniques. Temporal techniques rely upon the filtering of a sequence of images output by a display or device into sub-streams, typically using active shutter glasses. If the sequence of images comprises a sub-set of images at a first distinguishable polarization state (such as right circular) and a sub-set of images at a second distinguishable polarization state (such as left circular,) it has also been taught that the temporal filtering can be accomplished with passive polarizer glasses. Spatial techniques separate pixels within a given image into two groups, where the groups are distinguishable based upon 2 different polarization sates or 2 different color filters, such as a first R1G1B1 triplet that does not substantially overlap the frequencies of a second R2G2B2 triplet. Efforts have been made to define systems for providing a secure, or private image, using a technique of color complementation. In color complementation, a first private image is provided either temporally or spatially and limited to being received by the appropriately matched glasses, while a second image that is the color compliment of the first image is then likewise provided either temporally or spatially, where the naked eye perceives either the temporal or spatial combination of the first private and second complimentary images as essentially a featureless neutral gray.

The present application further anticipates techniques for providing an increased number of spatial, temporal or spatial-temporal sub-channels by creating new apparatus and methods, including for example: 1) combining active polarization with active shutter, thus providing 2 electronically selectable spatial sub-channels with multiple electronically selectable temporal sub-channels (primarily taught in FIGS. 1a, 2a and 2b); 2) combining passive color filters for RGB triplets with a new type of active shutter referred to as an Active Domain Shutter that does not use linear polarization, thus providing 2 physically selectable spatial sub-channels with multiple electronically selectable temporal sub-channels with maximum light transmission (primarily FIG. 2h,) and 3) combining active polarization with color triplets to provide 4 spatial sub-channels including 2 electronically selectable sub-channels based upon polarization for each of 2 physically selectable sub-channels based upon color, all with multiple electronically selectable temporal sub-channels (primarily FIGS. 2j, 2k, and 2l.)

The present invention therefore specifies apparatus and methods for providing multiple sub-channel video-audio through a single traditional channel, where the sub-channels are any of spatial, temporal or spatial-temporal. The limits of human spatial acuity (primarily FIG. 1b) and temporal acuity (primarily FIG. 1c) are reviewed as a basis for understanding the inflexion point where the single traditional channel is best divisible into multiple sub-channels (primarily FIGS. 1d and 1e.) A single traditional channel includes both a one-way communication path such as cable and satellite, or a two-way communication path such as the internet. Auditoriums in a movie theater are also an example of a single traditional channel. The present invention is shown to be capable of working to provide multiple modes (primarily FIGS. 4a, 4b, 4c, 4d, 4e, 4f, 4g and 4h) including: dual-view, quad-view, disguising mode, 2D or 3D content mode, privacy mode and gaming mode, where traditional single channel content is either pre-mixed or dynamically mixed by a controller. The present invention also teaches novel apparatus and methods for providing a private image in a privacy mode while simultaneously providing a pleasing public image (primarily FIGS. 2d, 2e, 2f, 2k, 4g, 5b, 5c, 5d, 5e, 5f, 5g, 5h, 5i, 5j, 5k, 5l and 5m.) Unlike color complementation, herein taught as supporting a disguising mode (primarily FIGS. 2c, 2o and 4d,) privacy mode has significantly more ability to provide concurrent pleasing private and public images since no illumination is lost to color complementation, where color complementation creates neutral gray in the public image, and where the neutral gray is a significant source of public image noise versus signal. In privacy mode, unlike spatial separation of illumination on a pixel-by-pixel basis, or temporal separation of illumination on a frame-by-frame basis, the same illumination of any given pixel contributes signal to the both the public image and the private image.

The present system teaches a content controller for interfacing between a multiplicity of content sources and video output devices (primarily FIGS. 4a, 4b, 4c, 4d, 4e, 4f, 4g, 4h and 5a.) The general function of the controller is to receive at least one single traditional channel for transformation and output as multiple sub-channels in coordination with system eye glasses (primarily FIGS. 2g and 2m) and private speakers (primarily FIGS. 3a, 3b, 3c, 3d, 3e and 3f.) Private speakers include for example ear buds, bone speakers and modulated ultrasound to provide private audio corresponding to the private video of a sub-channel. Further adapted movie theater seating is shown capable of automatically detecting a movie goer's glasses, allowing the viewer to select different sub-channels (e.g. movie versions) and then automatically providing the appropriate private audio through for example the use of modulated ultrasound. The system's functions include computer processes that are executed on specific preferable physical devices (primarily FIG. 4a.) The controller further comprises key computer processes for receiving content source input for transformation into multi sub-channel output (primarily FIG. 5a.)

The current state-of-the-art (primarily FIG. 10a) in video-audio content has been evolving within the single channel model from providing only closed 2D scenes (e.g. 2D movies, tv shows,) to providing open-free scenes (e.g. video games,) to providing 3D closed scenes or dual-view open-free scenes and finally to providing branching narratives limited to a single viewer-device relationship. The present system further adapts this state-of-the-art (primarily FIG. 10b) to provide a multiplicity of electronically selectable spatial-temporal sub-channels, where electronic selection includes any combination of manual selection (via viewer/gamer indications) or automatic selection (e.g. via interactive gaming system determinations,) (primarily FIG. 4h.) The multiplicity of manually or electronically selectable sub-channels supports new adjustable scenes and open-restricted scenes. Multiple selectable content sources are shown to comprise multiple selectable closed scenes, open-free scenes, adjustable scenes and open-restricted scenes supporting a self-directed extension to the branching narrative that extends across the selectable sub-channels and removes the restriction of the single viewer-device relationship allowing for multiple viewers experiencing multiple concurrent branching narratives on a single device. These further adaptations provide the foundations for adjustable stories (primarily FIGS. 9a, 9b, 9c and 10c) and advancements in multi-player video gaming and new gaming theaters (primarily FIGS. 4c and 4h.)

The copending applications INTERACTIVE OBJECT TRACKING MIRROR-DISPLAY AND ENTERTAINMENT SYSTEM and INTERACTIVE GAME THEATER WITH SECRET MESSAGE IMAGING SYSTEM describe an interactive gaming system for use in implementing a physical-virtual gaming layer within a destination such as a theme park or museum, wherein guests interact with a multiplicity of game access points distributed throughout the destination. Variations of a game access point were taught to include any of actuated device and secret message output devices, where the presence of one or more gamers is automatically detected by a gamer/device detector that facilitates interaction between the gamer and the game access point. The present invention further adapts the game access point to include a multiple sub-channel video-audio output device and to employ the gamer/device detector for determining a sub-set of pixels within the video output device for presenting a secret message to a gamer, such that multiple gamers are concurrently receiving private video from the video output device through a combination of different sub-channels and different sub-sets of pixels (primarily FIG. 6a.) A variation of this game access point is shown that replaces the automatic provision of content using a gamer/device detector with the self-serve provision of content using a multiplicity of gamer stations (primarily FIG. 6b.) The use of privacy mode is shown (primarily FIG. 6c) that is combinable with either the automatic game access points or self-serve game access points, where the privacy mode provides improved concurrent private and public images. A preferred form of the video output device used as a game access point is shown as either a curved display, cylindrical pillar (primarily FIG. 7a) or a flat display, hexagonal pillar (primarily FIG. 7b,) where both pillars are approachable from all directions by gamers.

The copending application PHYSICAL-VIRTUAL GAME BOARD AND CONTENT DELIVERY SYSTEM teaches a physical board game that detects the movement of game pieces across an overlay representative of the game being played, where the overlay is low cost and easily changed such that the single physical board game can be used to play any number of desired games simply by changing and registering the overlay. The copending application provided that an associated computing device receives game piece locations and automatically retrieves and outputs relevant video-audio content as preferably provided by a remote interactive gaming system. The present invention further adapts the physical virtual game board for use with the present controller and multiple sub-channel video-audio output devices (primarily FIG. 8.)

Preferred universal sunglasses are also taught (primarily FIG. 2n) that comprise an active shutter, active polarizer configuration for providing all the herein taught modes of operation, where the sunglasses have been further adapted to include at least one camera capable of sensing the incoming linear angle of rotation for light impinging upon at least one pixel. The preferred sunglasses include 2 cameras, each comprising a subset of pixels for determining color and a subset of pixels for determining the linear angle of rotation, where the combined information provides for 3d identification of object types with associated emissions of strongly polarized light, such as a road surface reflecting sun glare or a tablet computer with an LCD screen emitting images. The combined information is then shown to be usable to set the rotation orientations of the entrance light valves for select pixels in the active polarizer layer of the sunglasses, such that for example road glare can be decreased in transmission while the linearly polarized light emitted by an LCD screen can be maximized in transmission, even when the screen is rotated.

Given the state-of-the-art in video-audio content delivery networks, display and projection systems, LCD light valves, optical and electro-optical parts for filtering and altering polarized light, as well as technologies for providing private audio, it is now possible to provide multiple temporal, spatial and temporal-spatial sub-channels comprising private video and audio delivered within a single traditional channel. Using the provided multiple sub-channels, it is further possible to provide an adjustable story and delivery platform, where adjustable stories comprise at least one adjustable scene and any of closed, open-free, and open-restricted scenes. It is also possible to enhance traditional video gaming systems beyond dual-views, to enhance game access points used with an interactive gaming system at a destination, and to provide new types of hybrid gaming systems that combine adjustable stories that include branching narratives and then to further combine with physical-virtual game boards.

Thus, using the teachings provide herein, it is now possible to achieve the many benefits described by the present application in which viewers and gamers are more deeply engaged through the use of competency, autonomy and relatedness as compared to a traditional closed story, while producers and storytellers have greater control of the emotional experience provided to the viewer and gamer as compared to a traditional video game.

The present invention is anticipated to offer significant benefits beyond the home, movie theater and theme park embodiments herein described, for example including, museums, resorts, casinos, gaming restaurants (such as the popular Dave and Busters,) sporting and music venues, air ports, airplanes, convention centers, conference rooms and permanent and semi-permanent living communities such as retirement villas and college campuses. The present teachings are also anticipated to provide new and useful displays for use with computers, laptops, tablets and cell phones where at least a given user may view their screen in a secured, privacy mode.

BRIEF DESCRIPTION OF THE SEVERAL VIEWS OF THE DRAWINGS

FIG. 1a is a combination block diagram of system 100 components for providing multi sub-channel content through a traditional single channel video output device 23 along with a perspective diagram representative of a viewer 2's experience. Key components include a content controller 18 for providing at least video to a video output device 23 that provides a traditional single channel output 23-*out* that is further sub-divided into multiple temporal sub-channels (such as 1, 2 or 3) and multiple spatial sub-channels (such as A and B.) Controller 18 additionally provides control signals to lens controller 14-*lc* of eye glasses 14-5, where lens controller 14-*lc* uses at least in part the provided control signals to operate channel filter lens 14-*cfl* comprising both a spatial channel filter 14-*scf* and a temporal channel filter 14-*tcf*, and where channel filter lens 14-*cfl* filters single channel output 23-*out* into sub-channel 14-*out* for transmission to the viewer 2. Controller 18 preferably exchanges selection datum with a content selector 19 and provides private audio to private speakers 16. A viewer 2 uses the content selector 19 to provide viewer indications, where selector 19 then provides the viewer indications as selection datum to content controller 18 for use at least in part for adjusting any of video content provided to the video output device 23 and private audio content provided to private speakers 16.

FIG. 2*c* is a Figure repeated from copending application INTERACTIVE GAME THEATER WITH SECRET MESSAGE IMAGING SYSTEM (see copending FIG. 4) and is a perspective view of secret message output device 22 comprising a projector 21-*p*, where projector 21-*p* outputs both a secret message image A oriented at a first distinguishable polarization state and complimentary image B orientated at a second distinguishable polarization state, where the combination of images A and B are perceived by a viewer 2*o* using the naked eye as a public image 21-*img* that is different from secret message image A, and where magnifying glass 15 uses lens 15-*lp-as* to selectively transmit only images A such that a gamer 2*s* using glass 15 perceives secret message images A and not the combined A and B public image.

FIG. 2*f* is a diagram depicting the alternative active linear polarization layer 23-*ply*-2 of FIGS. 2*d* and 2*e* used in combination with alternative channel filter lens 14-*cfl*-4, where alternative channel filter lens 14-*cfl*-4 is like channel filter lens 14-*cfl* with the quarter wave plate omitted such that alternative lens 14-*cfl*-4 receives and selectively switches between 2 states of linearly polarized light and also has the ability to work in the modulator mode taught in relation to FIGS. 2*d* and 2*e* and lenses 14-*cfl*-3 and 14-*cfl*-4, respectively.

FIG. 2*g* portrays several embodiments of system glasses 14 including: passive polarization glasses 14-*pp* for providing 1 of 2 spatial sub-channels, active shutter glasses 14-*as* for providing 2 or more temporal sub-channels, active shutter/passive polarization glasses for providing 1 of 2 spatial sub-channels each within 2 or more temporal sub-channels, active polarizer glasses 14-*ap* for providing either of 2 spatial sub-channels, and active shutter/active polarization glasses 14-*as-ap* for providing either of 2 spatial sub-channels each within 2 or more temporal sub-channels.

FIG. 2*h* is a perspective diagram depicting a stereoscopic projector system 21-*ss* that is an adaptation of a projector system currently used in IMAX theaters to provide both 2D and 3D movies using a technique referred to as wavelength multiplex visualization where for 3D the left eye receives images output in a first color triplet R1G1B1 and the right eye receives images output in a second color triplet R2G2B2. System 21-*ss* is a further adapted over the currently available passive stereoscopic systems such as used by IMAX to include active shutter/passive color filter glasses 14-9a and to operate in new additional modes for example: exhibiting two 2D movies during a single time slot, exhibiting two 3D movies during a single time slot, and exhibiting four 2D movies during a given time slot.

FIG. 2i is a perspective diagram depicting a polarizing stereoscopic projector system 21-*pss* that is an adaptation of a monoscopic RealD 3D projector system currently used in theaters to provide both 2D and 3D movies using a technique referred to as temporally alternating image polarization where for 3D the right eye receives images output in a first distinguishable polarization A such as right or left circular and the left eye receives images output in a second distinguishable polarization B such as left or right circular respectively. System 21-*pss* is a further adapted over the currently available monoscopic polarization systems such as marketed by RealD to include two monoscopic projectors forming a stereoscopic system that further implements wavelength multiplex visualization and uses passive polarization/passive color filter glasses 14-9a and to operate in new additional modes for example: exhibiting two 2D movies during a single time slot, exhibiting two 3D movies during a single time slot, and exhibiting four 2D movies during a given time slot.

FIG. 2j is a block diagram depicting a preferred multi-mode adaptable stereoscopic projector system 21-*aps* for implementing each of stereoscopic projector system 21-*ss* and polarizing stereoscopic system 21-*pss* as described in FIGS. 2h and 2i respectively, comprising a content controller 18, a light source 21-*ls*, a light modulator 21-*lm* and a polarization layer 21-*ply*.

FIG. 2l depicts several variations of a preferred passive color/passive polarization video display 23-*pc-pp* comprising a multiplicity of pixels A.1, A.2, B.1 and B.2 in any of multiple arrangements such as 23-*ply*-3, 23-*ply*-4 or 23-*ply*-5. "A" pixels emit light polarized at a first distinguishable polarization such as right circular while "B" pixels emit light polarized at a second distinguishable polarization such as left circular. "0.1" pixels emit red, green, blue light in a first distinguishable color triplet R1G1B1 while "0.2" pixels emit red, green, blue light in a second distinguishable color triplet R2G2B2. Display 23-*pc-pp* is capable of controllably emitting 1 to 4 spatial sub-channels 23-*out*-4 comprising various combinations of A, B, 0.1 and 0.2, namely A.1, A.2, B.1 and B.2.

FIG. 2n depicts preferred universal sunglasses are also taught that comprise an active shutter, active polarizer configuration for providing all the herein taught modes of operation (primarily FIG. 4b, 4c, 4d, 4e, 4f, 4g and 4h,) where the sunglasses have been further adapted to include at least one camera capable of sensing at the incoming linear angle of rotation for light impinging upon at least one pixel. The preferred sunglasses comprise 2 cameras, each comprising a subset of pixels for determining color and a subset of pixels for determining the linear angle of rotation, where the combined information provides for 3d identification of object types with associated emissions of strongly polarized light, such as a road surface reflecting sun glare or a tablet computer with an LCD screen emitting images. The captured combined information is then shown to be usable to set the rotation orientations of the entrance light valves for select pixels in the active polarizer layer of the sunglasses, such that for example road glare can be decreased in transmission while the linearly polarized light emitted by an LCD screen can be maximized in transmission, even when the screen is rotated.

FIG. 2o is like FIG. 2c and depicts the output of secret images A spatially or temporally combined with complimentary images B, where the present Figure teaches the use of color triplets R1G1B1 and R2G2B2 for emitting images A and B respectively, versus the use of a first and second distinguishable polarization state A and B (as described in FIG. 2c.) Using color triplets, it is possible to emit the secret image onto a non-metallic (i.e. diffuse) reflecting surface 23-*rsf*-2 such as an artwork in a museum, whereas polarization requires a metallic reflecting surface 21-*rsf* and is therefore limited in its uses. The combined perception to the naked eye of the secret image and the complimentary image forming a public image is dependent upon their selected contents, and at least for use with the secret annotation of artwork, it is preferable that the combined public image be featureless white light as is possible using a complimentary image that is the color inverse of the private image.

FIG. 3a portrays any of system glasses 14 further adapted to comprise integrated private speakers 16-1, such as bone speakers not covering the auditory canal, or earphones covering the auditory canal.

FIG. 3b portrays any of system glasses 14 that omit attached private speakers 16-1, where glasses 14 without attached private speakers 16-1 are shown to work in conjunction with separate private speakers 16-2, such as ear bud speakers typically connected directly to an audio source such as either a cell phone or movie theater seat.

FIG. 3c portrays a preferred high-back seat 50 as might be provided in a movie theater auditorium, where a viewer 2 sits and receives both private video through any of system glasses 14 as well as private audio through for example directional speakers 16-3 and 16-3 built into the chair 50, and where chair 50 further comprises RFID sensors for automatically detecting a passive RFID embedded within any system glasses 14 for either classifying or uniquely identifying the system glasses 14.

FIG. 3d portrays alternative chair 51, where chair 51 omits directional speakers built into the chair in favor of directional speakers placed overhead that provided what is known as modulated ultrasound. Chair 51 also omits RFID sensors in favor of a combination barcode reader and touch LCD display content selector 19-2, where the barcode reader is usable for detecting a unique barcode placed upon system glasses 14 or packaging for glasses 14, and where the unique barcode is sufficient for classifying or identifying the system glasses 14.

FIG. 4a is a device and information flow diagram depicting a preferred embodiment of the present invention 100, including a content controller 18, 4 content sources 26 including 26-1, 26-2, 26-3 and 26-4, at least one video output device 23, any of system eye glasses 14, any of system private speakers 16, any of system public speakers 17, any of system content selectors/game interface 19, an internet connection/wi-fi router 24 connecting to a content delivery network 28, as well as a physical/virtual game board 11, where game board 11 was the subject of the copending application entitled PHYSICAL-VIRTUAL GAME BOARD AND CONTENT DELIVERY SYSTEM.

FIG. 4b depicts the relationship between 2 content sources 26 and a content controller 18-2 capable of providing 2 distinct temporal sub-channels to 2 viewers 2-1 and 2-2 through any traditional display or projector 23-2*d*, where each of the 2 content sources 26 provide traditional single channel content to controller 18-2 for mixing into 2 temporal sub-channels 14-*out*-1 and 14-*out*-2, and where the depicted function is referred to as dual-view mode.

FIG. 4c depicts the relationship between 3 content sources 26 and a content controller 18-4 capable of providing 4 distinct temporal-spatial sub-channels to 4 viewers 2-1, 2-2, 2-3 and 2-4 through any passive 3d display or projector 23-*p*3*d*, where 2 of the content sources 26 provide traditional single channel content to controller 18-4 and 1 of the content sources 26 provides dual-view content to controller 18-4 for mixing into 4 temporal-spatial sub-channels 14-*out*-1A, 14-*out*-1B, 14-*out*-2A and 14-*out*-2B, and where the depicted function is referred to as quad-view mode.

FIG. 4d depicts the relationship between a content source 26 and a content controller 18-2 or 18-4 each capable of providing at least one of a distinct temporal, spatial or temporal-spatial sub-channel to a viewer 2-1 through any traditional display or projector 23-2*d* or any passive 3d display or projector 23-*p*3*d*, where the content source 26 provides traditional single channel content to controller 18-2 or 18-4 for mixing into 2 sub-channels such as 14-*out*-1 and 14-*out*-2, where the first of the 2 sub-channels is the output 14-*out*-1 (V) for viewing by a viewer 2-1 and the second of the 2 sub-channels is the output 14-*out*-2 (C) that is a complimentary image determined by the controller 18-2, 18-4 such that combined output 23-*out*-*d* is perceived by the naked eye 2*o* as some disguising image D. Controller 18-2 or 18-4 is also provided with a target image T for using at least in part to determine complimentary image C so as to cause disguising image D to more closely resemble target image T to the perception of the naked eye 2*o*, and where the depicted function is referred to as disguising mode.

FIG. 4e depicts the relationship between multiple content sources 26 and a content controller 18-2 or 18-4 capable of providing any of 2D or 3D viewing experiences to a viewer 2-1 or 2-3, respectively, using any of two temporal, spatial or temporal-spatial sub-channels such as 14-*out*-A for providing 2D and 14-*out*-2A and 14-*out*-2B for providing 3D including each of a right-eye image and left-eye image, respectively, through any traditional display or projector 23-2*d* or any passive 3d display or projector 23-*p*3*d*, where a first content source 26 provides traditional single channel (2D) content to controller 18-2, 18-4 and a second content source 26 provides (3D) right-eye/left-eye content to controller 18-2, 18-4 for mixing onto any of the 2D or a 3D viewing experiences, and where the depicted function is referred to as 2D or 3D content.

FIG. 4f depicts the relationship between a content source 26 and a content controller 18-2 or 18-4 capable of providing 2 or more distinct temporal, spatial or temporal-spatial sub-channels to a viewer 2-1 through any traditional display or projector 23-2*d* or any passive 3d display or projector 23-*p*3*d*, where the content source 26 provides pre-mixed multi sub-channel content to controller 18-2, 18-4 for separating into either a selected default channel viewable without system eye glasses 14 or distinct viewing sub-channels such as 14-*out*-1A, 14-*out*-1B, 14-*out*-2A or 14-*out*-2B, where for example all of the pre-mixed content is related to a single show such as a sporting event and viewer 2-1 uses any of content selectors 19 to switch between any of the provided viewing sub-channels, and where the depicted function is referred to as pre-mixed sub-channels.

FIG. 4g depicts the relationship between a content source 26 and a content controller 18-2 or 18-4 each capable of providing a distinct temporal, spatial or temporal-spatial sub-channel to a viewer 2-1 through any polarized display or projector 23-*p* or non-polarized display or projector 23-*np* in combination with an active polarization and modulation layer 23-*ply*-2, where the content source 26 provides traditional single channel content to controller 18-2 or 18-4 for modulating onto public image 23-*out* forming image 23-*out-m* to be received and analyzed by system eye glasses 14-7 or 14-8 for revealing and transmitting demodulated private image 14-*out-dm* to a view 2-1, where any of modulated public image 23-*out-m* appears the same as any of public image 23-*out* to the naked eye 2*o*, and where the depicted function is referred to as privacy mode.

FIG. 5*d* juxtaposes four visible light spectral graphs representing the unpolarized output 64-*so* of the sun 64, the unpolarized output 62-*so* of an LED lighting 62, the polarized output 23-*so* of a typical LCD display 23 and the spectral bands passed by a color filter 14-*cf* for use with system glasses such as 14-5 or 15. What is shown is that a band-pass color filter 14-*cf* can be matched to the spectral output 23-*so* of a display 23 such that substantially all of the visible frequencies output by the display 23 are transmitted through system glasses 14-5, 15 while substantially 70% of all other visible frequencies output by ambient lighting such as the sun 64 and LED lighting 62 are blocked. Of the 30% of visible ambient light frequencies from sources such as 64 and 62 that are transmitted through matched color filter 14-*cf*, the linear polarizers associated with glasses 14-5, 15 substantially reduced this unpolarized light by another 50%, thus providing for a total reduction of ambient lighting associated with a private image V on the order of 85%, while then still transmitting substantially 100% of the private image V illumination.

FIG. 5*h* depicts a Function 4 for transforming any U pixel such as worst case U4, where at least worst case U4 has already been proportionally transformed by Function 2*a* to include all R, G and B sub-pixels with intensity values equal to or greater than BF2. Using Function 4, a single any U pixel such as U4.2*a* is first enlarged by a multiple of 4 and then redistributed into a color redistribution group 23-*out-f*1-*crg*, where enlarging means to multiply each R, G and B sub-pixel intensity value by a factor such as 4 and where redistributing means to set a combination of R, G and B sub-pixels in each pixel of the group 23-*out-f*1-*crg* such that the combined totals of the R, G and B sub-pixels intensity values in the entire group equals the enlarged amount of the original U pixel, wherein at least 1 pixel U(V) 23-*out-f*1-*pxl*-V of the group 23-*out-f*1-*crg* comprises a white window defined as minimally exceeding the BF2 multiplied by the enlargement factor. A private pixel V 23-*out-f*1-*pxl*-V is then second modulated out of the white-window comprising the U(V) pixel 23-*out-f*1-*pxl*-V such that a viewer 2 wearing system glasses substantially perceives the spatial integration of the second modulated V pixel 23-*out-f*1-*pxl*-V within the area defined by the group 23-*out-f*1-*crg*, where the area is preferably on the order of 0.5 to 1 arc minute with respect to the viewer 2's field-of-view.

FIG. 5*i* depicts a Function 4*a* that is an exemplary alternative to Function 4 wherein the enlargement factor is 5 and the color redistribution group 23-*out-f*1-*crg*-2 comprises 5 pixels, at least one of which is a U(V) pixel 23-*out-f*1-V-2 with a white window of 100% of the maximum possible intensities of R, G and B. In general, what is being taught is that based upon the choice of a BF1 and number of frames F, it is possible to choose an enlargement factor and corresponding size for a color redistribution group such as factors 4 or 5 corresponding to groups 23-*out-f*1-*crg* and 23-*out-f*1-*crg*-2 respectively, whereby at least one resulting U(V) pixel such as 23-*out-f*1-V and 23-*out-f*1-V-2 respectively, has a white window of a desired amount such as 80% to 100% of the maximum possible intensities. Also shown is a color redistribution group 23-*out-f*1-*crg*-3 comprising 16 pixels based upon an enlargement factor of 16, wherein the 16 pixels can be viewed as comprising 3 separate groups 23-*out-f*1-*crg*-2 of 5 pixels along with a single original U pixel, where then the total combined R, G, B sub-pixel intensities of a resulting 3 U(V) pixels and the original U pixel provide reserved illumination for a best representation of a V pixel 14-*out-f*1-*pxl* through a process of second modulation.

FIG. 5*k* depicts the color redistribution group 23-*out-f*1-*crg* of FIG. 5*h* as determined for both a frame 1 and frame 2, such that the spatial-temporal average of the group 23-*out-f*1-*crg* comprised within both frames 1 and 2 as perceived by the naked eye 2*o* is substantially like an original pixel U at a first luminance proportional to the maximum NITs output by a display 23 or projector 21-*p*. A viewer 2 perceives the same spatial-temporal average of the group 23-*out-f*1-*crg* as substantially like an original pixel V 14-*out-f*1-*pxl* at a second luminance proportional to the first luminance multiplied by the chosen Black Floor 1.

FIG. 5*l* is like FIG. 5*k* accept that the BF1 is chosen to be 20% rather than 10% and the size of the enlargement factor and color redistribution group is set to 2 rather than 4, such that within a similar 4 pixels of a frame 1 and frame 2, there are created 2 U(V) pixels each with an 80% white window rather than only 1 U(V) pixel as depicted in FIG. 5*k*. The perception of the naked eye 2*o* in comparison to FIG. 5*k* is that the original U pixel has a slightly altered hue H, saturation S and lightness L, fundamentally brighter than the average of FIG. 5*k*, whereas the perception of the viewer 2 of the private pixel V is that the luminance of the 14-*out-f*1-*pxl* has doubled.

FIG. 5*m* teaches an alternative Function 4 where the enlargement factor is less than the size of the color redistribution group, for example the factor is 3 and the size is 4. In the exemplary case depicted, the BF1 is set to 16.5% with a frames F=2 such that the BF2 is calculated to be 33%, where 33% enlarged by a factor of 3 always ensures a white window of 100% for the U(V) pixel 23-*out-f*1-*pxl*-V. The choice of a lesser factor 3 with respect to group size 4 has the added benefit of reducing by 25% the maximum luminance of the perceived spatial-temporal average U pixel with respect to the maximum output NITs of the display 23, such as 2,000 NITs. This net reduction in possible public image U luminance from for example 2,000 NITs down to 1,500 NITs (i.e. 75% of 2,000,) creates a more favorable ratio with respect to the maximum luminance of the private image V that remains BF1 multiplied by the maximum display luminance, e.g. in this case 16.5% of 2,000 NITs.

Gaming system 48 uses the gamer tracking datum at least in part to determine next content 26-*nc* for the gamer 2, such as a secret message related to an on-going game. Remote controller 18-*r*2 provides next content 26-*nc* to local controller 18-1 along with gaming indications including any of gamer tracking datum indicative of the gamer 2's spatial location with respect to the video device 23. Local controller 18-1 then provides the next content 26-*nc* to video device 23 for output on a select viewing sub-channel and a select sub-set of pixels, where the sub-set of pixels has been determined to be substantially in front of the gamer 2 with respect to the video display 23 such that multiple gamers such as 2-1, 2-2, 2-3, 2-4 and 2-5 are able to each receive next content 26-*nc* substantially at the same time using combinations of viewing sub-channels and sub-sets of pixels.

Figure 6A:
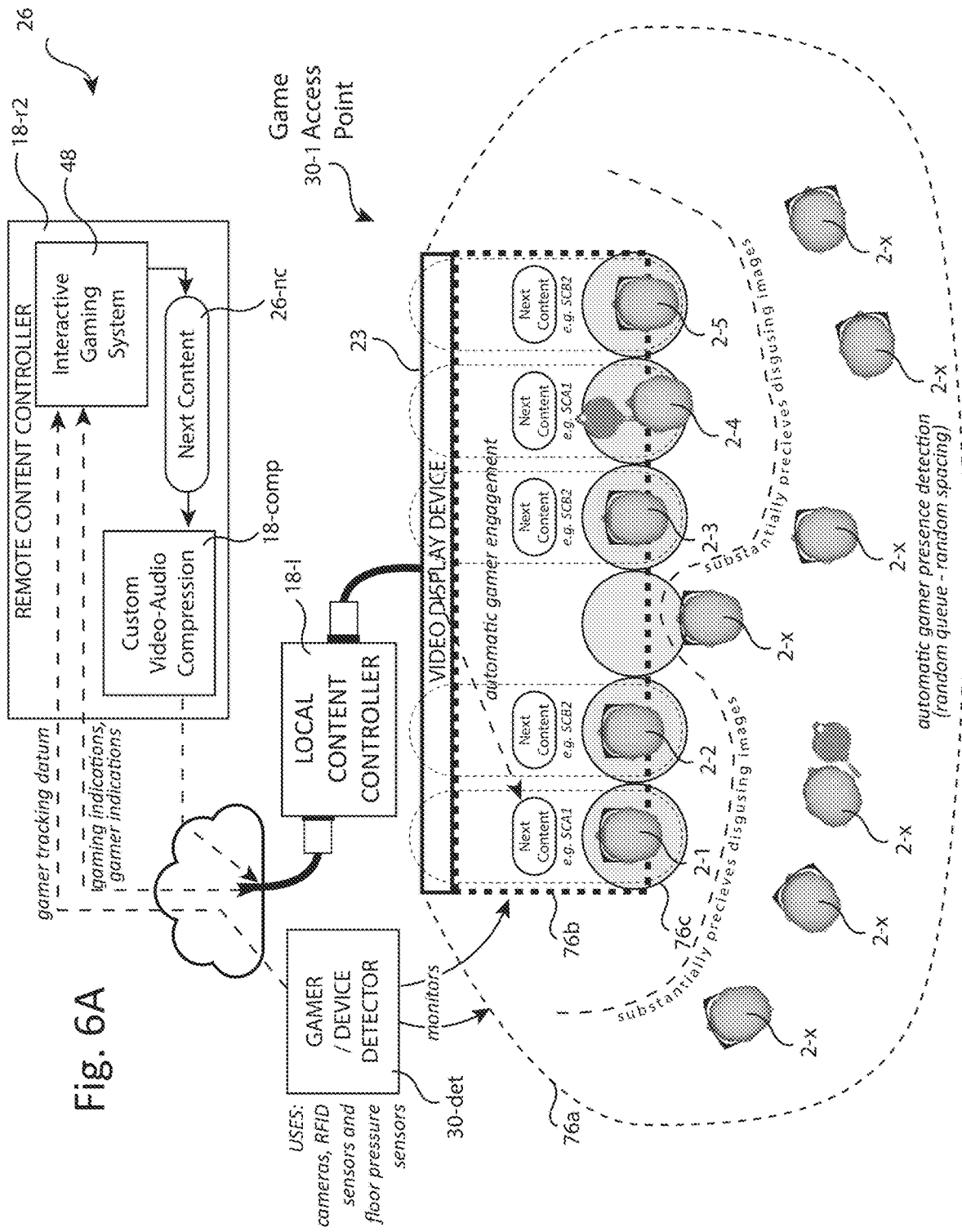
FIG. 6*a* depicts an alternate embodiment of the present invention combining components of the present system 100 with components described for a game access point such as 30-1 in the copending application INTERACTIVE GAME THEATER WITH SECRET MESSAGE IMAGING SYSTEM. A game access point such as 30-1 is meant for use at a destination such as a theme park or museum where viewers 2 become gamers 2 under the direction of an interactive gaming system 48. A preferred destination includes several game access points such as 30-1 where gamers 2 receive secret messages through a video display 23 using teachings from both the copending and present application. The video display 23 is shown combined with a gamer/device detector 30-*det*, where the purpose of the detector 30-*det* is to automatically detect, identify and locate a gamer 2 as the gamer 2 approaches the video device 23, where gamer tracking datum is provided by detector 30-*det* to a remote content controller 18-*r*2 comprising an interactive gaming system 48.
Figure 6B:
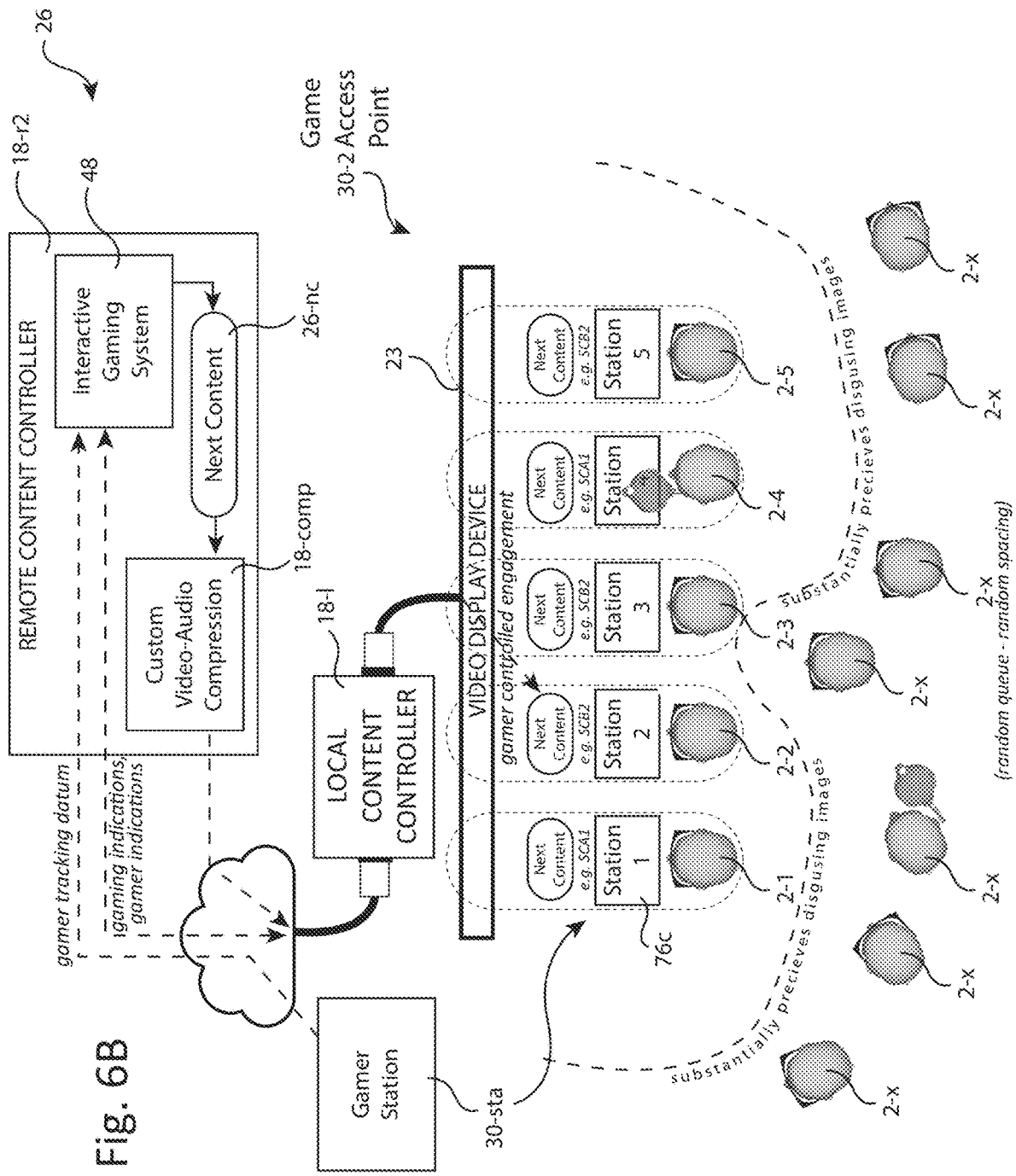

FIG. 6*b* depicts an alternative embodiment 30-2 of game access point 30-1 taught in relation to FIG. 6*a*, where game access point 30-1 has been further adapted to omit gamer/device detector 30-*det* and include gamer stations 30-*sta* such as station 1 through station 5. Unlike access point 30-1 that automatically detected and engaged gamers such as 2-1 or 2-4, game access point 30-2 provides gamer stations 30-*sta* such that each gamer such as 2-1, 2-2, 2-3, 2-4 and 2-5 self-engages, whereby self-engagement includes providing any of preferably electronic verification such as a smart ticket or mobile gaming device with embedded ID as defined in the copending application THEME PARK GAMIFICATION, GUEST TRACKING AND ACCESS CONTROL SYSTEM, where a mobile gaming device includes all the presently taught eye glasses including 14-5, 14-7, 14-8, 14-9, 14-10 and 14-11.

Figure 2A:
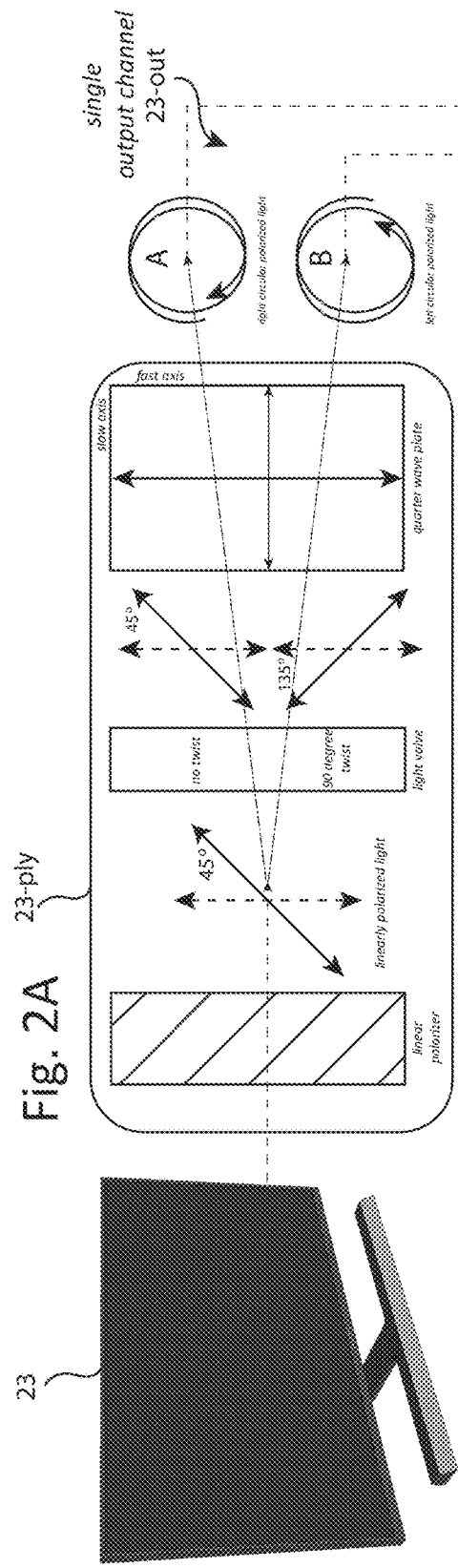
FIG. 2*a* is a diagram depicting the preferred optical components of an active circular polarization layer 23-*ply* for combining with a video device 23, such that the combination provides single channel output 23-*out* further comprising two spatial sub-channels (such as A and B) comprising for example each of right and left circular polarized video information, where the pixel combinations forming sub-channels A and B are dynamically alterable. Polarization layer 23-*ply* comprises a left-to-right assembly of optical and electro-optical parts including a linear polarizer, light valve and quarter-wave plate.
Figure 2B:
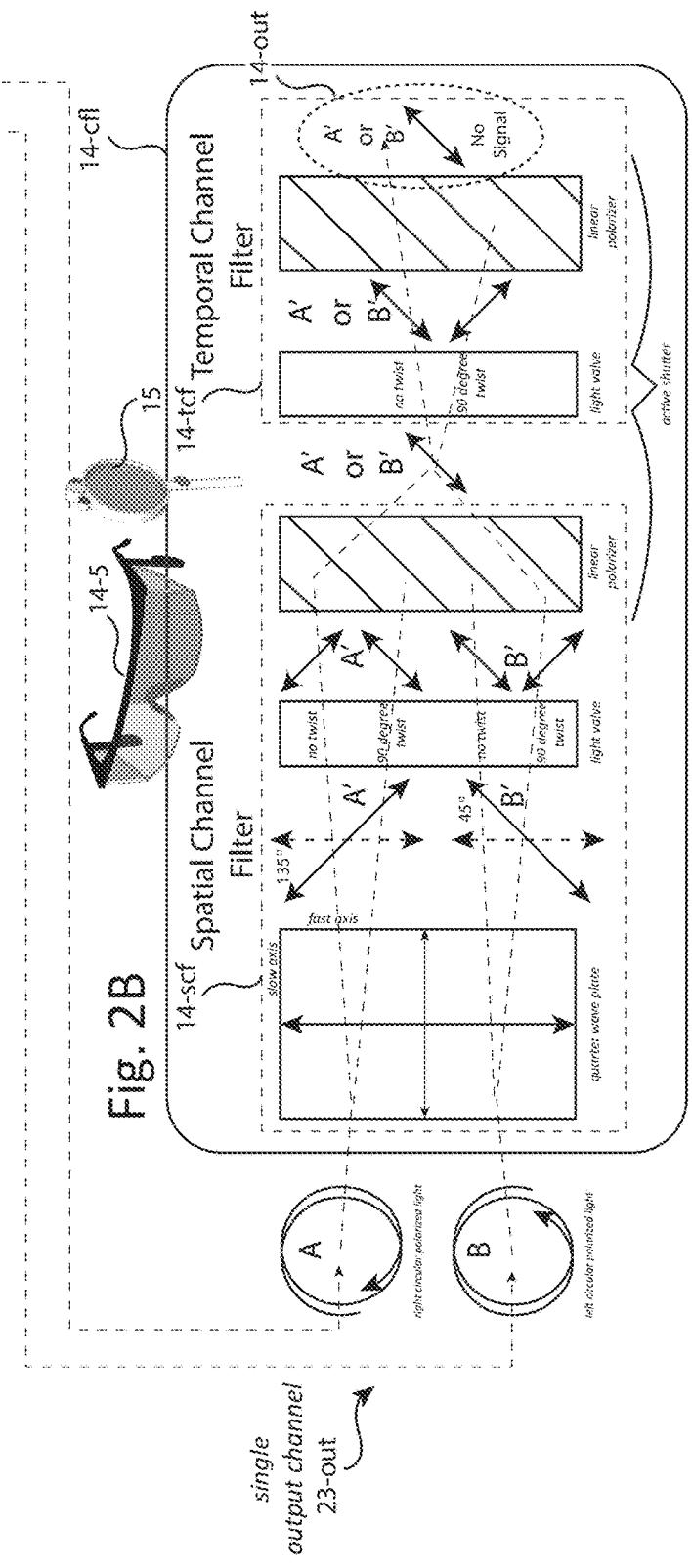
FIG. 2*b* is a diagram depicting the preferred components of a channel filter lens 14-*cfl* included within eye glasses 14-5 for receiving single channel output 23-*out* and controllably transmitting filtered video 14-*out* to a viewer 2, where filtered video 14-*out* comprises any of a selected spatial sub-channel such as A or B or no signal (i.e. neither A or B.) Filtering lens 14-*cfl* comprises a combination of spatial channel filter 23-*scf* and temporal channel filter 14-*tcf*, together providing a left-to-right right assembly of optical and electro-optical parts including a quarter-wave plate, first light valve, first linear polarizer, second light valve and second linear polarizer, where the combination of parts act to perform the necessary functions of both a spatial channel filter and a temporal channel filter.
Figure 2D:
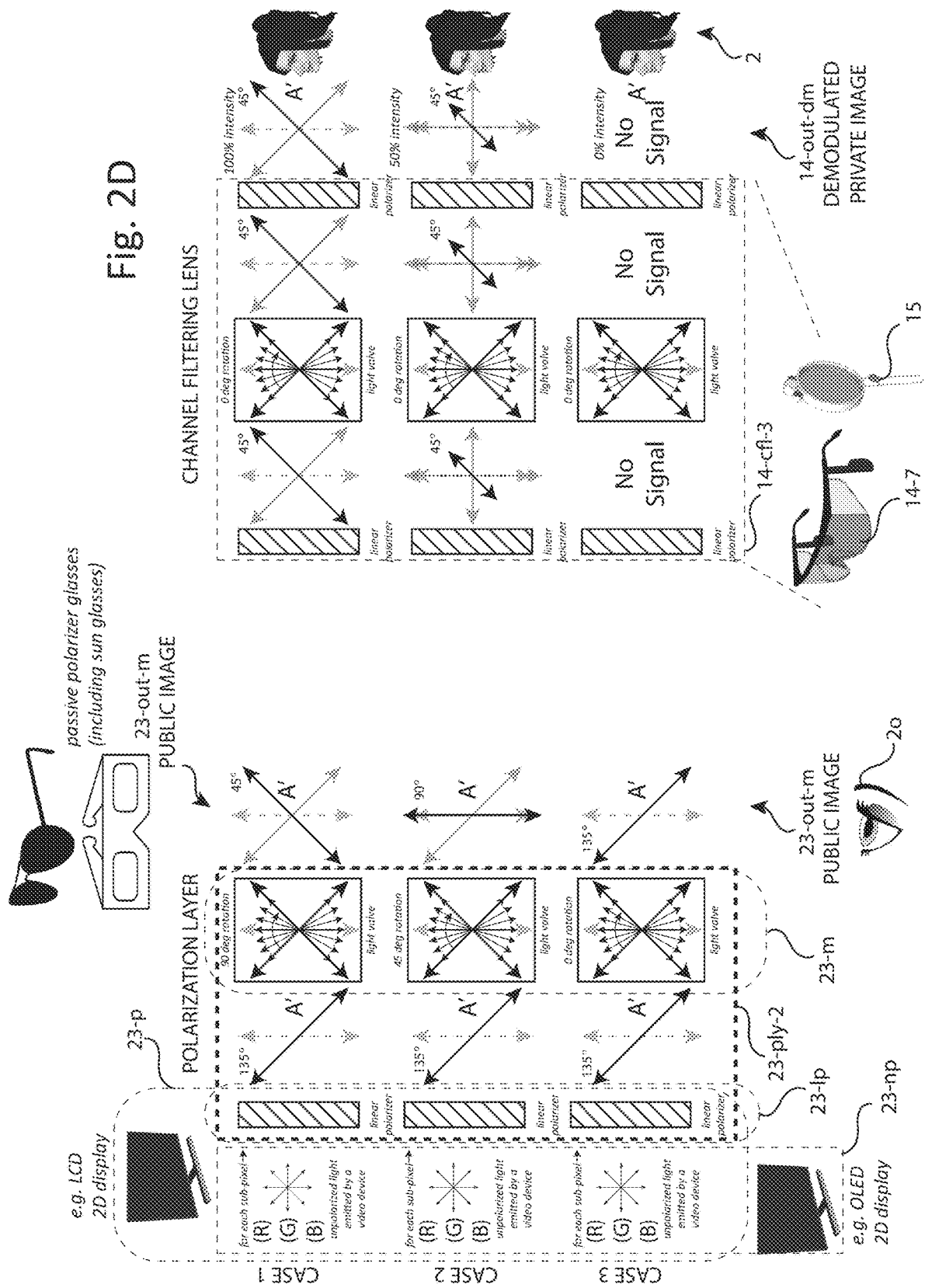
FIG. 2*d* is a diagram depicting the preferred components of an alternative active linear polarization layer 23-*ply*-2 for combining with either a non-polarizing video device 23-*np* or a polarizing video device 23-*p*, where the alternative layer 23-*ply*-2 is like layer 23-*ply* with the quarter wave plate omitted such that layer 23-*ply*-2 outputs linearly polarized light as opposed to circularly polarized light, where unlike the operation of layer 23-*ply*, layer 23-*ply*-2 is shown to operate at the sub-pixel level and to be capable of further modulating the public image output emitted from either the non-polarizing displayer 23-*np* or the polarizing display 23-*p* so as to form modulated public image 23-*out-m* that encodes a private image 14-*out-m*. Also depicted is alternate channel filter lens 14-*cfl*-3, where alternative channel filter lens 14-*cfl*-3 is like channel filter lens 14-*cfl* with the quarter wave plate and first light valve omitted such that alternate lens 14-*cfl*-3 receives and operates on linearly polarized light as opposed to circularly polarized light.
Figure 2E:
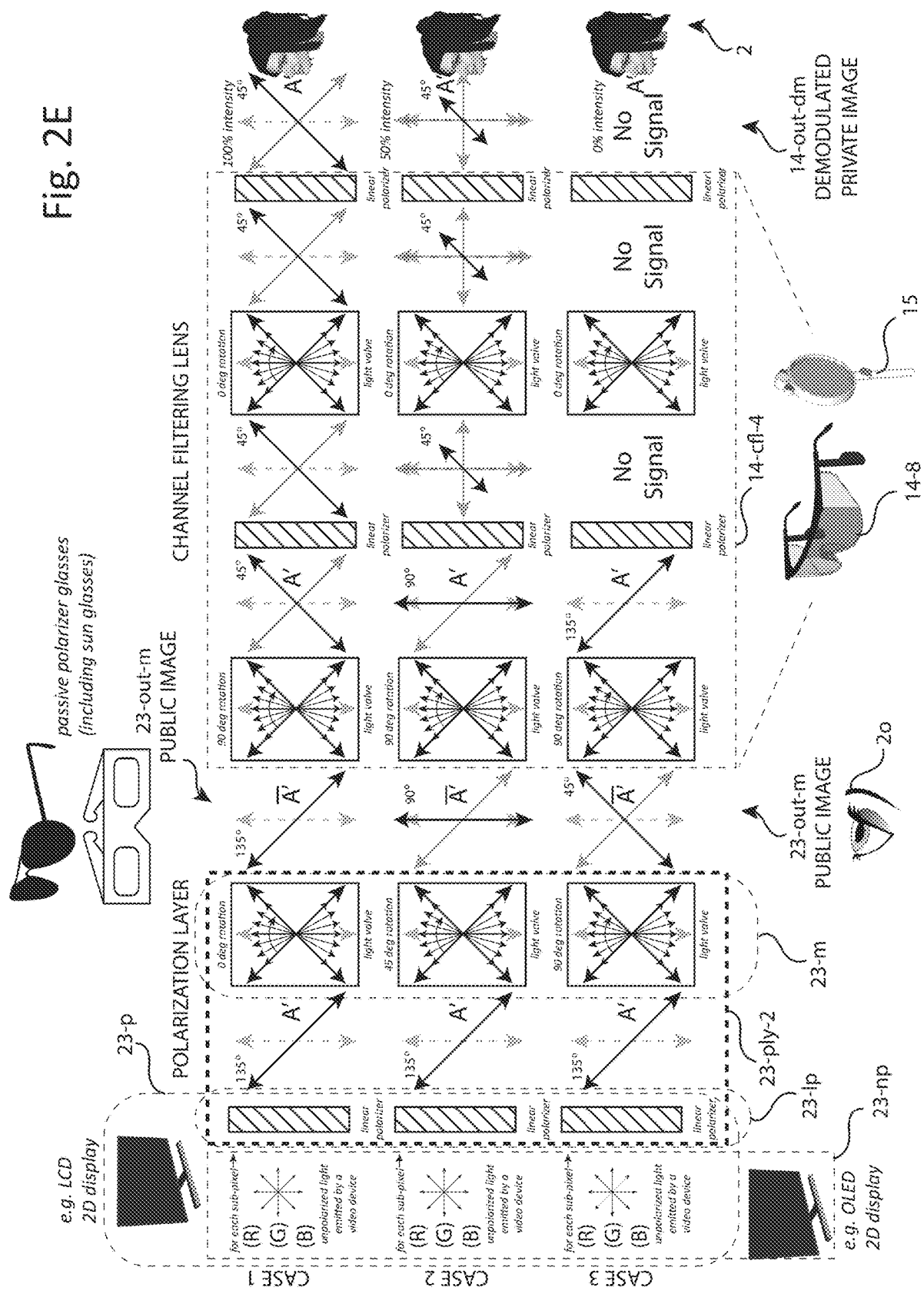
FIG. 2*e* is like FIG. 2*d* except that channel filter lens 14-*cfl*-3 of FIG. 2*d* has been further adapted by adding an entrance light valve to become lens 14-*cfl*-4, where lens 14-*cfl*-4 is like lens 14-*cfl* of FIG. 2*b* with the quarter wave plate omitted. All the operations described in FIG. 2*d* as cases 1, 2 and 3 are repeated in FIG. 2*e* where the only differences are that: 1) modulated light emitted as public image 23-*out-m* by polarization layer 23-*ply*-2 is further rotated by 90 degrees for alternating second image frames such that a viewer using passive polarized glasses including some sun glasses will perceive the combination of the alternating first un-rotated and second rotated image frames as neutral gray, and 2) channel filter lenses 14-*cfl*-4 receives a synchronized control signal to further rotate by 90 degrees each second image that was already rotated by 90 degrees, thereby completing a full 180 degree rotation returning each second image to a modulation state equivalent to the non-rotated first image frames, thus providing for a doubling of the private image 14-*out-m* intensity to a viewer 2 wearing glasses such as 14-8 including lenses such as 14-*cfl*-4 while simultaneously obfuscating the view using passive polarizers.

FIG. 6*c* depicts a display 23 with a polarization layer 23-*ply*-2 for use in any game access point such as 30-1 or 30-2, where the display 23 is divided into spatial regions corresponding to the game access point stations such as Stations 1 through 9, where for each spatial region a private image V is output as a temporal sequence of image frames using a varying pattern of 0 to complimentary 90 degree offset rotations as described with respect to FIGS. 2*d* and 2*e*, such that a viewer 2-*v*2 standing at a station such as 5 and receiving corresponding control signals for first rotating the entrance light valve of the system glasses 14-*ap* being worn by the viewer 2-*v*2 substantially perceives only the streams of Type V2 and not of any Type V1 or V3 that are output a different set of rotational states, thereby increasing overall privacy.

FIG. 7*a* is a depiction of game access point 30-1 as described in FIG. 6*a* being implemented as a pillar 30-1-*pir* allowing multiple gamers such as 2-1, 2-2, 2-3 and 2-4 to approach the access point 30-1 from any direction to receive next content 26-*nc*, such as a secret message. Pillar 30-1-*pir* includes the gamer/device detector 30-*det* depicted as the combination of cameras 30-*det-cam*, RF transponders 30-*det-rf* and pressure sensors 30-*det-ps*.

FIG. 7*b* is a is a depiction of game access point 30-1 as described in FIG. 6*a* being implemented as a pillar 30-1-*plr*-2, where unlike curved display 30-1-*pir* of FIG. 7*a*, pillar 30-1-*pir*-2 preferably comprises a hexagonal arrangement of 6 flat panel displays such as 30-1-*pir-d*1, 30-1-*pir-d*2 and 30-1-*pir-d*3 each comprising a polarization layer 23-*ply*-2, where each flat panel outputs a private image V in a stream of Type V1, V2 or V3 such that any two given streams of the same Type are on opposite sides of pillar 30-1-*pir*-2 and are physically prevented from being simultaneously seen by the same viewer such s 2-1, 2-3 or 2-4.

Figure 8:
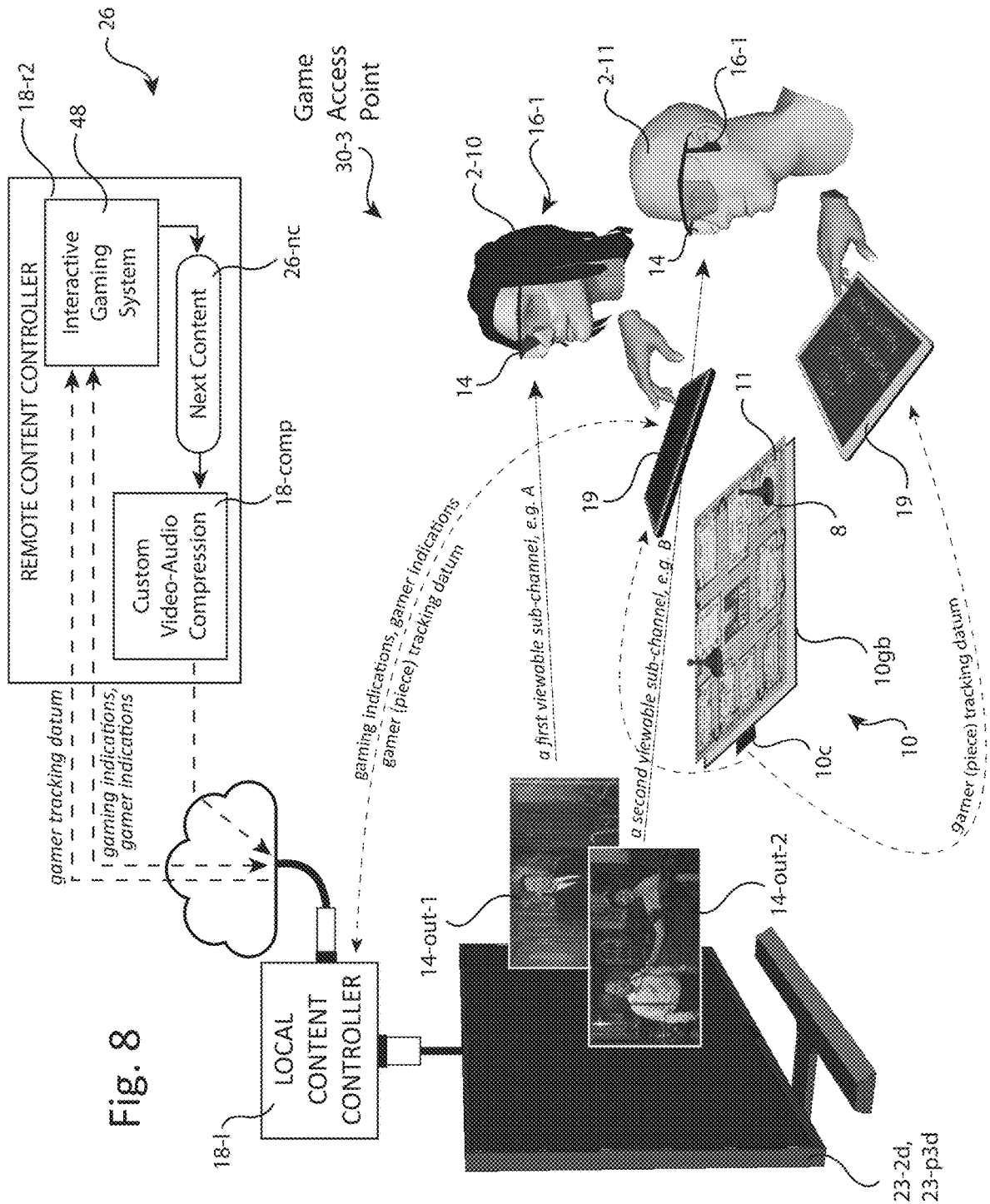

FIG. 8 depicts an alternate embodiment of the present invention combining components of the present system 100 with components described for a physical/virtual game board 10 in the copending application PHYSICAL-VIRTUAL GAME BOARD AND CONTENT DELIVERY SYSTEM, where the combination forms game access point 30-3. A game access point such as 30-3 is meant for use in a home or small group setting such as a café where viewers 2 are playing a physical board game as represented by the interchangeable board game overlay 11, where the overlay is in the format of a game such as Monopoly or Clue. Overlay 11 rests upon a game base 10*gb* capable of detecting and tracking the locations of multiple game pieces 8 as the pieces 8 are moved across the overlay 11, where game base 10*gb* is in communication with a computing device such as a mobile tablet including a gaming app 19 and provides the piece locations as gamer tracking datum to a device 19. Computing device 19 is also serving as a content selector 19 and is in communication with a local content controller 18-1 for exchanging any of gamer tracking datum, gaming indications or gamer indications, where local controller 18-1 is in communications with and provides the datum and indications to remote controller 18-*r*2. Remote controller 18-*r*2 includes an interactive gaming system 48 that at least in part uses any of the provided datum and indications to select next content 26-*nc* for transmission to local controller 18-1, where local controller 18-1 then selects a viewing sub-channel such A or B to provide the next content 26-*nc* to a gamer such as 2-10 as 14-*out*-1, where for example the next content 26-*nc* is provided in response to a gamer such as 2-10 moving their game piece 8 onto a new game board location.

FIG. 9*a* depicts an alternate embodiment of the present invention teaching the use case of providing a closed scene 26-*nc-cs* to one or more viewers such as 2-10 and 2-11, where the content of closed scene 26-*nc-cs* is transmitted to content controller 18-1 from a remote content controller 18-*r* that is in communication with and receiving mixing indications from a local interactive gaming system 48. Content controller 18-1 provides video content to a video display device such as 23-*p*3*d* that outputs video information 23-*out* for receiving and filtering by glasses 14 being worn by viewers such as 2-10 and 2-11. Controller 18-1 also provides public audio content to public audio speakers 17 that outputs shared audio to be received by all viewers such as 2-10 and 2-11, and provides private audio content as well as content datum including control signals to interactive gaming system 48-1. Gaming system 48-1 is in communications with any of personal computing devices such as a cell phone for use as a content selector 19. Selector 19 is paired and otherwise in communication with glasses 14 and private speakers such as 16-2 being worn by viewer 2-10 or 2-11. Selectors 19 in combination with interactive gaming system 48-1 functions to control the video and audio content received by a viewer such as 2-10 or 2-11. In a closed scene, both viewers are controlled by the system to perceive the same video-audio.

FIG. 9*b* represents the same alternate embodiment as depicted in FIG. 9*a*, where the content provided to viewers such as 2-10 and 2-11 is an adjustable scene 26-*nc-as*, for example including any of 4 selectable sub-channels 1A, 2B, 2A and 2B, where sub-channels 1A and 1B are shown to comprise the same third-person viewpoint of a given scene, while sub-channel 2A provides a first person viewpoint for a first selected character role and sub-channel 2B provides a first person viewpoint for a second selected character role.

Figure 9C:
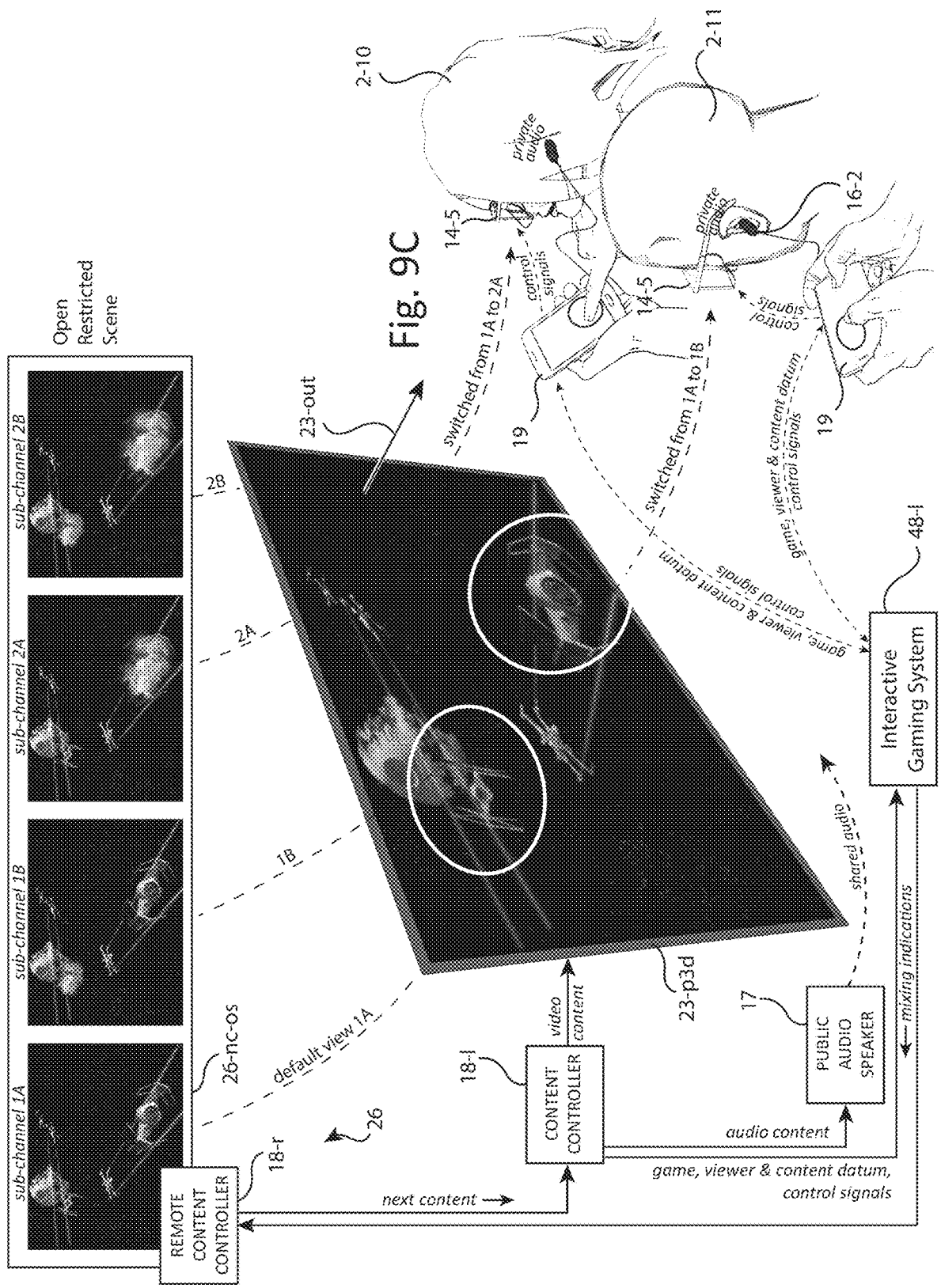

FIG. 9*c* represents the same alternate embodiment as depicted in FIG. 9*a* and FIG. 9*b*, where the content provided to viewers such as 2-10 and 2-11 is an open-restricted scene 26-*nc-os*, for example including any of 4 selectable sub-channels 1A, 2B, 2A and 2B, where viewers such as 2-10 and 2-11 interact with a gaming app running on their associated content selector 19, and where viewers-turn-gamers 2-10 and 2-11 provide inputs that are used at least in part by interactive gaming system 48-1 to dynamically switch a given viewer between any of the possible 4 sub-channels.

FIG. 10*a* is an abstraction using block symbols to represent various well-known relationships between a content source 26 providing content such as a static closed scene or dynamic open-free scene to a video output device 23. As defined herein, a closed scene such as a scene in a movie or the entire move (comprising multiple closed scenes) is pre-determined by a producer or storyteller and does not change its video-audio content in response to choices or inputs from a viewer 2, where therefore a closed scene is referred to as static and is displayed in white. As defined herein, an open-free scene such as an ongoing battle scene in a video game or the entire duration of the video game is not pre-determined by the producer or storyteller and does change its video-audio content in response to choices or inputs from a gamer 2, where therefore an open-free scene is referred to as dynamic and is displayed in gray. Some video games include closed scenes mixed with open-free scenes. Also shown are closed scenes that are provided with associated left-eye/right-eye video for implementing traditional 3D closed scenes. Video games such as provided by Sony PlayStation implement what is referred to as a dual-view video game where each of left-eye and right-eye stereoscopic images become gamer 1 and gamer 2 monoscopic perspectives that are on-going and related to the same virtual environment game. And finally, a succession of closed scenes is interactively provided to a viewer based at least in part on the viewers choices and inputs in a technique called a branching narrative as implemented by PodOp in a gaming app called Mosaic.

Figure 10B:
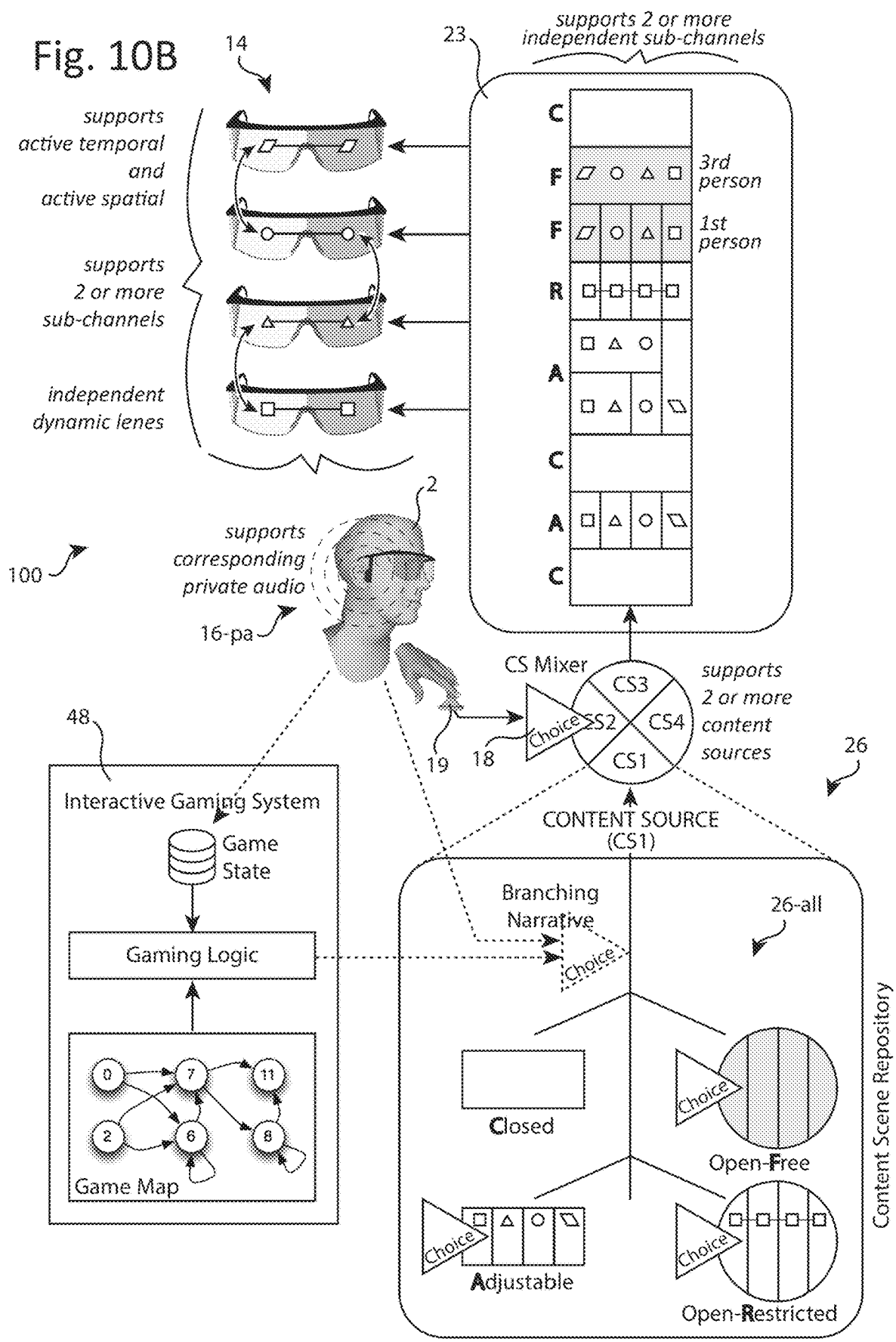

FIG. 10*b* builds upon the abstractions of FIG. 10*a* using the same and additional block symbols to teach key differences between the present system 100 and the prior systems of FIG. 10*a*. In one difference, video output device 23 in combination with eye glasses 14 provides any of 2 or more temporal, spatial or temporal-spatial sub-channels to either lenses of glasses 14 at any time during the presentation of video content. This capability provides for static adjustable scenes (A) and static open-restricted scenes (R), which along with closed scenes (C) and open-free scenes (F) form a content repository 26-*all* that is a content source 26. In another difference, there is a many-to-1 relationship between content sources 26 and the video output device 23, where the relationship is managed by a content controller 18, where controller 18 receives indications (depicted as "choices" for convenience) from viewer 2 for use at least in part in determining which of content 26-*all* from which of multiple content sources 26 such as CS1, CS2, CS3 or CS4 is provided on which of the 2 or more viewing sub-channels. System 100 optionally provides a branching process, either comprised within a content source 26 as portrayed, or within the controller 18, or within the interactive gaming system 48. The optionally included branching process accepts any of gaming datum from an interactive gaming system 48, or viewer indications from a viewer 2, to be used at least in part for selecting or determining the next provided scene. The arrangement allows for the features of both a branching narrative and a gaming system. In another difference, controller 18 provides private audio 16-*pa* to a viewer 2 using any of private speakers 16, where private audio corresponds to the private video provided to the viewer 2 on a viewing sub-channel.

Figure 10C:
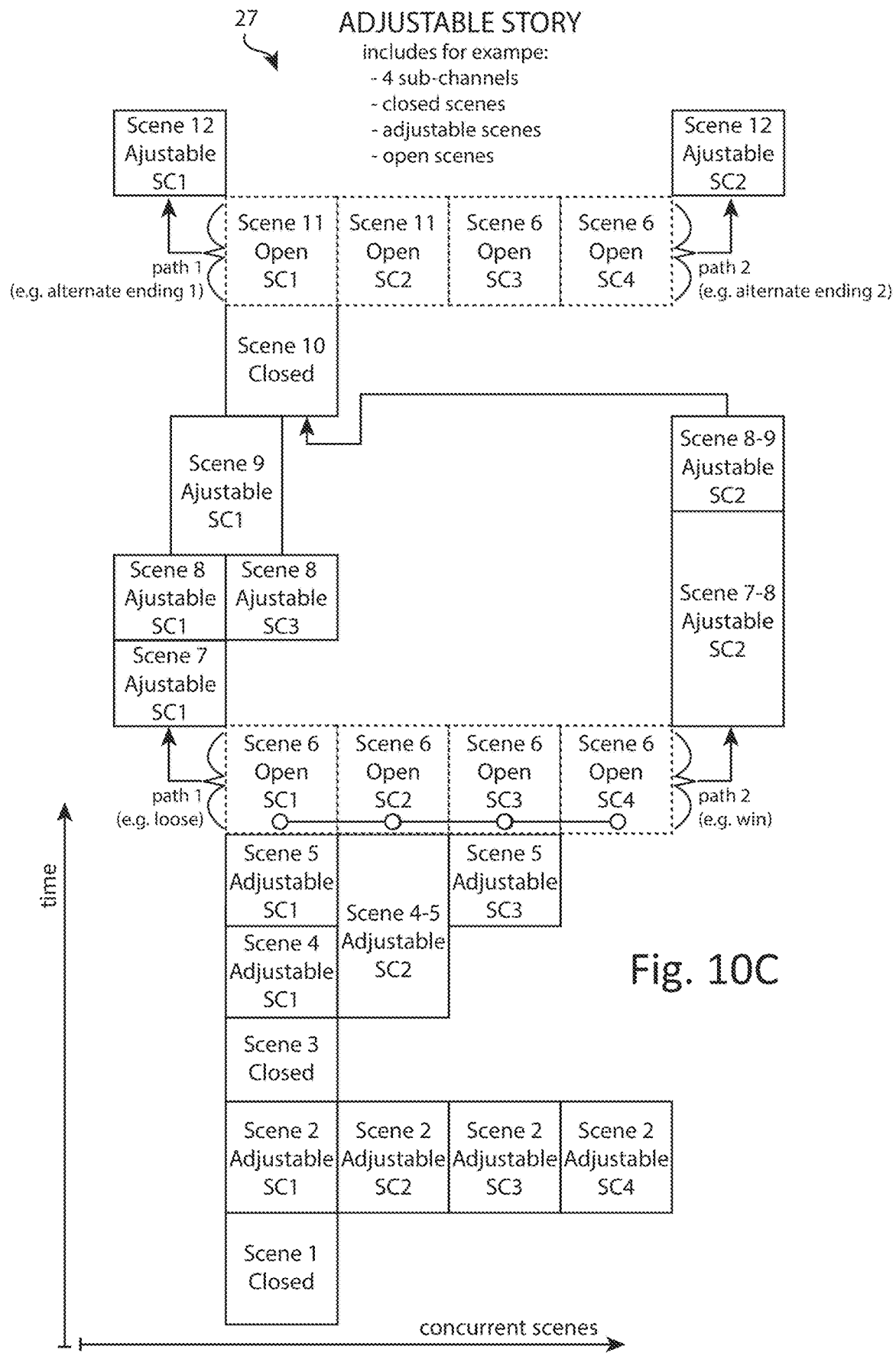

FIG. 10*c* is a block diagram representative of the content comprising an exemplary adjustable story 27, such as a movie including closed scenes C, adjustable scenes A, open-restricted scenes R and open-free scenes F.

In the following description, numerous specific details are set forth, such as examples of specific components, types of usage scenarios, etc. to provide a thorough understanding of the present disclosure. It will be apparent, however, to one skilled in the art that the present disclosure may be practiced without these specific details and with alternative implementations, some of which are also described herein. In other instances, well-known components or methods have not been described in detail to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring to FIG. 1*a* there is shown the three key components of system 100 including a content controller 18 for determining and providing two or more viewing sub-channels such as 1A, 1B, 2A, 2B, 3A, 3B as video content to a video output device 23, where device 23 outputs the provided video content as single channel video 23-*out* to be received by channel filtering eye glasses 14-5, and where controller 18 further determines and provides synchronized control signals representing a selected viewing sub-channel to eye glasses 14-5, such that glasses 14-5 using at least in part the control signals controllably filter single channel video 23-*out* to transmit the selected one of viewing sub-channels 1A, 1B, 2A, 2B, 3A, 3B as 14-*out* to a viewer 2. System 100 preferably further comprises a content selector 19 for determining or accepting indications from the viewer 2, where selector 19 provides any of the indications as viewer selection datum to content controller 18, where controller 18 at least in part uses the viewer selection datum to determine the selected viewing sub-channel and corresponding synchronized control signals for providing to eye glasses 14-5. System 100 preferably further comprises one or more private speakers 16 for providing to the viewer 2 private audio 16-*pa* corresponding to 14-*out*, where content controller 18 provides audio to private speakers 16 corresponding to the selected viewing sub-channel.

Controller 18 comprises a cell processor with XDRAM for executing its included functions preferably further comprises a video co-processor with VRAM, all as will be well-known to those skilled in the art of computing systems, especially those handling video graphics. In one operational mode of the present invention 100, content controller 18 first queries video device 23 to determine extended display identification data (EDID) using technology well-known to those skilled in the art of video devices, where the EDID at least indicates if the video device 23 is 2D, active 3D or passive 3D and preferably also indicates the display resolution and screen size. Using any of the EDID, controller 18 then determines and provides multi sub-channel content appropriate to the video device 23, where all of 2D, active 3D and passive 3D video devices 23 support multiple temporal sub-channels such as 1, 2 and 3 depicted, and where passive 3D video devices 23 additionally support 2 spatial sub-channels A and B depicted. Therefore, content controller 18 can determine and provide at least 2 to 3 temporal sub-channels 1, 2 or 3 for any existing video device 23, and where the video device 23 further supports passive 3D, content controller 18 is further capable of providing 2 spatial sub-channels A and B and a combination of temporal-spatial sub-channels such as 1A, 1B, 2A, 2B, 3A, 3B.

As will be discussed in relation to upcoming FIGS. 4*a*, 5 and 10*b*, content controller 18 is further capable of receiving video from two or more content sources such as a settop box, gaming console or personal computing device, where controller 18 transforms each of the received video into a distinct viewing sub-channel and provides the mix of distinct viewing sub-channels to the single video device 23 for output as 23-*out* such that multiple viewers 2 each wearing distinct eye glasses 14-5 may select and receive a distinct sub-channel from within 23-*out*, thus allowing multiple viewers 2 to share a single video device 23-*out*, each receiving substantially different video. Controller 18 is capable of querying each of connected input content sources to at least determine a device type or name, where controller 18 preferably provides a list of currently connected content sources including at least type or name as selection datum to content selector 19, where selector 19 interfaces with the viewer 2 to provide at least in part the selection datum to assist the viewer 2 in the sub-channel selection process.

Anticipated uses include providing four gamers the ability to share a single large screen display by plugging for example each of their gaming consoles or PCs into four video input ports on the content controller 18 and then wearing eye glasses 14-5 set to receive their desired sub-channel. Another expected use is for first member of a family to select a traditional channel from a settop box plugged into a first video input port on controller 18, where for example the traditional channel is showing a sporting event that is then transformed by the controller 18 for output through spatial sub-channel A, while a second member of the family wirelessly connects their personal computing device to a second video input port on controller 18, where for example the personal computing device then streams a movie that is then transformed by the controller 18 for output through spatial sub-channel B.

As is well-known in the art of 3D movies and active 3D displays, a 3D movie created for viewing with what is known as active shutter glasses typically comprises two temporal sub-channels 1 and 2 each comprising alternating left-eye/right-eye images, where the active shutter glasses controllably transmit only left-eye images (e.g. temporal sub-channel 1) to a viewer 2's left eye and right eye images (e.g. temporal sub-channel 2) to the viewer 2's right eye. In the present system 100, there are no restrictions as to the number of temporal sub-channels, nor are there any restrictions regarding which of the multiplicity of video images comprising video 23-*out* are to be included in any given temporal sub-channel, where for reasons that will be well understood to those familiar with the human vision system and acceptable video quality, the number of temporal sub-channels is anticipated to be, but not limited to, four.

As is well-known in the art of 3D movies and passive 3D displays, a 3D movie created for viewing with what is known as passive polarizer glasses typically comprises two spatial sub-channels A and B each comprising alternating left-eye/right-eye images, where the passive polarizer glasses controllably transmit only left-eye images (e.g. spatial sub-channel A) to a viewer 2's left eye and right eye images (e.g. spatial sub-channel B) to the viewer 2's right eye. As is also well-known, when using typical display technology for example as opposed to projector technology, each of the two spatial sub-channels A and B are present in a single video image within 23-*out* and comprise a fixed and substantially equal number of left-eye pixels (e.g. A) and right-eye pixels (e.g. B,) for example each of spatial sub-channels A and B represent alternating rows of pixels within the video device 23. In at least one embodiment of the present invention as to be discussed later in the specification, there are no restrictions as the which pixels within a given video image belong to the first spatial sub-channel A versus B. As is also well-known, each of spatial sub-channels A and B emit distinguishably polarized light that is responsive to a passive polarizer lens, where the response is either to substantially transmit in full or be blocked in full, and where the distinguishable polarization is either based upon circularly polarized light or linearly polarized light. While some embodiments of the present invention employ passive polarizers and as such either transmit A and block B, or transmit B and block A, other embodiments employ active polarizers that can be controllably operated to transmit either of A or B, and therefor block either of A or B.

Still referring to FIG. 1*a*, the preferred embodiment eye glasses 14-5 comprise an independently controlled channel filter lens 14-*cfl* for each of the left eye lens and right eye lens, where each channel filter lens 14-*cfl* comprises both an active spatial channel filter 14-*scf* and an active temporal channel filter 14-*tcf,* such that there is no restriction as to which of the multiplicity of provided viewing sub-channels such as 1A, 1B, 2A, 2B, 3A, 3B are filterable for either the left or right eye of viewer 2 with respect to any given video frame comprising video out 23-*out*. Eye glasses 14-5 also comprises a lens controller 14-*lc* that is in wireless communication with content controller 18, where wireless communication is like that used by existing active shutter glasses technology and typically includes either Bluetooth or infrared, but may also operate in wi-fi, all as will be well understood by those familiar with active shutter glasses and active 3D televisions. Lens controller 14-*lc* communicates with content controller 18 to perform the well-known function of device pairing, after which content controller 18 provides control signals to lens controller 14-*lc* for controllably operating each of the left and right eye channel filter lens 14-*cfl* in synchronization with the output 23-*out* of device 23. Content selector 19 is any implementation of a user interface and can be either a separate device such as the viewer's cell phone running an app that is in wireless communications with the content controller 18, or an embedded devices such as programmable buttons on a universal remote control or scroll wheel selector (such as depicted) built into a chair, where the any implementation is in communication with the content controller 18 and includes any of well-known computing elements for executing its functions.

Still referring to FIG. 1*a*, video output devices 23 are well-known in the art and include any of display devices such as OLED, LED, LCD or projection devices such as DLP or LCD. State-of-the-art displays and projection systems support outputting a stream of image frames such as 23-*out*, for example at a rate of 240 to 480 images per second. The preferred single channel video 23-*out* that comprises at least 240 images per second may then, for example, be controllably divided into 3 temporal sub-channels (shown as 1, 2 and 3,) each comprising 80 images per second. It is important to understand that: 1) for a traditional output channel 23-*out*, all images in the output stream represent a continuous on-going set of visible information that is perceived by the naked eye of a viewer 2 as coherent content, 2) creating flick-free video typically requires a minimum of 60 images per second, 3) evenly dividing single channel 23-*out* comprising 240 images into three temporal sub-channels (1, 2 and 3) of 80 images per second provides greater than 60 images per second per each temporal sub-channel, but assuming distinct visual content for each of the three temporal sub-channels, the naked eye of a viewer 2 will experience the interleaved combination of the three temporal channels as incoherent content, and 4) if the images received by a viewer 2 are limited by eye glasses 14-5 to a single temporal sub-channel (e.g. 1, 2 or 3,) then the viewer 2 will perceive coherent video at the frame rate of the single temporal channel, e.g. at 80 images per second. The temporal channel filter 14-*tcf* of lens 14-*cfl* comprises any implementation of an active shutter that is capable of controllably switching between either of a transmissive or non-transmissive state (see upcoming FIGS. 2*b*, 2*c*, 2*d*, 2*e* and 2*g* for more detail,) where each of the transmissive or non-transmissive states correspond to select images in the temporal sequence of images comprising video 23-*out*, all as will be well understood by those skilled in the art.

Still referring to FIG. 1*a*, as is also well-known in the art of display systems such as OLED and LCD and as described in the copending applications, a single output image frame may be spatially divided into two distinct sub-frames using polarization elements such as left and right circular polarizers or vertical and horizontal linear polarizers. Those familiar with 3D imaging displays will recognize that these distinct sub-frames are the left and right images necessary for creating the 3D visual effect for a viewer 2. Display manufacturer LG Electronics has sold displays including a film-type patterned retarder for causing alternating rows of an output image to be either left or right circular polarized, where the output polarized rows are then either transmitted or blocked by a left or right circular polarizer layer affixed to each lens of eye glasses worn by a viewer 2, all as will be well understood by those familiar with 3D display systems. Also well-known are optical devices and films for causing alternating rows of an image to be either vertically linear polarized or horizontally linear polarized, where the output polarized rows are then either transmitted or blocked by a vertical or horizontal linear polarizer affixed to each lens of eye glasses worn by a viewer 2, all as will be well understood by those familiar with 3D display systems. The spatial channel filter 14-*scf* of lens 14-*cfl* comprises any implementation of actively switchable circular or linear polarizers that is capable of controllably switching between either of two polarization states A or B, for example where A is right circularly polarized and B is left circularly polarized (see upcoming FIGS. 2*b*, 2*c*, 2*d*, 2*e* and 2*g* for more detail,) where each of the two polarization states A and B correspond to the alternating image rows of the output display, all as will be well understood by those skilled in the art.

A careful understanding of the present teachings will recognize that the preferred output channel 23-*out* comprising at least 240 image frames per second is for example filtered using temporal channel filter 14-*tcf* into three temporal sub-channels (1, 2 and 3) each comprising a stream of 80 image frames per second, where each image frame per second is further filtered using spatial channel filter 14-*scf* into two spatial sub-channels (A and B) each comprising some amount of pixels, such that the entire preferred single channel video 23-*out* supports a total of six separate viewing sub-channels, where a viewing sub-channel is a combination of a temporal and spatial sub-channel.

Still referring to FIG. 1*a*, as will be well understood by those familiar with displays, projectors, video streams, human visual perception and 3D systems, there is a lower temporal limit for the visual information sufficient for creating the perception of full-motion video without the effects of flickering, where flickering is the perception of black image frames sequenced in between the images making up the full-motion video. As prior mentioned, this limit is generally understood to be 60 images per second. In addition to the total images per second, it is also important to understand the length of time that each image of the 60 remains viewable to the naked eye, for example ranging from $\frac{1}{60}$ of a second for an output channel 23-*out* comprising 60 images per second, to $\frac{1}{240}$ of a second for an output channel comprising 240 images per second, where the assumption is that the underlying display technology is capable of outputting a single image frame with minimal delay in the switching time of the pixel electronics, which varies based upon the technology and for example is at least one order of magnitude faster for OLED versus LCD, all as will be well understood by those familiar with the various display technologies. As will also be well understood, there is a lower spatial limit for the visual information sufficient for creating pleasing visual images where the edges of objects are smooth as opposed to jaggy. In today's market, HD images with a minimum resolution of 1280 (horizontal)×720 (vertical) are generally considered as pleasing, where for 3D HD displays these same HD images are spatially sub-divided using polarization as prior discussed, such that each of the left/right eye images are presented at a lower minimal resolution of 1280×360 (where 360 is 50% of the 720 vertical image rows.) For 3D viewing, it is well-known that human visual perception combines the 50% resolution of the left and right images into a single 3D image that is generally perceived as comprising the full 1280×720 resolution and is therefore still pleasing.

In the present teachings, splitting a single HD image into two spatial sub-channels A and B will result in image resolutions that are anticipated to be minimally acceptable by a viewer 2, and therefor what is preferred when implementing spatial sub-channels as herein taught is to at least use what are generally referred to as 4k displays that output a single image frame at a minimum resolution of 3840× 2160, such that a single spatial sub-channel image A or B would have a resolution of 3840×1080 that exceeds the acceptable HD spatial quality. As is also well-known in the art, 3D projector systems can work differently than 3D displays, in that two projectors may be simultaneously outputting full resolution left and right images, each with a distinguishable polarization states, where the full resolution images reflect off a screen back to the viewer 2 who wearing 3D glasses perceives each left and right image to be full resolution, rather than the half-resolution of a 3D display. What is most important to understand with respect to the present invention is that a single channel video 23-*out* presents an on-going stream of individual images, where the total number of images as well as the total spatial resolution of each single image may be controllably sub-divided into any combination of herein defined temporal and spatial sub-channels, where a combination of temporal and spatial sub-channels forms a unique viewing sub-channel, and where distinct video content may be presented to a viewer 2 through a distinct viewing sub-channel such that the viewer 2 wearing eye glasses 14-5 is limited to perceiving only the temporal-spatial visual information presented within the distinct viewing sub-channel.

Given the state-of-the-art in video output displays and projectors, this provides the opportunity of creating a single channel output 23-*out* that is divisible into for example into two to six viewing sub-channels, where each viewing sub-channel creates sufficiently smooth spatial quality and flicker-free temporal quality. One anticipated use for the present invention 100 is to adapt a traditional closed story movie to further comprise alternative scenes embedded within any of the available viewing sub-channels, where for example multiple viewers 2 pre-select prior to a movie a role type, such as hero or villain, and then receive 80% of the same image frames while the remaining 20% of received image frames are different for at least two of the viewers 2 based at least in part upon the pre-selected role type. There are many other anticipated uses for the present teachings as will be well understood to a careful reader of the present invention, including interactively constructing and streaming video 23-*out* to a group of two or more viewers 2 who are playing a game, were the stream 23-*out* is dynamically constructed based at least in part upon on-going inputs from each of the two or more viewers 2, where the stream 23-*out* is dynamically adjusted to form a varying number of viewing sub-channels at any given time ranging from a single sub-channel viewed by all two or more viewers, to for example six sub-channels selectively viewably by any of the two or more viewers, all as will be described in greater detail forthwith. It is also possible that the output video 23-*out* is divided into a set number of viewing sub-channels, e.g. two to six, for the entire duration of output, but that at any given time frame during the output of video 23-*out* some or all of the viewing sub-channels include copies of the same or different image frames, such that viewers 2 of different viewing sub-channels sometimes are viewing the same image information as other viewers 2 watching a different viewing sub-channel, and sometimes viewing distinct images only provided on the select sub-channel. As the careful reader will see, many variations are possible with respect to the technology used for implementing the present system, and for the static or dynamic determination of viewing sub-channels based upon combinations of temporal and spatial sub-channels, and therefore the preferred apparatus and methods should be considered as exemplary, rather than as limitations of the present invention.

Still referring to FIG. 1*a*, as those familiar with hardware and software systems will understand, the apparatus and methods herein described are functional, where the functions may be deployed in various hardware and software configurations without departing from the scope and intention of the present invention, therefore again, the preferred and depicted embodiments should be considered as exemplary rather than as a limitation of the present invention. For example, using the present teachings, any traditional video device 23 can be used with the content controller 18 and eye glasses 14-5 to provide single channel video 23 that comprises at least two viewing sub-channels that are two temporal sub-channels, such that a single traditional close story movie is further adaptable to be output as an adjustable story comprising the two sub-channels, where for example one sub-channel emphasizes the hero's journey while the other sub-channel emphasizes the villain's journey. Furthermore, content controller 18 might be a separate computing device within an enclosure separate from the video device 23, or controller 18 might be included within the enclosure of the video device 23 such as an OLED 3D TV sharing none or some of any computing elements comprising the video device 23. Alternately, controller 18 or its functions might be included within a popular gaming controller such as PlayStation 4 or XBOX, or some equivalent. The video output device 23 can be any of display or projection systems, for example an LCD display for use in a home living room or a 3D projection system for use in a movie theater. Again, what is important to see is that the single channel video 23-*out* is controllably divided into two or more viewing sub-channels, where the viewing sub-channels are then made selectable to the viewer 2.

Figure 1B:
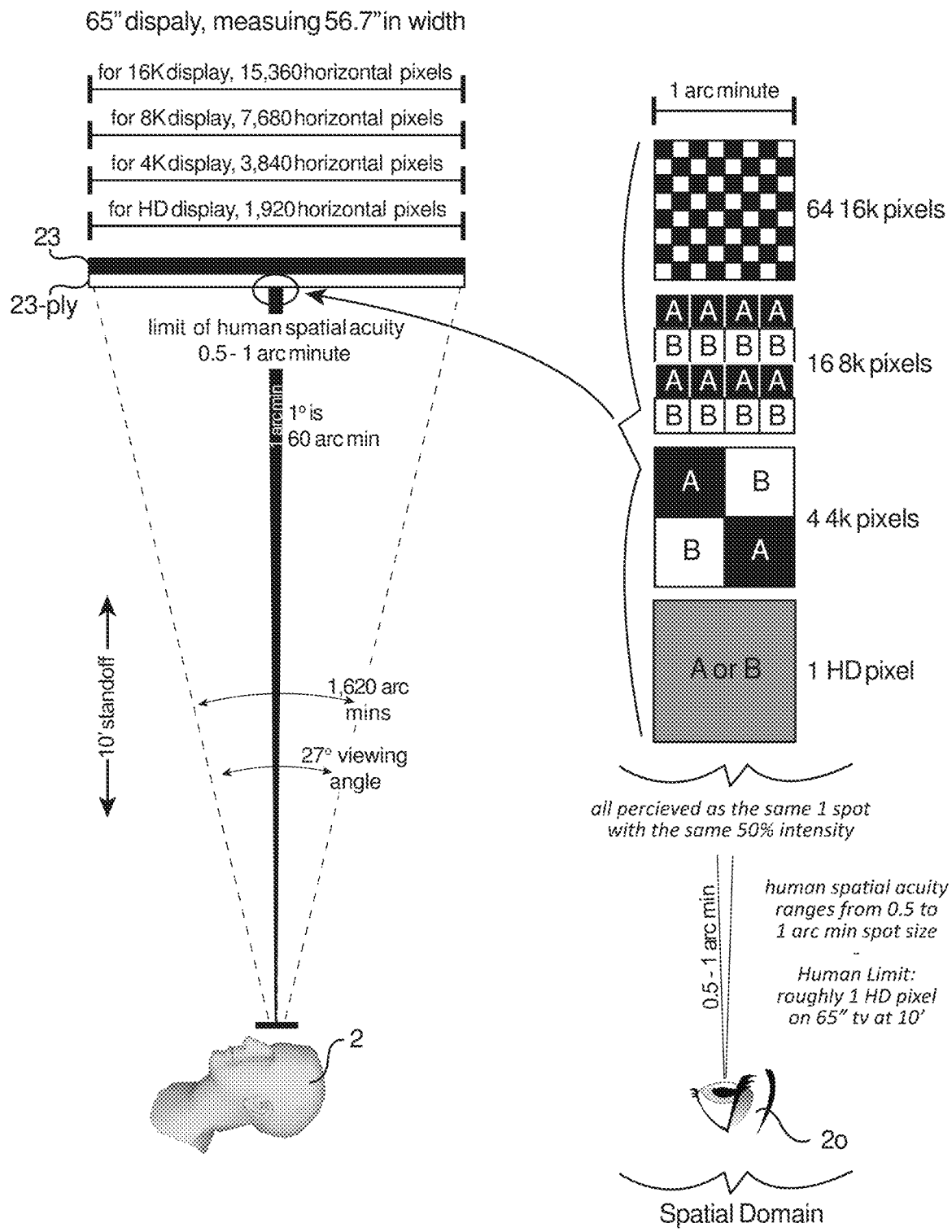
FIG. 1b depicts the physical rough-scale relationships between a viewer 2 and a video output device that is a display, where the relationship is intended to highlight the pixel resolution per arc minute of viewing area on the surface of a display, where the average spatial acuity of human vision is well-known to reach its limit in the range of 0.5 to 1 arc minute.

Referring next to FIG. 1*b*, there is show an approximate scale depiction of a viewer 2 looking at a 65" display at a distance of 10', where the display width measures 56.7" in width and takes up approximately 27 degrees of the viewer's 2 field-of-view. As those familiar with human vision will understand, the study of spatial visual acuity attempts to define the smallest visual angle within which a person can see clearly. There are many considerations, but in general it is useful to know that the definition of a "standard observer" with 20/20 vision means that they can read letters with a stroke width of 1 arc minute, and that the "normal best-corrected" adult visual acuity is roughly 0.8 arc minutes. As is also well-known, there are 60 arc minutes per degree, such that the 27-degree view as depicted includes 1,620 arc minutes. The number of pixels per arc minute depends upon the distance to the display, the display width, and the pixels resolution of the display, where for example an HD display includes 1,920 horizontal pixels, versus 3,840 for a 4k display, 7,680 for an 8k display and 15,360 for a 16k display. Using well-known trigonometric functions, it is possible to calculate the number of pixels per 1 arc minute for a 65" display being view at 10', where a 1 arc minute surface area of display would include approximately: 1 HD pixel, 4 4k pixels, 16 8k pixels and 64 16k pixels (see the right side of the present Figure.) As the careful reader will observe, given the depicted constraints, at 4k resolution the pixel size is roughly 0.5 arc min and is reaching the typical human limit of spatial acuity.

As the present Figure depicts, at HD resolution a single pixel roughly becomes a single spot of light within a spatial area that is 1 arc min wide and 1 arc min high. At 4k resolution, 1 pixel reaches about 0.5 arc minutes that is below the 0.8 arc minute normal best-corrected vision. As is also well-known, the human eye sums light intensity over area, where as spatial detail increases, human vision blurs image detail created by varying intensities into a larger feature. For example, a 1 HD pixel with a display intensity of 50% will be perceived as a spot of average brightness in an image. Likewise, a matrix of 4 4k pixels, where 2 are displayed at 100% intensity and 2 are 0% intensity (thus providing the same total light intensity over the 1 arc min×1 arc min spatial area as the 1 HD pixel,) will tend to be blurred and summed by the human eye as roughly equivalent to the 1 HD pixel, as depicted. In another blurring arrangement, 4 rows of 4 pixels of 8k resolution are arranged in an alternating horizontal pattern, similar to how the left-eye and right-eye images are arranged on a passive 3D display, where again the total light emitted across the matrix of 16 pixels is equivalent to the 1 HD pixel such that the human eye will tend to blur the matrix perceiving the equivalent of the 1 HD pixel. What is important to see is that at 4k resolutions and above, dividing pixels within a 1×1 arc min area between the two spatial sub-channels of A and B will provide two spatial images with an equivalent 1 HD resolution that reaches the standard visual acuity of a standard observer, such that greater resolution detail has marginal effect on image quality. At 8k resolution, pixel detail well exceeds that of normal best-correct adult vision. What is also important to see is that as display manufactures compete to bring out displays with higher and higher spatial resolution, like the spatial resolution competition in digital cameras or digital audio, the technology has reached and will exceed a practical human limit where the present invention then seeks to find alternative advantageous uses for the additional spatial resolution beyond increase image detail.

Figure 1C:
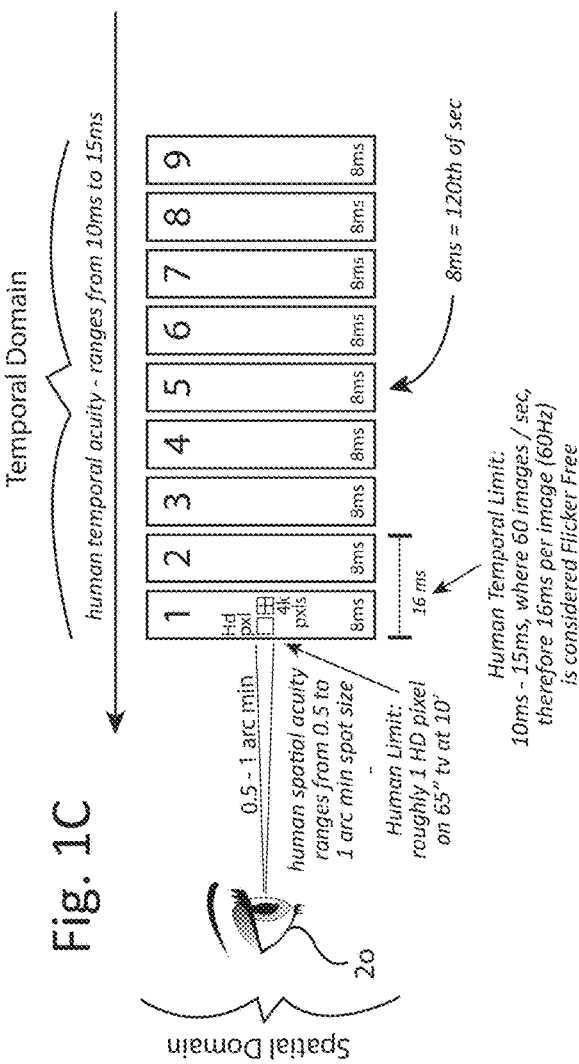
FIG. 1c depicts a temporal flow of intermittent images being received by a viewer 2 as provided by a video output device, where the relationship of the viewer 2 to the flow of images is intended to highlight the temporal resolution or sensitivity of the average human vision to the intermittent flow of light, where the average temporal acuity of human vision is well-known to reach its limit for detecting flicker on the range 10 ms to 15 ms.

Referring next to FIG. 1*c*, there is depicted the naked eye 2*o* receiving a stream of images from a 65" 4k tv with a refresh rate of 120 Hz, being viewed at 10'. As discussed in relation to FIG. 1b, given this exemplary arrangement, human spatial visual acuity begins to reach the average person's limits at HD resolutions. As is also well-known to those familiar with human vision, there is also a concept of temporal visual acuity, which attempts to define the critical rate at which changes in the luminance levels of a given spot, e.g. 1 HD pixel, are perceived as continuous as opposed to intermittent, where this critical rate is referred to as the critical flicker fusion rate (CFF.) As with spatial visual acuity, there are many factors effecting temporal visual acuity. For example, increasing the total luminance of the 1 HD pixel shortens the critical duration necessary for the eye to detect the luminance that conversely increases the CFF such that a pixel going from black to 100% intensity will tend to flicker more than a pixel going from black to 25% intensity. In general, in order to detect a successive flashing of light an appropriate integration time is required between flashes that ranges in normal human vision between 10 ms to 15 ms, which translates to refresh rates of 100 Hz and 65 Hz. The commonly accepted norm for what the display industry calls "flicker free," is to display images at a minimal rater of 60 Hz, where each pixel within the image is updated once every 16 ms.

However, understanding flicker also requires understanding what is actually happening inside of the display with respect to the difference between what is known as frames-per-second and the refresh rate. Frames per second relates to the number of distinct images a computing element such as a graphics card can form within internal memory, a task that typically includes decoding if the images are providing from a streaming source or graphics calculations if a virtual image is being generated such as in a video game. In today's marketplace, 60 fps is a typical rate, where many graphics cards can reach 120 distinct images per second and beyond. As each image is formed within internal memory, another process transfers this digital representation as typically analog signals to the display elements such as OLED of LCD pixel elements, where this transfer rate is the refresh rate. It is also well-known and important to understand that when flashing a series of individual images that includes the motion of an object, at roughly 24 images per second, the human eye will start to perceive continuous motion of the object, were below 24 images the object's motion appears uneven or jumpy. Given this consideration, in practice cinematic movies have display at least 24 distinct images per second and computer systems have rounded this up to 30 images per second, or 30 fps, where $\frac{1}{30}^{th}$ of a second is equal to 33 ms. The next question becomes the duration of time that a single image is display, e.g. is the image display for the full 33 ms or only a portion of this time such as 16 ms? Many modern televisions implement what is known as display-and-hold, where each distinct image is displayed for the entire amount of time until the next distinct image is available. In this case, the refresh rate is the same as the frames-per-second, e.g. 30. In some displays, a single frame presented every $\frac{1}{30}^{th}$ of a second is flashed onto the screen twice, in which case the fps is 30 and refresh rate is 60 Hz.

Still referring to FIG. 1c, while 30 fps is considered full-motion/smooth motion, in practice when a series of images includes a fast-moving object, and each of 30 images per second is displayed for the full $30^{th}$ of a second, with each successive image frame the fast-moving object can still appear to jump to the human eye. There are two general techniques for reducing this jumpiness, the first is to display a minimum of 60 fps or more requiring a more powerful graphics card, where this motion is then twice as smooth but also perceived as the "soap opera effect" for movie watchers, basically too smooth compared to a normal 24 fps of a cinema movie. In the second technique, each of the 30 images is displayed for only 16 ms, or $\frac{1}{60}^{th}$ of a second. In between the 30 images the screen is left substantially black for the remaining 16 ms, a technique known as black frame insertion (BFI.) This technique works to trick the eye that than integrates the motion of the objects in the successive frames within the brain to make them appear smooth. The difficulty with black frame insertion is that the human eye is able to detect flashing lights down to 15 ms and even 10 ms. As the careful reader will see, a temporal sub-channel is formed by filtering only a sub-set of the total refresh rate to be received by a first viewer 2 watching a first temporal sub-channel 1 verses a second viewer 2 watching a second temporal sub-channel 2. In order to stay above the generally accepted CFF of 60 Hz while also providing 2 temporal sub-channels, it is necessary to have a display that at least supports a refresh rate of 120 Hz.

In one embodiment, a first graphics card that is capable of decoding, generating or otherwise providing 120 fps that are used to provide 60 fps to the first temporal sub-channel 1 and the remaining interleaved 60 fps to the second temporal sub-channel 2, where for example sub-channel 1 is receiving 60 fps related to a movie while sub-channel 2 is receiving 60 fps related to a sporting event or video game. As the careful reader will see, at 60 distinct images per second each sub-channel is receiving over twice the rate of images generally excepted as necessary for providing cinematic smooth motion (i.e. 24 fps,) where in between each image the sub-channel is essentially off, or receiving a black frame inserted by the action of the temporal channel filter 14-tcf (to be discussed in greater detail with respect to upcoming Figures.) In another embodiment, two graphics cards or computing processes are used simultaneously, where for example the first process receives and decodes a movie at a rate of 60 fps, while a second process generates virtual world gaming images at a rate of 60 fps, and where a third process alternately provides one of each of the first process and second process images to the display for a combined 120 fps. As the careful reader will see, the visual effect for a viewer 2 of sub-channels 1 and 2 is substantially equivalent for the first and second embodiments, where the total frames per second is still more than twice the cinema rate of 24 fps.

In a third embodiment that is like the second embodiment, the two computing processes for providing video to temporal sub-channels 1 and 2 each operate at 30 fps, staggered by 25%, such that the two processes combine to provide a substantially continuous rate of 60 fps to the 120 Hz display. In this case, the 120 Hz display is preferably refreshed as follows: image 1, image 2, image 1 repeated, image 2 repeated, where each refresh last 8 ms (i.e. $120^{th}$ of a second.) As the careful reader will see, image 1 appears on sub-channel 1 every $60^{th}$ at substantially 50% intensity caused by the temporal blurring of the inserted black image, where 1) the reduction in intensity and temporal blurring acts to further reduce flicker, and 2) it is then possible to increase the luminance output (referred to as NITs which is a measure of candela per square meter) of the television such to compensate for each dimmed sub-channel, where for example the increase is roughly 2×.

What is important to see is that at 120 Hz, or 8 ms per image refresh, the refresh rate well exceeds that of the normal adult vision for detecting flicker. Furthermore, even when dividing the 120 Hz refreshes between two temporal sub-channels, each sub-channel with an effective 60 Hz refresh rates provides the typically accepted flicker-free rate.

Figure 1D:
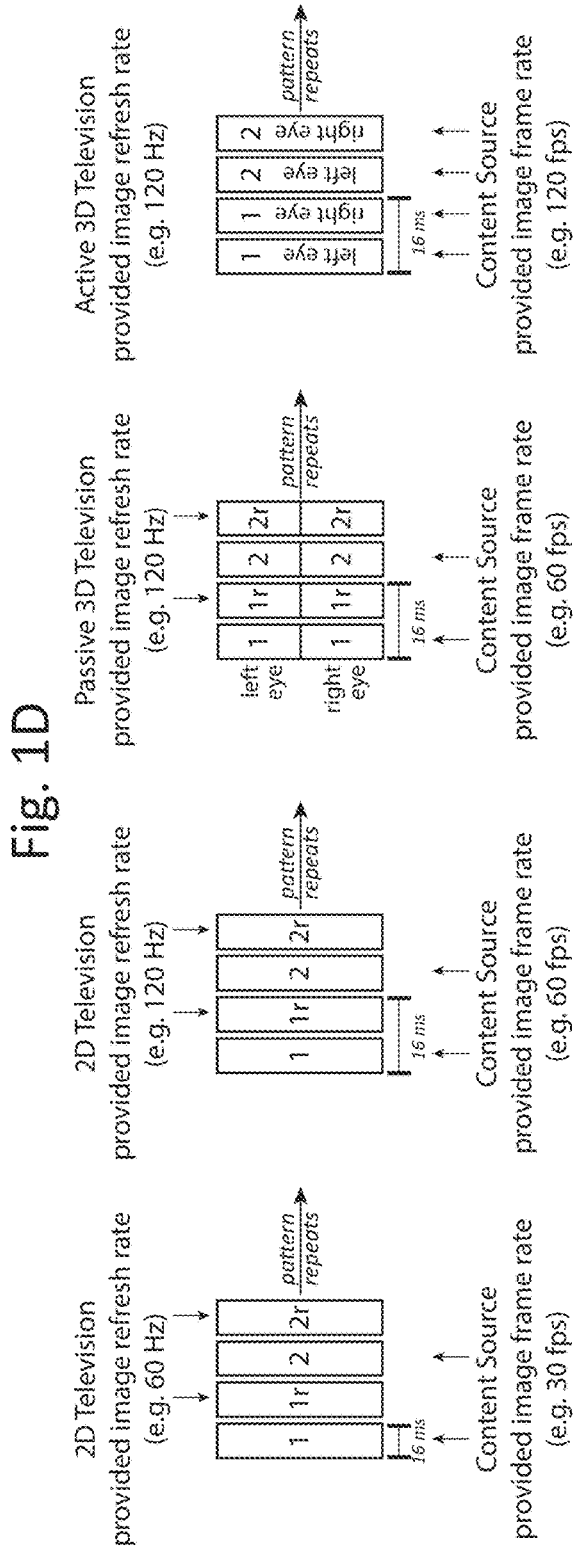
FIG. 1*d* is a depiction of the temporal and spatial nature of images provided by a video output device in relation to the two critical measurements of image frames per second (typically expressed as "fps") and image refreshes per second (typically expressed as "Hz",) where the fps is a measure of the rate at which a content source can provide distinct images to a video output device, and where the Hz is a measure of the rate at which a video output device can flash intermittent images to a viewer. The Figure portrays four typical arrangements of fps from a content source being provided to a video output device for refreshing to a viewer 2, where the arrangements are illustrative of the currently available state-of-the-art systems.

As will be shown in relation to FIG. 1d, at even higher image fps and refresh rates, it is possible to provide additional flicker-free full-motion temporal sub-channels with the important understanding that the luminance (Nits) must then also be increased to avoid dimming of the sub-channels. What is also important to see is that as display manufactures compete to bring out displays with higher and higher temporal resolution, like the fps/samples-per-second temporal competition in digital cameras or digital audio, the technology has reached and will exceed a practical human limit where the present invention then seeks to find alternative advantageous uses for the additional temporal resolution beyond increasing video smoothness. Given the understandings related to FIG. 1c as exemplified, when using a 4k 65" 120 Hz (refresh rate) tv viewed at 10', the average person is receiving roughly 4× more spatial resolution and 2× more temporal resolution than is necessary for a pleasing image.

Referring next to FIG. 1d, there is shown four exemplary cases of various combinations of image frame rates (as provided by a graphics display card or otherwise a computing process) and refresh rates (as provided by a video display or projector.) In each exemplary case, there is a sequence of boxes left-to-right where each vertically aligned box represents a single image being output by a video device, and where some vertically aligned boxes are divided horizontally to represent the output of two spatial sub-channels, e.g. when providing left-eye/right-eye images on a passive 3d display device. Going from left-to-right, the first example depicts a 2D television that provides a refresh rate of 60 Hz being provided distinct images at a rate of 30 fps from a graphics card or otherwise image processing. As depicted, each provided image (1, 2, . . . ) is repeated once by the display, where for example "1" followed b "1r" combine as the first image displayed for $\frac{1}{30}^{th}$ of a second. As the careful reader will see, in this example as well as the remaining three examples, there are no black inserted frames, which is a practice that is not typically implemented in a modern video device. As the careful reader will also see, a display-and-hold video device could simply output the image 1 for 32 ms rather than displaying image 1 twice for 16 ms each display. This arrangement will provide what is referred to as flicker-free, full-motion video.

In the second example, both the refresh rate and the fps are doubled, with the net effect of providing even smoother video at 60 fps. In the third example, the display is a passive 3d display where each output image is spatially divided into left-eye versus right-eye pixels being output at distinguishable polarization states such as left or right circular, typically comprising alternating image display rows of pixels. In this case, each image refresh, such as 1 or 1r, provides 50% luminance of the left-eye and 50% luminance of the right-eye image, and thus on a per-eye basis the perceived brightness of passive 3D is reduced (with a further slight attenuation as the images transmit through the passive polarizer glasses,) all as will be well understood by those familiar with 3d display systems. In the fourth example, an active 3d television outputs a refresh rate of 120 Hz and is provided 120 fps from a video source. In this case, each next image alternates between a left-eye image and a right-eye image, such that the left-eye and right-eye are each receiving 60 refreshes per second (flicker free) fps at 60 fps (exceeding full-motion video,) however once again the total luminance per left and right eye is reduced by 50%.

What is important to see is the interplay between the three factors of: refresh rate (in Hz,) image rate (in fps) and luminance (Nits). With respect to luminance, it is well-known that the average tv outputs images at around 100 to 200 Nits, while newer high-dynamic-range (HDR) tvs output images with 400 to 2,000 Nits. Using the increased luminance allows for a broader (i.e. higher) range of colors going from black to white, all as is well-known in the art. While the following FIG. 1e describes exemplary cases preferably providing HDR images per each sub-channel, as will be well understood by those familiar with video devices, this is not necessary in order to provide pleasing images assumed to be at least HD in resolution, 30 fps of new images providing full-motion, a refresh rate of 60 Hz to provide flicker-free, and 200 Nits in luminance to match a typical tv. A similar discussion applies to projectors versus displays, where luminance for a projector is measured in terms of ANSI lumens versus Nits, where generally 1 Nit=3.426 ANSI lumens. The present invention prefers and anticipates dynamically adjusting the output Nits or ANSI lumens of a video output device based upon the number of sub-channels being provided, where for example a display capable of 2,000 Nits might display a traditional single channel at 600 Nits, and then when switched into 2 viewing sub-channels increase the luminance output to 800-1200 Nits netting an effective 400-600 Nits per sub-channel. If the same video device is then switched to 4 sub-channels, it is preferred to further increase the luminance output, for example to 1600-2000 Nits, thus providing sub-channels with effective Nits of 400 to 500 each.

Figure 1E:
FIG. 1*e* is like FIG. 1*d*, where two additional critical measurements are also considered beyond the content source frame rate (fps) and the video device refresh rate (Hz) including the video device resolution (e.g. HD or 4k) and the video device luminance output (typically expressed as "Nits" for a display or "ANSI lumens" for a projector.) The Figure portrays six arrangements as example cases of temporal and spatial sub-channels provided by the present invention 100 to a viewer 2, where each arrangement includes a minimum preferred specification of frames per second, refresh rate, display resolution and luminance.

Referring next to FIG. 1e, there are show 6 exemplary implementations of temporal, spatial and temporal-spatial sub-channels, where each case 1 through 6 is based upon a different combination of image frame rates, refresh rates, spatial resolution and luminance (Nits). In case 1, 2 temporal sub-channels are formed using a graphics card or computing process that provides 120 fps of images representing 2 different video streams, e.g. a sporting event and a news broadcast, or player 1's point-of-view (POV) in a video game and player 2's POV in the same game. Each 1 image of the 120 fps is output by the video device at least 1 time, where the video device has a 120 Hz or higher refresh rate, thus providing substantially flicker-free, full-motion video for each sub-channel 1 and 2. The resolution is preferably HD quality or higher output at 800 Nits, where the effective Nits of each temporal sub-channel 1 and 2 is 400.

In case 2, 2 spatial sub-channels are formed using a passive polarization 3d display providing substantially 50% of the resolution from each HD or higher image to a first sub-channel A with the remaining resolution provided to sub-channel B. Images are provided at 60 fps and displayed at least once by a video device capable of providing a minimum refresh rate of 60 Hz. As those familiar with passive polarization 3d displays will understand, each single image output by a video device carries both the left-eye and right-eye image data, where for example the left-eye image is represented by all even row pixels while the right-eye image is represented by all odd row pixels. Because todays systems are limited to passive polarization glasses that cannot dynamically change the polarization state transmitted through each lens, it is then necessary that each next single image output provided to and output by the video device continue to provide left-eye images on all even rows and right-eye images on all odd rows. A drawback of this limitation is that each left-eye and right-eye stream of images (and therefore each spatial sub-channel A and B) is therefore limited to 50% spatial resolution. As will be discussed in greater detail with respect to the upcoming Figures, the present invention 100 will work with either passive polarization glasses or active polarization glasses such as 14-5, where each lens of glasses 14-5 comprises a separately controllable spatial channel filter 14-*scf* that can alternate between transmitting a first distinguishable polarization state such as right-circularly polarized light versus a second distinguishable polarization state such as left-circularly polarized light.

As the careful reader will see, using the present invention it is possible that a first image frame 1 comprise even rows of pixels for representing a first spatial sub-channel A and odd rows of pixels for representing a second spatial sub-channel B, where when the first image frame 1 is output on a passive polarization display, the pixels of sub-channel A are for example right-circularly polarized and the pixels of sub-channel B are left-circularly polarized. Content controller 18 then provides control signals to active polarization glasses 14-5 to allow each lens to be set for transmission of either right or left circularly polarized light, thereby causing a viewer to receive an image from either sub-channel A or B. If then the second image frame 2 oppositely comprises odd rows of pixels for representing a first spatial sub-channel A and even rows of pixels for representing a second spatial sub-channel B, then when the second image frame 2 is output on a passive polarization display, the pixels of sub-channel A are for example left-circularly polarized and the pixels of sub-channel B are right-circularly polarized. For this second oppositely polarized image frame 2, content controller 18 then provides control signals to active polarization glasses 14-5 to allow each lens to be oppositely set for transmission of either left or right circularly polarized light, thereby causing a viewer to receive the next image from the same either sub-channel A or B. As those familiar with display systems will understand, this allows sub-channel A to provide a full-resolution HD image using the combination of alternating image frames 1 and 2, where each sub-channel is then also flicker free and full motion. Similar to case 1, each spatial sub-channel A and B will be output at an effective Nits of 400.

Still referring to FIG. 1e, example case 2, especially as taught in reference to upcoming FIGS. 2a through 2e, the present invention 100 also provides for active polarization video devices, where a given first or second spatial sub-channel A or B, based upon a given first or second distinguishable polarization state, can be formed using any combination of individual pixels. Regarding example 2, it is also possible that during the output of the first image frame 1, comprising even rows of pixels for representing a first spatial sub-channel A and odd rows of pixels for representing a second spatial sub-channel B, the active polarization video devices as herein specified outputs sub-channel A pixels using a first distinguishable polarization state such as right circularly polarized light and outputs sub-channel B pixels using a second distinguishable polarization state such as left circularly polarized light. In this case a viewer 2 may be wearing any of system eye glasses providing a passive polarization filter as opposed to the active polarization filter prior discussed, such that the viewer 2 is only able to receive for example light emitted from the video device at the first distinguishable polarization state such as right circularly polarized light. Within this understanding, when then outputting the second image frame 2, comprising odd rows of pixels for representing a first spatial sub-channel A and even rows of pixels for representing a second spatial sub-channel B, the active polarization video devices continue to output sub-channel A pixels using the first distinguishable polarization state of right circularly polarized light while also outputting sub-channel B pixels using the second distinguishable polarization state of left circularly polarized light. As the careful reader will see, accomplishing this requires that any given pixel can be controllably set to either of the two distinguishable polarization states for any given output frame such as image 1 or image 2. Like a passive polarization video device using active polarization eye glasses, this arrangement of an active polarization video device using passive polarization glasses teaches a novel opportunity for providing full-resolution images from a single spatial sub-channel, where the full-resolution comprises two interleaved half-resolution images alternately output, all as will be well understood by those familiar with 3d video devices.

Referring still to FIG. 1e, in exemplary case 3, 2 temporal sub-channels and 2 spatial sub-channels are combined to create 4 viewing sub-channels. In this case 3, a video stream is provided at preferably 120 fps, where each single video image comprises for example 50% pixels dedicated to a first spatial sub-channel A, with the remaining 50% pixels dedicated to a second spatial sub-channels B. Each single video image is displayed at least once using a video device capable of a 120 Hz refresh rate, where alternating images 1 versus 2 are dedicated to two different temporal sub-channels 1 and 2. As the careful reader will see, using this arrangement the input video stream of images can be mixed to comprise up to four different and distinct streams of video, such as a sporting event, a news broadcast, a gamer 1's POV and a gamer 2's POV. Each of the four temporal-spatial sub-channels 1A, 1B, 2A and 2B will be provided at 50% resolution, 25% of full luminance and flicker-free 60 refreshes per second. For this arrangement, it is preferred that the display is 4k resolution or higher such that each 50% spatial sub-channel is effectively HD quality resolution. It is also preferred that the output Nits of the video device are increased to for example 1600 or the ANSI lumens equivalent, such that each temporal-spatial sub-channel is output at a net of at least 400 Nits. As those familiar with video processing will also understand, every two successive images within the preferred stream of 120 fps will comprise 150% resolution image representative of one of the four viewing sub-channels 1A, 1B, 2A and 2B. As will also be understood, at 120 fps, this means that each of the four viewing sub-channels could potentially receive new video information every $60^{th}$ of a second, which is more than full-motion video at 30 fps, where some video streams do not comprise more than 30 fps. Given a single video steam of only 30 fps to be mixed into a four sub-channel combination of four video streams such as shown in exemplary case 3, it is possible to simply repeat each of the given 30 fps video stream images twice, where for example on a first display image comprising temporal-spatial sub-channel 1A there is displayed a first image from a source 30 fps video stream, where then also on a second subsequent display image comprising temporal-spatial sub-channel 1A there is displayed the same first image from a source 30 fps video stream. In such an arrangement, the net frame rate of sub-channel A is then the full-motion 30 fps, again provided at the flicker-free rate of 60 Hz.

Still referring to FIG. 1e, case 4 is like case 1 where the provided fps, refresh rate and Nits are all doubled in order to form four temporal sub-channels rather than two. The higher 240 Hz displays are currently becoming available in the marketplace from companies such as ASUS, where graphics cards also capable of providing 240 fps at high resolutions are not yet available. For the purposes of the present invention, it is important to note that generating 240 fps in relation to a single coherent scene is generally only desired by video gamers where near continuous, very fast object motion is typical. With respect to a cinematic movie captured at 24 fps, generating 240 fps is neither relevant nor supported by the cameras and image workflows currently used in the movie, and show production studios, even including the faster moving sporting events, still mostly captured at 30 fps or at most 60 fps. The other important understanding is that especially at higher resolution such as 4k, the cost/benefit tradeoffs of capturing and streaming 240 fps let alone 120 fps of a single movie, show, sporting event, news broadcast, etc. is problematic. However, as depicted in case 4, multiple content sources each provided at a lower 60 fps are either mixed into or otherwise made available for a combined output rate of 240 fps, where it is even possible to repeat frames provided from a content source at 30 fps in order to generate 60 fps content for a single temporal sub-channel 1, 2, 3 or 4.

As will be clear to those familiar with image processing, what it is important is that an image is prepared in computer memory for transferring to the video output device at the frame rate set for the device, e.g. 120 Hz or 240 Hz. The particular visual content of the individual images in computer memory are irrelevant, including whether they are updated images or repeated images. As will be discussed in relation to upcoming FIGS. 4*b* through 4*h*, the content controller 18 is capable of concurrently receiving input from multiple content sources, where one graphic image is formed in computer memory for each temporal sub-channel, and where the coherent images per each of the multiple input sources provide an incoherent combined output stream to the video display device that is then controllably filtered (i.e. sorted) by the system eye glasses such as 14-5 back into individual coherent image streams. There is no limitation requiring that each temporal sub-channel provides the same fps or refresh rate, where for example in case 4, what is shown as sub-channel 1 (SC1) and sub-channel 3 (SC3) could be fed from a single 120 fps content source such as a video game (thus becoming single temporal sub-channel such as SC1,) where on the remaining sub-channel SC2 there might be provided a sporting event and on sub-channel SC4 there might be provided a news broadcast. A large multiplicity of combinations is possible.

Furthermore, there is no limitation requiring that any given content source providing a stream of images at a given fps be correspondingly represented by the images output by a temporal sub-channel. For example, the input content source may be at 30 fps while the sub-channel may display 60 images per second, where each of the 30 fps is displayed twice (i.e. refreshed) or equivalent (e.g. by using the well-known "display and hold" method.) It is also possible that the input content source provides images at 120 fps, where the system drops every other image to provide only 60 fps to the output temporal sub-channel. There is also no limitation that the frames per second provided from a single content source to a temporal (or spatial) sub-channel be consistent throughout the duration of the providing of the single content source, where for example a sporting contest captured at 60 fps is output at 60 fps during start and stop times indicative of individual plays, and otherwise output at 30 fps for example including commercials. The content controller 18 is able to dynamically reset the provided fps to any given temporal sub-channel based upon any given input fps from a content source.

Still referring to FIG. 1*e* and case 4, by doubling the Nits from 800 (case 1) to 1600, each of the four images represented as SC1, SC2, SC3 and SC4 are output at 400 Nits, similar to the luminance of the two images SC1 and SC2 of case 1. It is also preferred that the video output device such as a display or projector receives indications from the content controller 18 specifying the desired current luminance per temporal sub-channel, where for example controller 18 provides datum indicating that sub-channel SC1 is to be provided at 300 Nits whereas sub-channel SC4 is to be provided at 500 Nits. The minimum preferred resolution in case 4 is HD, where also each represented sub-channel is then flicker free at 60 Hz, full-motion at 30 to 60 fps, while a sufficient luminance of 400 Nits to achieve high-dynamic range (HDR) quality. As shown in case 5, each of the 4 temporal sub-channels discussed in relation to case 4 are divided into two spatial sub-channels A and B, forming the eight viewing sub-channels of: 1A, 1B, 2A, 2B, 3A, 3B, 4A and 4B, where it is understood that the video output device is providing each of two distinguishable polarization states for each of the sub-channels A and B, such as accomplished using a passive 3D polarization layer included with a 3D tv as is well-known in the art. It is then further preferred to use a 4k video device, such that each of the two spatial sub-channels A and B are provided at HD quality. It is also preferred that the luminance is increased to 3200 Nits, where it is understood that each temporal sub-channel (comprising the two spatial sub-channels of A and B) has twice the luminance as for example in case 4, and that this luminance is then halved for the viewers 2 receiving a single spatial sub-channel A or B within the temporal sub-channel.

As prior discussed and as will be well understood by those familiar with the human vision system, there is a critical duration of time during which the eye processes incoming light before signaling a detection pulse to the brain, where the critical duration varies based at least upon the total luminance received. In general, as a light source is decreased in luminance it is necessary to integrate the light source for a proportionally increased duration of time to achieve the same threshold, where there is a limit to the max integration time before providing a signal. As a light source flickers on and off, the difference between the luminance of the on state versus off state is generally referred to as the temporal contrast, where increased contrast also shortens the critical duration. For example, as the duration of time that a given temporal sub-channel is displayed decreases, such as from 16 ms (60 Hz) down to 4 ms (240 Hz,) if the corresponding output Nits per image is not changed (as depicted in cases 1 through 6,) than the contrast will be decreasing per sub-channel along with the increasing of the critical duration of the human eye, thus also reducing the ability of the human eye to detect flicker. However, while the present exemplary cases 1 through 6 prefer that the output Nits per image remain at least equal as the refresh rates increase, this is not a limitation as increasing the output per image as the duration per image decreases will improve the perceived image brightness, all as will be well understood by those familiar with display systems and human vision. For example, as the maximum Nits increases for a video output device, it is possible to provide each temporal-spatial sub-channel of case 5 at 800 Nits rather than 400 Nits by doubling the maximum from 3200 to 6400 Nits. As those familiar with the human vision system will understand, according to the Talbot-Plateau Law, the perceived brightness of an intermittent light source (such as a temporal sub-channel) emitting at a frequency that is above the critical flicker fusion (CFF) rate will be the same sensation as if the emitted light had been uniformly distributed over the whole time (and thus any extension of the duration of the black insertion frame that does not then cause the perception of flicker will simply act to dim the corresponding emitted light.)

As discussed, the tradeoff includes the increase in contrast as a given temporal-spatial sub-channel flashes on (at 400 or 800 Nits) for 4 ms and then remains essentially black for 12.5 ms, where the human visual system may begin to detect the flicker as the luminance threshold is reached by the increased flash on. As prior stated, the typical minimal duration of temporal light integration ranges between 10 ms to 15 ms, thus straddling the 12.5 ms black insertion frame. While reducing the output of luminance such as from 800 Nits to 600 Nits or even 400 Nits will have the effect of increasing the integration time of the human eye, e.g. from 10 ms to 15 ms and thus masking the black insertion frame, using the present system it is also possible to use a given temporal or temporal-spatial sub-channel to flash an additional amount of for example white light thus helping to further reduce contrast and trigger the human vision system to continue visual integration thus avoiding the detection of flicker. For example, temporal sub-channel 3 comprising both of temporal-spatial sub-channels 3A and 3B could be reserved as a flashing sub-channel that outputs white light to be received by all viewers of the remaining temporal-spatial sub-channels 1A, 1B, 2A, 2B, 4A and 4B, where the additional light level is set to reduce contrast sufficient to reduce any perception of image flicker. As will also be well understood by those familiar with human vision, the extra inserted white light of any given flashing sub-channel will have the effect of reducing contrast of all sub-channels, where the reduction in contrast does not change the perception of color but does change the perception of color saturation which is often referred to as "washing out" and image. As the careful reader will see, there are many tradeoffs to consider and what is important to also see is that the content controller 18 can provide dynamically adjusted mixes of content from 1 or more content sources to any two or more viewing channels, where signals are also provided to adjust luminance levels for maintaining substantial flicker free, full motion quality.

Still referring to FIG. 1e, example case 6 is like case 5 wherein content is provided at 240 fps to a video output device capable of refreshing images at 240 Hz, were case 6 illustrates the flexibility of the present system 100. Specifically, while temporal sub-channels 1 and 3 are further sub-divided into spatial sub-channels A and B, temporal sub-channels 2 and 4 are not. In this regard, when using a passive polarization layer combined with a video display device, every image emitted by the device necessarily comprises two sets of pixels A and B, each polarized to a different state such as right circular and left circular. If the polarization layer is for a traditional passive 3D display, then there is even a further restriction in that not only does every image comprise two sets A and B of distinctly polarized pixels, each of these sets comprise substantially 50% of the total pixels of the display and the sets are spatially interleaved, for example ever odd row of pixels is in set A and every even row of pixels is in set B. Given this traditional passive polarization layer, if a viewer 2 is wearing traditional passive polarization glasses than the viewer will always receive all of either the A or B pixels for each temporal image frame. However, the present system teaches a new combination of active shutter with passive polarizer glasses (see FIGS. 2b, 2c, 2d and 2g,) wherein the active shutter is operable to either transmit or block any given temporal sub-channel, thereby enabling cases 3, 5 and 6 that each contain spatial sub-channels that do not appear in at least 1 temporal sub-channel. (As discussed in relation to case 3, there are no temporal sub-channels as every image frame comprises both sub-channels A and B, where the unique abilities of the system allow sub-channels A and B to alternate between the sets of display pixels, such as even and odd rows, for every next image frame.)

Still referring to case 6 of FIG. 1e, there is taught the use of an active polarization layer included with a display where the assignment of any given pixel to a spatial sub-channels A or B is dynamic, and therefore can change from output image to output image (see FIGS. 2a-2e.) In this embodiment, for any given temporal sub-channel all the pixels can be set to a single spatial sub-channel A or B and then also all pixels would be transmitted to a viewer wearing passive polarizer glasses matched to receive A or B, respectively. Using this embodiment, as shown in case 6, it is also possible to include a higher total number of pixels in a first sub-channel such as 3A versus a second sub-channel such as 3B.

Also, in case 6, there is shown an entire temporal sub-channel being set aside for outputting what is referred to herein as a complimentary image (see FIG. 4d,) where the pixels of the complimentary image are dynamically determined by the content controller 18 based at least in part upon the temporally surrounding sub-channels such as 1A, 1B, 2, 3A and 3B with respect to case 6. The purpose of the complimentary image is to temporally combine in the visual perception of the naked eye to cause the combination of output sub-channels to appear more coherent, e.g. appearing to be a half-intensity white light. As will be well understood by those familiar with content sources, image displays, as well as passive and active polarization, and as the careful reader will see, the present system 100 is capable of creating multiple combinations of temporal and spatial sub-channels comprising a multiplicity of video data (see FIGS. 4b-4h for more detail) output at a variety of frames per second (fps,) for display at a variety of refresh rates (Hz,) at a variety of luminance (Nits,) with various combinations of pixels included in any given spatial sub-channel A or B, and therefore the preferred and alternate embodiments described herein, including various cases, should be considered as exemplary rather than as limitation to the present invention.

Referring next to FIG. 2a, there is shown video output device 23 comprising traditional apparatus for producing images for output, further adapted to include active circular polarization layer 23-*ply*, where a stream of polarized images emitted by the combination of video device 23 and active polarization layer 23-*ply* form single channel output 23-*out*. As those familiar with 3D monitors and projection systems will understand, there are many existing video devices 23 that are either displays (as depicted) or projection systems. All of these existing video devices 23 produces a temporal sequence of image frames sufficient for output 23-*out* to present eye glasses 14-5 with two or more temporal sub-channels for temporal filtering. Some of these existing video devices 23 are further adapted with a passive polarization layer 23-*ply* at least sufficient for polarizing substantially 50% of the pixels comprising of each output image frame in a first distinguishable polarization state (e.g. 45 degrees linear or right circular) while also polarizing the remaining pixels of each output image frame in a second distinguishable polarization state (e.g. 135 degrees linear or left circular, respectively.) As is also well-known, there currently exit polarization overlays, such as the Z-Screen sold by VRLOGIC of Germany and used in the RealD 3D system for showing 3D movies in theaters that can be placed in front of a projector lens or display 23 screen to alternately polarize the light from each successive and entire video frame, whereas the presently described polarization layer 23-*ply* is capable of setting each individual pixel of the video device 23 to either of the two distinguishable polarization states within any individual video frame. (It is noted here, and as will be well understood by those familiar with optical systems and polarization, the assigning of a particular number, such as 45 degrees or 135 degrees to a particular linear orientation is somewhat subjective, as there are no hard-and-fast rules. What is important is that within a given set of explanations, the assignments remain consistent, which is the case herein.)

Still referring to FIG. 2a, there is depicted a left-to-right flow of light as first emitted by device 23, and then as transformed by active circular polarization layer 23-ply to become multi sub-channel video-audio output 23-out that is spatially polarized. Light input into active polarization layer 23-ply is any of: 1) un-polarized light, for example as is typically output by an OLED display, or 2) linearly polarized light at a known angle such as 45 degrees or 135 degrees, as for example as is typically output by an LCD display. If the light input into active polarization layer 23-ply is un-polarized, then the first preferred optical element is a linear polarizer as is well-known in the art, where for example the linear polarizer is oriented to filter the un-polarized light causing the light to become polarized at an angle of 45 degrees. If the light input into active polarization layer 23-ply is already polarized, e.g. to an angle of 45 degrees or 135 degrees (as is typical with the output of an LCD display,) then the first preferred optical element is omitted as being unnecessary and only serving to further attenuate the input light, all as will be well understood by those familiar with 3D display systems. Again, it should be understood that the given arrangement of optical and electro-optical elements comprising 23-ply are meant to be operable on a per-pixel level, and not at the sub-pixel level similar to a light valve in an LCD display, and not at the entire screen level for example like the ZScreen.

Within layer 23-ply, linearly polarized light is then preferably transmitted through a light valve, where light valves are well-known in the art and for example include twisted nematic, in-plane switching or a push-pull modulator technology, and where what is most important is that the included light valve be electronically controllable for rotating the linear angle of polarization of the light input to the light valve, e.g. incoming at a polarization angle of 45 degrees, to be either un-rotated and therefore output from the light valve at the same 45 degrees, or to be 90 degrees rotated and therefore output from the light valve at the same 135 degrees, all as will be well understood by those familiar with light valve technology. While the examples of 45 degrees and 135 degrees are given without a reference point, as will be will understood by those familiar with 3D systems these angles are typically as shown, which is diagonal to the horizontal plane of the display device 23 (and thus causing minimum attenuation for a viewer that might be wearing polarized sun-glasses, for example comprising a linear polarizer oriented to 0 degrees (vertical) or 90 degrees (horizontal.) However, these example angles should not be construed as limitations to the present invention, as other angle can be chosen while still achieving the goals of dynamically providing on a pixel-by-pixel basis at least two spatial sub-channels A and B of distinguishable polarized light that is then filterable by eye glasses 14-5.

Still referring to FIG. 2a, the light valve within active polarization layer 23-ply is optional and serves to provide additional useful functionality for outputting dynamically re-arrangeable pixel configurations of spatial sub-channels A and B. As prior described in relation to FIG. 1a, a typical 3D display outputs a fixed and unchanging configuration of spatial sub-channels A and B, for example comprising alternating rows of an output image to be either left or right circular polarized. As is well-known, this fixed and unchanging configuration of alternating circular polarizations is preferable for supporting the left-right images to be output for creating the perception of 3D by the viewer. However, the present system anticipates use cases where for example spatial sub-channel A might comprise one or more areas comprising one or more spatially contiguous pixels, where each area may be located anywhere within the total display 23 image area, such that channel A can be made to represent for example only a single object in an image (e.g. a car,) where the remainder of the image is orthogonally polarized as channel B, thus channel B revels an image with a car-shaped hole when being viewed through channel filtering glasses 14-5 set for transmitting channel B and (therefore blocking channel A.) Furthermore, the example single object in an image could be multiple objects, or portions of objects, where the presentation of these objects or portions correspond to a game being played by one or more viewers 2. As the careful reader will see, with the ability to dynamically adjust for each output image frame which one or more pixels within the entire output image frame are polarized for inclusion in spatial sub-channel A versus B, it is both possible to create traditional compositions of channel A and B, for example including alternating rows for representing left and right images for forming a perceived 3D view, or any possible combination of one or more areas comprising one or more pixels for either channel A and B, where one possible composition is that all pixels are of type A and none are of type B, or vice versa, thus providing for full spatial resolution on either of the given spatial sub-channels A or B.

Still referring to FIG. 2a, the per-pixel light waves output by the light valve are then passed through a quarter wave plate, where the function of a quarter wave plate is well-known for converting linearly polarized light into either right or left circularly polarized light, depending upon the input rotation angle of the linearly polarized light as well as the orientation of what is known as the fast and slow axis of the quarter wave plate with respect to the input rotation angle. What is important to understand is that preferably the active circular polarization layer 23-ply further comprises a quarter wave plate such that output channels A and B of images 23-out are circularly (rather than linearly) polarized, although using an active polarization layer 23-ply that omits the quarter wave plate still provides actively linearly polarized pixels A and B, where it is considered sufficient for the present teachings to operate with either circularly polarized spatial channels of pixels A and B, or linearly polarized spatial channels of pixels A and B, and therefore an active polarization layer 23-ply with or without the quarter wave plate are both considered within the scope of the present invention.

Still referring to FIG. 2a, the active polarization layer 23-ply minimally comprises sufficient optical and electro-optical elements for controllably outputting two polarization-state distinct sub-sets of pixels A and B, where each pixel in the sub-set of A is at least linearly polarized at a first rotation angle, such as 45 degrees, and where each pixel in the sub-set B is at least linearly polarized at a second rotation angle that is preferably orthogonal to the first rotation angle, such as 135 degrees, where A and B pixels are preferably then also transformed from linearly polarized to circularly polarized for example by using a quarter wave plate, and where any zero or more pixels of a given display can be of type A or B for any given output video frame.

Referring next to FIG. 2b, as is well-known in the art, it is possible to provide what are known as active shutter glasses for actively filtering what is herein referred to as temporal sub-channels. The well-known LCD active shutter comprises a combination of linear polarizer, liquid crystal solution (a light valve) and second linear polarizer, also referred to as an analyzer. For many of the purposes of the present invention, the well-known active shutter glasses are considered to fall within the scope of the present system, as they are sufficient for working in combination with other novel apparatus and methods described herein to provide at least two viewing sub-channels based upon at least two temporal sub-channels. The present inventor also notes a technology in production referred to as an "active domain LCD shutter." Manufactured and sold by Liquid Crystal Technologies of Cleveland, OH, the novel shutter differs from a traditional active shutter that is a combination of a light valve placed between two linear polarizers. As is well-known, a linear polarizer in theory reduces incident unpolarized light by 50%, whereas the active domain LCD shutter does not include a linear polarizer but instead uses a "novel liquid crystal device that can act as an optical diffraction or phase grating." Liquid Crystal Technologies claims to have achieved roughly 95% transmission of incident unpolarized light, which is roughly double the 45% that is provided by today's actual (and not theoretical) linear polarizer based active shutters. Any implementation of the active shutter lens is sufficient for accomplishing the needs of the temporal channel filter 14-*tcf* of the present teachings. Regardless of the technology used for implementing the active shutter, what is important is that in response to control signals for example as provided by the lens controller 14-*lc*, the temporal channel filter 14-*tcf* of lens 14-*cfl* is capable of either transmitting or blocking any given video frame comprising output 23-*out*.

Still referring to FIG. 2*b*, as is also well-known in the art, it is possible to provide what are known as polarization glasses, herein referred to as passive polarizer glasses, for passively filtering what is herein referred to as a spatial sub-channel. The well-known 3D passive polarizer glasses typically filter a first lens (e.g. left eye) for a first distinguishable polarization state and the second lens (e.g. right eye) for a second distinguishable polarization state, where the distinguishable polarization states are typically either right and left circular polarization or two orthogonal states of linear polarization. For many of the purposes of the present invention, the well-known passive polarizer glasses are considered to fall within the scope of the present system, as they are sufficient for working in combination with other novel apparatus and methods described herein to provide at least 1 viewing sub-channel based upon at least 2 spatial sub-channels (i.e. A for the left eye and B for the right eye.) In the copending application entitled INTERACTIVE OBJECT TRACKING MIRROR-DISPLAY AND ENTERTAINMENT SYSTEM and INTERACTIVE GAME THEATER WITH SECRET MESSAGE IMAGING SYSTEM, the present inventor described eye glasses for receiving secret messages (see for example eye glasses 14 of copending FIG. 5*c*,) where these glasses combined the use of an active shutter and passive polarizers, wherein further for the passive polarizers, both the left and right eye lenses were specified to use the same distinguishable polarizer, e.g. both eyes either received right circular or left circular polarized light.

In the copending application entitled INTERACTIVE GAME THEATER WITH SECRET MESSAGE IMAGING SYSTEM, the present inventor described a magnifying glass lens 15 for filtering images to receive a secret message, where the lens comprised a passive polarizer, active shutter and active light valve, where the light valve was at least used for dynamically adjusting the linear polarization angle of any received light prior to the passing of this adjusted light through the active shutter and passive linear polarizer. The present application builds upon the teachings of the copending applications to provide active shutter, active polarization glasses 14-5 as herein specified, where the glasses 14-5 are controllably operable to dynamically transmit 4 or more temporal-spatial viewing sub-channels (such as 1A, 1B, 2A, 2B and 3A, 3B, of FIG. 1*a*,) independently for either of the left lens or right lens of glasses 14-5, such that a viewer 2 (not depicted) wearing glasses 14-5 may dynamically receive filtered 14-*out* comprising any of spatial channels A or B or No Signal for any video frame of the output 23-*out*. It is further here noted once, that any of the teachings herein applicable to any of the system eye glasses, such as 14-5, are also applicable as further adaptations to any of the copending glasses (copending element 14) or copending magnifying glass (copending element 15,) where it is also noted that the apparatus and methods taught regarding the copending glasses and magnifying glass are likewise applicable as further adaptations to the presently taught eye glasses such as 14-5.

Still referring to FIG. 2*b*, the preferred channel filter lens 14-*cfl* comprises a series of optical (passive) and electro-optical (active) elements depicted in a left-to-right flow along the optical path where output images 23-*out* enters glasses 14-5 to be filtered into output 14-*out* for receiving by a viewer 2. As prior stated, output images 23-*out* comprise a stream of temporally distinct image frames, where each temporal image frame comprises zero to many pixels of a first distinguishable polarization state (e.g. A, right circular,) and possibly also zero to many pixels of a second distinguishable polarization state (e.g. B, left circular.) When inputting circularly polarized light, as will be well understood by those familiar with optical elements and polarization, filter lens 14-*cfl* preferably first includes a quarter wave plate with the well-known function of transforming circularly polarized light (such as A and B) into linearly polarized light (such as A' and B',) where both light A and A' as well as B and B' carry the same information to a viewer 2 as will be well understood by those familiar with human vision that is unable to distinguish between states of polarization such as circularly polarized versus linearly polarized light. If the first and second distinguishable polarization states where linearly polarized A' and B' as opposed to circularly polarized A and B, for example as would be caused by removing the quarter wave plate of polarization layer 23-*ply*, then filter lens 14-*cfl* alternatively omits the first quarter wave plate as necessary, as will be clear to those familiar with polarization optics and from a careful reading of the present invention.

As will also be well understood by those skilled in the art, the rotational alignment between the quarter wave plate included within polarization layer 23-*ply* and the quarter wave plate included within the filter lens 14-*cfl* is important for determining the expected rotational angle of the linearly polarized light output by the filter lens quarter wave plate. As prior stated, quarter wave plates are well-known to include both a fast and slow axis, where incoming light, e.g. linearly polarized at a 45-degree rotation, is converted into right circularly polarized light if the fast axis of the quarter wave plate is aligned along the 90-degree vertical orientation with respect to the incoming light. If the outgoing right circularly polarized light is then passed through a second quarter wave plate (such as that included in filter lens 14-*cfl*,) where the second plate also orients the fast axis along the 90-degree vertical orientation, then the linearly polarized light output from the second wave plate will be 90 degrees rotated to the linearly polarized light input to the first wave plate, all as is well-known in the art. Hence, in the depiction of the present Figure, if light that has been linearly polarized at 45 degrees enters the first wave plate of polarization layer 23-*ply*, this same light will be polarized at 135 degrees as it exits the second wave plate of filter lens 14-*cfl*.

Still referring to FIG. 2*b*, what is most important to understand with respect to the quarter wave plates of both polarization layer 23-*ply* and channel filter 14-*cfl* is that: 1) linearly polarized light entering the first quarter wave plate within polarization layer 23-*ply* will be transformed into circularly polarized light; 2) circularly polarized light exiting the first quarter wave plate and entering the second quarter wave plate within channel filter 14-*cfl* will be transformed back into linearly polarized light; 3) by pre-arranging the orientations of the fast and slow axis of both the first and second quarter wave plates, it is possible to accurately known the substantial angle of linear polarization of the light exiting the second quarter wave plate based upon pre-knowledge of the rotational angle of linear polarization of light entering the first quarter wave plate as well as the rotational angles of the fast and slow axis of each of the first and second quarter wave plates, and 4) many arrangements are possible with respect to any of: a) the rotational angle of the linear polarized light entering the first quarter wave plate, and b) the rotational angles of the fast and slow axis of each of the first and second quarter wave plates with respect to each other and the light input into the first quarter wave plate. Therefore, as will be well understood by those skilled in the art of polarization optics, the preferred embodiments herein disclosed describing the orientation of optical elements such as linear polarizers and quarter wave plates are exemplary as many variations are possible while remaining within the scope of the present invention, and as such the preferred embodiments should not be considered as limitation of the present invention, but rather exemplifications thereof.

Still referring to FIG. 2*b*, linearly polarized light A' and B' exiting the quarter wave plate included within the channel filter 14-*cfl* then preferably passes through a first light valve included within channel filter 14-*cfl*, where the light valve is of any sufficient technology for controllably rotating the linear polarization of the incoming light based upon electrical controls signals provided by a lens controller 14-*lc* (see FIGS. 1*a* and 3.) As prior mentioned, many technologies are well-known and sufficient for the functions of the present invention for providing a light valve at least including twisted nematic, in-plane switching or a push-pull modulator technology. Furthermore, there is no requirement for implementing any of the three light valves depicted in the present Figure using the same technology, as many embodiments are possible and sufficient. Those familiar with the different light valve technologies will understand that each technology offers trade-offs in performance, where these trade-offs are important for determining for example the thickness and weight of the channel filter lens 14-*cfl*, the power consumed by the channel filter lens 14-*cfl*, the switching speed (and therefore synchronization) of the light valve with respect to the output frame rate of the images being emitted by video device 23, the quality of the image frames 14-*out* filtered and output by channel filter lens 14-*cfl*, the cost of the polarization layer 23-*ply*, and many other considerations. For the purposes of the present invention, the novel teachings herein disclosed are independent of the individual optical elements chosen, and even their orientations with respect to each other, what is important is that some technology is chosen and that the final orientations are known, such that light flows and is substantially transformed as herein taught in both the preferred and all alternate embodiments, where some alternate embodiments are disclosed, and many others are anticipated.

Still referring to FIG. 2*b*, as those familiar with light valve technology will understand, the first light valve of channel filter 14-*cfl* serves to controllably rotate the angle of linear polarization of the A' and B' light output by the quarter wave plate included within the channel filter 14-*cfl*, for example rotating A' light output by the quarter wave plate at 135 degrees rotation to 45 degrees rotation A', or rotating B' light output by the quarter wave plate at 45 degrees rotation to 135 degrees rotation B'. Light output from the first light valve included within channel filter 14-*cfl* is then input into a first linear polarizer included within channel filter 14-*cfl*, where the function of the first linear polarizer is to filter the input A' and B' light to either pass the light or block the light, all as will be well understood by those familiar with polarization optics. Therefore, given a careful consideration of the present teachings thus far, a single spatial sub-channel A or B (as shown in FIG. 1*a*) is controllably output by the first linear polarizer included within channel filter 14-*cfl*, where the determination of sub-channel A or B for output is controllable at least in part by electronically switching the first light valve included within channel filter 14-*cfl*, and as such the portion of the channel filter lens 14-*cfl* including the quarter wave plate, first light valve and first linear polarizer is herein referred to as a spatial channel filter 14-*scf*. For example, incoming right circular light A is transformed by the quarter wave plate into 135 degrees linearly polarized A' light, while incoming left circular light B is transformed by the quarter wave plate into 45 degrees linearly polarized B' light. Since the first linear polarizer is chosen to transmit along the 45-degree linear axis, if the first light valve is set to the 0-degree rotation state, then B' light will be transmitted through the first linear polarizer while A' light will be blocked. However, if the first light valve is set is the 90-degree rotation state, then B' light will be substantially rotated to 135 degrees linear and will be blocked by the first linear polarizer while A' light will be substantially rotated to 45 degrees linear and transmitted.

Still referring to FIG. 2*b*, light output by the spatial channel filter 14-*scf* within channel filter lens 14-*cfl* is then preferably input into a temporal channel filter 14-*tcf* comprising a second light valve and second linear polarizer. The second light valve controllably rotates the input light by either 0 or 90 degrees as well-known in the art. The controllably rotated light output from the second light valve is then input into the second linear polarizer, where the second linear polarizer then either transmits or blocks the input light based upon the combination of the rotational angle of the input light and the transmission axis of second linear polarizer, all as will be well understood by those familiar with polarization optics, and for which many technology and orientation choices are possible. For example, all light exiting the first linear polarizer will be, in the present example, oriented at 45 degrees linear rotation, but may be either one of A' or B' light. To controllably transmit the either A' or B' through the second linear polarizer with a likewise transmission axis of 45 degrees linear rotation, the light valve is set to 0 degrees rotation. In order to controllably block the either A' or B' from passing through the second linear polarizer with a likewise transmission axis of 45 degrees linear rotation, the light valve is set to 90 degrees rotation. What is important to see is that the light input to the second light valve included within channel filter 14-*cfl* is controllably selectable as either spatial sub-channel A or B, and that the light output by the second linear polarizer included within channel filter 14-*cfl* is controllably selectable as either spatial sub-channel A or B, or No Signal, where No Signal means that all light is substantially blocked and therefore any light information passing through channel filter lens 14-*cfl* to be received by a viewer 2 wearing eye glasses 14-5 is substantially not perceivable by a viewer 2.

As the careful reader will understand, the combination of the second light valve and the second linear polarizer included within channel filter 14-*cfl* are therefore acting as what is herein referred to as a temporal channel filter 14-*tcf*, either passing some information (i.e. such as spatial sub-channel A or B) corresponding to a given temporal image frame as included within the stream of images comprising video output 23-*out*, or passing no light information, and therefore effectively blocking a given image frame. As those familiar with polarization optics and especially 3D video systems will understand, the combination of the first linear polarizer, the second light valve and the second linear polarizer all included within the channel filter 14-*cfl* are commonly referred to as an active shutter. As will be clear to those familiar with polarization systems, it is possible to for example select other orientations (such as 135 degrees transmissive rather than the portrayed 45 degrees transmissive) for the first and second linear polarizers, or even to select different orientations (for example where the first linear polarizer is at one orientation such as 45 degrees linear while the second linear polarizer is at a second, and preferably orthogonal orientation such as 135 degrees linear.) Based upon the selection of the orientations of the transmission axis of the first and second polarizers, the settings of for example 0 rotation or 90-degree rotation of the first and second light valves are then altered accordingly to accomplish the transmission of either A' or B' or No Signal as herein taught. Therefore, the present depiction of the optical and electro-optical elements comprising glasses 14-5 should be considered as exemplary rather than as a limitation of the present invention, what is important is that some optical and electro-optical elements are provided for accomplishing the selective transmission, per individual eye glass 14-5 left and right lens, of either A', B' or No Signal.

And finally, with respect to both FIGS. 2*a* and 2*b*, the present invention anticipates many alternative embodiments at least including:

1) the active circular polarization layer 23-*ply* that is further adapted to omit the light valve thus becoming a passive circular polarization layer 23-*ply*, comprising any of well-known combinations of passive linear polarizers and quarter wave plates for causing preferably and substantially 50% of the pixels to be right circularly polarized and the remaining pixels to be left circularly polarized, for example following the well-known arrangements of a 3D display that includes what is known as a film pattern retarder, for example causing every other row to be alternatively polarized right or left circular;

2) the active circular polarization layer 23-*ply* that is further adapted to omit the quarter wave plate thus becoming an active linear polarization layer 23-*ply*, where pixels A or B are linearly polarized, preferably at orthogonal rotational angles for example of 45 degrees linearly polarized A' and 135 degrees linearly polarized B', and where channel filter lens 14-*cfl* is also further adapted to omit the quarter wave plate;

3) the active linear polarization layer 23-*ply* of (2) above that is further adapted to omit the light valve thus becoming a passive linear polarization layer 23-*ply*, comprising any of well-known combinations of passive linear polarizers for causing preferably and substantially 50% of the pixels to be linearly polarized at a first linear rotation (such as 45 degrees) and the remaining pixels to be linearly polarized at a second, and preferably orthogonal rotation with respect to the first linear rotation (such as 135 degrees,) for example causing every other row to be alternatively polarized right or left circular;

4) any of the preferred or alternate embodiments (1), (2) or (3) above where eye glasses 14-5 are further adapted to omit the temporal channel filter 14-*tcf* included within channel filter lens 14-*cfl* by omitting the second light valve and second linear polarizer, where the alternate embodiment of eye glasses 14-5 omitting the temporal channel filter 14-*tcf* receives and selectively transmits any of spatial sub-channels at least including A and B;

5) any of the preferred or alternate embodiments (1), (2) or (3) above where eye glasses 14-5 are further adapted to implement the temporal channel filter 14-*tcf* included within channel filter lens 14-*cfl* using an active domain LCD shutter rather than the depicted second light valve and second linear polarizer;

6) the embodiment (5) above where the optical path location of the active domain LCD shutter providing temporal channel filter 14-*cfl* is changed, for example the active domain LCD shutter is included within channel filter lens 14-*cfl* as the first element (and therefore left-most in the present drawing,) prior to the quarter wave plate, and 7) an imaging device 23 that is not further adapted to include a polarization layer 23-*ply*, where output 23-*out* comprises a multiplicity of ongoing image frames that are selectable into temporal sub-channels but are not selectable into spatial sub-channels, and where channel filter lens 14-*cfl* is further adapted to omit the functions of a spatial channel filter 14-*scf* by omitting the quarter wave plate and first light valve, where the remaining first linear polarizer, second light valve and second linear polarizer included within channel filter 14-*cfl* form a controllable active shutter for selectively transmitting or blocking ongoing image frames.

Still referring to FIGS. 2*a* and 2*b*, regarding the preferred and alternate embodiments, what is important to understand is: 1) multiple sufficient technologies exist for all optical and electro-optical elements of both the polarizing layer 23-*ply* and the channel filter 14-*cfl*, where optical elements include at least linear polarizers and quarter wave plates and electro-optical elements include at least light valves and active domain LCD shutters, where sufficient technologies have trade-offs well-known in the art such that some combinations are more desirable than others, where regardless of the desirable and sufficient technologies selected for implementing any particular embodiment, what is implemented is any of: a) a temporal channel filter for selecting between two or more temporal sub-channels; b) a spatial channel filter for selecting between two or more spatial sub-channels, and c) a temporal-spatial channel filter for selecting between four or more temporal-spatial sub-channels; 2) a viewer may be provided with a sub-channel selecting apparatus or method, where the selecting apparatus or method enables viewer 2 or the system (such as further comprising an interactive gaming component to be discussed in relation to upcoming Figures) to dynamically select between two or more viewing sub-channels within single channel output 23-*out*, where viewing sub-channels are any of temporal only, spatial only, or temporal-spatial, and 3) where the viewer 2 or system using any implementation of the selecting apparatus or method selects between viewing sub-channels either once (statically) prior to the emission of the stream of images 23-*out*, or one or more times (dynamically) prior to and during the emission of the stream of images 23-*out*.

As the careful reader will see, the present invention broadly provides novel apparatus and methods for subdividing an on-going stream of light including visual information emitted by a display, projection or otherwise light emitting system into one or more temporal or spatial divisions of the on-going light stream, where the divisions are then available to a viewer 2 or the system for selection and therefore present novel opportunities to control the flow of visual information represented in the on-going stream of light thereby creating a customizable stream of visual information, where the present invention further provides for a combination of public and private audible information corresponding to the on-going stream of visual information, and where any of the public and private audible information is adjusted by the apparatus and methods based at least in part on the viewer 2 or system's selection of temporal or spatial divisions of the on-going stream of light including visual information. Many variations of the present teachings are possible and will be evident to those skilled in the necessary arts and from a careful reading of the present invention, therefore the preferred and alternate embodiments described herein should be considered as exemplary rather than as limitations of the present invention.

Referring next to FIG. 2c, there is shown FIG. 4 from the copending application INTERACTIVE GAME THEATER WITH SECRET MESSAGE IMAGING SYSTEM. This copending application built upon other prior teachings regarding the copending application entitled INTERACTIVE OBJECT TRACKING MIRROR-DISPLAY AND ENTERTAINMENT SYSTEM. In the OBJECT TRACKING MIRROR-DISPLAY application, the present inventor taught apparatus and methods for providing secret message images in combination with a mirror for use in a destination-wide gaming system, where for example the display-mirror was a Harry Potter Mirror of Erised and a gamer wore various combinations of passive polarization glasses, active shutter glasses and active shutter/passive polarization glasses. The present application expands upon these copending applications to further teach amongst other things the use of active shutter/active polarization glasses. In the copending application for an INTERACTIVE GAME THEATER WITH SECRET MESSAGE IMAGING SYSTEM, there was shown as can be seen in the copending FIG. 4 and the present FIG. 2c, a magnifying glass 15 with a single lens 15-*lp-as* comprising the combination of a linear polarizer and an active shutter for filtering the output of two distinct polarization states from one or more projectors 21-*p*. The polarization states are depicted as linear (herein referred to as A' and B',) but were also discussed and anticipated as being circularly polarized, such as the presently taught A and B. Each of the two copending applications also addressed the implementation of either display or projection technology for creating the necessary two-state polarization, again, either linear or circular.

The present FIG. 2c is repeated from the copending application for three primary reasons. First, the teachings related to the magnifying glass 15 are applicable to all the present system eye glasses 14-5, 14-7, 14-8, 14-9, 14-10 and 14-11 and are considered as incorporated herein. For example, the channel filtering lenses of the present invention including 14-*cfl*, 14-*cfl*-3, 14-*cfl*-4, 14-*cfl*-5 as well as all discussed, anticipated and obvious variations are implementable as either a single lens magnifying glass 15 or as a dual-lens eye glass such as any 14. Indeed, there is no restriction to the number and size of any lens as herein taught or as taught in the copending applications. For example, the copending application for the MIRROR-DISPLAY described the value of creating a large lens-window that was essentially any of the taught lens combinations, and where for example the window was used as a prop in a ride line at a theme park, such that certain guests standing in one portion of the ride line perceived one image from a system display, while other guests looking through the lens-window at the same system display, perceived the images output by the system display differently.

Second, the copending FIG. 4 and present FIG. 2c describes how a projector based system can output two simultaneous spatial channels, A and B, either using linearly polarized light as shown or using circular polarized light as discussed both in the copending and present application and as will be well understood by those familiar with polarization systems, where A is for example a private image (e.g. a secret message in a gaming system,) and B is a complimentary image. As will be appreciated by those familiar with projector-based systems, one interesting advantage is that it is possible to display two full resolution images simultaneously through a single projector 21-*p* by using a prism to essentially divide the image intensity between A and B. It is furthermore possible to display two full resolution, full intensity images using two projectors 21-*p*, one for displaying A and the other for displaying B. As was discussed and is well-known to those familiar with 3D projection systems, if the reflective surface is based upon metallic paints then the projected images A and B substantially retain their polarization states. The projected light from for example a two projector 21-*p* system is additive, which simply means that the naked eye combines the colors and intensities. As the copending application discussed, using this principle it is possible for the present and copending apparatus and methods to: 1) start with a given private video comprising a sequence of private images A as well as a desired final public image or public video A+B, and 2) then dynamically determine the color and intensity differences between a given private image A and a desired public image A+B in order to craft a best fitting additive complimentary image B. The main restriction with this understanding is that for any given pixel, the luminance of private image A should not be substantially greater than the desired public image A+B, as will be evident from a careful consideration. However, as those familiar with destinations such as theme parks and museums will understand, there are significant fun and exciting public images that can be used to essentially hide fun and exciting private (secret) images, like the opportunities provided by the present teachings especially related to FIG. 2d.

Still referring to FIG. 2c, the third reason the copending FIG. 4 is repeated as present FIG. 2c is to show that the teachings of the present invention are applicable for use in what the copending application referred to as a game access point, where a game access point automatically identified a gamer and any of their gamer equipment and clothing, and where the game access point engaged the gamer in an on-going physical-virtual experience including the provision of secret messages and clues using any of secret message output devices 22. These game access points are preferably spread throughout a destination such as a theme park, resort or museum and work to more deeply engage the guest. A preferred alternate embodiment of a secret message display 22 will be discussed in relation to the upcoming FIGS. 6a, 6b and 7.

Figure 2K:
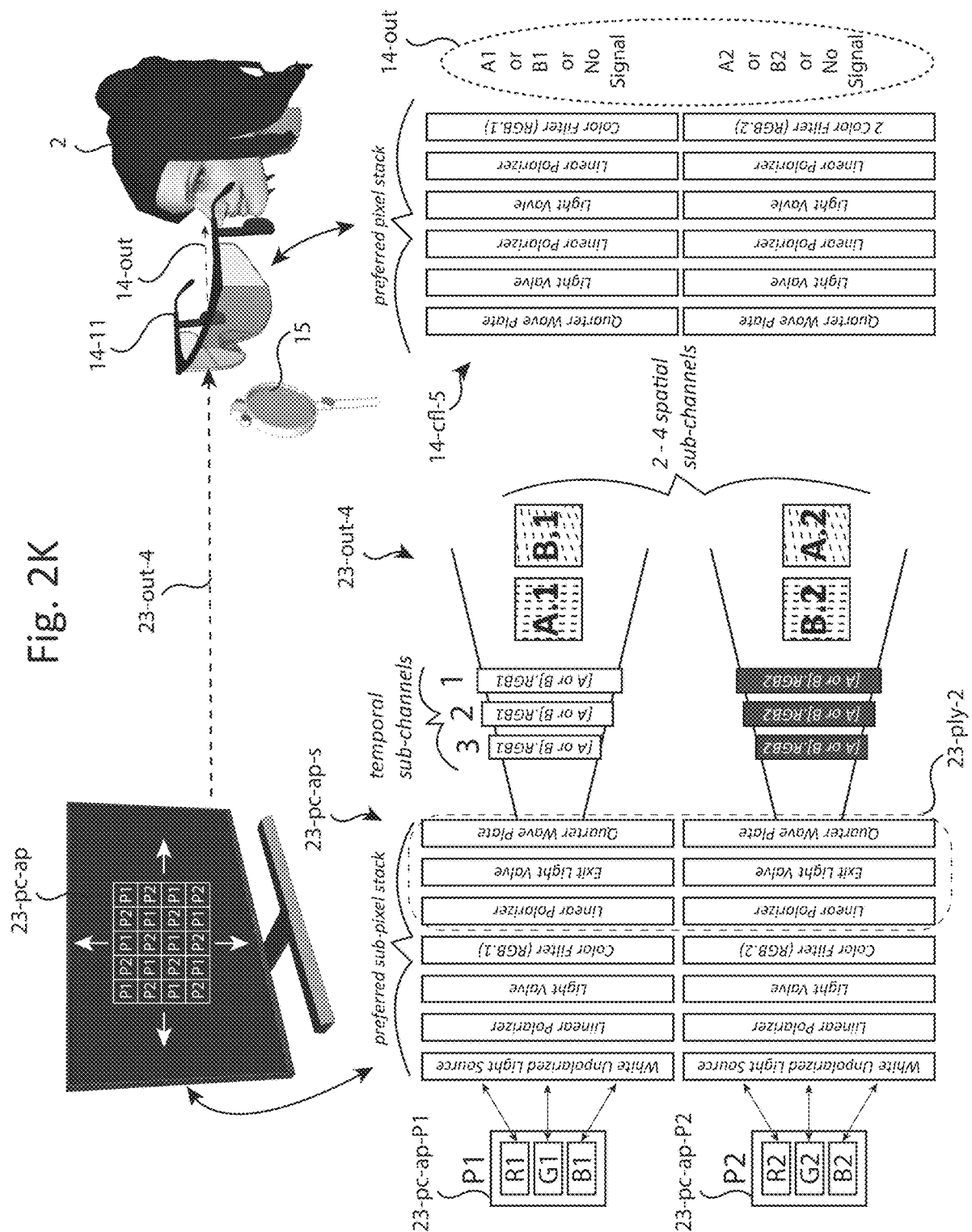
FIG. 2k depicts a preferred passive color/active polarizer display 23-*pc-ap* that comprises a multiplicity of P1 pixels 23-*pc-ap*-P1 and P2 pixels 23-*pc-ap*-P2, where each pixel P1 and P2 comprises three sub-pixels R1,G1,B1 (="0.1") and R2,G2,B2 (="0.2") respectively, and where each sub-pixel comprises a preferred stack of optical and electro-optical elements 23-*pc-ap-s*. Display 23-*pc-ap* controllably emits 23-*out*-4 comprising 1 or more temporal sub-channels each comprising 1 or more spatial sub-channels implemented as combinations of polarization states A or B and color filtered triplets "0.1" or "0.2", where companion active shutter/active polarizer/passive color filter glasses 14-11 comprising channel filter lenses 14-*cfl*-5 are controllably operable to filter 23-*out*-4 into any of the emitted sub-channels. Channel filter lens 14-*cfl*-5 is shown to comprise a preferred stack of optical and electro-optical elements like prior active shutter/active polarization lens 14-*cfl* with the further inclusion of a color filter.

Referring still to FIG. 2c and with respect to game access points, it is ideal that a secret message can be provided to a single targeted viewer 2s, even if other viewers 2s are also looking at the same reflective surface 21-rsf at the same time, with either their own magnifying glass 15 or similar system glasses 14. To provide a secret message, it is important that some component of the glass 15 or 14 have at least one active component that is controllable by the system, and that the system differentiates between each unique magnifying glass 15 or similar system glasses 14 providing at least different control signals to a viewer 2s for whom a secret message is intended. In the present depiction, the active element is the active shutter layer, where it is also possible that the magnifying glass 15 or system glasses 14 can use an active polarizer, or a combination of active shutter and active polarizer, all as will be discussed further throughout the upcoming Figures and summarized with respect to FIG. 2g. It is also possible that the magnifying glass 15 or system glasses 14 combine with the use of a color filter for separating RGB1 versus RGB2 triplets in combination with an active shutter and/or an active polarizer (see upcoming FIGS. 2h, 2i, 2k summarized in FIG. 2m.) Upcoming FIG. 2o discusses the use of at least an active shutter (preferably an Active Domain Shutter as prior described in relation to FIG. 2b,) in combination with a color filter for use with non-metallic surfaces that do not maintain the polarization state, such as artwork in an art museum.

Still referring to FIG. 2c, when providing a secret message to a viewer such as 2s using only one active component that is an active shutter, the present system preferably provides a sequence of secret images that is not periodic such that without receiving the proper sequence of temporal channel filter 14-tcf light valve rotations (i.e. shutter open/close control signals,) a viewer 2s for which a signal is not intended (i.e. encoded,) is substantially unable to activate their glasses 15 or 14 properly to transmit the secret image at the synchronized times. If the one active component is an active polarizer, it is preferred that the projector 21-p has been further adapted with a polarization layer such as 23-ply for controllably emitting at least two different states of polarization A or B (including A' or B') for any or all of the pixels of an image, where a secret message is provided to a single viewer 2o by controllably transmitting a sequence of A/B rotations for controlling the spatial channel filter 14-scf of the glasses 15 or 14 in coordination with the emission of secret message pixels in either of polarization sates A or B. For example, projector 21-p further adapted with polarization layer 23-ply emits a secret image at a first polarization state A or B while concurrently (in the case of spatial sub-channels) or sequentially (in the case of temporal sub-channels) emitting a complimentary image at a second polarization state B or A, where a synchronized control signal is emitted exclusively to the glasses 15 or 14 for which the secret message is intended causing the entrance light valve of the spatial channel filter 14-scf to rotate accordingly for the transmission of the polarization state A or B comprising the secret message. A viewer 2s for which the synchronized signals are not intended (i.e. encoded,) is substantially unable to activate their glasses 15 or 14 properly to transmit the secret image at the synchronized times.

If two active components are used such as the preferred combination of an active polarizer and an active shutter, a number of combinations are possible for controllably emitting a secret message on any of a spatial, temporal, or spatial-temporal sub-channel all as herein described, where other spatial, temporal, or spatial-temporal sub-channels are then reserved for emitting a complimentary image or disguising image (see FIG. 4d for further teachings.) As will become apparent from the teachings of upcoming Figures of the present invention, the use of a privacy mode (primarily FIGS. 2d, 2e, 2f, 4g and 5b-5m) is also possible for providing secret messages. And as prior mentioned, upcoming FIG. 2o discusses an alternative embodiment using a combination of an active shutter and a color filter for providing secret messages that does not require polarization and is still controllably secure/private.

However, as will be appreciated by those familiar with certain fun-oriented destinations such as theme parks or museums, there is essentially little concern or motivation for a given viewer 2s to try and "steal" a secret message. Given this understanding, using an active shutter or any active component such as an active polarizer, what is most important is that the glass 15 o4 14 being worn by the viewer 2s for which the secret message is intended receives control signals causing the secret message to be substantially transmitted, whereas any other glass 15 or 14 being worn by any other viewer 2s for which the secret message is not intended receives control signals causing the secret message to be substantially blocked. As the careful reader of the present invention will see, this understanding removes the system requirement of needing to create a unique, non-periodic sequence of secret image versus complimentary image emissions, since a periodic emission is sufficient.

For example, using a single projector 21-p further adapted with an active polarization layer such as 23-ply that can emit an image of a first detectable polarization state such as A and an image of a second detectable polarization state such as B, where one desirable sequence of emitted A and B images along with concurrent control signals includes:

1) emitting a public image in a first polarization state such as A that is pre-known to align for best transmission with a passive linear polarizer included within a lens such as 15-lp-as, whether configured as a magnifying glass 15 or eye glasses 14, where if the magnifying glass 15 or system eye glasses 14 are further adapted to include an active polarizer rather than a passive polarizer, then a control signal is provided to all glasses 15 and 14 so as to cause the rotation of the active polarizer to substantially transmit the emitted public image, where all of glasses 15 and 14 with either passive or active polarizers also include an active shutter, where a control signal is provided to only the glasses 15 and 14 being worn by a select viewer 2s so as to cause the active shutter to substantially block the emitted public image, where a control signal is provided to only the glasses 15 and 14 being worn by all non-select viewers 2s so as to cause the active shutter to substantially transmit the emitted public image, and where it is further understood that the naked eye 2o will also receive the public image;

2) emitting a secret image in a first polarization state such as A that is pre-known to align for best transmission with a passive linear polarizer included within a lens such as 15-lp-as, whether configured as a magnifying glass 15 or eye glasses 14, where if the magnifying glass 15 or system eye glasses 14 are further adapted to include an active polarizer rather than a passive polarizer, then a control signal is provided to all glasses 15 and 14 so as to cause the rotation of the active polarizer to substantially transmit the emitted secret image, where all of glasses 15 and 14 with either passive or active polarizers also include an active shutter, where a control signal is provided to only the glasses 15 and 14 being worn by a select viewer 2s so as to cause the active shutter to substantially transmit the emitted secret image, where a control signal is provided to only the glasses 15 and 14 being worn by all non-select viewers 2s so as to cause the active shutter to substantially block the emitted secret image, and where it is further understood that the naked eye 2o will also receive the secret image, and 3) emitting a complimentary image in a second polarization state such as B that is pre-known to align for least transmission with a passive linear polarizer included within a lens such as 15-*lp-as*, whether configured as a magnifying glass 15 or eye glasses 14, where if the magnifying glass 15 or system eye glasses 14 are further adapted to include an active polarizer rather than a passive polarizer, then a control signal is provided to all glasses 15 and 14 so as to cause the rotation of the active polarizer to substantially block the emitted complimentary image, where all of glasses 15 and 14 with either passive or active polarizers also include an active shutter, where a control signal is provided to all of glasses 15 and 14 so as to cause the active shutter to substantially block the emitted complimentary image, and where it is further understood that the naked eye 2o will also receive the complimentary image and that the naked eye 2o will substantially perceive the temporal combination of the secret image and the complimentary image as the public image.

Still referring to FIG. 2c, as the careful reader will note from the above preferred operation, the naked eye 2o will perceive a sequence of images including: 1—pubic image, 2—secret image and 3—complimentary image, where the secret image and complimentary image temporally combine to be substantially the same as the public image (1). A select viewer 2s will perceive: 1—no image, 2—secret image and 3—no image, while a non-select viewer 2s will perceive: 1—public image, 2—no image and 3—no image.

Given a single projector 21-*p* further adapted with a polarization layer 23-*ply* capable of selectively causing some pixels in an image to emit at a first detectable polarization state such as A while other pixels in the same image are emitted at a second detectable polarization state such as B, it is possible to support two spatial sub-channels concurrently emitting images A and B. Given a single projector 21-*p* that is further adapted to include a prism for substantially dividing the first projected white light into two separate light-paths, where the first light-path comprising substantially 50% of the white light is modulated into a first image emitted at a first detectable polarization state such as A and on the second light-path comprising substantially 50% of the white light is modulated into a second image emitted at a second detectable polarization state such as B, it is possible to support two spatial sub-channels concurrently emitting images A and B. Given two projectors 21-*p*, it is also possible to support two spatial sub-channels concurrently emitting images A and B. Given a system capable of projecting two spatial sub-channels concurrently emitting images A and B, one desirable sequence of emitted A and B images along with concurrent control signals includes:

1) concurrently emitting a secret image on a first spatial sub-channel with a first polarization state such as A along with a complimentary image on a second spatial sub-channel with a second polarization state such as B, where the first polarization state such as A is pre-known to align for best transmission with a passive linear polarizer included within a lens such as 15-*lp-as*, whether configured as a magnifying glass 15 or eye glasses 14, where if the magnifying glass 15 or system eye glasses 14 are further adapted to include an active polarizer rather than a passive polarizer, then a control signal is provided to all glasses 15 and 14 so as to cause the rotation of the active polarizer to substantially transmit the emitted secret image, where all of glasses 15 and 14 with either passive or active polarizers also include an active shutter, where a control signal is provided to only the glasses 15 and 14 being worn by a select viewer 2s so as to cause the active shutter to substantially transmit the emitted secret image, where a control signal is provided to only the glasses 15 and 14 being worn by all non-select viewers 2s so as to cause the active shutter to substantially block the emitted secret image, and where it is further understood that the naked eye 2o will also receive both the concurrent secret image and complimentary image and that the naked eye 2o will substantially perceive the spatial combination of the secret image and the complimentary image as the public image, and 2) concurrently emitting a public image on a first spatial sub-channel with a first polarization state such as A along with a public image on a second spatial sub-channel with a second polarization state such as B, where the first polarization state such as A is pre-known to align for best transmission with a passive linear polarizer included within a lens such as 15-*lp-as*, whether configured as a magnifying glass 15 or eye glasses 14, where if the magnifying glass 15 or system eye glasses 14 are further adapted to include an active polarizer rather than a passive polarizer, then a control signal is provided to all glasses 15 and 14 so as to cause the rotation of the active polarizer to substantially transmit the emitted public image, where all of glasses 15 and 14 with either passive or active polarizers also include an active shutter, where a control signal is provided to only the glasses 15 and 14 being worn by a select viewer 2s so as to cause the active shutter to substantially block the emitted public image, where a control signal is provided to only the glasses 15 and 14 being worn by all non-select viewers 2s so as to cause the active shutter to substantially transmit the emitted public image, and where it is further understood that the naked eye 2o will also receive the public image as emitted on both the first and second spatial sub-channels and that the naked eye 2o will substantially perceive the spatial combination as the public image.

Still referring to FIG. 2c, as the careful reader will note from the above preferred operation, the naked eye 2o will perceive a sequence of images including: 1—secrete image+complimentary image and 2—public image+public image, where the secret image and complimentary image spatially combine to be substantially the same as the public image (2). A select viewer 2s will perceive: 1—secret image and 2—no image, while a non-select viewer 2s will perceive: 1—no image and 2—public image.

As will be clear to the careful reader, using the various combinations of a passive polarizer or an active polarizer combined with an active shutter comprised within magnifying glass 15 or eye glasses 14, there are multiple possible sequences for emitting secret images, complimentary images and public images to accomplish the desired goal of exclusively transmitting a secret image to only a select viewer 2s. As will also be clear to the careful reader, there are other possible emission sequences comprising any of spatial, temporal or spatial temporal sub-channels for accomplishing the same goal. In yet another example, if the magnifying glass 15 or eye glasses 14 comprises only active polarizer without an active shutter (see glasses 14-*ap* in FIG. 2g,) it is possible to provide 2 spatial sub-channels for accomplishing the desired goal of exclusively transmitting a secret image to only a select viewer 2*s*, where one desirable sequence of emitted A and B images along with concurrent control signals includes:

1) concurrently emitting a secret image on a first spatial sub-channel with a first polarization state such as A along with a complimentary image on a second spatial sub-channel with a second polarization state such as B, where a control signal is provided to all glasses 15 and 14 being worn by any of a select viewer 2*s* or non-select viewer 2*s* so as to cause the rotation of the active polarizer to substantially transmit the emitted secret image (and therefore substantially block the complimentary image,) where it is further understood that the naked eye 2*o* will also receive both the concurrent secret image and complimentary image and that the naked eye 2*o* will substantially perceive the spatial combination of the secret image and the complimentary image as the public image, and 2) concurrently emitting a secret image on a first spatial sub-channel with a first polarization state such as A along with a complimentary image on a second spatial sub-channel with a second polarization state such as B, where a control signal is provided only to the glasses 15 and 14 being worn by a select viewer 2*s* so as to cause the rotation of the active polarizer to substantially transmit the emitted secret image (and therefore substantially block the complimentary image,) where a control signal is provided only to the glasses 15 and 14 being worn by any non-select viewer 2*s* so as to cause the rotation of the active polarizer to substantially transmit the emitted complimentary image (and therefore substantially block the secret image,) where it is further understood that the naked eye 2*o* will also receive both the concurrent secret image and complimentary image and that the naked eye 2*o* will substantially perceive the spatial combination of the secret image and the complimentary image as the public image.

Still referring to FIG. 2c, as the careful reader will note from the above preferred operation, the naked eye 2*o* will perceive a sequence of images including: 1—secret image+complimentary image and 2—secret image+complimentary image, where the secret image and complementary image spatially combine to be a public image. A select viewer 2*s* will perceive: 1—secret image and 2—secret image, while a non-select viewer 2*s* will perceive: 1—secret image and 2—complimentary image, where the secret image and complementary image temporally combine to be a public image. As the careful reader will note, the following sequence of images is also possible for accomplishing the desired goal of exclusively transmitting a secret image to only a select viewer 2*s*, namely: 1—secret image (spatial sub-channel A)+complimentary image (spatial sub-channel B) followed by 2—complimentary image (spatial sub-channel A)+secret image (spatial sub-channel B.) Like the prior example, the naked eye also receives a secret image concurrent with a complimentary image, the spatial combination of which is the public image. By controllably operating the active polarizer comprised within the glass 15 or 14 associated with a select viewer 2*s*, it is possible to always substantially transmit the secret image and always substantially block the complimentary image. Likewise, using inverse control signals, a non-select viewer 2*s* always substantially receives the complimentary image and always substantially is blocked from receiving the secret image. One advantage of this second mode of operation is that the select viewer 2*s* receives the secret image in substantially twice the resolution comprising the combination of the spatial sub-channels A and B as a careful consideration will show. Therefore, with respect to the various configurations of apparatus and methods of operation, the present teachings are to be considered as exemplary, rather than as limitations to the present invention. What is most important is that a public image is perceived by at least the naked eye 2*o* and preferably also a non-select viewer 2*s*, while a viewer 2*s* substantially perceives only a secret message.

Referring next to FIG. 2*d*, unlike polarization layer 23-*ply*-1 where the configuration of optical and electro-optical components works to effect the output polarization state of each pixel and therefore equally effecting all of the pixel's sub-pixels (where each pixel is known to comprise of for example three sub-pixels for separately outputting (R)ed, (G)reen and (B)lue light,) there is shown alternate embodiment polarization layer 23-*ply*-2 where the configuration of optical and electro-optical components works to individually effect the output polarization state of each sub-pixel R, G and B, as will be well understood by those skilled in the art of display technology. As will also be well understood, using certain display technologies such as OLED, AMO-LED, LED, Micro LED, or Quantum Dots that are typically non-polarizing, a non-polarizing display 23-*np* will require linear polarizers 23-*ip* covering each sub-pixel as shown, whereas using certain technologies such as LCD where the emitted sub-pixel light is already linearly polarized, it is possible to take advantage of the existing LCD linear polarizers and thus omit linear polarizers 23-*ip* from polarization layer 23-*ply*-2. For the present Figure, as will be well understood, what is important is that each of the sub-pixels R, G and B in a display 23-*np* or 23-*p* is emitting light that transmits through a linear polarizer, for example setting the angle of linear polarization to 135 degrees, referred to as A' (prime) light.

Still referring to FIG. 2*d*, the significant transformation of each sub-pixel's emitted light, starting with the light's emission from either display 23-*np* or 23-*p*, is portrayed left-to-right in three cases 1, 2 and 3, as it is modulated by light valves 23-*m* and then output as modulated public image 23-*out-m*, where image 23-*out-m* is then received into glasses 14-7 and then filtered and demodulated for output as private image 14-*out-dm* to a viewer 2. Prior to discussing the transformations associated with cases 1, 2 and 3, as the careful reader will see, in case 1 the light valve of layer 23-*m* is set for 90 degrees rotation, while in case 2 the light valve is set for 45 degrees rotation and in case 3 the light valve is set for 0 degrees rotation. As those familiar with human vision will understand, this differing modulation of the emitted light forming public image 23-*out-m* is not perceivable to the naked eye 2*o*. However, as is also well-known, the modulated public image 23-*out-m* can then be analyzed (or demodulated) by the use of a linear polarizer to reveal what is herein referred to as a private image 14-*out-dm*. In case 1, there is no modulation and therefore the emitted light C is received by the viewer 2 at full intensity, whereas in case 2 light C is modulated to half intensity and in case 3 light C is modulated to zero intensity, all as will be explained shortly in more detail and as will be well understood by those skilled in the art of light valves and from a careful consideration of the present Figure. Lastly, by modulating each of the underlying sub-pixels R, G and B, as will also be understood by those familiar with at least LCD displays, it is possible to emit a modulated public image 23-*out-m* that is perceived to the naked eye 2*o* with certain colors and intensities (for example a picture of a bright sky with birds flying) that is then demodulated into a substantially different private image 14-*out-dm* (for example dark skies with dragons flying and breathing fire.)

More specifically, it is well-known that the pixel comprises what are referred to as sub-pixels, for example emitting red (R), green (G) and blue (B) light, where the relative emitted intensities of each R, G and B pixel with respect to each other cause a perception of color as the human eye integrates the emitted light. For example, on the well-known intensity scale of 0 (no emission) to 256 (full emission,) sub-pixels with values of R=256, G=256 and B=256 would be perceived in 23-*out-m* as a white pixel. The present and upcoming FIG. 2*f* will teach that this same perceived white pixel is then further modulated by light valves 23-*ply-m* such that by the time the pixel in image C is filtered and analyzed (demodulated) by lens 14-*cfl*-3, the same example sub-pixels may be seen by a viewer 2 as the color of R=128, G=200 and B=57, where it is well-known that the steps of modulation and demodulation of light can only lower any given intensity (e.g. reducing 256 to any value as low as 0,) but cannot increase the given intensity (e.g. increasing 128 to 129.) Still referring to FIG. 2*d*, with respect to a non-polarizing display 23-*np*, case 1 starts with the transformation of unpolarized light into for example 135 degrees linearly polarized light A' using any of well-known linear polarizers. In case 1, the linearly polarized light A' then passes through a light valve in layer 23-*m*, where the light valve is controlled for 90 degrees rotation such that the light A' exiting the valve is substantially 45 degrees linearly polarized. The 45 degrees linearly polarized light A' of case 1 is then emitted becoming 23-*out-m* that is viewable to the naked eye 2*o*, where the naked eye perceives the frequency (color) and intensity (amplitude,) but not the linear 45-degree angle of polarization. The emitted light A' then enters channel filtering lens 14-*cfl*-3 to be operated upon by a first linear polarizer (the analyzer,) a light valve and then a second linear polarizer (altogether forming an active shutter,) where the careful reader will note that this arrangement of components is similar to the channel filter 14-*cfl* with the quarter wave plate and first light valve omitted (see FIG. 2*b*,) and where the present inventor notes that the operation of the final three optical elements of lens 14-*cfl*-3 (i.e. the first linear polarizer, second light valve and second linear polarizer) is exactly like the operation of the corresponding elements of lens 14-*cfl* and that it is instructive to recognize light A' as the linearly polarized version of circularly polarized light A.

As the 45-degree light A' enters the first linear polarizer of lens 14-*cfl*-3, where the axis of transmission of the first linear polarizer is set to, for example, 45 degrees, light A' than transmits without further substantial attenuation to enter the first light valve of lens 14-*cfl*-3 at a 45 degrees rotation. Like the function of the second light valve of lens 14-*cfl* (primarily FIG. 2*b*,) the first light valve of lens 14-*cfl*-3 is controllably operated to 0 degrees rotation to transmit light A' remaining at substantially at 45 degrees rotation before entering the second linear polarizer of lens 14-*cfl*-3. If the first light valve of 14-*cfl*-3 is alternatively operated to 90 degrees rotation, then light A' will be substantially rotated to a 135 degrees rotation before entering the second linear polarizer, as is well-known in the art. As is also well-known, 45 degrees light A' will substantially transmit through a second linear polarizer with an axis of transmission aligned at 45 degrees, whereas 135 degrees light A' will be substantially blocked. As will also be well understood by the those skilled in the art, if the second linear polarizer of lens 14-*cfl*-3 was alternatively implemented to include a 135 degree axis of transmission, than the operation of the first light valve of lens 14-*cfl*-3 to be 0 degrees rotation would cause light A' to be blocked, while operation of the first light valve to be 90 degrees rotation would cause light A' to transmits and become 14-*out-dm*, and therefore the preferred and alternate embodiments should be considered as exemplary rather than as limitations to the present invention, as what is important is that a function is provided to either substantially transmit or substantially block light A' from being received by a viewer 2 as 14-*out-dm*.

Still referring to FIG. 2*d*, and now referring to case 2, 135 degrees polarized light A' enters the light valve of layer 23-*m* set to rotate this incoming light by 45 degrees rather than the 90 degrees rotation shown in case 1, thus emitting 90 degrees light A', as opposed to the 45 degrees light A' of case 1. The now 90 degrees linearly polarized light A' comprised within 23-*out-m* is still perceived by the naked eye 2*o* as 100% or full intensity because the light has not yet passed through an analyzer, such that the naked eye 2*o* perceives the light emitted in 23-*out-m* of case 1 the same as case 2. As 90 degrees light A' of case 2 enters the first 45-degree axis of transmission linear polarizer of lens 14-*cfl*-3, light A' is then considered to be what is referred to as off-axis with respect to the linear polarizer, and as such will experience some attenuation. As is well-known in the art of polarization optics as the Law of Malus, if light enters a linear polarizer off-axis to the transmission axis of the polarizer, it will be reduced in its intensity according to the following calculation: Output Intensity=Input Intensity*$COS^2$(theta), where theta is the angle of rotation of the input light with respect to the axis of transmission. In the present case 2 example, theta is 45 degrees and therefore the Output Intensity=Input Intensity*0.5, where the $COS^2$(45 degrees) is 0.5. Thus, and for example, if the incoming light was a red sub-pixel of 200 intensity, after passing through the analyzer it would become a red sub-pixel of substantially 100% intensity.

As is also well-known in the art, after passing through the analyzer, any transmitted light will then take on the rotational angle of the analyzer, such that in the present case 2, the transmitted A' light is now 45 degrees linearly polarized like case 1, except at a 50% intensity in comparison to case 1. Now rotated to 45 degrees, the 50% reduced intensity A' light of case 2 passes through the light valve of lens 14-*cfl*-3 without further rotation and then also passes through the second linear polarizer without further substantial attenuation to be received by a viewer 2 as 50% of the intensity as was perceived by the naked eye 2*o* when viewing the same light within 23-*out-m*. As prior mentioned, the 50% reduced intensity light A' could be blocked from transmission to a viewer 2 as 14-*out-dm* by setting the rotation angle of the light valve to 90 degrees thus rotating the incoming 50% intensity 45 degrees rotated light A' to exit at 50% intensity 135 degrees rotated light A' that would be orthogonal to the transmission axis of the second polarizer and therefore substantially blocked.

Referring still to FIG. 2*d* and now to case 3, the same light path is followed with the only difference being that the light valve of layer 23-*m* is set to a 0-degree rotation, such that the incoming light A' is not rotated and remains 135 degrees light A'. The 135-degree A' light will then enter the first linear polarizer of lens 14-*cfl*-3 off-axis by 90 degrees, and therefore as will well-known in the art will be substantially blocked, or from the modulation/demodulation perspective, attenuated to 0% intensity. Similar to case 1 and 2, in case 3 the naked eye 2*o* does not recognize any change in polarization and will perceive the 135 degree rotated A' light of case 3 to be the same as the 45 degree A' light of case 1 and the 90 degree A' light of case 2, and therefore the public image 23-*out-m* is perceived to be the colors (based upon the various intensities of R, G and B sub-pixels) as input to, and output from the modulation layer 23-*ply-m*, where therefore the modulation layer 23-*m* has no effect on the visible perception of image A' 23-*out-m* to the naked eye 2*o*. As the careful reader will see, while the private image encoded within public image 23-*out-m* emitted by the modulation layer 23-*m* will be undetectable by any viewer 2 not wearing system glasses such as 14-7, channel filtering glasses 14-7 not only operate to filter (i.e. transmit or not transmit) the selected image A' to viewer 2, they also perform the function of an analyzer, thus attenuating the emitted light of 23-*out-m* based upon the rotations of modulation layer 23-*ply-m*, where the attenuated 23-*out-m* is demodulated private image 14-*out-dm*, and where private image 14-*out-dm* may then appear substantially different to viewer 2 wearing glasses 14-7 as compared to the naked eye 2*o* seeing public image 23-*out-m*.

Still referring to FIG. 2*d*, as will also be well understood, the arrangement of a first linear polarizer, first light valve and second linear polarizer as described for lens 14-*cfl-3* is well-known in the art as an LCD active shutter. What is different about this traditional LCD active shutter versus the prior mentioned active domain shutter (that does not include a polarizer,) is that in the present usage the first polarizer of lens 14-*cfl-3* is also acting as the second polarizer in combination with the first polarizer of layer 23-*ip* and first light valve of layer 23-*m*, where acting as the second polarizer it also serves the well-known function of an analyzer. Hence, the present teachings are showing the advantage of interleaving two traditional LCDs, where the first LCD is partially implemented as polarization layer 23-*ply-2* covering a non-polarizing display 23-*np* and includes the traditional first linear polarizer and light valve, but where the second linear polarizer (that is also the analyzer) that is traditionally affixed directly to an LCD is alternatively used as the first optical element in a lens such as 14-*cfl-3*. The second of the interleaved LCDs is then contained entirely within channel filter lens 14-*cfl-3*, where it now serves both as an analyzer and as an active shutter. It is further noted that traditionally an active shutter is not used as an analyzer but simply as a "transmit/no-transmit" filter, where light is passed or blocked, but in passing there is not the additional considered combination and planned usage of analyzing the light such as A'. As an example of this traditional thinking, the alternative active domain shutter prior described and sold by Liquid Crystal Technologies, either transmits or blocks light without the use of a linear polarizer, and as such cannot even act as an analyzer because it specifically excludes the use of any linear polarizers. As an alternative embodiment, the present invention anticipates placing a linear polarizer in combination with an active domain shutter to be functionally equivalent to lens 14-*cfl-3*, that is specifically providing both the functions of analyzing the incoming light such as A' and then controllably transmitting or not-transmitting this analyzed light A', all as the careful reader and those familiar with optical polarization elements will understand.

As those familiar with LCDs will also understand, it is well-known to create what is herein referred to as a split-LCD, whereby removing the second linear polarizer of a traditional LCD display, the naked eye then perceives all white light at full intensity (i.e. as the public image 23-*out-m*.) If the viewer then uses a traditional linear polarizer (analyzer) as a revealing lens on an eye glass, they will then see the image fully-formed (analyzed) as intended for output by the operation of the traditional LCD monitor. In this example, the herein specified further combination of an active shutter following the revealing lens is considered to be within the scope of the present invention, providing novel and useful teachings. However, as those familiar with various possible uses will understand, a split-LCD has limited applications since the public image is limited to full-intensity white light, although it would be possible to set or change this intensity of the emitted white light by for example regulating the LCD backlighting, all as will be well understood by those familiar with the operations of an LCD monitor.

Still referring to FIG. 2*d*, what is desirable is to have a display that is both capable of emitting traditional public images (where traditional means substantially like any existing market display using any technology such as LCD or OLED,) and further capable of modulating this emitted traditional public image forming 23-*out-m* to further include a polarization encoded private image 14-*out-m* that is controllably transmitted or not-transmitted to a viewer 2 wearing system glasses such as 14-7. The present Figure teaches this desirable display, for example by: 1) placing layer 23-*ply-2* comprising linear polarizer layer 23-*ip* and light valve layer 23-*m* over a non-polarizing display 23-*np* such as an OLED display, or by 2) placing layer 23-*ply-2* comprising only light valve layer 23-*m* over a sufficiently polarizing display 23-*p* such as an LCD display, where in both cases (1) and (2) the displays 23-*np* and 23-*p*, respectively, serve to emit the traditional fully-formed public image while the included polarization layer 23-*ply-2* provides for modulation of the public image into modulated public image 23-*out-m* and the matched glasses 14-7 serve to both demodulate 23-*out-m* into 14-*out-dm* and to controllably transmits or not-transmit 14-*out-dm* to a viewer 2. As the careful reader will appreciate, providing the additional novel ability to encode a private image 14-*out-dm* within a full-formed public image 12-*out-m* is useful and considered to be herein novel, even if the necessary additional optical elements for controllably transmitting or not-transmitting are omitted from glasses 14-7, specifically the first light valve and second linear polarizer as depicted, in which case any appropriately oriented linear polarizing lens will act to always reveal the private image 14-*out-m*. As will also be well understood, it is possible to further include an emitting quarter wave plate with polarization layer 23-*ply-2* after the light valve layer 23-*m* and then also include a receiving quarter wave plate in front of the first linear polarizer (analyzer) of lens 14-*cfl-3*, like the arrangements of polarization layer 23-*ply* of FIG. 2*a* and lens 14-*cfl* of FIG. 2*b*, where the result is to transmit public image 23-*out-m* to glasses 14-7 as circularly polarized light such as A, rather than linearly polarized light A'.

As will be discussed further within the present application, such a display can at times be operated as a traditional display, with or without further modulation of a private image 14-*out-m* thus satisfying the traditional needs of a display, while also being capable of entering novel operations such as described herein, where for example the display enters a privacy mode (see FIG. 4*g*) that emits non-descript white or colored light, or even still or moving images, that are further modulated such that the viewer is then capable of receiving a traditional single channel as a private image 14-*out-dm*, where in combination with the private speakers 16-1 such as bone speakers attached to glasses 14-7, a viewer 2 can now watch a traditional single channel in complete video and audio privacy. As will be appreciated by those familiar with sun glasses employing polarization, it is typical that the linear angle of polarization of the polarizing layer included on the sun glasses is oriented vertically, thus designed to maximally block any horizontally oriented polarized light as is typically found in road or water surface glare. To maximize the images output by a display such as 23-*p* including some polarization layer such as 23-*ply* or 23-*ply*-2, manufactures often orient the exit linear polarizer (such as 23-*lp*) at 45 degrees or 135 degrees linear polarization so as to not be fully blocked by traditional sunglasses. The present inventor notes that the modulated public image 23-*out-m* will necessarily be comprised of a range of linear rotations that are encoding the private image 14-*out-dm*, and that a person using passive polarizing glasses (such as used in movie theaters or 3D televisions,) or sun glasses, will also be able to perceive the modulated private image 14-*out-dm*. For the goals of privacy, this is not desirable. In up-coming FIG. 2f, by adding an additional entrance light valve to channel filter lens 14-*cfl*-3, thus becoming lens 14-*cfl*-4, it will be shown that alternating temporal frames comprising public image 23-*out-m* may be rotated by 90 degrees (thus forming a type of compliment image,) where the alternating complimentary public images 23-*out-m* combine into neutral gray when perceived by any of passive polarizer glasses such as sun glasses. However, synchronized channel filter lenses 14-*cfl*-4 will act to rotate every other frame of emitted public image out 23-*out-m*, thus doubling the refresh of private image 14-*out-dm* to the viewer 2 while at the same time obscuring the private image to: passive polarized lenses, as well as active polarized lenses that are not synchronized.

Referring next to FIG. 2e, there is depicted further adapted apparatus and methods for providing private image 14-*out-dm* to a viewer 2 as described in relation to FIG. 2d with the additional goal of causing private image 14-*out-dm* to be disguised to any viewer using passive polarizer glasses such as sun glasses, where it is well-known that sun glasses or other passive polarizers will reveal image 4-*out-dm* as public image 23-*out-m* passes through an analyzer layer. Apparatus adaptations comprise further adapting channel filter lens 14-*cfl*-3 to include an entrance light valve, thus becoming channel filter lens 14-*cfl*-4, where lens 14-*cfl*-4 is like lens 14-*cfl* (see FIG. 2b) with the quarter wave plate omitted. As will be appreciated by those skilled in the art, lens 14-*cfl*, although described with a quarter wave plate, is useable for the purposes taught in relation to FIG. 2e with the added condition that polarization layer 23-*ply*-2 is also further adapted to include an exit quarter wave plate following modulator 23-*m*, all as will be well understood by those skilled in the art and from a careful reading of the present invention. Method adaptations include: 1) emitting a first video frame including modulated public image 23-*out-m* such as described in relation to FIG. 2d, see especially cases 1, 2 and 3; 2) emitting a second, preferably alternating video frame where the exit light valve 23-*m* of polarization layer 23-*ply*-2 rotates each sub-pixel of the second video frame to be a complimentary rotation that is a 90 degree rotation with respect to the corresponding sub-pixels of the first image frame, and 3) providing control signals to channel filter lens 14-*cfl*-4 such that for each second 90 degree rotated second image frame, the added entrance light valve further rotates the incoming second image light an additional 90 degrees, where the net result of two 90 degree rotations is to create a 180 degree rotation, turning the second image frame into a modulated replica of the first image frame.

Still referring to FIG. 2e, upcoming FIG. 4d will describe a disguising mode operation of the present invention that uses color complimenting for causing spatially or temporally corresponding pixels to be perceived in combination as neutral gray, a function that is well-known in the art and herein improved upon. Upcoming FIG. 2g will describe the use of modulation and demodulation as taught in relation to FIGS. 2d and 2e for providing an alternative means for causing private images, which is also known in the art and herein further improved upon. In general, the complementation being referred to in the disguising mode of FIG. 4d is based upon image processing, where for any given set of red, green and blue sub-pixel valves, a complimentary pixel is generally described as the inverse valve based upon the intensity scale. For example, and to be explained in more detail in relation to FIG. 4d, if a given pixel has a maximum intensity of 255 with a red intensity of 100, green intensity of 200 and blue intensity of 255, then the complimentary pixel would have a red intensity of 155=255–100, a green intensity of 55=255–200 and a blue intensity of 0=255–255, all as is well-known in the art. With respect to the complimenting referred to in the present Figure, if a given sub-pixel is modulated (rotated) by 0 degrees (case 1 of FIG. 2d,) 45 degrees (case 2) or 90 degrees (case 3,) then the modulation compliments are: 90 degrees for case 1, where 90=90–0, 45 degrees for case 2, where 45=90–45, and 0 degrees for case 3, where 0=90–90. Further examples include a first image sub-pixel rotated to 10 degrees, with a compliment of 80 degrees=90–10, or a first sub-pixel rotated to 70 degrees, with a compliment of 20 degrees=90–70. As will be appreciated by those familiar with the workings of LCD displays and the effect of rotating the angle of linear polarization as a means of regulating the amount of light from for example 0 (=no light) to 255 (=full light) that passes through an exit analyzer, any first sub-pixel and complimentary second sub-pixel will have complimentary intensities, where the perception of complimentary intensities as seen through a passive polarizer will net into the average intensity that is 50%, thus disguising the analyzed first and second images.

Still referring to FIG. 2e, when a complimentary second image is emitted by polarization layer 23-*ply*-2, a synchronized control signal is also emitted (preferably by a controller 18,) to be received by channel filter lens 14-*cfl*-4. In response to the received control signal, lens 14-*cfl*-4 then sets the entrance light valve to rotate all incoming light by 90 degrees (where for the first image the light valve is set for 0 degrees rotation.) As a careful consideration will show, the effect of this second 90-degree rotation is to return all complimentary second sub-pixels back to a rotation matching the corresponding first sub-pixels, thus causing the second image to be further analyzed by channel lens 14-*cfl*-4 identically to the first image, where viewer 2 then perceives back-to-back presentation of the first image causing a doubling of the intensity of the first image. As those familiar with the color-based complimenting will appreciate, color complimenting is useful for images that are perceptible to the naked eye, where the compliments cause the naked eye to perceive neutral gray. As will be taught in more detail going forward especially in relation to upcoming FIGS. 5b through 5m, while the public image of FIGS. 2d and 2e may also be recognizable to the naked eye, the further modulation of the private image 14-*out-dm* is only visible if seen through an analyzer (i.e. linear polarizer.) By using polarization angle complementation as discussed in the present Figure, the naked eye cannot perceive either the first or complimented second private image 14-*out-dm*, while viewers wearing polarized sun glasses will perceive neutral gray as the first and second images are analyzed into complimentary sub-pixel intensities, and the viewer 2 wearing glasses 14-8 comprising channel filter lenses 14-*cfl*-4 will perceive the first image followed by another first image (that is the 90 degrees rotated second image.)

As will also be appreciated by those skilled in the art of color-based image complementation as a means of disguising, it is possible to cause the first image as described in FIG. 2*d* to be output as normal while the second image of the present Figure is a color-based compliment that is then not additionally rotated by 90 degrees, and where channel filter lens 14-*cfl* also does not additionally rotate the incoming second image light by 90 degrees. In this case, while both the first and second images are modulated (and therefore not visible to the naked eye,) when analyzed by normal sun glasses the first and second images will still be perceived as neutral gray, in the same manner that is well-known in the art. However, in this alternate use, while the first and second private images are effectively disguised from a non-authorized viewer, the authorized viewer 2 wearing glasses such as 14-8 will also perceive neutral gray unless the glasses 14-8 are controllably operated to block the viewer 2 from receiving the color-complimented second image.

Referring still to FIG. 2*e*, the present invention teaches several novel combinations of glasses including 14-8 that combine active polarization (known in the art) with active shutter (known in the art) to provide for novel active polarization/active shutter glasses, wherein various combinations of spatial, temporal and spatial-temporal filtering are possible, especially in combination with displays using either pixel level exit polarization such as with layer 23-*ply*, or sub-pixel level exit polarization such as with layer 23-*ply*-2. Using the teachings of the present Figure and generally those provided herein, it is possible to create modulated first and rotationally complimented second images 23-*out-m* that are: 1) disguised from the naked eye; 2) disguised from non-authorized viewers for example wearing polarized sun glasses, and 3) perceived as double intensity first images. This doubling of intensity is favorable with respect to the color-based complimenting of the prior art that effectively loses the additional output light of the complimented pixels, all as will be well understood by those familiar with using color complementation to create disguised images.

Referring next to FIG. 2*f*, there is shown identical configuration of polarization layer 23-*ply*-2 now matched with eye glasses 14-8 comprising channel filtering lens 14-*cfl*-4, where channel filtering lens 14-*cfl*-3 of FIG. 2*d* has been further adapted to include a first light valve proceeding the first linear polarizer thus becoming lens 14-*cfl*-4, and like lens 14-*cfl* of FIG. 2*b* with the quarter wave plate omitted. FIG. 2*f* discusses two cases 1 and 2, wherein case 1 operates the light valve of layer 23-*m* to controllably rotate 0 degrees, wherein case 2 operates the light valve of layer 23-*m* to controllably rotate 90 degrees. In case 1, light A' remains unchanged and is emitted as light A' from the polarization layer 23-*ply*-2. In case 2, light A' is rotated by 90 degrees becoming as prior discussed 45 degrees light A', that can also be seen as light B'. As the careful reader will see, by controllably rotating any of the light valves of layer 23-*ply*-2 to be either and only 0 degrees rotated, or 90 degrees rotated, without for example allowing any rotations in between 0 and 90 such as 30 degrees, 45 degrees or 72 degrees, it is possible to selectively transmit any sub-pixel and therefore also any pixel comprising e.g. three sub-pixels, as either A' light or B' light to be received by system glasses 14-8. Using such an arrangement, unlike a traditional passive 3D screen that uses fixed linear polarizers or fixed retarders for example to always transmit every other row as either a first polarization state or a second polarization state, such as 45 degrees and 135 degrees linear or right and left circular respectively, the described embodiment allows any zero or more pixels to be assigned a first distinguishable polarization state while the remaining zero or more pixels are assigned to a second distinguishable polarization state. (Again, it is noted by that adding an emitting quarter wave plate to polarization layer 23-*ply*-2, thus becoming like polarization layer 23-*ply* of FIG. 2*a*, and by adding a receiving quarter wave plate to lens 14-*cfl*-4 thus becoming like lens 14-*cfl* of FIG. 2*b*, the embodiment of FIG. 2*f* will operate with the two distinguishable polarization states being right and left circular, rather than the depicted 45 degrees and 135 degrees linear.)

Still referring to FIG. 2*f*, it is important to understand that a traditional passive 3D display has a fixed and interleaved arrangement of the 2-state pixels, such that 50% of the pixel as represented by the first polarization state can for example be directed to the left eye while the remaining 50% are directed to the right eye. As prior stated, present teachings anticipate the use of a display to provide for multiple viewing sub-channels within a single traditional channel. As to be further discussed in more detail, as display technologies continue to advance from 4k, to 8k, to 16k and even 32k, it is well-known that the spatial resolution will exceed the limits of human vision to resolve a single pixel when for example viewing at reasonable in-home distances, and even when not exceeding human vision still provide more resolution than is necessary for a pleasing image that is assumed to be what is now referred to as at least HD quality. For example, a 4k display with resolution of 3840×2160, can be divided equally into two spatial sub-channels each providing 1,920×1,080, such that each of the two spatial sub-channels both exceed HD quality by 50%, all as will be understood by those familiar with display resolutions. Using an 8k display with resolution of 7,680×4,320, with an equal distribution of pixels across two spatial sub-channels, each sub-channel will effectively be 4k having the resolution of 3,840×4,320. Using the present invention, it is possible to reassign this total resolution to the two spatial sub-channels in proportions different from the 50%-50% arrangement of a traditional passive 3D tv. For example, in an 8k display 33% of the total resolution could be assigned to a first spatial sub-channel (such as A in FIG. 1*a*,) while the remaining 67% of the total resolution is assigned to the second spatial sub-channel. As will be well understood by those familiar with broadcasting, some shows such as a sporting event benefit more from the additional spatial resolution than other shows such as a game show with limited motion. Hence, the present invention allows for the dynamic allocation of pixels to spatial sub-channels to be based at least in part upon the best needs and requirements of the show to be watched on the display.

As will likewise be understood with respect to temporal sub-channels, a traditional active 3D system automatically splits the temporal resolution of the output (i.e. the frame rate) equally between the left and right eye. Using the present active shutter/active polarization glasses in combination with the at least per-pixel 2-state polarization layers 23-*ply*, 23-*ply*-2 herein described, it is now possible to provide a dynamic allocation of both spatial and temporal resolution to one or more given viewing sub-channels. For example, when considering an 8k display with a 480 Hz frame rate, the presently described system is capable of outputting at least four viewing sub-channels based upon two spatial sub-channels A and B and two temporal sub-channels 1 and 2, where for example viewing sub-channel: 1A has a spatial resolution of 2,557×1439 that is 33.3% of the available total and 50% more pixels than provided by an HD tv, and has a temporal resolution of 160 Hz that exceeds flicker free; 1B has a spatial resolution of 5,123×2,881 that is 66.7% of the available total and 5 times more pixels than provided by an HD tv, and has a temporal resolution of 33.3%, while both 2A and 2B have equal spatial resolution of 3,840×2,160 (4k) and equal temporal resolution of the balance 320 Hz. Furthermore, the present invention has no restriction regarding the allocation of either spatial or temporal resolution to a given sub-channel, such that any allocation can change dynamically during the on-going output of a sub-channel. For example, the resolution of sub-channel 1A could be increased automatically by taking spatial pixels away from sub-channel 1B, or by taking away temporal resolution from sub-channels 2A and/or 2B. As a careful consideration will show, there are virtually limitless possibilities for sub-channel spatial and temporal resolution allocation, where the assignment of this dynamic resolution is an alternate feature of content controller 18.

What is also important to see is that as display technologies continue to advance in their total resolution, e.g. from HD to now 4k and soon 8k and beyond, broadcasters will be challenged to create content at these higher resolutions and furthermore internet providers will be challenged to then also provide sufficient bandwidth. There is also significant content already created and desirable to the marketplace that is only available at lower resolutions. One adaptation for the market place to these forces has been the increasing of what is commonly referred to as "video up-scaling," where for example content created and provided at a lower resolution is transmitted to the final delivery devices, such as a television in a home living room, wherein a local hardware component such as the settop box or a DVD player transforms the lower resolution images into a higher resolution that takes better advantage of the increased resolution of the output display device.

The present system offers many new opportunities to television manufactures that support selling increased resolution displays with useful new and exciting features that are not fully dependent upon the content and internet providers to supply full-resolution (e.g. 4k or 8k) content. Many of these new and exciting uses will be discussed further within the present application. It is important to see that in one respect, displays and projectors based upon the teachings herein will offer a reconfigurable number of sub-channels, where one sub-channel is therefore equivalent to the state-of-the-art as provided through a single tv receiver, and two to eight sub-channels provides new features and content opportunities still provided through a single receiver, and where any of the two or more viewing sub-channels can be dynamically allocated for output as necessary and upscaled across any desired spatial resolution, where for example the preferred pixel resolution of a sub-channel is at least dependent upon any of: 1) specifications included with the content for example in meta-data associated with the video; 2) the total pixels available for allocation based upon the determined capacity of the output display, and 3) the total number of desired sub-channels requested by an end user. It is then also important to understand that what has traditionally been considered a single video-audio experience device that occupies a central location can now be a shared video-audio experience where the video and audio are private to each of the sharing parties, providing significant opportunities for convenience, socialization and new types of gaming.

Referring next to FIG. 2g, there is shown various species of any system glasses 14, where it is also understood that magnifying glasses 15 is like a single lens of any system glasses 14. Any system glasses 14 comprise: 1) any of passive polarizer glasses 14-*pp* for transmitting a single distinguishable polarization state through preferably both left and right lenses, such as either right circular A, left circular B, 135 degree linear A' or 45 degree linear B'; 2) any of active shutter glasses 14-*as* for controllably transmitting through either left or right lens independently, a first video image 1 and blocking a second video image 2, where active shutter glasses 14-*as* include active domain LCD shutter glasses; 3) any of active shutter/passive polarizer glasses 14-*as-pp* for controllably transmitting through either left or right lens independently, a first video image 1 and blocking a second video image 2 wherein for each transmitted image 1 or 2 there is transmitted preferably a single distinguishable polarization state such as A, B, A' or B'; 4) any of active polarizer glasses 14-*ap* for controllably transmitting through either left or right lens independently, either of two distinguishable polarization states such as right or left circular (i.e. A or B) or 135 degree or 45 degree linear (i.e. A' or B'), and 5) any of active shutter/active polarizer glasses 14-*as-ap* for controllably transmitting through either left or right lens independently, a first video image 1 and blocking a second video image 2 wherein for each transmitted image 1 or 2 there is controllably transmitted through either left or right lens independently, either of two distinguishable polarization states such as right or left circular (i.e. A or B) or 135 degree or 45 degree linear (i.e. A' or B'.)

Still referring to FIG. 2g, the careful reader will note that: 1) eye glasses 14-5 of FIG. 2b are an implementation of active shutter/active polarization glasses 14-*as-ap* designed for working with circularly polarized light; 2) eye glasses 14-7 of FIG. 2d are an implementation of active shutter/active polarization glasses 14-*as-ap* designed for working with further modulated linearly polarized light, and 3) eye glasses 14-8 of FIG. 2f are an implementation of active shutter/active polarization glasses 14-*as-ap* designed for working with linearly polarized light. As the careful reader will see, each of the preferred and alternate embodiments of any system glasses 14 such as 14-5, 14-7 and 14-8 as well as magnifying glass 15 are exemplary and used to best illustrate possible variations and as such should be considered as exemplary rather than as limitations of the present invention. Those familiar with active shutter technology as well as passive and active polarization technology we realize that they are many possible variations of any system glasses 14 beyond those specifically described herein, where the many possible variations are not mentioned for both clarity and because the variations will be obvious to those skilled in the necessary arts.

And finally, with respect to FIG. 2g, as well as the copending application entitled INTERACTIVE GAME THEATER WITH SECRET MESSAGE IMAGING SYSTEM, the following additional features of the herein and copending described eye glasses and magnifying lenses are recapped. First, as will be well understood by those familiar with LCD and light valve technology, any of active glasses 14-*as*, 14-*ap* or 14-*as-ap* that include light valves such as used in LCD technology are cable of adjusting the light received at individually small locations across the surface of either left or right lens of the respective any glasses, such that as depicted in copending FIG. 8c it is possible to display any of information such as symbols, text or even images by controllably altering the individual light valves, where the copending application discussed one example of outputting text in relation to a game. Second, as will be well understood by those familiar with various types of augmented reality glasses, any of system glasses 14 can be further modified to include various implementations of AR technology such as depicted in copending FIG. 6 where a lens is further adapted to include an internal projector for projecting an additional image C onto the lens for combination with any of A, B or No Signal, such that the viewer 2 receives additional information beyond that output from the provider of light A or B.

In summary reference to FIGS. 2a, 2b, 2c, 2d, 2e, 2f and 2g, as those familiar with polarization optics will understand, there are many possible selections of linear polarizers, quarter wave plates, and light valves as well as many possible orientation states of the optical elements such that the embodiments and alternate embodiments herein taught should be considered as exemplary rather than as limitations to the present invention. In fact, there are also additional well-known optical and electro optical components such as half wave plates, switchable halfwave plates, switchable quarter wave plates and variable retarders that can be used to implement the novel system herein taught, and therefore are also considered to fall within the scope of the present invention.

Referring next to FIG. 2h, there is depicted a stereoscopic projector system 21-ss comprising two "3P" projectors 21-p-1 and 21-p-2, where each projector 21-p-1 and 21-p-2 emits a unique RGB triplet of colors R1,G1,B1 and R2,G2, B2 respectively that are reflected off a non-metallic screen to be filtered and selectively received by passive color-filter glasses 14-9-1 and 14-9-2 respectively, and where "3P" is an industry term that refers to the "3 Primary" colors of red, green and blue. As is well known, the human vision system is sensitive to the visible frequencies of the electromagnetic spectrum, where these frequencies range from roughly 380 nm to 760 nm. Within this limited visible spectrum, the human vision system is capable of distinctly detecting three overlapping ranges, including 500 nm-760 nm (generally red light,) 430 nm to 670 nm (generally green light,) and 380 nm-550 nm (generally blue light.) Within these ranges, the human vision system has peak receptivity centered at 600 nm (generally red,) 550 nm (generally green,) and 450 nm (generally blue.) As will be discussed in greater detail with respect to upcoming FIGS. 2j and 2k, it is possible for a projector or display to emit two narrow, non-overlapping frequency bands (e.g. "red 1" vs. "red 2") for each of the colors red, green and blue, where these two bands for each of the three primary colors form distinct triplets known as R1,G1,B1 and R2,G2,B2. Based upon the choice of these frequency bands, the human vision system is largely unable to detect any difference between R1 vs. R2, G1 vs. G2 and B1 vs. B2, such that an image formed using triplet R1,G1,B1 is perceived as identical to an image formed using triplet R2,G2,B2. As is also well-known, it is possible to create glasses such as 14-9-1 using color filters such as a multiple layer dielectric to substantially pass the narrow frequency bands of R1,G1,B1 while substantially blocking all other visible light including R2,G2,B2. Likewise, it is possible to create glasses 14-9-2 that substantially transmit R2,G2,B2 and block all other visible light including R1,G1,B1. Thus as a system, color images may be emitted by a R1,G1,B1 projector such as 21-p-1 that are only received by glasses such as 14-9-1 and color images may be emitted by a R2,G2,B2 projector such as 21-p-2 that are only received by glasses such as 14-9-2. Color filter glasses are often referred to in the art as dichroic filter glasses, and the stereoscopic projection system is referred to as wavelength multiplex visualization.

Still referring to FIG. 2h, as those familiar with 3D movie projection systems such as used in IMAX theaters will understand, what is typical is that a viewer 2 wears glasses with a left lens for example filtered to transmit R1,G1,B1 and block R2,G2,B2 and a right lens alternately filtered to transmit R2,G2,B2 and block R1,G1,B1 such that a viewer simultaneously receives a left 2D image and right 2D image to be interpreted as a combined 3D image. This type of system is generally referred to in the art as "color-separation-based 3D." As depicted, for the novel purposes of the present invention, glasses 14-9-1 exclusively transmit R1,G1,B1 through both the left and right lenses and glasses 14-9-2 exclusively transmit R2,G2,B2, thus providing the ability to simultaneously project two concurrent closed scenes (e.g. two distinct entire movies) that are exclusively seen by a viewer 2 depending upon the glasses 14-9-1 or 14-9-2 that the viewer 2 is wearing. In the terminology of the present invention, the combination of projectors 21-p-1 and 21-p-2 simultaneously emit a single traditional channel 23-out-2 that comprises two spatial sub-channels (herein referred to as "0.1"=R1,G1,B1 and "0.2"=R2,G2,B2,) where each spatial sub-channel is filtered into 14-out by passive color-filter glasses such as 14-9-1 and 14-9-2 respectively, where glasses 14-9-1 and 14-9-2 are not then further capable of temporal sub-channel filtering. In one example use of the present configuration, a theater such as IMAX provides traditional 3D glasses that for example filter R1,G1,B1 for the left eye and R2,G2,B2 for the right eye when showing a 3D movie. When showing a single 2D movie, the viewer 2 does not wear glasses. What is new is that a theater such as IMAX using a stereoscopic projector system 21-ss may then also show two 2D movies simultaneously, where a first movie is output throughout its entire duration as R1,G1,B1 colors whereas a second movie is output throughout its entire duration as R2,G2,B2 colors, where it is also assumed that the theater is equipped with private audio 16-pa as herein taught for simultaneously providing on a viewer-by-viewer basis unique audio corresponding to both the first and second movies. One advantage of such as system is that a movie theater may then for instance provide two movie options for a given time slot, for example during normally slower mid-week moving going times to maximize attendance and revenues.

Referring still to FIG. 2h, one well-known advantage of the color-filter systems for separating left-eye/right-eye images for displaying 3D video as opposed to polarization based systems is that at least some color filtering systems are able to preserve a greater percentage of the original luminance as emitted by the light sources, where in general greater luminance produces a higher, more pleasing dynamic range of colors and where it is well known that a polarizer reduces the emitted light by over 50%. A second well-known advantage is that a color-filtering system can use a non-metallic screen 21-rsf-2 that is capable of a more even dispersion of light, also forming a more pleasing image compared to the metallic screens used for polarization-based systems. The present inventor prefers using active shutter/passive color-filter glasses 14-9a comprising both an active domain shutter (i.e. temporal filter) in combination with the color (spatial) filters such as R1,G1,B1 of glasses 14-9-1 or R2,G2,B2 of glasses 14-9-2, where the combination glasses 14-9a provide at least two temporal sub-channels along with the two spatial sub-channels, thus allowing for at least four viewing sub-channels as herein defined. As previously mentioned, the active domain shutter as provided by Liquid Crystal Technologies of Cleveland, OH, does not employ polarization and claims as little as 5% light loss in the transmissive state. To be discussed in more detail with respect to upcoming FIG. 2*j*, color-separation based projection systems such as manufactured by Christie are now emerging that use what are known as RGB lasers, where the RGB lasers are in a scalable configuration and capable of providing at least 2× the luminance of a typical Xenon lamp-based projection system. Using the increased luminance, it is possible to sub-divide the total stream 23-*out*-2 into two to four sub-channels, where each sub-channel forms a pleasing video with a minimum 2k resolution, 24-30 fps of video at an industry standard luminance of 14 fl (foot-Lambert.) Using such as system, a movie theater could then offer 4 simultaneous movies during off-peak days and times, thus increasing potential revenues. Furthermore, using active viewing sub-channels as provided by glasses 14-9*a*, it is possible to provide viewers 2 with adjustable scenes and therefore movies that are adjustable stories, all as will be described in greater detail especially with respect to upcoming FIGS. 9*a*, 9*b*, 9*c*, 10*b* and 10*c*.

Hence, using a stereoscopic projector system 21-*ss* a theater chooses different modes of operation including:
1) exhibiting a single 2D movie during a given time slot using projectors 21-*p*-1 and 21-*p*-2, where viewers 2 do not wear glasses, all as is a normal practice;
2) exhibiting a single 3D movie during a given time slot using projectors 21-*p*-1 and 21-*p*-2, where viewers 2 wear traditional color filter 3D glasses for filtering the left lens to transmit a first color triplet such as R1G1B1 and filtering the right lens to transmit a second color triplet such as R2G2B2, all as is a normal practice;
3) exhibiting two 2D movies during a given time slot using projectors 21-*p*-1 and 21-*p*-2 to output a first 2D movie comprising temporal sub-channel 1 image frames and using projectors 21-*p*-1 and 21-*p*-2 to output a second 2D movie comprising temporal sub-channel 2 image frames that requires at least: a) each viewer 2 to wear traditional color filter 3D glasses that are further adapted to include an active shutter such as an active domain shutter for selectively filtering the first temporal sub-channel comprising the first 2D movie from the second temporal sub-channel comprising the second 2D movie; b) the herein taught private audio 16-*pa* apparatus and methods (see FIGS. 3*a*, 3*b*, 3*c*, 3*d*, 3*e*, and 3*f*) for providing separate audio to each viewer 2 corresponding to each of the two 2D movies; c) the herein taught content controller 18 apparatus and methods (see FIGS. 1, 4*a*, 4*b*, 5 and 10*b*) for temporally mixing each of the image streams comprising each of the 2D movies into a single image stream 23-*out*-2, and d) the herein taught content controller 18 apparatus and methods for emitting control signals to be received by each of the traditional color filter 3D glasses further adapted to include active shutters for synchronizing with the output of temporal sub-channels 1 and 2;
4) exhibiting two 2D movies during a given time slot using projector 21-*p*-1 to output a first 2D movie and projector 21-*p*-2 to output a second 2D movie, where viewers 2 wear passive color-filter glasses 14-9-1 or 14-9-2 for filtering both lenses to receive only the R1G1B1 triplet or only the R2G2B2 triplet respectively, and that requires at least the herein taught private audio 16-*pa*;
5) exhibiting two 3D movies during a given time slot using projectors 21-*p*-1 and 21-*p*-2 to output a first 3D movie comprising temporal sub-channel 1 image frames and using projectors 21-*p*-1 and 21-*p*-2 to output a second 3D movie comprising temporal sub-channel 2 image frames that requires at least: a) each viewer 2 to wear traditional color filter 3D glasses that are further adapted to include an active shutter such as an active domain shutter for selectively filtering the first temporal sub-channel comprising the first 3D movie from the second temporal sub-channel comprising the second 3D movie; b) the herein taught private audio 16-*pa* apparatus and methods for providing separate audio to each viewer 2 corresponding to each of the two 3D movies; c) the herein taught content controller 18 apparatus and methods for temporally mixing each of the image streams comprising each of the 3D movies into a single image stream 23-*out*-2, and d) the herein taught content controller 18 apparatus and methods for emitting control signals to be received by each of the traditional color filter 3D glasses further adapted to include active shutters for synchronizing with the output of temporal sub-channels 1 and 2, and
6) exhibiting four 2D movies during a given time slot using mode (3) further limited wherein projector 21-*p*-1 outputs a first and second movie on a first and second temporal sub-channel and projector 21-*p*-2 outputs a third and fourth movie on a first and second temporal sub-channel, where viewers 2 wear active shutter/passive color-filter glasses 14-9*a* for controllably receiving either of two temporal sub-channels limited to a single color triplet such as R1G1B1 or R2G2B2, where each projector 21-*p*-1 and 21-*p*-2 can be controlled by a single content controller 18 or both projectors 21-*p*-1 and 21-*p*-2 can be controlled by the same content controller 18, and where controlling includes the temporal mixing of two movies into a combined stream 23-*out* for provision to a projector 21-*p*-1 or 21-*p*-2.

Other combinations of modes as will be apparent through a careful consideration of the teachings herein. As will also be apparent from a careful reading of the present invention, two or more "single movies" can be the same movie presented in two or more versions or perspectives, for example an "R" version vs. a "PG-13" version, or a "hero's version" vs. a "villain's version," etc.

Referring next to FIG. 2*i*, the stereoscopic projector system 21-*ss* of FIG. 2*h* is further adapted with a polarization layer 21-*ply* to emit color-separated polarized light 23-*out*-3 providing a combination of four spatially separable images and is herein referred to as a polarizing stereoscopic projector system 21-*pss*. Polarization apparatus are well known in the art and are also herein further taught for causing images to be emitted as any of: 1) single-state-polarized to a first distinguishable polarization state, such that all pixels of an emitted image are polarized to the same first distinguishable polarization state, for example right or left circular, or 2) dual-state-polarized to both a first and second distinguishable polarization state, such that at least a first number of pixels of an emitted image are polarized to the same first distinguishable polarization state, for example right circular, where the remaining pixels of the image are polarized to the second distinguishable polarization state, for example left circular.

For example, it is well-known that the "RealD 3D" system sold by RealD is a single projector that alternately emits right and left circularly polarized images at a rate of 144 images per second, such that 72 of the images are right circularly polarized and the other 72 are left circularly polarized. The 72 images represent 24 unique images, where each unique image is repeated three times. Viewers 2 wearing passive polarization glasses then receive for example the right circularly polarized images into their right eye and the left circularly polarized images into their left eye, all as is well-known in the art. Using the terminology of the present invention, polarization is being used to filter two alternating temporal sub-channels 1 and 2. In one embodiment of the present invention, two RealD 3D projectors (or any marketplace equivalent) are used in an arrangement like that depicted as 21-*p*-1*a* and 21-*p*-2*a*, where the projectors are not yet further adapted to emit different RGB triplets as prior described in relation to FIG. 2*h*. Using the two RealD 3D projector configuration, each of the projectors are synchronized by a content controller 18 to emit alternately polarized images in synchronization. For example, while projector 21-*p*-1*a* emits an image A with for example right circular polarization, projector 21-*p*-2*a* emits an image B with for example left circular polarization. Subsequently, when projector 21-*p*-1*a* next emits an image B with left circular polarization, projector 21-*p*-2*a* next emits an image A with right circular polarization. In a first use of this two RealD 3D projector arrangement, the A and B images represent left and right eye images for creating a 3D effect and as such a viewer 2 receives 3D content at twice the refresh rate and therefore also twice the total luminance, all as will be well-understood by those skilled in the art and from a careful reading of the present teachings. In this first use, viewers 2 wear traditional polarization 3D glasses, where for example the right lens filters for the first distinguishable polarization A such as right circular and the left lens filters for the second distinguishable polarizations B such as left circular.

Still referring to FIG. 2*i*, in another embodiment of the present invention, each of projectors 21-*p*-1*a* and 21-*p*-2*a* are further adapted as depicted to emit unique RGB triplets, namely R1G1B1 and R2G2B2 respectively, where glasses such as 14-10-1 or 14-10-2 include both passive color filters for exclusively receiving R1G1B1 and R2G2B2, respectively, as well as passive polarization filters for exclusively receiving through both the left and right lens a first distinguishable polarization A such as right circular versus a second distinguishably polarization B such as left circular. In this embodiment, each further adapted RealD 3D projector 21-*p*-1*a* and 21-*p*-2*a* can be operated separately to output two 2D movies, thus simultaneously providing four 2D movies for sharing during a single time slot, the benefits of which were prior discussed and help to increase theater revenues. For example, a first and second 2D movie are controllably interleaved and output on projector 21-*p*-1*a* by a content controller 18 (not depicted,) where the first and second 2D movies are limited to the R1G1B1 colors, and where the first 2D movie is limited to a first distinguishable polarization A, such as right circular, and the second 2D movie is limited to a second distinguishable polarization B, such as left circular. Likewise, controller 18 mixes a third and fourth 2D movie for output on projector 21-*p*-2*a*. What is also important to see is that in such a configuration, each of the further adapted RealD 3D (or marketplace equivalent) projectors can still be operated one-at-a-time to provide either 2D or 3D movies using passive polarization glasses all as is currently practiced, and that the inclusion of filtered colored light such as R1G1B1 or R2G2B2, at least using some apparatus and methods such as RGB lasers provided by Christie does not further limit luminance but rather increases luminance over the existing broadband light sources such as a Xenon bulb.

Hence, using a polarizing stereoscopic projector system 21-*pss* a theater chooses different modes of operation including:

1) exhibiting a single 2D movie during a given time slot using a single projector 21-*p*-1*a* or 21-*p*-2*a*, where viewers 2 do not wear glasses, all as is a normal practice;
2) exhibiting a single 3D movie during a given time slot using a single projector 21-*p*-1 or 21-*p*-2, where viewers 2 wear traditional polarization 3D glasses for filtering the right lens to transmit a first distinguishable polarization A such as right circular and filtering the left lens to transmit a second distinguishable polarization B such as left circular, all as is a normal practice;
3) exhibiting two 2D movies during a given time slot using a first projector 21-*p*-1*a* to output a first 2D movie where all image frames are polarized to a first distinguishable polarization A such as right circular and using a second projector 21-*p*-2*a* to output a second 2D movie where all image frames are polarized to a second distinguishable polarization B such as left circular, that requires at least: a) each viewer 2 to wear traditional polarization 3D glasses that are further adapted such that both the left and right lens transmit either the first distinguishable polarization A or the second distinguishable polarization B, and b) the herein taught private audio 16-*pa* apparatus and methods (see FIGS. 3*a*, 3*b*, 3*c*, 3*d*, 3*e*, and 3*f*) for providing separate audio to each viewer 2 corresponding to each of the two 2D movies;
4) exhibiting two 2D movies during a given time slot using a first projector 21-*p*-1*a* to output a first 2D movie where all image frames are output in a first color triplet R1G1B1 and using a second projector 21-*p*-2*a* to output a second 2D movie where all image frames are output in a second color triplet R2G2B2, that requires at least: a) each viewer 2 to wear traditional color filter 3D glasses that are further adapted such that both the left and right lens transmit either the first color triplet R1G1B1 or the second color triplet R2G2B2, and b) the herein taught private audio 16-*pa* apparatus and methods for providing separate audio to each viewer 2 corresponding to each of the two 2D movies;
5) exhibiting two 3D movies during a given time slot using a first projector 21-*p*-1*a* to output a first 3D movie where all image frames are output in a first color triplet R1G1B1 and all right eye image frames are polarized to a first distinguishable polarization A such as right circular and all left eye image frames are polarized to a second distinguishable polarization B such as left circular and using a second projector 21-*p*-2*a* to output a second 3D movie where all image frames are output in a second color triplet R2G2B2 and all right eye image frames are polarized to a first distinguishable polarization A such as right circular and all left eye image frames are polarized to a second distinguishable polarization B such as left circular, that requires at least: a) each viewer 2 to wear traditional polarized 3D glasses that are further adapted such that both the left and right lens transmit either the first color triplet R1G1B1 or the second color triplet R2G2B2, and b) the herein taught private audio 16-*pa* apparatus and methods for providing separate audio to each viewer 2 corresponding to each of the two 3D movies;
6) exhibiting four 2D movies during a given time slot using a first projector 21-*p*-1*a* to output a first and second 2D movie where all image frames are output in a first color triplet R1G1B1 and all first 2D movie image frames are polarized to a first distinguishable polarization A such as right circular and all second 2D movie image frames are polarized to a second distinguishable polarization B such as left circular and using a second projector 21-*p*-2*a* to output a third and fourth 2D movie where all image frames are output in a second color triplet R2G2B2 and all third 2D movie image frames are polarized to a first distinguishable polarization A such as right circular and all fourth 2D movie image frames are polarized to a second distinguishable polarization B such as left circular, that requires at least: a) each viewer 2 to wear passive polarizer/passive color-filtered glasses such as 14-10-1 and 14-10-2 such that a first pair of glasses for watching the first movie filters for colors R1G1B1 polarized to A, a second pair of glasses for watching the second movie filters for colors R1G1B1 polarized to B, a third pair of glasses for watching the third movie filters for colors R2G2B2 polarized to A, and a fourth pair of glasses for watching the fourth movie filters for colors R2G2B2 polarized to B; b) the herein taught private audio 16-*pa* apparatus and methods for providing separate audio to each viewer 2 corresponding to each of the four 2D movies, and c) the herein taught content controller 18 apparatus and methods (see FIGS. 1, 4*a*, 4*b*, 5 and 10*b*) for temporally mixing the image stream for projecting through projector 21-*p*-1*a* comprising each of the first and second 2D movies into a single image stream 23-*out*-2 and for temporally mixing the image stream for projecting through projector 21-*p*-2*a* comprising each of the third and fourth 2D movies into a single image stream 23-*out*-2.

Other combinations of modes as will be apparent through a careful consideration of the teachings herein. As will also be apparent from a careful reading of the present invention, two or more "single movies" can be the same movie presented in two or more versions or perspectives, for example an "R" version vs. a "PG-13" version, or a "hero's version" vs. a "villain's version," etc.

Referring next to FIG. 2*j*, there is shown a preferred multi-mode adaptable stereoscopic projector system 21-*aps* for implementing each of stereoscopic projector system 21-*ss* and polarizing stereoscopic system 21-*pss* as described in FIGS. 2*h* and 2*i* respectively, comprising a content controller 18, a light source 21-*ls*, a light modulator 21-*lm* and a polarization layer 21-*ply*. As will be discussed in more detail with respect to upcoming FIGS. 4, 4*b*, 4*c*, 4*e*, 5 and 10*b*, content controller 18 is capable of receiving a multiplicity of content such as one or more movies as streams of images and mixing the multiplicity of individual content streams into a single stream for output 23-*out*-2 or 23-*out*-3, where 23-*out*-2, 23-*out*-3 comprises a multiplicity of viewing sub-channels including any combination of temporal and spatial sub-channels, where a viewer 2 wearing system glasses 14 (see especially FIGS. 2*g* and 2*m*) is limited to a receiving single viewing sub-channel 14-*out* through each left and right lens at any given time. As will be well understood by those familiar with the state-of-the-art in movie projection systems, light source 21-*ls* preferably comprises either of: 1) a broad-band light source such as a Xenon lamp, where the emitted white light of the Xenon lamp is filtered into either R1G1B1 or R2G2B2 using any of well-known color filters such as substrates coated with multiple layers of dielectric compounds, and where the color filters are preferably attached to apparatus for causing the color filter to be either inserted or removed from the path of the white light through the projector such that the projector operates in either a colored filtered mode or a non-color filtered mode, or 2) RGB lasers as are well-known in the marketplace that are manufactured to emit R1G1B1 or R2G2B2 colored light.

As will also be well understood by those familiar with the state-of-the-art in movie projection systems, light modulator 21-*lm* can be implemented by at least using either a LCD (liquid crystal display) modulator or a DMD (digital micromirror) modulator, where a well-known variation of an LCD is known as a LCOS (liquid crystal on silicon) modulator is often used in projectors as a light modulator. And finally, as is also well-known, there are several manufacturers of polarization layers for at least alternately polarizing a first image with a first distinguishable polarization such as right-circular and polarizing a second image with a second distinguishable polarization such as left-circular, where one such example is the ZScreen sold by RealD that uses what is known as a push-pull electro-optical liquid crystal modulator. As is well known, LCD light modulators include at least one linear polarizer, where the linear polarizer decreases the transmission of light by at least 50%, thus being one of the disadvantages of using a polarization layer such as 21-*ply*. For the purposes of creating a multi-mode projector system 21-*asp* such as depicted in FIG. 2*j* that is capable of outputting polarized light such as in 23-*out*-3 or outputting non-polarized light such as in 23-*out*-2, it is further preferred that polarization layer 21-*ply* is attached to apparatus for causing the polarization layer 21-*ply* to be either inserted or removed from the path of the white or colored light through the projector such that the projector 21-*asp* operates in either a polarizing or a non-polarizing mode. As depicted, at least in one mode of operation adjustable projector system 21-*asp* is capable of emitting two or more temporal sub-channels (such as 1, 2 and 3,) where each temporal sub-channel comprises one to four spatial sub-channels such as: A or B, A and B, "0.1" or "0.2", "0.1"and"0.2", or combinations of A.1, B.1, A.2 or B.2.

Referring next to FIG. 2*k*, there is depicted a preferred passive color/active polarizer display 23-*pc-ap* that comprises a multiplicity of P1 pixels 23-*pc-ap*-P1 and P2 pixels 23-*pc-ap*-P2, where each pixel P1 and P2 comprises three sub-pixels R1,G1,B1 and R2,G2,B2 respectively, and where each sub-pixel comprises a preferred stack of optical and electro-optical elements 23-*pc-ap-s*. Passive color/active polarizer display 23-*pc-ap* emits a stream of images 23-*out*-4 comprising one or more temporal sub-channels such as 1, 2 and 3, where each temporal sub-channel comprises: 1) a multiplicity of pixels P1 emitting a first distinguishable color triplet R1G1B1 referred to as "0.1" and a multiplicity of pixels P2 emitting a second distinguishable color triplet R2G2B2 referred to as "0.2," where the ratio of multiplicities of P1 to P2 pixels is preferred to be substantially 50%-50%, where a distinguishable color triplet is a set of three narrow band frequencies representative of the colors red, green and blue, and where the narrow band frequencies comprising the first distinguishable color triplet R1G1B1 do not substantially overlap any of the narrow band frequencies comprising the second distinguishable color triplet R2G2B2, and 2) zero or more P1 or P2 pixels that have been polarized to a first distinguishable polarization A such as right circular, and zero or more P1 or P2 pixels that have been polarized to a second distinguishable polarization B such as left circular. The combination of emitted temporal and/or spatial sub-channels 23-*out*-4 are received by either of active shutter/active polarizer/passive color filter glasses 14-11 or magnifying glass 15 that comprise channel filter lenses 14-*cfl*-5, where a channel filter lens 14-*cfl*-5 comprises preferred stack of optical and electro-optical elements and is capable of controllably filtering input 23-*out*-4 into output 14-*out* for receiving by a viewer 2, where output 14-*out* is any combination of A, B, "0.1", "0.2" or No Signal.

As those familiar with LCD technology will recognize, the preferred sub-pixel stack 23-*pc-ap-s* is like a traditional LCD stack that has been further adapted to include an exit light value and quarter wave plate as taught in relation to FIGS. 2*d*, 2*e* and 2*f* with respect to polarization layer 23-*ply*-2 for modulating the public image emitted by a display such as 23-*pc-ap* at the sub-pixel level. While it is preferred that the modulation control of the exit light value is applied at the sub-pixel level, as will be understood by those familiar with display technology and from a careful reading of the present invention, in an alternative embodiment the exit light value is applied at the pixel level, rather than the sub-pixel level, as described in FIG. 2*a* in relation to polarization layer 23-*ply*, such that entire pixels P1 or P2 are controllably set to either of two distinguishable polarization states A or B such as right circular or left circular. As will also be as will be understood by those familiar with display technology and from a careful reading of the present invention especially in relation to FIGS. 2*d* and 2*e*, it is possible that either of the polarization layers 23-*ply*-2 or 23-*ply* are combined with non-LCD display/projector technology, for example OLED, AMOLED, LED, Micro LED, or Quantum Dot display technology or DLP. What is important to see regarding the underlying display technology such as LCD or OLED that produces the light energy to be input into the exit light valve is that produced light is filtered to form a distinguishable color triplet such as R1G1B1 or R2G2B2 comprising three distinct narrow bands of red frequencies, green frequencies and blue frequencies, where filtering white light into a narrow band of red, green or blue frequencies is well-known in the art and for which many technical solutions are available such as using a multiple layer dielectric.

Most displays and 2A projectors include some form of a color filtering element covering each sub-pixel for at least limiting the colors emitted by a sub-pixel to a frequency band of red, green or blue, all as is well known. For example, filtering the broad band white light emitted by a Xenon lamp into narrow-band RGB triplets is a well-known practice associated with some types of projectors, where two identical images created from light comprising two different narrow-band RGB triplets such as R1G1B1 and R2G2B2 are: 1) substantially indistinguishable to the human vision system, and 2) substantially distinguishable to color filter glasses including what are generally known as band-pass filters for substantially transmitting only the select narrow bands of one of the RGB triplets such as R1G1B1 or R2G2B2 and substantially non-transmitting all other visible light. In the present Figure, these narrow-band color filters are depicted as "Color Filter(RBG.1)" for pixels P1 and "Color Filter(RBG.2)" for pixels P2. Again, it is important to see that if a non-LCD technology is used, for example an OLED technology, then each OLED pixel must be likewise color filtered to be a distinguishable color triplet such as R1G1B1 or R2G2B2 prior to being input into the polarization layer 23-*ply*-2 or 23-*ply*. As those familiar with projector technology and the human vision system will understand, a display 23-*pc-ap* comprising a mix of P1 to P2 pixels can emit a single image using all of P1 and P2 pixels and therefore the full resolution of the display where a human observer looking with the naked eye will perceive a single image at full resolution without any perception that some of the pixels are of type P1 verses P2. As will also be understood, if for example the mix of P1 to P2 pixels is interspersed evenly such as every other row/col as depicted, and the display emits a first distinct image using all P1 pixels and a second distinct image using all P2 pixels, than: 1) a human observer looking with the naked eye will perceive a spatial mix of the first and second distinct images as an incoherent image; 2) first glasses with a color filter for exclusively transmitting the R1G1B1 narrow frequency bands will only substantially transmit the first distinct image whereas second glasses with a color filter for exclusively transmitting the R2G2B2 narrow frequency bands will only substantially transmit the second distinct image, and 3) an observer wearing first glasses will therefore only substantially perceive the first distinct image while an observer wearing second glasses will therefore only substantially perceive the second distinct image.

Still referring to FIG. 2*k*, and specifically to the preferred pixel stack of channel filter 14-*cfl*-5, filter 14-*cfl*-5 is like channel filter 14-*cfl* that has been further adapted to include either a "Color Filter(RGB.1)" or a "Color Filter(RGB.2)," where the preferred channel filter 14-*cfl*-5 comprises a substantially equal interspersed mix of pixels filtering with "Color Filter(RGB.1)" versus "Color Filter(RGB.2)." As will be clear from a careful consideration of this arrangement, each lens 14-*cfl*-5 comprises a multiplicity of active pixels such as typically found in any active shutter glasses, where each active pixel includes additional elements for actively filtering based upon the polarization states of A and B, such that each pixel can be operated to controllably transmit or not transmit any light polarized as A or B, all as taught in relation to FIG. 2*b* with respect to filter 14-*cfl*, and then where any transmitted A or B light is subject to either of the color filters RGB.1 or RGB.2. Using the combination of a passive color/active polarization output device such as display 23-*pc-ap* along with active shutter/active polarizer/passive color filter glasses 14-11, it is possible for a single image emitted by the display 23-*pc-ap* on a single temporal sub-channel to be further sub-divided into as many as four spatial sub-channels, specifically A.1, B.1, A.2 and B.2.

For example, if the display 23-*pc-ap* is an 8k display with a resolution of 7,680×4,320, where every other row/col pixel is of type P1 verses P2 as depicted, then all of the P1 pixels ("0.1") can be used to emit a first distinct image while all of the P2 pixels ("0.2") can be used to emit a second distinct image. In this case, each of the two distinct images will have a resolution of 3,840×4,320, which is 2.25× greater than 4k resolution.

If then further, substantially half of the P1 pixels are polarized to A (forming "A.1" pixels) and half are polarized to B (forming "B.1" pixels,) and likewise substantially half of the P2 pixels are polarized to A (forming "A.2" pixels) and half are polarized to B (forming "B.2" pixels,) than it is possible to form four distinct images using four distinguishable pixels including: A.1, B.2, A.2 and B.2, where each of the four distinct images will have a resolution of 3,840×2, 160, which is 1.125× greater than 4k resolution. Thus, a single temporal sub-channel can support up to four spatial sub-channels, or four simultaneous images. Using displays with frame rates between 120 to 240 images per second, it is possible to support up to four temporal sub-channels, where each of the four temporal sub-channels supports four spatial sub-channels, all together supporting up to 16 viewing sub-channels, where active shutter/active polarizer/passive color filter glasses 14-11 are useable by the system to dynamically switch a viewer 2 between any of the viewing sub-channels, for example in response to a viewer indication, a game indication or a combination of a viewer and game indication, all as to be discussed in greater detail with respect to upcoming FIGS. 4a, 4b, 4c, 4e, 4f, 4h, 5, 6a, 6b, 7, 8, 9a, 9b, 9c, 10b and 10c.

Still referring to FIG. 2k, there are many alternative embodiments of system glasses 14 as described herein, especially including those described in relation to FIG. 2g that comprise combinations of passive polarizers, active polarizers and active shutters. Each of these combinations of glasses 14 as described in FIG. 2g are combinable with color filters as will be discussed in greater detail in relation to upcoming FIG. 2m. Therefore, each of the system glasses 14 as described herein should be considered as exemplary, where the glasses 14 must be correctly matched to the type of display or projector output such as 23-*out*, 23-*out-m*, 23-*out*-2, 23-*out*-3 and 23-*out*-4, all as will be clear from a careful reading of the present invention. As will also be clear, outputs 23-*out*-2 or 23-*out*-3 as provided by projector system 21-*asp* taught in relation to FIG. 2j is identical to output 23-*out*-4 as provided by display 23-*pc-ap* of the present Figure, and therefore glasses 14-11 are matched to and may be additionally used with at least projector system 21-*asp*.

As will also be clear to those familiar with display technology, passive polarizers, and from a careful understanding of the purposes of the present invention, in an alternate embodiment display 23-*pc-ap* is further adapted to omit the exit polarizing light value and to implement a pattern of quarter wave plates for causing a fixed and preferably interspersed multiplicity of A versus B polarized pixels, where for example all of the light entering the quarter wave plate associated with any given sub-pixel or pixel is of the same linear polarization and the rotation of the individual A versus B quarter wave plates is chosen such that the A light for example becomes right circularly polarized while the B light for example becomes left circularly polarized, where multiple interspersion patterns of A and B type pixels are possible as to be discussed in relation to upcoming FIG. 2l. Furthermore, it is also possible that the orientation of all quarter wave plates is fixed and that the optical elements including linear polarizers preceding the quarter wave plate are chosen such that the A light enters the quarter wave plate at a first linear polarization rotation and the B light enters the quarter wave plate at a second linear polarization rotation that is substantially orthogonal to the first linear rotation, where the arrangement then causes the A light to be for example right circularly polarized and the B light to be left circularly polarized, all as will be understood by those familiar with the polarization of light. As will also be clear, omitting the exit light value reduces the complexity and cost of the display while also limiting the display's features. For example, the exit light valve is necessary for causing alternating full-resolution A polarized images versus B polarized images, where then passive polarization glasses filtering by A or B polarization are effectively filtering for temporal sub-channels 1 and 2.

And finally with respect to color separated displays and projectors such as 23-*pc-ap*, 21-*asp*, 21-*p*-1, 21-*p*-2, 21-*p*-1a and 21-*p*-2a, it is well known that the state-of-the-art of optical color filtering is advancing such that the minimum FWHM (full width half maximum) for a given filtered red, green or blue color of a triplet such as R1G1B1 or R2G2B2 is narrowing, thus providing for the opportunity of at least third triplet R3G3B3 supported by a projector or display and matched glasses, where the third triplet provides the opportunity for adding a third spatial sub-channel based upon color filtering, where then the 3 color-based spatial sub-channels are combinable with the two polarization-based spatial sub-channels to form 6 spatial sub-channels for combining with any one or more temporal sub-channels.

Referring next to FIG. 2l, there is shown a passive color/passive polarization video output device such as display 23-*pc-pp* that is capable of simultaneously emitting four spatial sub-channels. Passive color/passive polarization display 23-*pc-pp* comprises a multiplicity of pixels A.1, A.2, B.1 and B.2 in any of multiple arrangements such as 23-*ply*-3, 23-*ply*-4 or 23-*ply*-5. As taught in the prior FIG. 2k, "A" pixels emit light polarized at a first distinguishable polarization such as right circular while "B" pixels emit light polarized at a second distinguishable polarization such as left circular. As was also taught, "0.1" pixels emit red, green, blue light in a first distinguishable color triplet R1G1B1 while "0.2" pixels emit red, green, blue light in a second distinguishable color triplet R2G2B2. As will be well understood by those familiar with the human vision system, since the naked eye cannot perceive states of polarization such as A and B, and further cannot substantially distinguish between color triplets such as R1G1B1 versus R2G2B2, it is possible to emit images of full resolution using all of pixels A.1, A.2, B.1 and B.2 that will appear to the observer as identical to another display of equivalent specifications that does not include polarization or color filtering to provide pixels A.1, A.2, B.1 and B.2. Hence, display 23-*pc-pp* can be used in any "normal" mode of operation that is typical for a state-of-the-art 2D display. Furthermore, since display 23-*pc-pp* includes substantially 50%-50% arrangements of A and B pixels, it is possible to emit half resolution right-eye images (e.g. using A polarization) and left-eye images (e.g. using B polarization) for providing polarization-based 3D video. It is also possible to provide color separation 3D video alternatively based upon half resolution right-eye images (e.g. using 0.1 colors) and left-eye images (e.g. using 0.2 colors.)

Still referring to FIG. 2l, using the teachings provided herein, it is also possible to controllably emit one to four spatial sub-channels 23-*out*-4 comprising various combinations of A, B, 0.1 and 0.2 for combination with any one or more temporal sub-channels, thus forming the herein taught viewing sub-channels, where the present system using a controller 18 for providing control signals to active shutter/active polarization/passive color glasses 14-11 being worn by a viewer 2 can cause the viewer 2, or allow the viewer 2 to cause the transmitted sub-channel 14-*out* to be any of the viewing sub-channels comprised within 23-*out*-4. As the careful reader will understand, any display 23-*pc-pp* or similarly constructed projector can be used with a number of the herein defined system glasses (see especially FIGS. 2g and 2m,) where it is not mandatory that a viewer 2 wear system glasses 14-11 that are capable of filtering and transmitting every type of viewing sub-channel a display such as 23-*pc-pp* or similarly constructed projector can emit, i.e. based upon any combination of A.1, A.2, B.1 and B.2, but rather it is only necessary for a system based upon the present teachings to cause viewing sub-channels to be emitted that are appropriately matched to the particular species of glasses 14 being worn by a viewer 2, where it is understood that a display such as 23-*pc-pp* or similarly constructed projector has a maximum flexibility to emit every type of viewing sub-channel thus supporting every type of system glasses 14. It should be further understood that it is not mandatory that a viewer 2 wear a form of active glasses 14 to receive benefit from the teachings herein provided, since there are many novel benefits provided herein where viewers 2 are only wearing passive glasses 14. For example, a movie theater or display showing two to four simultaneous movies or shows allows a viewer to select a desired movie or show and to watch the video output using the lesser expensive passive glasses 14. As will also be clear from a careful reading of the present invention, active glasses allow the system to dynamically switch a viewer 2 from seeing a first viewing sub-channel to seeing a second viewing sub-channel, where the dynamic switching provides for new types of adjustable scenes, open-restricted scenes and open-free scenes, as well as branching narratives, all to be discussed in more detail going forward.

Figure 2M:
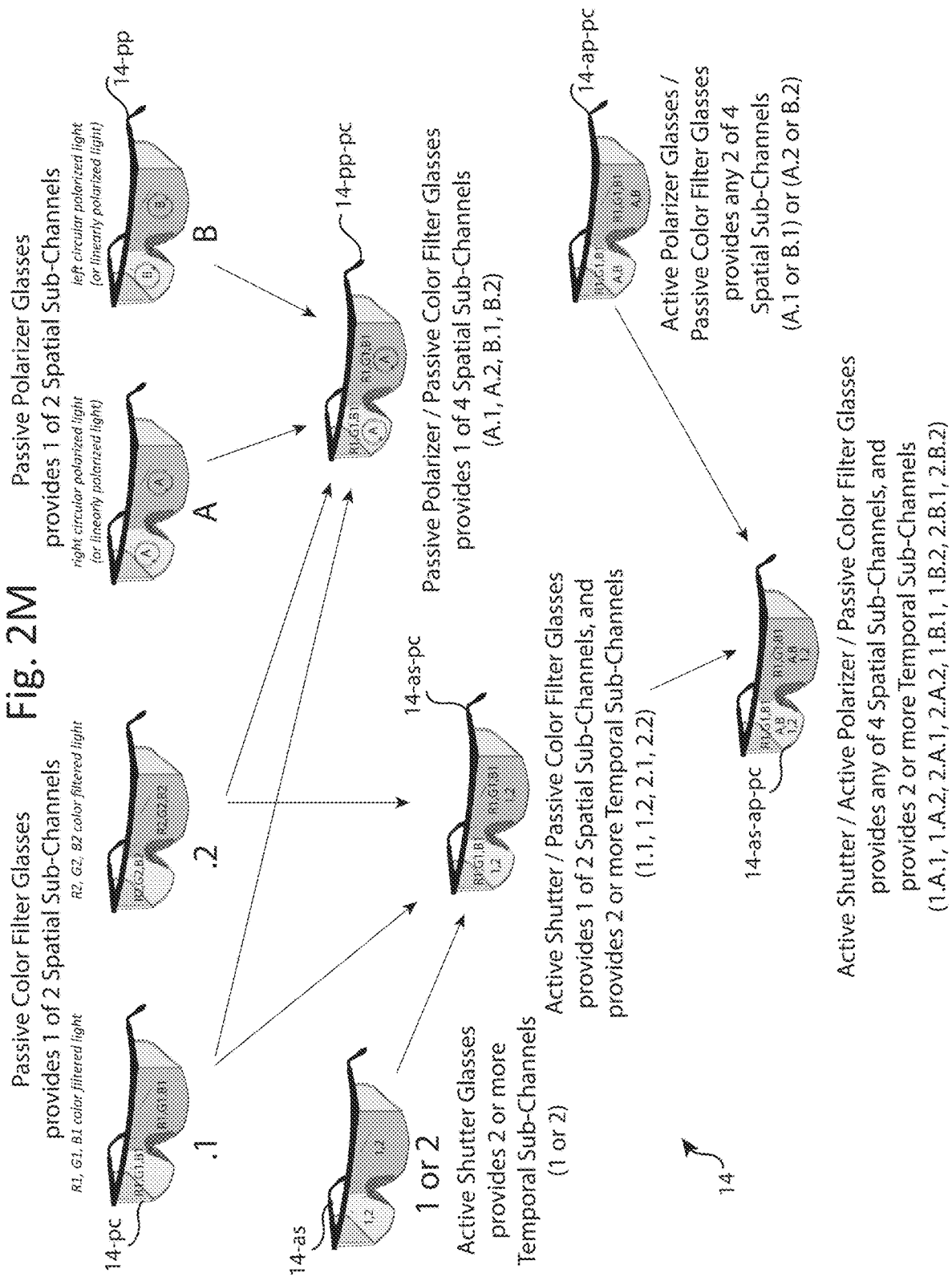
FIG. 2m portrays various species of any system glasses 14 as discussed in relation to FIG. 2g, now further adapted to comprise color filtering, including: passive color filter glasses 14-*pc* for providing 1 of 2 spatial sub-channels, passive polarizer/passive color filter glasses 14-*pp-pc* for providing 1 of 4 spatial sub-channels, active shutter/passive color filter glasses for providing 2 or more temporal sub-channels each with 1 of 2 spatial sub-channels, and active shutter/active polarizer/passive color filter glasses 14-*as-ap-pc* for providing 2 or more temporal sub-channels each with any of 4 spatial sub-channels. Also shown are prior described passive polarizer glasses 14-*pp*, active polarizer glasses 14-*ap* and active shutter glasses 14-*as*.
Figure 20:
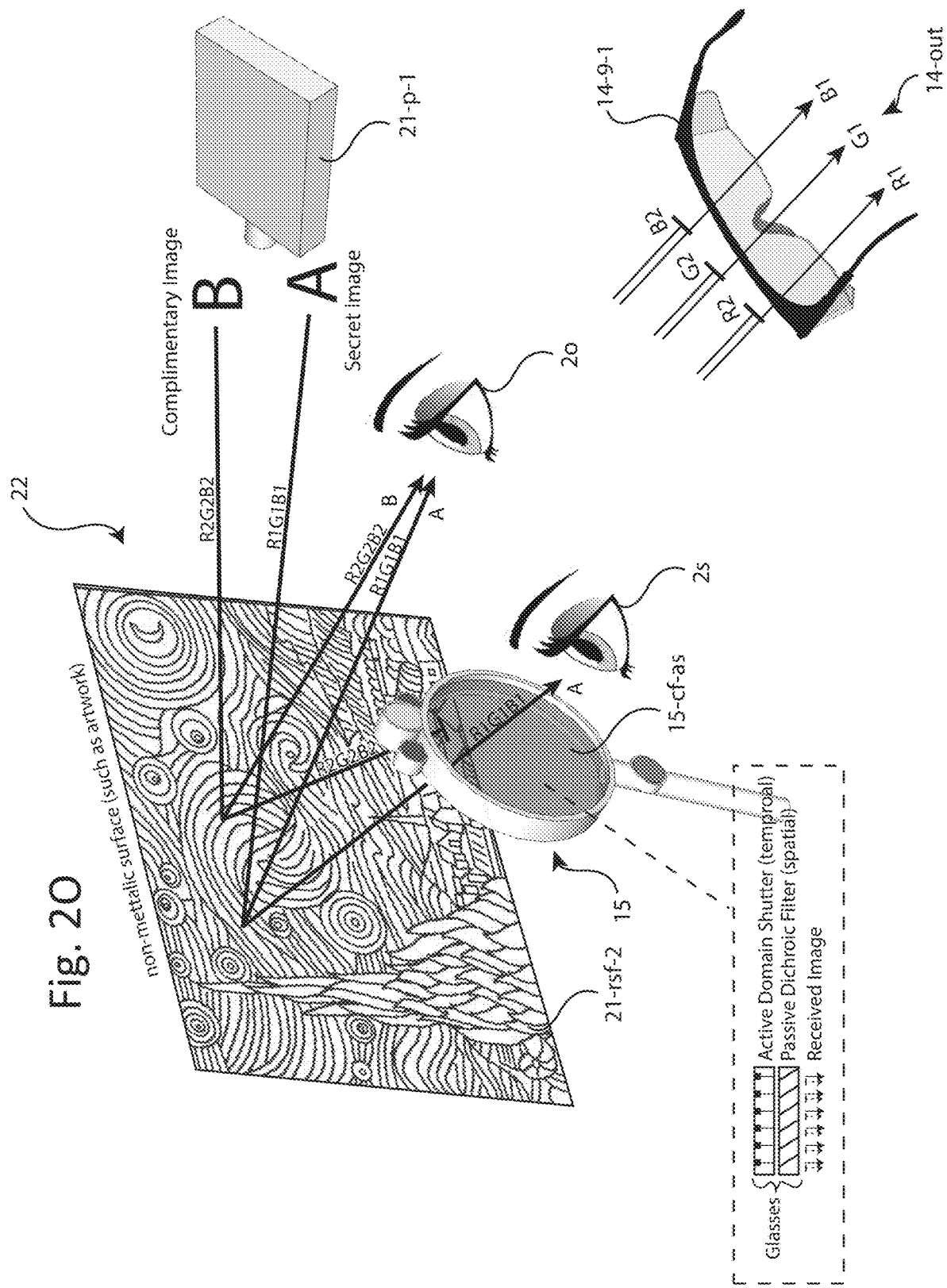

Referring next to FIG. 2m, there is shown additional various species of any system glasses 14 now further adapted to include color filtering, where it is also understood that magnifying glasses 15 is like a single lens of any system glasses 14. Like the teachings related to FIG. 2g, there are various possible species of system glasses 14 that are benefited by the further adaptation of color separation, where color separation provides for at least two additional spatial channels. Passive color filter glasses 14-*pc* are like those used in 3D movie theaters, except that both the right and left lenses are adapted to likewise filter either "0.1"=R1G1B1 or "0.2"=R2G2B2, whereas in the traditional color filter glasses the left lens filters for a first distinguishable color triplet such as R1G1B1 while the right lens filters for a second distinguishable color triplet such as R2G2B2. Passive polarizer glasses 14-*pp* have been prior described in relation to FIG. 2g, and similarly comprises lenses that filter for the same first A or second B polarization state, unlike traditional polarization glasses used for 3D movies that filter for different states. As is well-known, one benefit of color filtering is that less light is lost as compared to polarization filtering.

Passive polarizer/passive color filter glasses 14-*pp-pc* combine polarization filtering of A or B with color filtering of at least R1G1B1 or R2G2B2, where preferably but not necessarily each right and left lens filter for the same combination. By having both lenses filter for the same color triplets or polarization states, the present invention has shown that the glasses 14-*pc* or 14-*pp* respectively, can be used to filter between two simultaneously displayed viewing sub-channels, such as two movies being displayed at the same time in a movie theater, where the two movies could also be the same movie with different MPAA rated content or different perspectives such as hero and villain. The novel combination of color filtering and passive polarization filtering provides for glasses 14-*pp-pc* that can be used for example to filter between four simultaneously displayed viewing sub-channels, such as four movies being displayed at the same time in a movie theater, all as discussed herein. As is also well known, passive glasses such as 14-*pc*, 14-*pp* and 14-*pp-pc* are less expensive than active glasses that require power and control signals to operate.

Still referring to FIG. 2m, active shutter glasses 14-*as* have been prior described in relation to FIG. 2g, where attention was drawn to a new type of active domain shutter that is not based upon polarization and claims a 95% transmission of light when the shutter is in the open state. Active shutter/passive color filter glasses 14-*as-pc* combine the well-known active shutter for filtering temporal sub-channels with the well-known passive color filters for filtering spatial (or temporal) sub-channels, where again the present invention uses the same color filters for both the left and right lens. Hence, using novel active shutter/passive color filter glasses 14-*as-pc*, it is possible to filter two or more temporal sub-channels such as 1 or 2, each with two spatial sub-channels 0.1 or 0.2, where preferably the active shutter is implemented using an active domain shutter as sold by Liquid Crystal Technologies of Cleveland, OH, thus providing for a minimum of light loss.

Active polarizer glasses 14-*ap* were also prior described in relation to FIG. 2g and allow for the dynamic filtering of polarization states A or B through either the right or left lens, with many benefits as herein described. The teachings of the present Figure further adapt active polarizer glasses 14-*ap* to include passive color filters becoming active polarizer/passive color filter glasses 14-*ap-pc*, where the color filtering is any of: 1) the same RGB triplet across the entire right and left lenses, e.g. where the glasses 14-*ap-pc* transmit either A or B polarized light, but only R1G1B1 light, or 2) a first RGB triplet across the right lens and a second RGB triplet across the left lens, e.g. where the glasses 14-*ap-pc* transmit either A or B polarized light through both right and left lenses, but only R1G1B1 light through the right lens and only R2G2B2 light through the left lens.

Still referring to FIG. 2m, active shutter/active polarization glasses 14-*as-ap* were also described in relation to FIG. 2g and are herein shown as glasses 14-*as-ap-pc* that have been further adapted to also comprise color filters 0.1 and 0.2. It is important to understand that the color filters 0.1 and 0.2 can be implemented in 3 important variations as follows: 1) both the right and left lenses can include the same color filter 0.1 filtering for example R1G1B1 or 0.2 filtering for R2G2B2; 2) the right lens can include a first color filter such as 0.1 while the left lens includes a second color filter such as 0.2, and 3) each pixel of the active shutter/active polarization stack can include either of a first, second or more color filters, such as described in relation to glasses 14-11 taught in FIG. 2k that comprise channel filter lens 14-*cfl*-5. As a careful consideration of variation (3) will show, if both the right and left lenses of glasses 14-*as-ap-pc* comprise substantially evenly interspersed pixels with color filter 0.1 verses 0.2 (like the arrangements 23-*ply*-3, 23-*ply*-4 and 23-*ply*-5 in FIG. 2l,) it is possible to independently and dynamically control each right and left lens of glasses 14-*as-ap-pc* to act as: 1) a passive color filter for 0.1=R1G1B1, thus providing substantially 50% spatial resolution of a given first viewing sub-channel; 2) a passive color filter for 0.2=R2G2B2, thus providing substantially 50% spatial resolution of a given second viewing sub-channel, or 3) a passive color filter for both 0.1 and 0.2 thus providing 100% spatial resolution for a third viewing sub-channel that does not differentiate based upon color, where channel filter lens 14-*cfl*-5 therefore operates as an active color filter. As depicted, when combined with polarization A/B filtering, glasses 14-*as-ap-pc* provide dynamic selection of any available spatial sub-channels based upon combinations of A/B and 0.1/0.2 including A.1, A.2, B.1 and B.2. As prior mentioned, using a third color filter 0.3 for filtering a triplet R3G3B3, it is then possible to further adapt glasses such as 14-*as-ap-pc* to dynamically filter between six simultaneous spatial sub-channels. The present inventor notes that the same advancements in display and projector resolutions are applicable to the resolutions available for implementing active shutter, active polarization or active shutter/active polarization glasses, such that any filtering of the actively controlled and transmitted viewing sub-channel 14-*out* is granularized to a finer detail that is expected to be less noticeable to the naked eye, all as will be well understood by those familiar with active glasses technology and the human vision system.

Referring generally to the teachings related to color filters as described in FIGS. 2h, 2i, 2j, 2k, 2l and 2m, it has been shown that it is possible to provide at least 2 spatial sub-channels based upon color filtering and at least four spatial sub-channels based upon the combination of color filtering and polarization filtering, where four spatial sub-channels combined with two to four temporal sub-channels provides four to sixteen viewing sub-channels, providing significant new opportunities as described herein. The remaining Figures and discussion going forward in the present application generally discuss examples related to temporal and spatial sub-channels that do not implement color filtering, and for the sake of clarity generally limit the viewing sub-channels to two or four. It should be understood that the teachings going forward are exemplary, and that for example two spatial sub-channels described based upon polarization emission and filtering of A and B could also be implemented based upon the color triplet emission and filtering of 0.1 and 0.2, and as such these exemplary teachings should not be considered as limitations to the present invention. Those skilled in the necessary arts, as well as those conducting a careful reading of the present invention, will understand that many preferred and alternate embodiments of the present invention and all of its physical components including displays, projectors, content controllers, glasses, private and public speakers have been described, while other variations are possible, and that it is important to match the features of each component as taught herein to provide the novel functionality of multiple sub-channels within a single traditional sub-channels.

Referring next to FIG. 2n, in the upper right-hand corner there is shown an existing camera sensor manufactured by Sony and sold as the IMX250MZXR "polarized sensor." The sensor is currently being incorporated by manufacturers such as Lucid Vision Labs to provide cameras for imaging the reflected polarized light of a scene. The Sony sensor uses a well-known wire-grid array that is typically fit over the micro-lenses of a camera sensor, or in Sony's case attached directly to the surface of the sensor over which the micro-lenses are then placed, all as will be understood by those familiar with machine vision systems and polarization cameras. The fundamental part of any wire-grid array is a set of 4 polarizers, where each of the four polarizers is oriented to transmit a different angle of linearly polarized light. Sony refers to this as a "calculation unit" where the four polarization filters transmit at 90°, 45°, 0° and 135° as can be seen by a careful review of the diagram labeled "Sony IMX250MZR polarized sensor." What is most important to see is that the Sony sensor, like all other polarization sensors in the marketplace, covers all the pixels in the sensor with these or similar "calculation units." While this is helpful for creating the maximum polarization information regarding a scene, it is also problematic in that the polarized dataset is monochrome and as such the sensor and any camera using the sensor is unable to then also capture and determine the traditional color and intensity values for each pixel. What is needed for the purposes to be discussed herein, is a sensor 83 with a set of traditional pixels filtering for color in combination with at least a set of pixels filtering for linear polarization angles, where one means for filtering for polarization angles is to use wire-grid polarizers. It is also desirable for certain applications such as facial recognition and providing secret data to further include a set of pixels filtering for non-visible portions of the spectrum such as UVA or preferably near-IR.

Still referring to FIG. 2n, using a preferred sensor 83 that comprises a combination of color filtering pixels and linear polarization filtering pixels, it is possible to provide preferably 2 cameras 83-1 and 83-2 with any of system glasses including an active polarizer 14-ap and preferably also including an active shutter 14-as-ap. Examples of preferred system glasses include: 14-5 (primarily FIG. 2b,) 14-7 (primarily FIG. 2d, 2e,) 14-8 (primarily FIG. 2f,) and 14-11 (primarily FIG. 2k, 2l.) By using 2 cameras 83-1 and 83-2, the captured color-polarization images are usable to provide 3d data registered to the system glasses, all as will be well understood by those familiar with 3d vision systems and related calibration techniques. What is most important see is that unlike traditional cameras fitted onto glasses for capturing color images, cameras 83-1 and 83-2 also provide important information about any emitted and/or reflected linearly polarized light within the FOV of the glasses 14-as-ap, 14-ap and therefor the wearer of the glasses. As depicted, there are well known sources of reflected polarized light 63-lp, such as sun 62 glare reflecting off of a road or water surface 63. Existing polarized sunglasses are limited to: 1) anticipating a single and typically horizontal linear polarization for sun glare and therefore, 2) using a fixed vertical polarizing film across the entire lenses of the sunglasses, such that only horizontally polarized light is substantially blocked, and this blockage is across the entire surface of the both lenses. However, there are situations where it is preferable to have an option to block or transmit at least this horizontally reflected sun glare 63-lp, for example when fishing on the water it is useful to block the glare allowing better vision into the water, but it is also desirable at times to allow the glare effect as it provides more information about the surface turbulence of the water.

It is also well-known that LCD based displays such as used in many computer laptops, tablets 19-2 and cell phones 19-1, as well as computer displays in airplane cockpits as well as other vehicles, emit linearly polarized light 19-2-lp that is typically not oriented at the horizontal angle to lessen the filtering by traditional sun glasses with vertical polarizers. It is also well-known that as these LCD displays are physically rotated with respect to the viewer, the linear rotation of the emitted light such as 19-2-lp is therefore also rotated. Given these understanding regarding both reflected linear polarized light 63-lp and emitted linear polarized light 19-2-lp, what is desirable are polarized sunglasses that can: 1) detect the various angles of linear polarized light throughout the entire FOV of the glasses 14-as-ap, 14-ap; 2) determine pixels within the glasses 14-as-ap, 14-ap through which the detected linearly polarized light is expected to transmit; 3) determine known objects such as road or water surfaces as well as laptops, tablets and displays that are in the FOV of the glasses 14-as-ap, 14-ap; 4) associate the detect linear polarized light with the detected objects; and 5) adjust the entrance light valve of individual pixels within glasses 14-as-ap, 14-ap according to the expected transmission locations of the linearly polarized light so as to effect the transmission, such as by increasing or decreasing the transmission. Using the present teachings, it is now possible to provide these desirable features in glasses such as 14-as-ap, 14-ap.

It is further desirable to provide system glasses 14-as-ap, 14-ap with a user interface such as an app accessible on a paired mobile device such as a cell phone 19-1, such that the wearer of the sun glasses can do any one of, or any combination of: 1) set a mode for manually or automatically determining sun glass polarization features as described herein; 2) set at least one threshold for controlling the transmitted intensity level of the detected linearly polarized light such 63-lp, 19-2-lp, where the entrance light valves of individual pixels are adjusted at least in part based upon the at least one threshold, thereby effecting the transmittance through glasses 14-*as-ap*, 14-*ap* of the reflected or emitted linearly polarized light such as 63-*lp* or 19-2-*lp* respectively, and where the threshold can be set according to an object type (such as a road or water surface 63 versus a cell phone 19-1 or tablet 19-2); 3) see images from their glasses 14-*as-ap*, 14-*ap* with overlaid polarization information, and 4) see located objects with within the images and select these objects for setting a transmission threshold. Using the present teachings, it is now possible to provide these desirable features in glasses such as 14-*as-ap*, 14-*ap* with an associated app such as running on a cell phone 19-1.

Still referring to FIG. 2*n*, as shown in the upper left with respect to a step "A," system glasses such as 14-*as-ap* or 14-*ap* that are further adapted to include at least one color-polarization camera such as 83-1 or 83-2 along with respective computer processing as is well-known in the field for controlling cameras and processing images, use cameras 83-1 and 83-2 to capture color images within which some portion of pixels comprise calculation units or similar means for determining the linear angle of polarization of the light received throughout the camera's FOV. As shown with respect to a step "B," using image processing such as edge detection and shape template recognition, glasses 14-*as-ap*, 14-*ap* preferably identify one or more objects that are associable with any of the linearly polarized light, where for example objects include road or water surfaces 63 or LCD display devices such as cell phones 19-1 or tablets 19-2. If no objects or object types are identified, step "B" at least identifies incoming linearly polarized light preferably with associated intensity values for comparison to an intensity threshold. In step "C," glasses 14-*as-ap*, 14-*ap* use at least one threshold such as an intensity threshold, preferably associated with a detected object or object type, for at least in part determining a change to the rotation of an entrance light valve included within at least one pixel of glasses 14-*as-ap*, 14-*ap*, where the change in rotation angle is communicated to the active spatial filter 14-*scf* (see FIG. 2*b*) such that the spatial filter causes the entrance light valve to rotate the linear polarization angle of the incoming light with respect to the first linear polarizer that follows the first light valve on the incoming optical path, where the rotating of the incoming linearly polarized light effects the resulting light transmission through the first linear polarizer substantially achieving the desired threshold.

Referring still to FIG. 2*n*, the preferred steps A, B and C are performed at some interval such that as objects in the glass's FOV are rotated (e.g. tablet 19-2,) or change their position (e.g. a road surface 63 as the wearer of the glasses is driving,) or change either than linear angle of rotation or intensity (e.g. when the light source such as the sun 62 changes its position or intensity,) the glasses 14-*as-ap*, 14-*ap* adjust accordingly to best maintain the at least one desired threshold. In one example, a wearer of the further adapted sunglasses 14-*as-ap*, 14-*ap* is outside looking at a LCD based tablet 19-2 that emits linearly polarized light 19-2-*lp* while at the same time there is sun-glare 63-*lp* being reflected off both a local surface and off the tablet 19-2. In response to the detected linear polarization angles across the FOV of the glasses, and by performing steps A, B and C, the light valves associated with the pixels determined to be located in the FOV for transmitting the emitted polarized light 19-2-*lp* are set to maximally transmit the light 19-2-*lp*, whereas other different pixels determined to be located in the FOV for transmitting at least some of the reflected sun-glare 63-*lp* are set to minimally transmit the glare 63-*lp*. It is further noted that to the extent that the sun glare 63-*lp* is of a substantially different rotational angle from the emitted LCD light 19-2-*lp*, any glare 63-*lp* reflected off the tablet 19-2 is also minimized as the light valves are rotated to favor the transmission of the emitted light 19-2-*lp*.

Referring still to FIG. 2*n*, further adapted glasses 14-*as-ap*, 14-*ap* are also capable of setting an overall desired lighting level, such that any one or more of the pixels of the glasses can be operated to lower or raise the transmitted lighting level, where rotating either or both the entrance light valve associated with the spatial channel filter 14-*scf* or the second light valve associated with the temporal channel filter 14-*tcf* (see FIG. 2*b*) will cause a change in the transmission levels of any light, as will be understood by those familiar with polarization and from a careful reading of the present invention. And finally, it is also desirable that the app for controlling the glasses 14-*as-p*, 14-*ap*, regardless of whether or not the glasses 14-*as-ap*, 14-*ap* are further adapted to include at least one polarization camera such as 82 or 83, allow the wearer of the glasses to set and/or control the other modes of operation as described herein, including any one of, or any combination of: active shutter based 2d, 3d modes, active polarizer based 2d, 3d modes, active shutter/active polarizer based modes including spatial or temporal sub-channel selection, determination of a sub-channel for viewing synchronization, or the setting of disguising or privacy mode. It is further understood that in the exemplary case where the controlling app is running on a mobile device such as a cell phone 19-1, the cell phone 19-1 is acting as the herein defined selector 19 and is in communication with both the glasses 14-*as-ap*, 14-*ap* and at least a local controller 18-*l*. In determining a mode or setting, selector 19-1 communicates this information to a controller 18, all as herein described, such that the appropriate mode or setting is activated in coordination with the function of at least the controller 18 and any of displays 23, projectors 21-*p*, polarization layers 23-*ply* or 23-*ply*-2, or private speakers 16-*pa*. As those familiar with the marketplace will understand, by providing glasses such 14-*as-ap*, 14-*ap* that are capable of operating in the many useful modes as herein described, where the glasses are then further adapted to include at least one polarization sensing camera such as 82 or 83, it is possible to broaden the market appeal of the glasses 14-*as-ap*, 14-*ap* for operation with viewing sub-channels, disguising mode, privacy mode, gaming mode as well as adjustable sun-glasses.

Still referring to FIG. 2*n*, as will be understood by those familiar with image processing and in particular the processing of both color image and polarization image data, the ratio of color detecting pixels to linear polarization detecting pixels can be altered based upon the needs of the application, such that the depiction herein of a ratio should be considered as exemplary, rather than as a limitation. It should also be understood that while capturing the four rotation angles of 90°, 45°, 0° and 135° provides a typically accepted polarization data set, it is possible to capture only two substantially orthogonal angles such as 90° and 0° for sufficiently estimating the presence of sun glare 63-*lp* (that will primarily be horizontally oriented and therefore 0° as depicted,) and the presence of emitted LCD polarized light 19-2-*lp* (that will primarily be oriented at a 45° rotation,) where detecting a substantially equal intensity of 90° and 0° is interpretable as indicating a 45° rotation, as will be understood by those familiar with linear polarization. It is also noted that as an LCD device is rotated, the change in intensities detected between the at least two orthogonal rotational angles will change in proportion to the rotation, thus indicating a corresponding change in the entrance light valves determined to be substantially coincident with the detected LCD emittance rays 19-2-*lp*.

And finally, while comprising two cameras such as 83-1 and 83-2 is advantageous for glasses 14-*as-ap*, 14-*ap* when determining 3d information, a single camera is sufficient for performing at least simple edge and shape detection sufficient for determining the location of a rectangular shaped computing device (with LCD screen) such as a cell phone 19-1 or tablet 19-2 and even the form of a hand holding the device, where this information is sufficient for estimating the relative location of the device with respect to the glasses 14-*as-ap*, 14-*ap*, and where the estimated location of the device along with the corresponding detected polarization angles is then sufficient for estimating a subset of pixels within glasses 14-*as-ap*, 14-*ap* whose entrance light valves should then be rotated accordingly. Therefore, the depiction and description of the preferred sun glasses 14-*as-ap* or 14-*ap* that are further adapted to comprise at least one camera for capturing at least one pixel of linear polarization data for use in determining the rotation angle of the entrance light valve for at least one pixel of the glasses should be considered as exemplary, rather than as a limitation of the present teachings. Still within the spirit of these teachings, many variations are possible.

Referring next to FIG. 2*o*, there is shown a secret message display 22 like shown in FIG. 2*c* for concurrently or successively emitting both a secret message image A and a complimentary image B, where the naked eye perceives either or both the spatial and temporal combination of A and B to be a public image, and where a viewer 2*s* using a system magnifying glass 15 or glasses 14 perceives only the secret message A. In FIG. 2*c*, the secret message A and complimentary image B were emitted by either the same projector 21-*p* or by two separate projectors 21-*p*, where the image A comprised polarized light of a first polarization state such as A and image B comprising polarized light of a second polarization state such as B. Because images A and B were emitted and differentiated using two different polarization states A/B, it was necessary to use a metallic based reflective surface 21-*rsf*. FIG. 2 also discussed the use of secrete message display 22 in a game access point as first taught in the prior copending patent INTERACTIVE GAME THEATER WITH SECRET MESSAGE IMAGING SYSTEM, and as to be taught in further detail with respect to upcoming FIGS. 6*a*, 6*b*, 6*c*, 7*a* and 7*b*. One of the intended uses of a game access point is to conduct a game within a destination such as a museum, where it is further anticipated that secret messages A can be overlaid directly onto artwork surfaces such as paintings and statues, where these artwork surfaces are expected to be non-metallic, and therefore emitting secret message A and complimentary image B using two different polarization states is problematic.

Still referring to FIG. 2*o*, one or more projectors 21-*p*-1 concurrently or successively emit both a secret message image A and a complimentary image B, where the naked eye perceives either or both the spatial and temporal combination of A and B to be a public image, and where a viewer 2*s* using a system magnifying glass 15 or glasses 14 such as 14-9-1 perceives only the secret message A, where magnifying glass 15 preferably comprises active color filter lens 15-*cf-as* combining both an active shutter and a passive dichroic (color) filter. Using projectors 21-*p*-1, a secret message image A is emitted using a first RGB triplet such as R1G1B1 while the complimentary image B is emitted using a second RGB triplet such as R2G2B2 (see FIG. 2*h*.) With respect to the public image that is the combination of the images A and B and emitted onto an artwork in a museum, it is noted that preferably this public image is white light that in all other respects is substantially unnoticeable to the naked eye 2*o*, except that perhaps it is further illuminating the artwork. As taught in relation to FIG. 2*h*, by adding an active shutter that is preferably an Active Domain Shutter, it is possible to controllably provide secret messages to a select viewer 2*s* using either of the system magnifying glass 15 comprising lens 15-*cf-as* or glasses 14 such as 14-9-1, even while other viewers 2*s* are also concurrently attempting to view the reflective surface 21-*rsf*-2, wherein it was taught that only the appropriate glasses 15 or 14 being worn by the intended select viewer 2*s* receive the encoded control signals sufficient for enabling the operation of the active shutter and therefore for transmitting synchronized secret message A.

Referring still to FIG. 2*o* in comparison to the teachings related to FIG. 2*c*, the careful reader will note that a passive element such as a passive linear polarizer is useful when the reflective surface 21-*rsf* is metallic and that a passive element such as a color filter is useful when the reflective surface 21-*rsf*-2 is non-metallic (i.e. diffuse.) From an operations view, both the passive elements types of linear polarization versus color filter can be treated similarly when combined with an active element such as an active shutter and as such the detailed description of various emission sequences of images for accomplishing the desired goal of exclusively transmitting a secret image to only a select viewer 2*s* are equally applicable to the combination of an active shutter and a passive polarizer as well as the combination of an active shutter and a passive color filter. It is again noted that when using a passive polarizer, the active shutter is preferably also based upon linear polarizers, whereas when using a color filter, the active shutter is preferably and Active Domain Shutter that is not based upon linear polarizers.

Referring next to the combination of FIGS. 3*a*, 3*b*, 3*c* and 3*d*, there are shown four basic types of apparatus and methods for providing private audio 16-*pa* to a viewer 2 corresponding to a selected viewing sub-channel.

FIG. 3*a* repeats the information taught regarding FIG. 1*a*, now showing any system glasses 14 being worn by viewer 2. As with FIG. 1*a*, where eye glasses 14-5 are a species of any glasses 14, in FIG. 3*a* the any glasses 14 are shown in combination with integrated speakers 16-1, where the preferred integrated speakers are what is commonly referred to as bone speakers. Bone speakers are well-known in the art and are meant to be worn near, but not covering the ear of viewer 2 (thus providing for better reception of ambient sounds that are not private audio 16-*pa*.) As those familiar with bone speakers will understand, sound is conducted to the inner ear through the bones of the skull, rather than through the ear's auditory canal. As those familiar with audio information especially in relation to a movie, it is typical that at least the conversation of the movie characters is separated as audio information to be output through specially positioned center speakers, whereas other ambient sounds such as outdoor noises are output as different audio information on different left, right, front and back speakers. The anticipated use of the present invention is that at least the separated conversation audio of a movie or show, along with none, some or all the non-conversation audio will be output as private audio 16-*pa* through integrated eye glasses speakers 16-1, whereas all, some or none of the non-conversation audio will be output on public speakers as shared ambient sounds. However, any integrated speakers 16-1, whether bone speakers or more traditional ear covering speakers necessarily ad cost, power requirements, size, weight, manufacturing complexity and other considerations with respect to any system eye glasses 14.

Referring now to FIG. 3b, rather than integrating bone speakers or earphones into the any glasses 14, it is also possible to use any of well-known wired (depicted) or wireless (not depicted) not-integrated bone speakers or earphones 16-2, where the audio source for example is the viewer's 2 cell phone in communication with the present system 100 and therefore receiving at least audio content from content controller 18 and then acting in combination with earphones or similar as the private speakers 16. Another example audio source is a seat in a movie theater auditorium that is in communication with content controller 18 for receiving audio content and includes an audio jack and provides the appropriate sub-channel of audio based upon the viewer 2's selections, where the private speakers 16 are preferably built into a seat (see upcoming FIGS. 3c and 3d.) Non-integrated private speakers 16-2 are advantageous since they reduce the cost and simplify manufacturing of the any eye glasses 14. For example, by removing the requirement of power for providing a custom audio sub-channel, the any eye glasses 14 have the option of being very low cost for example by implementing any of passive polarization lenses 14-*pp* as described in FIG. 2g. However, regarding FIG. 3b, ear speakers 16-2 that are ear buds do interfere with the viewer 2's hearing of shared audio 16-*sa* and may be uncomfortable to some viewers over an extended period.

Referring to FIG. 3c, there is shown a viewer 2 sitting in a preferred chair 50 including one or more directional speakers such as 16-3. In this case, the viewer 2 is still receiving a private audio 16-*pa* sub-channel while wearing any species of any system glasses 14. Chairs with embedded speakers are well-known in the market, where in general their designs are not concerned with restricting the audio to only be substantially heard by the occupant of the chair. The market also currently offers for sale what are referred to as directional speakers 16-3, where directional speakers are designed to limit the hearing of the audio output to a confined volumetric space, such as surrounding the head of a viewer 2 sitting in a chair, and where the present inventor prefers using directional speakers 16-3 positioned within a high-back chair, where the high-back of the chair forms a curved surface partially enclosing viewer 2 as depicted in the present Figure.

Referring still to FIG. 3c, chair 50 is further adapted to comprise one or more eye glasses RFID sensors 50-*rf*, where the one or more sensors 50-*rf* are preferably embedded (and therefore not seen, whereas for clarity the present Figure depicts the sensors as seen) in the back of the chair 50 near where the head of viewer 2 is anticipated to be located during the movie. As those familiar with passive RFID technology will understand, it is possible and inexpensive to include a passive RFID chip within for example the frame of any system glasses 14, where the RFID chip is then automatically detected by chair sensor 50-*rf*. An example use case is a movie being shown that is a two perspective adjustable story, and where viewer's preselect either of two passive glasses 14-*pp* such as discussed in relation to FIG. 2g for filtering 2-state polarization distinguishable images such as A or B, where the glasses 14-*pp* are further adapted to include two different passive RFID chips uniquely identifying A or B and where sensor 50-*rf* automatically detects and classifies the A or B type of a viewer's glasses 14-*pp* and sets the corresponding audio sub-channel accordingly such that the viewer then sees and hears substantially only sub-channel A or B using inexpensive passive eye glasses 14-*pp*. One preferred solution for embedding a sub-channel code such as A or B into any of system eye glasses 14 is to use what is referred to as a micro-RFID, such as sold by Hitachi as a "ultra small package tag" USPT. The Hitachi tag has dimensions of only 2.5 mm square and therefore is a small size for fitting into frames of any system glasses 14 and also has a short-read range thus helping to ensure that only the specific glasses such as 14-*pp* (e.g. type A or B) being worn by a specific viewer 2 occupying a specific chair 50 are detected by sensors such as 50-*rf*. Other passive short and medium range RFID devices are also usable and are well-known in the art. When using any of active system glasses 14-*as*, 14-*as-pp*, 14-*ap* or 14-*as-ap* it is also anticipated that the passive RFID chip further includes a unique identifier for assisting with the pairing of the active system glasses 14, thus in combination with the lens controller 14-*lc* included with any active system glasses 14, system 100 associates a single pair of any active system glasses 14 with a unique seat such as 50. The present inventor notes that the preferred chair 50 may also be created to seat two or more viewers 2, where all viewers 2 sitting in chair 50 hear the same audio sub-channel and therefore are assumed to be watching the same corresponding viewing sub-channel wearing the same type of any system glasses 14, except in the case where the viewers 2 are wearing any active version of any system glasses 14 and for example are participating in an adjustable story that includes a game, such as an open-restricted scene as described especially in relation to upcoming FIGS. 9c and 10c.

Referring next to FIG. 3d, there is shown alternate chair 51 in which a viewer 2 sits and is wearing any of system glasses 14. In this arrangement, directional sound 16-4-*ds* is being projected by any of directional speakers 16-4 into the sitting space occupied by the viewer 2, where only the occupant 2 of the seat is able to substantially hear sound 16-4-*ds*. The present inventor prefers directional speakers 16-4 that emit what is technically referred to as modulated ultrasound, where the modulated ultrasound is demodulated by the volume of air through which the ultrasonic waves travel on the way to the viewer 2, and thus the volume of air is technically the speaker. The present inventor is aware of at least two commercially available speaker systems based upon modulated ultrasound including the "Audio Spotlight" manufactured by Holosonics, with headquarters in Watertown, MA and the HyperSound HSS300 manufactured by HyperSound of San Diego, CA. Like the speakers 16-3 of FIG. 3c, directional speakers 16-4 provide a means of supplying a corresponding audio sub-channel without requiring an integrated speaker (such as bone speakers 16-1, see FIG. 1a) on any of system glasses 14, thus allowing for lower cost glasses 14 including the lowest cost passive polarizer glasses 14-*pp*. Also like preferred chair 50, alternative chair 51 may have many designs, including high backs that help to further limit the unwanted hearing of directional sound 16-4-*ds* by other viewers 2 not currently occupying chair 51, as well as designs for seating two or more viewers, where it is well-known and possible to alter the shape of the directional sound 16-4-*ds*'s audio field, where the audio field is herein defined as the volumetric space within which a viewer 2 may substantially hear the sound 16-4-*ds* (as depicted in grey) such that the audio field may include multiple viewers 2.

While chair 51 is further capable of implementing RFID sensors 50-*rf* for automatically detecting eye glasses 14, chair 51 is shown as alternatively comprising a manually operated content selector 19-2, such as a combination barcode scanner and touch-sensitive screen that are both well-known in the art. The present invention anticipates that rather than including an embedded RFID element, such as a passive micro-RFID, any of system glasses 14 are further adapted to include a barcode somewhere on their outer surface and/or on any packaging within which the eye glasses 14 are enclosed prior to providing to a viewer 2 or even as provided on the viewer 2's theater ticket, where the viewer 2 uses the barcode scanner of selector 19-2 to scan the included barcode and thus classify or identify the viewer's glasses 14. As the careful reader will see, by having the viewer 2 first scan a bar code associated with their active glasses such as 14-as-ap, it is possible to determine a unique identifier for use in the well-known pairing operation between content controller 18 and lens controller 14-lc.

In the example of a 4-perspective adjustable movie using four viewing sub-channels 1A, 1B, 2A, 2B for filtering using active shutter/active polarization glasses 14-as-ap, the preferred selector 19-2 presents a list of four movie characters representative of each sub-channel, such as: "Thor," "Jane," "Hulk" or "Odin," where the viewer 2 selects their sub-channel choice by touching the appropriate screen location on selector 19-2. Once the viewer 2's choice is determined by content selector 19-2, the indication is provided to the content controller 18 that is capable of then transmitting the appropriate control signals to paired lens controller 14-lc. In the example of a 2-perspective adjustable movie using two viewing sub-channels A or B for filtering using any of passive polarizing glasses 14-pp, the preferred selector 19-2 presents a list of two movie characters representative of each sub-channel, such as: "Thor" or "Loki," where the viewer 2 selects their sub-channel choice by touching the appropriate screen location on selector 19-2. As the careful reader will see, by having the viewer 2 select a viewing sub-channel from a list of 2 choices such as through a touch screen, it is possible to deduce which of the two types of passive glass 14-pp a viewer 2 is wearing, such as A or B, and therefore it is not necessary or preferred that selector 19-2 includes a barcode scanner for classifying the type of glasses 14-pp.

Referring still to FIG. 3d, as those familiar with at least technology for wirelessly identifying mobile electronic devices will understand, it is possible to replace the barcode reader component of selector 19-2 with some other technology for determining the classification or identity of the viewer 2's any system glasses 14. For example, in another embodiment of the present invention, any system glasses 14 include a near field RFID and selector 19-2 includes a near-field scanner, such that the viewer 2 simply holds their glasses 14 near the selector 19-2 during which glasses 14 are automatically scanned using near-field communication (NFC) and sufficiently classified or identified. It is also possible that the viewer 2 simply enter a unique code through the touch LCD screen for classifying or identifying their glasses 14. As will be well understood by those familiar with user input devices especially including screens with touch interfaces, many solutions are sufficient for the requirements of the present invention and therefore the herein disclosed versions of channel selectors such as 19-2 should be considered as exemplary, rather than as limitations of the present invention. What is important is that a sub-channel is determined in regard to the any viewer 2 occupying a unique seat such as 50 or 51, where determination can be fully automatic such as with chair 50 or semi-automatic or manual assisted such as with chair 51. As will be clear to those familiar with information systems, all that is necessary is that the apparatus and methods associated with chair 50 or 51 determines or otherwise receives information indicative of: 1) a classification of passive glasses 14-pp as type A or B, therefore also identifying a viewing sub-channel and associated private audio 16-pa to be provided by the content controller 18 to the private chair speakers 16, or 2) the unique identity of a viewer 2's active glasses 14-as, 14-as-pp, 14-ap or 14-as-ap for use in the pairing operation between the content controller 18 and the lens controller 14-lc included with the viewer 2's active glasses, as well as the viewer 2's desired viewing sub-channel for use by the controller 18 in determining proper control signals for transmission to the paired lens controller 14-lc and for use by the controller 18 in providing associated private audio 16-pa to the private chair speakers 16.

Figure 3E:
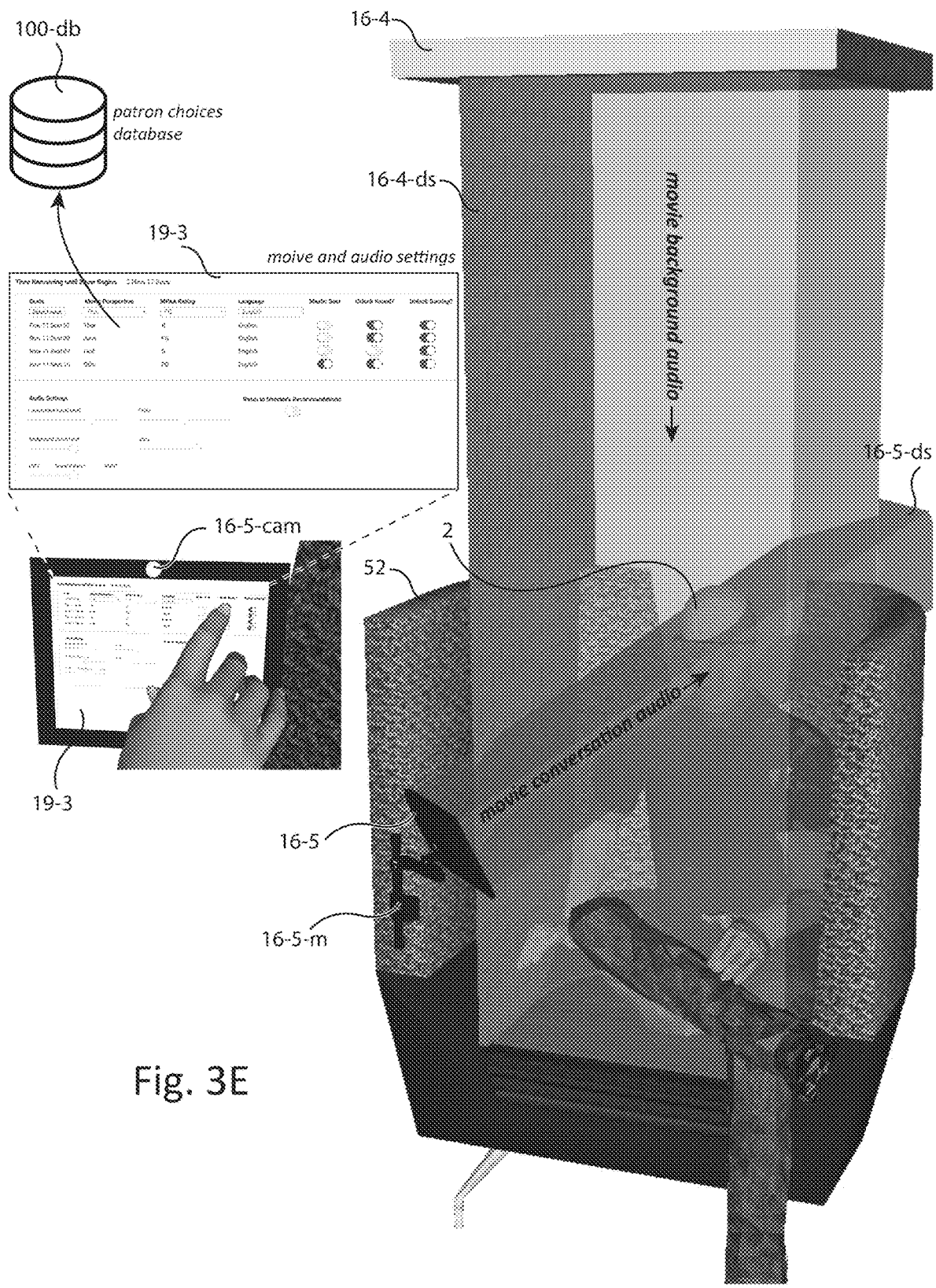
FIG. 3e portrays alternative chair 52, where chair 52 includes seat directional speaker 16-5 in combination with overhead directional speaker 16-4, each capable of outputting separately controllable modulated ultrasound 16-5-*ds* and 16-4-*ds*, respectively, and where seat speaker 16-5 further includes a touch screen display selector 19-3 for interfacing with a viewer 2. For example, selector 19-3 further allows viewer 2 to control the sound levels of each of speakers 16-5 and 16-4. Selector 19-3 also provides a viewer with the ability to register each of their own and other theater seats with the system 100, thus indicating desired choices for example including: "movie perspective" such as Thor, Jane, Hulk or Odin, "MPAA Rating" such as G, PG or R, and "Language" such as English, Spanish or Chinese. Touch screen display 19-3 is envisioned to provide several options, choices and control mechanisms to a viewer 2, where the viewer 2's inputs and related datum are maintained in a viewer choices database 100-*db* for later analysis and provision, for example to theater owners and movie producers and storytellers.

Referring next to FIG. 3e, there is shown alternative chair 52, where chair 52 includes both overhead speakers 16-4 for outputting directional sound 16-4-ds as described with chair 51 as well as seat speakers 16-5 for outputting additional directional sound 16-5-ds. As with speaker 16-4, the preferred technology for seat speaker 16-5 is modulated ultrasound that can maintain a tight audio field while also extending over significant distances, all as is well-known in the art. As will also be understood by those familiar with modulated ultrasound, speakers 16-4 and 16-5 emit modulated ultrasound that is well above the hearing range for a viewer/listener 2, and as such is not a speaker per se, where the unique pattern of ultrasound frequencies emitted over the entire surface of speaker 16-4 and 16-5 conduct through the air volume as longitudinal waves forming a combined multiplicity of compressions and rarefactions within the air that ultimately provide a demodulation of the original emitted ultrasound into frequencies that are within the hearing range of the viewer 2, such that technically the air volume of the audio field is the speaker. Audio systems such as provided by Holosonics emit ultrasound at a frequency range of roughly 60 kHz to 70 kHz, where it is generally understood that human hearing extends between 20 Hz to 20 kHz, such that demodulation of the 60-70 kHz ultrasound into the audible hearing range requires an extended air volume acting as the speaker for demodulating the ultrasound. In general, the demodulation process creates the higher frequencies such as 20 kHz first and requires more time and distance to create the lower frequencies, all as will be well understood by those familiar with modulated ultrasound technology.

Still referring to FIG. 3e, with respect to the private audio 16-pa that is provided by the system 100 to a first viewer 2 sitting in a movie theater auditorium seat such as 52, what is most desirable and herein taught is that: 1) private audio 16-pa such as 16-4-ds is provided to each of a first viewer 2 sitting in a movie theater auditorium seat such as 51 or 52 that is substantially not heard by any other second viewer 2 sitting in a different auditorium seat, where audio 16-4-ds is emitted remote to the seat such as 51 or 52; 2) additional private audio 16-pa such as 16-5-ds is provided to each first viewer 2 and is also substantially not heard by any of second viewers 2, where audio 16-5-ds is emitted at the seat such as 52; 3) seat speaker 16-5 is mounted using any of well-known adjustable mounting 16-5-m so as to allow the orientation of directional sound 16-5-ds to be manually adjusted by the first viewer 2 occupying a seat 52; 4) adjustable mounting 16-5-m is further adapted to include electro-mechanical apparatus for controllably adjusting the orientation of directional sound 16-5-ds in response to provided control signals, where electro-mechanical apparatus includes any of well-known motorized pan/tilt mechanisms, and 5) seat speaker 16-5 is further adapted to include computer processing (not depicted) in communications with the motorized pan/tilt adjustable mounting 16-5-m as well as any of well-known cameras 16-5-cam for capturing images of the first viewer 2 while sitting in seat 52, where the captured images are analyzed during computer processing using for example any of well-known face tracking algorithms in order to determine the relative position of the first viewer 2's head or torso, where the relative position information is used at least in part by the computer processing to determine and provide electronic control signals to the motorized pan/tilt adjustable mounting 16-5 for automatically adjusting the orientation of the directional sound 16-5-*ds* during at least some portion of time for which first viewer 2 is seated in seat 52.

Referring still to FIG. 3e, chair 52 preferably includes any of registration apparatus and methods for registering any of system glasses 14 as associated with a given chair 52, where any of registration apparatus and methods include eye glasses RFID sensors 50-*rf* (see chair 50, FIG. 3c) or content selector 19-2 (see chair 51, FIG. 3d,) where registration at least determines either the classification of any system eye glasses 14 such as a type of movie perspective (e.g. "Thor" vs. "Loki",) or a unique ID of the any system eye glasses 14, and where the unique ID associated with the any system glasses 14 is usable for determining a movie perspective and for establishing a unique pairing between any of active system glasses 14's included lens controller 14-*lc* and the content controller 18. As the careful reader will see, using a chair 52 including any of registration apparatus and methods, it is possible to provide a viewer 2 with the experience of simply occupying their assigned theater seat 52 after which: (a) the viewer 2's any system glasses 14 are automatically detected such that the viewer 2's visual experience is then fully determined and controllable, and (b) their head location is tracked such that the directional sound 16-5-*ds* becomes and remains automatically oriented towards their head throughout the duration of the provided movie; where the combination of features provides for minimal input from a given viewer 2.

Still referring to FIG. 3e, it is well-known that the wavelength (lambda) for a given longitudinal sound wave can be calculated as the speed of sound traveling through a medium such as air (approximately 330 [ms$^{-1}$],) divided by the frequency of the sound (e.g. in the case of typical modulated ultrasound 65 kHz,) such that a typical wave length of modulated ultrasound is on the order of 50 mm (or 2 inches.) It is further well-known that the absorption rate of sound propagating through a given material is directly affected by the thickness of the material with respect to the wavelength, such that materials with a thickness that is substantially less than the wavelength of a given soundwave will cause lesser or limited absorption of the transmitting sound. It is also well-known that flexible displays such as AMOLED panels produced by Royale of China, have a thickness on the order of 0.01 mm, and therefore substantially less that the wavelength of 65 kHz ultrasound. Furthermore, it is also well-known that flexible displays are based upon plastic substrates and tend to be more porous than for example rigid displays that include glass, where the rigid displays also tend to be thicker. And finally, it is also well-known that "due to the limited thickness of the porous medium, the attenuation caused by the wave front expansion is negligible and the main attenuation is the wave amplitude from the reflection and refraction," (see top of page, in the chapter on Porous Materials, in the book Porous Materials: Processing and Applications, by Peisheng Lui, Gui-Feng Chen.)

Given that attenuation of the wave front expansion is akin to sound distortion whereas the attenuation of wave front amplitude is akin to reducing volume (and can therefore be somewhat counteracted by increasing the power output of the modulated ultrasound,) it is possible to at least place a AMOLED display (such as manufactured by Royal of China) over the surface area of the directional speaker (such as the AS-168i manufactured by Holosonics of Watertown, Mass,) without substantially affecting the sound quality of directional sound 16-5-*ds* being provided to the viewer 2. The resulting AMOLED touch screen selector 19-3 therefore repurposes the area of seating dedicated to the seat speaker 16-5 and its mounting 16-5-*m* to also provide a content selector 19, preferably with at least the features described with respect to either selector 19-2 of chair 51 (where seat speaker camera 15-5-*cam* also serves as a barcode reader) and/or the current teachings for selector 19-3. However, it is also noted that OLED displays are also available with a thickness on the order of 0.5 mm, which is still substantially less than the expected wave length of the modulated ultrasound and therefore is also usable for the present purposes of covering chair speaker 16-5 and providing a touch screen 19-3 for interacting with a viewer 2.

Still referring to FIG. 3e, Turtle Beach of San Diego, CA, selling under the name of Hypersound, has demonstrated a product they call HyperSound Clear 500p, that is a transparent modulated ultrasound speaker that is meant to be placed over a display, such that the combination of any of well-known displays located directly underneath the clear modulated ultrasound speaker, and any of well-known touch sensors placed over the clear modulated speaker, is considered an alternative embodiment of seat speakers 16-5 and selector 19-3 for the purposes of the presently described chair 52, where a viewer 2 receives both directional sound 16-5-*ds* and a user interface 19-3 from the same speaker-apparatus surface area. Regarding the use of overlaid touch sensor technology, it is preferred that what is known as an infrared touchscreen is implemented, since unlike all other touch technologies, there is no overlay and thus no potential for distorting or otherwise attenuating the emitted modulated ultrasound, all as will be well understood by those familiar with touch screen technologies and from a careful consideration of the teachings herein provided. It is also noted that chair 52 has significant novel value and benefits that are dependent upon the provision of the seat speaker 16-5 and the provision of interface 19-3 and that are not dependent upon the combination of the two components into a single surface area, such that the preferred and alternate embodiments as herein discussed should be considered as exemplary, and many other combinations of well-known technology can be used to provide a user interface 19-3 separate from the seat speakers 16-5.

Still referring to FIG. 3e, the user interface provided by any implementation of touch screen 19-3 preferably: 1) allows a first viewer 2 to register their any system eye glasses 14 and/or provide additional viewing and listening parameters; 2) allows a first viewer 2 to likewise set any parameters for any other of second viewers 2 sitting in other seats 52, and 3) provides a user interface for accepting viewer 2 input during the presentation of the movie, where for example the accepted input is in relation to an adjustable or open-restricted scene within an movie that is an adjustable story, all as to be discussed in relation to FIGS. 9c and 10c. With respect to the preferred parameters accepted via touch screen 19-3, one preferred operation is for a first viewer 2 to scan a barcode provided for example on their theater ticket using either a further included barcode scanner (such as described in relation to selector 19-2 in chair 51,) or using the camera 16-5-*cam* to capture images for any of well-known image processing analysis by the associated computer processing thereby confirming their ticket number.

After scanning their ticket, viewer 2 then uses interface 19-3 to set viewing and listening parameters such as: 1) a desired movie perspective, such as the prior examples of a 4-perspective Marvel Comic movie including the perspectives of Thor, Jane, Hulk and Odin; 2) a desired well-known MPAA moving rating such as PG, PG-13 or R; 3) a designed spoken language such as English, Spanish or Chinese. As the careful reader will see, a 4-perspective movie, where each perspective has a PG, PG-13 and R rated version, represents a total of twelve combinations of movie content. However, using two spatial sub-channels and two temporal sub-channels, the producers and storytellers are limited to four viewing sub-channels. As those familiar with movies and production will understand, there are often only a few scenes that determine if a given MPAA rating is PG versus PG-13 versus R, such that it is possible to work within a limit of four viewing sub-channels to still provide four perspectives at three rating levels, where the only requirement is that at any given overlap of time, only four of the possible twelve combinations are being displayed.

Referring still to FIG. 3e, it is also possible that interface 19-3 allows a given first viewer 2 to additionally provide parameter choices for any one or more second viewers 2, where for example the first viewer 2 is a parent and a second viewer 2 is their child. In this situation, the first viewer 2, using the first viewer's seat 51, scans the ticket of the second viewer 2 using any of the herein described apparatus and methods, after which the first viewer 2 makes parameter selections for the second viewer 2, for example including a seat number for the second viewer 2 and the preferred movie perspective and MPAA rating. In this situation, it is possible that the bar code or similar printed for example on the theater ticket includes an indication that a given ticket is a master seat and thus allowed to operate the seat user interface such as 19-3, whereas tickets that are not for a master seat will not be able to be scanned and therefore select parameters.

Regarding audio parameters, it is well-known that movie sound systems often separate the conversation audio of the actors for output on a separate traditional audio channel, such as center speakers, whereas other sound (herein collectively referred to as background sound,) is output on other traditional channels that are not the center speakers. In one implementation of the present invention, overhead speakers 16-4 are used for outputting background sound while seat speakers 16-5 are uses for outputting actor conversation, and user interface 19-3 accepts at least one parameter regarding the output of audio, for example: 1) the volume level of the actor conversation, as preferably output exclusively by seat speakers 16-5; 2) the volume level of the background sound, as preferably output exclusively by overhead speakers 16-4; 3) other audio characteristics such as treble or bass as will be well-known to those familiar with audio systems, or 4) the balance of sound as directed to the left or right ear as will be well-known to those familiar with stereo sound systems, where it is further noted that many individuals experience tinnitus, hearing loss or other hearing deficiencies that adversely affect the enjoyment of a movie, and that can be benefited by the herein taught system including the ability to set personal conversation and background volumes as well as setting the treble and bass volumes or balancing the sound between ears. It is also preferred that the viewer 2 is provided with an option to flip between their personalized sound settings and the sound settings as recommended to the director, as an easy means for comparison. In this regard, the present system preferably provides a test sound track that is available prior to the start of the movie for use by a viewer 2 to determine their preferred parameters, where the test audio is output to the viewer as both overhead directional sound 16-4-*ds* and seat directional sound 16-5-*ds* for personal adjustment. And finally, it is further anticipated that a master seat first viewer 2 may indicate through their user interface 19-3 that a second seat viewer 2 may or may not use the user interface 19-3 associated with the second viewer 2's second seat to adjust their second seat audio, where the indication is portrayed in the present screen example as "unlock sound?"

Still referring to FIG. 3e, the present teachings in relation to upcoming FIGS. 9c and 10c discuss the concept and implementation of adjustable and open-restricted scenes, where especially in an open-restricted scene, but also at any time throughout the adjustable story, it may be desirable to gather input from a viewer 2, where the input is interpreted as a part of a game. For accepting input, it is anticipated that the system 100 will automatically change the user interface (such as displayed as 19-3) to become some game interface, where the game interface can dynamically reflect the state of the game all as will be well understood by those familiar with gaming and video systems. What is important to see is that: 1) a provided user interface such as 19-3 is usable as a gaming interface during the presentation of a movie, and in this regard can be further adapted to include an of well-known gaming input controllers such as a joystick and buttons, and 2) the present invention also anticipates that ability for a master seat such as for a parent viewer 2, to turn on or off the gaming system interface for any associated viewer 2 (such as a child) seat, where turning on or off is portrayed as "unlock gaming?"

As will be well understood by those familiar with concepts of business metrics and data science, the parameter choices made by any given first viewer 2, or by a given first viewer 2 for a second viewer 2, any by any given second viewer 2 as allowed by a first viewer 2, comprise valuable information, where the present system further provides any of traditional and well-known computing and network means to capture and maintain the input parameters and all indications made by any first or second viewer 2 through any of the provided user interfaces such as 19-3 with the anticipated use of selling or otherwise providing the information to interested third parties including the movie theater owners, the movie producers and storytellers, the movie distributors, movie critics and movie rating systems such as the well-known Rotten Tomatoes. As the careful reader will see, and as those familiar with business metrics and data collection will understand, any and all of the datum gathered by the system in the performance of its operations is considered as usable for business intelligence and therefore also stored in database 100-*db* or similar, where examples include the time at which any of system glasses 14 was registered thus indicating the time of occupancy as well as the occupied seat ID, the amount and timing of any movement of a viewer 2 as detected by seat camera 16-5-*cam* that is comparable via the timing information to content being portrayed during the movie, any of well-known facial recognition parameters such as detected emotions also correlated to timing as well as the detected sex or age of the viewer 2, where it is further possible to adapt camera 16-5-*cam* to provide an infrared (IR) illumination of the viewer 2, such as with a ring light, and to detect IR in addition to or replacement of visible light, thus allowing for tracking and facial recognition in lower visible lighting conditions, all as will be well-known to those familiar with imaging systems.

And finally, still with respect to FIG. 3e, the present inventor anticipates many uses for chairs such as 50, 51 and especially 52, where for example chair 52 is provided in a conference room setting and includes only seat speakers 16-5, mounted to the chair as herein described, or alternatively to a desk or conference room table, where the directional sound 16-5-*ds* output by the chair is limited to a spatial area substantially contained by the space of the chair, such that using the preferred high frequency absorbers the viewer/listener is provided both control over the provided audio and best insured that the private audio is not substantially heard by others.

It is further anticipated that a home theater embodiment of the present invention 100 comprises a content controller 18 for providing multi sub-channel private video to a video output device 23 along with corresponding private audio to one or more private audio speakers 16 that are directional speakers such as 16-5 mounted on adjustable mounting 16-5-*m*. In the copending application INTERACTIVE OBJECT TRACKING MIRROR-DISPLAY AND ENTERTAINMENT SYSTEM, the present inventor described various tracking apparatus and methods with respect to copending taught system glasses 14 considered to be usable with the herein further taught adaptations of copending system glasses 14, where the tracking apparatus and methods are usable to determine and provide to content controller 18 the current 3D location of any system eye glasses 14 being worn by a viewer 2, such that it is at least possible to estimate the 3D location of a viewer 2's head. Using at least in part the current 3D locations determined and provided by any tracking apparatus and method for tracking system glasses 14, content controller 18 determines control signals for providing to adjustable mounting 16-5-*m*, where in response to the control signals mounting 16-5-*m* adjusts the direction of the directional sound 16-5-*ds* to substantially follow the head location of the viewer 2 wearing the tracked system glasses 14, such that tracked viewer 2 continues to receive private audio 16-*pa* that is the directional sound 16-5-*ds* even as the tracked viewer 2 moves about within an area that provides an unobstructed air volume between the speakers 16-5 and the viewer 2, where unobstructed means that the modulated ultrasound comprising directional sound 16-5-*ds* is transmitted to the tracked viewer 2 without substantial absorption or distortion. For example, the home theater embodiment of the present invention 100 as described is in a living room where two or more viewers 2 are sharing a video output device 23 to each receive a private viewing sub-channel 14-*out*, where each of viewers 2 can move freely about the living room while still receiving both the private video 14-*out* and private audio 16-*pa* such as 16-5-*ds*.

Figure 3F:
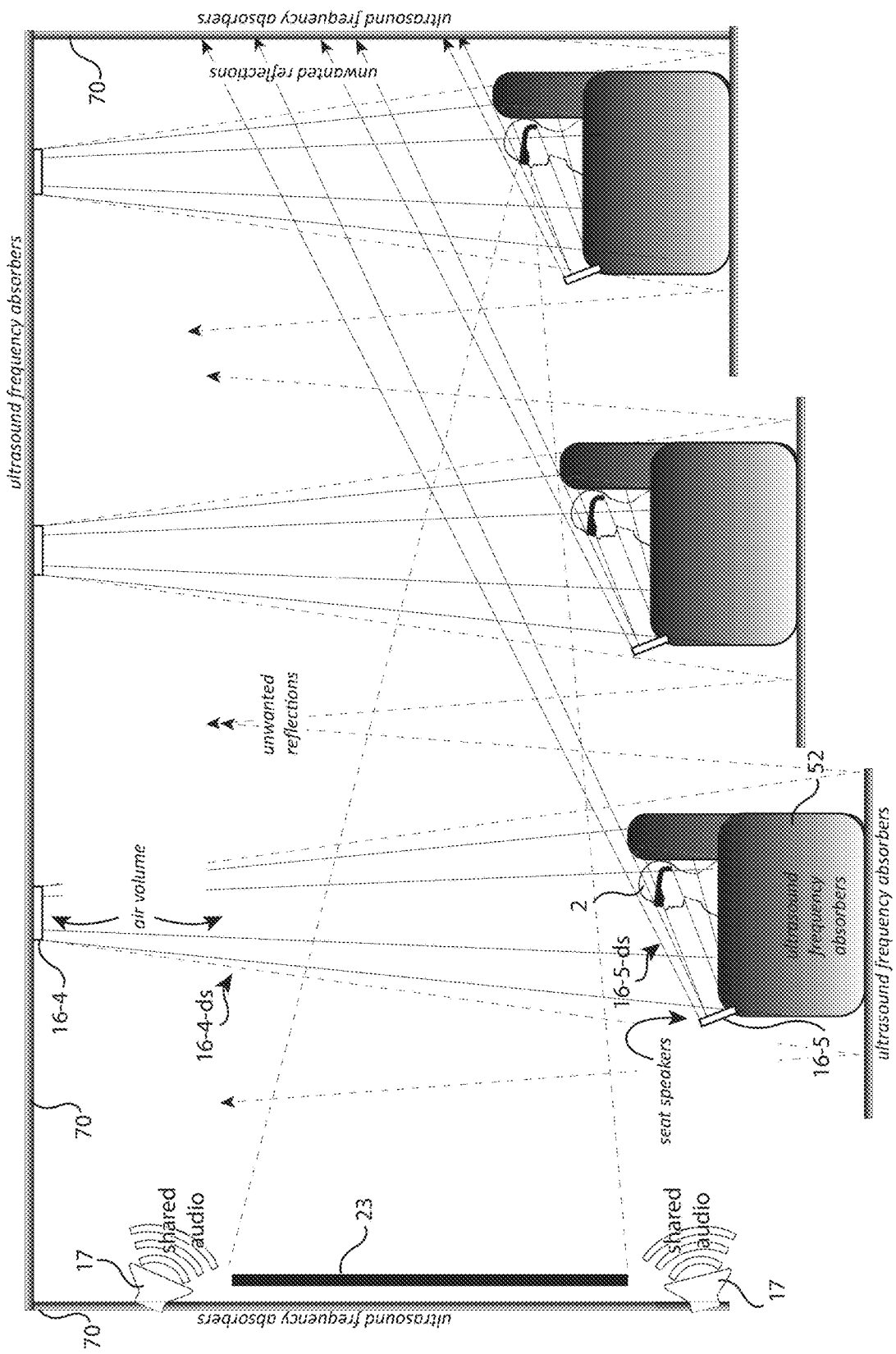
FIG. 3f portrays a movie theater setting where chairs 52 and walls 70 further include sound proofing materials adapted to better absorb higher frequency ultrasound in the 60 kHz range, where traditional soundproofing is targeted to the audible range of sounds this is under 20 kHz.

Referring next to FIG. 3*f*, there is shown an example arrangement of three alternative seats 52 as representative of three rows in an exemplary movie theater auditorium. The chairs 52 as portrayed are roughly drawn to scale to match typical dimensions for auditorium chairs and their offsets. As prior discussed, the present invention prefers the novel use of directional sound such as 16-4-*ds* and 16-5-*ds* in a movie setting for providing private audio 16-*pa* corresponding to private video 14-*out*. While the use of modulated ultrasound provides significant opportunity for limiting the audio to a single seat such as 52 and therefore a single viewer 2, as is well-known, sound striking a surface will reflect, where the reflections of the modulated ultrasound are considered as unwanted reflections to preferably be minimized. As depicted, the initial reflecting surfaces of the overhead directional sound 16-4-*ds* are the viewers 2, the seats 52 and the floor area surrounding the seats 52. The initial reflecting surfaces of the seat directional sound 16-5-*ds* are the viewer 2 and the seat 52. What is desired and considered to be novel is the use of special materials within seats 52 for the substantial absorbing of ultrasonic waves, especially those in the frequency range of 20 kHz to 70 kHz, where the ultrasound is initially emitted at frequencies between 60 kHz and 70 kHz, but then demodulates down to 20 kHz and lower as it propagates through the air space. Once the demodulation produces frequencies below 20 kHz, the audio has reached the range of human hearing and as such many theaters already include sound proofing for controlling these audible frequencies as emitted by public speakers 17. What is needed is to combine special materials designed specifically to absorb these higher ultrasonic frequencies into the chair, floor and walls, thus minimizing the unwanted reflections of ultrasound prior to further demodulation.

Still referring to FIG. 3*f*, it is well-known that ultrasound is used for medical applications, where controlling unwanted reflections is critical. For these purposes, one company Acoustic Polymers Ltd. of Churcham, England, produces a special polyurethane rubber material specifically designed to absorb ultrasonic sound frequencies ranging from 20 kHz to 10 MHz, with reductions measured in the significant range of 30 dB to 40 dB, that is 1,000 to 10,000 times reduced. This material has a minimal thickness of 14 mm (roughly 0.5 inches) and can be cut into various geometries. In their paper entitled Sound-Absorbing and Insulating Enclosures for Ultrasonic Range, authors Andrzej Dobrucki, et. al. describe their research and findings that include a comparison between polyurethane based materials versus well-known Ecophon™ and specially produced boards of ceramic fibers. Their test results showed that for frequencies in excess 30 kHz, the polyurethane material provide the best absorption while both the polyurethane and ceramic tiles where roughly equivalent as best absorbers between roughly 6 kHz to 30 kHz, and the ceramic tiles were the best absorbers below 6 kHz. It is herein noted that the polyurethane layer tested by Dobrucki had a thickness of 1 cm (roughly 0.4 inches and similar to the Acoustic Polymers product.) It is preferred that first absorbers such as seats 52 and the floor area surrounding seats 52 are further adapted to include an ultrasonic absorbent material such as AptFlex F28 as sold by Acoustic Polymers or a similarly constructed polyurethane material, where serving as first absorbers they are positioned to absorb the highest of the emitted ultrasound frequencies above 30 kHz. It is further anticipated that using either or both of the polyurethane materials or ceramic tiles as described by Dobrucki as absorbers for any of the auditorium walls 70, it is possible to significantly absorb all remaining unwanted ultrasonic frequencies as well as unwanted audible frequencies. As the careful reader will see, with a well-known estimated average movie theater seating of 200-300 viewers, by adding the preferred modulated ultrasound, it is very desirable to then also provide for the prevention and/or absorption of all unwanted reflections, where frequencies of particular concern are the higher more energetic frequencies above the audible range that are known pass through more traditional audible frequency absorbers such as fabrics or EcoPhon.

Referring next to FIG. 4*a*, there is shown a device and information flow diagram depicting a preferred embodiment of the present invention 100, including a content controller 18, 4 content sources 26 including 26-1, 26-2, 26-3 and 26-4, a video output device 23, any of system eye glasses 14, any of system private speakers 16, any of system public speakers 17, any of system content selectors/game interface 19, an internet connection/wi-fi router 24 connecting to a content delivery network 28 and a physical/virtual game board 11, where game board 11 was the subject of the copending application entitled PHYSICAL-VIRTUAL GAME BOARD AND CONTENT DELIVERY SYSTEM. As to be discussed in relation to upcoming FIGS. 4*b*, 4*c*, 4*d*, 4*e*, 4*f*, 4*g* and 4*f*, there are many possible implementations of a system content controller 18, just as there are various implementations for each of the depicted devices especially including video device 23, eye glasses 14, private speakers 16 and content selector/game interface 19. In all implementations, any system controller 18 provides at least one of well-known and sufficient input port connections such as HDMI for accepting video-audio. As is also well-known, the content source may connect to the any controller 18 using various wireless means such as well-known wireless dongles or what is known as wi-fi direct, where both the content source and the content controller 18 are connected to a shared network using for example a wi-fi router 24 over which they exchange data. As those familiar with computing devices will understand, controller 18 in any configuration includes computing elements sufficient for detecting the presence of content source 26 input on any of the provided input ports. One of the key functions of any controller 18 is act as what is generally known as a multiplexer by: 1) identifying to the content source 26 that the controller 18 is able to receive any of: a) a conventional 2D tv signal, b) a conventional 3D tv signal, or c) a multi sub-channel tv signal as herein defined; 2) providing a user interface for identifying which of any and all input ports are connected to a content source 26, preferably including any available identification such as "Dish," "Kris IPAD," "David PC," "PlayStation4," etc., and 3) allowing the user to select any of the available input ports/content sources 26 to be directly connected in a well-known pass through mode to the video device 23.

Another key function of any system controller 18 is to pair with or otherwise allow the registration of a multiplicity of active eye glasses 14 such as 14-*as*, 14-*as-pp*, 14-*ap* or 14-*as-ap*, where the controller 18 preferably includes some form of persistent storage such as a solid state drive or non-volatile memory for at least saving information regarding all paired devices such as eye glasses 14 or any of private speakers 16, all as will be well understood to those familiar with the art. Preferably, for each paired eye glasses 14, any controller 18 also accepts and maintains a name, such as "Kris" or "David," for association with the active glasses 14. As will also be well understood, using the communications means and path available for pairing such as Bluetooth, glasses 14 are also able to provide an indication to any controller 18 if glasses 14 include integrated private speakers 16-1. Any controller 18 is also able to pair with wireless connected private speakers 16, where each of connect private speakers such as included in or projecting onto a chair 50, 51 or 52, are also preferably associated with a name, such as "Dad's Chair," or "Mom's Chair." It is also possible that any controller 18 provides output to an audio system, where the audio system maintains and controls the connections to the various private speakers 16, and where any controller 18 is capable of providing audio signals sufficiently encoded for the audio system to thereby control which of audio sources input to any controller 18 are then also output to a given private speaker(s) 16 by the audio system, all as will be well understood by those familiar with audio systems.

All content controllers 18 are capable of connecting with and providing video-audio to at least one video device 23, where any controller 18 further acts as a mixer by: 1) presenting the user with a list of available video devices 23, including at least one indication of either a 2d or 3d tv/display/projector, where for example an indication is: "TV1—2d," or "TV1—3d," or "TV1—3d; TV2—2d"; 2) either automatically selecting or allowing the user to select an video device 23 output source and available sub-channel, e.g. "TV1—2d/sub-channel 1" or "TV1—3d/sub-channel 4," where the sub-channels are any of the herein defined temporal, spatial or temporal-spatial sub-channels; 3) providing a list of sub-channels for a selected video device 23 output source, showing any content source 26 already assigned to the video device 23 sub-channel, or otherwise allowing the user to add, delete or change the content source 26 assigned to any given video device 23 sub-channel, e.g. "TV1—2d/sub-channel 1/Settop Box" or "TV1—3d/sub-channel 4/Kris IPAD"; 4) providing a list of all paired eye glasses 14, where for a selected paired eye glasses 14, showing any content source 26 already assigned to the paired glasses 14, or otherwise allowing the user to add, delete or change the content source 26 assigned to the paired glasses 14, e.g. "David/David PC", and 5) providing a list of all connected private speakers 16, where for a selected private speaker 16, showing any content source 26 already assigned to the private speaker 16, or otherwise allowing the user to add, delete or change the content source assigned to the private speaker 16, e.g. "Dad's Chair/Dish," where after any controller 18 then: a) provides to the selected video device 23 output sub-channel the assigned content source video as provided by the content source 26 preferably sufficiently up-scaled or down scaled by the any controller 18 processing to fit the resolution of the assigned output sub-channel; b) provides control signals sufficient for operating either or both of the temporal channel filter 14-*tcf* and/or spatial channel filter 14-*scf* included within the any and all assigned active glasses 14, such that the any and all assigned active glasses 14 controllably filter only the assigned content source 26, and c) provides to the selected any private speakers 16 the assigned content source audio as provided by the content source 26.

Figure 4H:
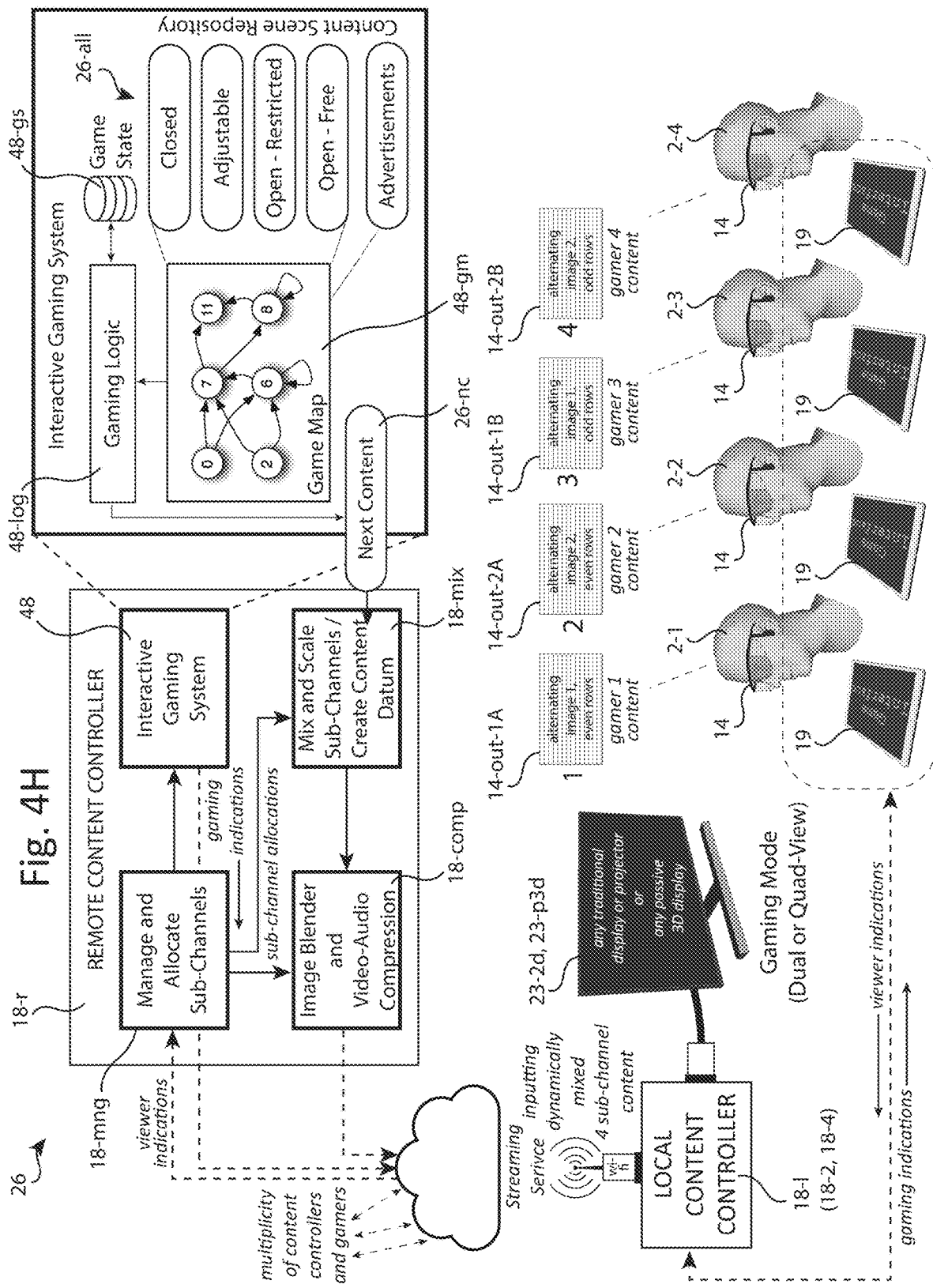
FIG. 4h depicts the relationship between a content source 26 that comprises a remote content controller 18-*r* for providing dynamically mixed multi sub-channel content and a local content controller 18-1 capable of providing multiple distinct temporal, spatial or temporal-spatial sub-channels such as 14-*out*-1A, 14-*out*-1B, 14-*out*-2A and 14-*out*-2B to multiple viewers such as 2-1, 2-2, 2-3 and 2-4, respectively, through any traditional display or projector 23-2*d* or any passive 3d display or projector 23-*p*3*d*. Remote content controller 18-*r* further comprises: manage and allocate sub-channels part 18-*mng*, interactive gaming system part 48, mix and scale sub-channels/create content datum part 18-*mix* and video-audio compression part 18-*comp*. Interactive gaming system part 48 further comprises gaming logic 48-*log*, game state 48-*gs*, a content repository for holding scenes 26-*all*, and a game map 48-*gm* such that gaming system 48 receives viewer indications for use at least in part to select and provide next content 26-*nc* to mixing part 18-*mix*, where final mix with gaming indications is provided to local content controller 18-1 for provision on any of the multiple sub-channels to any of the multiple viewers. Each of viewers 2 interact with a content selector 19 capable of receiving gaming indications and providing viewer indications from and to local controller 18-1 and therefore also from and to remote controller 18-*r*. The depicted function is referred to as gaming mode.

Still referring to FIG. 4*a*, a system content selector 19 is preferably provided with content controller 18 as a remote control, using any of well-known apparatus and methods. As to be further discussed with respect to upcoming Figures, it is also desirable that the system 100 provides an option for a user to download a selector app for a computing device such as a smart phone or tablet, all of which will be well-known to those skilled in the art, where the software app selector 19 preferably communicates wirelessly over the wi-fi router 24 with the content controller 18. As will also be discussed further in relation to FIGS. 4*h*, 8 and 9*c*, in other gaming embodiments of the present invention the software app selector 19 further includes a game interface that is a part of an interactive gaming system. In one of these gaming embodiments, system 100 includes the use of the copending physical/virtual game board 11 that for example allows viewers to play a board game where the movement of the pieces is tracked and provided to the interactive gaming system for at least in part determining video content to be provided on a given video device 23 output sub-channel (see FIG. 8.)

And finally, with respect to the list of any video devices 23, it is preferred that any content controller 18 determine (for example by requesting EDID from the video device 23) or otherwise receive (for example from the user through the selector 19 interface) device type datum regarding the specifications of the video device 23 including any of: 2d, 3d active, 3d passive, screen size, resolution and distance to viewer, where the any content controller 18 uses at least in part any of the device type datum for determining the translation of video input from a content source 26 to be output to a selected video device 23 sub-channel. It is further preferred that any content controller 18 allows the user to specify temporal-spatial details regarding any given video device 23 sub-channel, where temporal-spatial details includes information regarding output pixel resolutions and frame rates, such that it is possible that a user can configure a first video device 23 sub-channel to be of a different spatial or temporal resolution than a second sub-channel, all as will be well understood by those familiar with video output devices and video translation software.

Referring next in general to FIGS. 4b, 4c, 4d, 4e, 4f, 4g, 4f and 4h there is shown a number of exemplary use cases of the present any video device 23, polarization layer 23-*ply*, 23-*ply*-2, any content controller 18 and any active eye glasses 14 providing features such as dual-view mode, quad-view mode, disguising mode, 2D or 3D content, pre-mixed sub-channels, privacy mode as well as an example gaming mode. In these Figures, any video device 23 is shown as either: 1) any traditional display or projector 23-2d that provides a temporal sequence of images without any spatial polarization and is therefore capable of at least dual-view mode using 2 temporal sub-channels such as 1 and 2, or 2) any passive 3d display 23-3d that provides both a temporal sequence of images for dividing into at least temporal sub-channels 1 and 2 as well as further providing two spatial sub-channels (such as right circular A and left circular B,) and is therefore capable of at least quad-view mode using 4 temporal-spatial sub-channels such as 1A, 2B, 2A and 2B. While for clarity, all controllers 18-2 and 18-4 are shown to connect to a single video device 23-2d or 23-3d, it is possible and useful that for example two or more any video devices 23 are supported. Content controller 18 is presented as either 18-2 that supports dual-view mode using two temporal sub-channels on any display 23-2d, or 18-4 that supports quad-view mode using two temporal sub-channels and two spatial sub-channels on any display 23-3d. All content controllers 18-2 and 18-4 are capable of supporting one to four or more input ports for connection various content sources 26, where content sources 26 provide either traditional single-channel content (such as a sporting event, news broadcast or a movie,) provide 3D content with intermixed left-eye, right-eye images (see FIG. 4e,) provide what is known as dual-view content such as from a gaming console (see FIG. 4c,) or provide mixed sub-channel content as herein defined (see FIGS. 4f and 4h.) Various system eye glasses 14 are shown as exemplary and preferred, while it will be obvious to those skilled in the art which eye glasses 14 best match with a given use case.

Referring now to FIG. 4b, there is shown dual-view content controller 18-2 receiving input from two content sources 26 for allocation and mixing into two temporal sub-channels 14-*out*-1 and 14-*out*-2, where each input is a traditional single channel. For example, input source one is a settop box connected to controller 18-2 using an HDMI cable and input source two is a pc connected to controller 18-2 using a wireless dongle (or a wifi direct connect link,) all as is well-known in the art. Video device 23-2d is any traditional display or projector. In a dual-view mode of operation, controller 18-2 receives and decodes the full frame rate (e.g. approximately 24-30 fps) from both sources 1 and 2, where based upon determined allocation of video sources 1 and 2 to the video device 23 sub-channels, controller 18-2 for example substantially divides the available refresh rate of the video display 23 to presenting a sampling of the input video frames from both source 1 and 2, where the sampling is 14-*out*-1 and 14-*out*-2 respectively.

Those familiar with video systems will understand that there is a well-known difference between what is referred to as the frame rate of the any video source 26 and the refresh rate of the any display 23. In general, the frame rate refers to the number of distinct images per second that are contained within the stream of images comprising video source 26, where the number typically ranges from 24-30 distinct images per second but can also reach as high as 60 images per second. These images are typically decoded or otherwise determined from the input stream of source video images and then transformed into an image representation in graphics memory, where the graphics memory representation is matched to the resolution of the output device 23, such that it is the graphics memory that is updated at roughly the frame rate, for example 30 fps. As is also well-known, the graphics controller can transmit the image formed in graphics memory to the video output device 23 at a given refresh rate as supported by the display 23, e.g. 60, 120, 240 or even 480 refreshes per second. The preferred content controller 18 comprises sufficient computing capacity to decode all input sources forming a separate graphic memory image for each next video frame provided by each input source 26. When providing a temporal sub-channel, the preferred content controller 18 equally divides the video refresh rate between displaying images from source 1 versus source 2. For example, if the video device 23 has a refresh rate of 120 Hz, then the controller 18-2 allocates substantially 60 Hz to the refreshing of source 1 images and 60 Hz to the refreshing of source 2 images. It is further preferred that controller 18-2 sample each single image from each of the video sources at least once and preferably at an equal rate per image frame. For example, with 120 refreshes per second divided across the sampling of 30 source 1 images per second as well as 30 source 2 images per second, it is most desirable that the controller 18-2 allocates 2 refreshes per each distinct image frame from each of sources 1 and 2, where 2 refreshes=120 total refreshes/(30 images from source 1+30 images from source 2). There are significant protocols already established and well-known for the allocation of frame rates to refresh rates, where again, what is most desirable is that each distinct image provided by an input source 1 is decoded and sampled (i.e. provided to the viewer 2 as a refreshed image) at least once, but in general at a substantially equal amount refreshes to all other image frames from all sources 26.

Still referring to FIG. 4b, controller 18-2 additionally provides control signals to paired eye glasses such as active shutters 14-*as* being worn by a viewer 2-1 that correspond to the timing of the source 1 image refreshes to display 23-2d, thus allowing glasses 14-*as* to controllably limit viewer 2-1 to only receiving the source 1 image refreshes. Likewise, controller 18-2 additionally provides control signals to paired eye glasses such as 14-*as* being worn by a viewer 2-2 that correspond to the timing of the source 2 image refreshes to display 23-2d, thus allowing glasses 14-*as* to controllably limit viewer 2-2 to only receiving these source 2 image refreshes. As will be well understood those familiar with polarization optics, while any of active system glasses 14-*as-pp* or 14-*as-ap* are capable of temporal filtering, they require that light emitted by display 23-2d pass through at least 1 linear polarizer, where if the emitted light is for example un-polarized, it will be attenuated by at least 50% by the linear polarizer, all as is well-known in the art. While the present Figure depicts viewer's 2-1 and 2-2 as wearing eye glasses 14-*as*, it should be understood that any system eye glasses 14 capable of temporal channel filtering 14-*tcf* are sufficient.

Referring next to FIG. 4*c*, there is shown quad-view content controller 18-4 receiving input from 3 content sources 26 for allocation and mixing into 4 temporal-spatial sub-channels 14-*out*-1A, 14-*out*-1B, 14-*out*-2A and 14-*out*-2B, where inputs 1 and 2 are receiving traditional single channel source video while input 4 is receiving what is known as dual-view video, for example as output by a gaming device such as a PlayStation. For example, input source 1 is a settop box connected to controller 18-2 using an HDMI cable, input source 2 is a pc connected to controller 18-2 using a wireless dongle (or a wi-fi direct connect link,) and input source 4 is game system connected to controller 18-2 using an HDMI cable, all as is well-known in the art. Video device 23-3*d* is any traditional passive 3d display, where a passive 3d display is typically constructed to output ever other row of pixels as right circularly polarized light versus left circularly polarized light, all as is well-known in the art, and any existing passive 3d construction is sufficient. What is important is that controller 18-4 can discover from display 23-3*d* its construction regarding the pixel arrangements associated with a first distinguishable polarization (such as all even rows) versus the pixel associated with the second distinguishable polarization (such as all odd rows.) In a quad-view mode of operation, controller 18-2 receives and decodes the full frame rate (e.g. approximately 24-30 fps) from all sources 1, 2 and 3, where based upon determined allocation of video sources 1, 2 and 3 to the video device 23 sub-channels, controller 18-2 for example substantially divides the available refresh rate and the available pixel resolution of the video display 23 to presenting a sampling of the input video frames from sources 1, 2 and 3, where the sampling is 14-*out*-1A, 14-*out*-2A, and the combination of 14-*out*-1B and 14-*out*-2B respectively.

As is also well-known in the art, dual-view video such as provided by a gaming device comprises two monoscopic images representing each of two gamer's visual experiences. As is also well-known, it is possible to provide each of these two monoscopic images in for example half-resolution for each dual-view video frame, or full-resolution for half of the frame rate. Regardless, it is possible for any controller 18, such as 18-2 or 18-4, to decode the dual-view content and form two separate images in the controller 18's graphic memory, as if the single dual-view source was in fact actually two separate single view sources. What is important to see is that any controller 18 first receives each of input sources and creates single view images in graphics memory representative of the single view intended to be output as 14-*out* to a viewer 2. If the input sources are providing only a single view, then the any controller 18 preferably creates a single corresponding graphic memory image, where the image may be up-scaled or down-scaled by the controller 18 to best fit the display resolution provided by the video device 23 and as allocated to a sub-channel by the controller 18 or the system user. If the input sources provide dual views, than the any controller 18 preferably creates two single corresponding graphic memory images, and if the input source is a quad-view (as defined at least herein,) then the controller 18 preferably creates four single corresponding graphic memory images, where upon and in any case, after all input sources images are decoded, up-scaled or down-scaled and then transferred to graphics memory, the any controller 18 then proceeds to refresh the video device 23 as herein taught.

As will be appreciated by those familiar with display resolutions and refresh rates, as well as human visual perception, what is desirable is that video device 23-3*d* is a 4k or higher resolution television with a refresh rate of 240 Hz or more, which are commonly available in today's marketplace. As prior explained in detail with respect to FIG. 4*b*, controller 18 receives the stream of video images from each of sources 1, 2 and 3 for decoding into graphics memory. As was applicable to the prior FIG. 4*b* but not discussed, it is possible that the source video such as from the settop box is provided in HD, therefore at a resolution of 1,920×1,080, whereas the output resolution of the video device 23 is at a different resolution, such as 4k or 3,840×2,160. With respect to the prior FIG. 4*b*, it would be additionally necessary for controller 18-2 to upscale the HD input image of a 1,920×1,080 resolution to match the 4k resolution of 3,840×2,160, all as is well-known in the art. With respect to the present FIG. 4*c*, this example 4k total resolution would be equally divided between the two output polarization states, thus providing 2 spatially interleaved sub-images within each single image frame, where each sub-image includes a resolution of 1,920×1,080 matching the HD input source resolution, and where it is desirable that each sub-image represents a single viewing sub-channel as provided input sources 1, 2 or 4 to be received by a viewer as 14-*out*-1A, 14-*out*-2A, 14-*out*-1B or 14-*out*-2B.

Still referring to FIG. 4*c*, in this example, controller 18-4 preferably creates both a first and a second 4k merged graphic image, where each 4k image comprises 2 spatially interleaved sub-images each representative of a spatial viewing sub-channel A and B, where the first 4k merged graphic image is to be output as the spatial combination of viewing sub-channels 14-*out*-1A and 14-*out*-1B, and the second 4k merged graphic image is to be output as the spatial combination of viewing sub-channels 14-*out*-2A and 14-*out*-2B. The pixels of each HD video image received from input source 1 are preferably evenly distributed to occupy 50% of the first 4k merged graphic image, for example occupying every even row. Similarly, the pixels of each HD video image received from input source 2 are preferably evenly distributed to occupy 50% of the second 4k merged graphic image, for example also occupying every even row.

As the careful reader will see, if the dual-view input source 4 is providing temporally interleaved HD monoscopic images, then a first decoded dual-view image will fully comprise a first monoscopic image with a HD resolution of 1,920×1,080, and as such the first monoscopic image is preferably evenly distributed to occupy the remaining 50% of the first 4k merged graphic image, for example occupying every odd row.

Likewise, a second decoded dual-view image will fully comprise a second monoscopic image with a HD resolution of 1,920×1,080, and as such the second monoscopic image is preferably evenly distributed to occupy the remaining 50% of the second 4k merged graphic image, for example occupying every odd row. However, if the dual-view input source 4 is providing spatially interleaved HD monoscopic images, then a first decoded dual-view image will 50% comprise a first monoscopic image and 50% comprise a second monoscopic image, where it is then preferable to first upscale the 50% HD resolution first monoscopic image to be full HD resolution, after which the upscaled first monoscopic image is then preferably evenly distributed to occupy the remaining 50% of the first 4k merge graphic image, for example occupying every odd row. Likewise, it is also preferable to first upscale the 50% HD resolution second monoscopic image to be full HD resolution, after which the upscaled second monoscopic image is then preferably evenly distributed to occupy the remaining 50% of the second 4k merge graphic image, for example occupying every odd row.

Still referring to FIG. 4c, as any controller 18 such as 18-4 decodes, scales and mixes the pixels from a given input video source 26 into graphics memory representative of a given viewing sub-channel for output by the target video device 23 such as 23-*p*3*d*, any controller 18 also determines timing signals associated with the temporal, spatial or temporal-spatial given viewing sub-channel for providing to any of active system eye glasses 14 such as 14-*as-pp*, 14-*as-ap*, 14-*as-pc*, 14-*as-ap-pc* that are pre-associated by the controller 18 to receive the given input video source 26, and therefore to substantially transmit and not block the given viewing sub-channel, where the timing signals are transmitted to the associated eye glasses 14 in sufficient time for the lens controller 14-*lc* to operate any of the spatial channel filter 14-*scf* or temporal channel filter 14-*tcf* substantially simultaneously with the output of the given viewing sub-channel image by the video device 23.

As those skilled in the art of video processing will understand, and as the careful reader will see, there are many possible video sources 26 with many possible resolutions for providing 1, 2 or more temporally and/or spatially interleaved monoscopic or even stereoscopic views. There are also many possible video devices 23 with many possible image resolutions and refresh rates. There are also many possible computing elements such as graphics co-processors for use within any controller 18 with many possible supported frame rates. What is preferred is that each viewing sub-channel comprise a total resolution and frame rate sufficient for creating pleasing visual images, where for example HD resolution at 60 refresh samplings of 30 image frames per second is considered to be minimally pleasing such that a preferred video device 23-2*d* for outputting only temporal sub-channels provides at least HD resolution at a 120 kHz refresh rate and a preferred video device 23-*p*3*d* for outputting only spatial or temporal-spatial viewing sub-channels provides at least 4k resolution at a 120 kHz refresh rate. As will also be appreciated, there are many possible algorithmic approaches for decoding, scaling and mixing the input source video to best comprise the in-memory graphic image pixels to be output as any given video frame on a video device 23. As such, the preferred and alternative embodiments herein disclosed should be considered as exemplary, rather than as limitations of the present invention, as for example many hardware and software processing arrangements are possible for implementing the any controller 18.

Referring next to FIG. 4*d*, there is shown any controller such as 18-2 (supporting dual-view based upon temporal sub-channels) or 18-4 (supporting quad-view based upon temporal-spatial sub-channels) including at least one input port for inputting traditional single channel content from a content source 26 such as a settop box. Using temporal sub-channels, both controller 18-2 and 18-4 can provide what is herein referred to as a disguising mode, which controller 18-4 is also capable of providing using either spatial or temporal-spatial sub-channels. The purpose of disguising mode is to allow a viewer 2-1 to watch at least a single channel of source 26 video in privacy, where any other viewer 2*o* not looking through paired glasses 14 simply sees at least a white screen, but otherwise some default or target imagery that is not indicative of the single channel 26. In disguising mode, using either controller 18-2 or 18-4, a viewer 2-1 first selects an input such as source 1, settop box, to be directed for output to a display 23-2*d* or 23-*p*3*d*, respectively. When selecting the input source 1 through the controller 18-2, 18-4, the viewer 2-1 is presented with an option for disguising mode, with an advanced option of temporal, spatial, or temporal-spatial disguising. In temporal disguising, controller 18-2, 18-4 assigns the selected input source 1 to a first temporal sub-channel 1 for providing the viewing image 14-*out*-1, while then also assigning the complimentary image 14-*out*-2 to a second temporal sub-channel 2. As controller 18-2, 18-4 receives, decodes and appropriately scales each next video frame from the input source to be disguised, the next video frame is stored as a first graphic image in computer memory, where a disguising process computes at least a complimentary image that is stored as a second graphic image. In operation, for preferably each pixel of the first graphic image, the disguising algorithm computes a corresponding complimentary pixel for each pixel of the second graphic image, where corresponding means the same row number and column number in the video frame, and where complimentary means having sub-pixels whose intensity values are set to the maximum possible intensity value less the intensity value of the corresponding sub-pixel.

For example, if the maximum intensity value any given sub-pixel can have is 255, and a given first image pixel has a red sub-pixel of value 127, a green sub-pixel of value 0 and a blue sub-pixel of value 255, then the complimentary pixel has a red sub-pixel of value 128, a green sub-pixel of value 255 and a blue sub-pixel of value 0, all as will be well understood by those familiar with image processing. As will also be understood by those familiar with human vision, by alternating the first graphic image output as viewing image 14-*out*-1 with the second graphic image output as complimentary image 14-*out*-2, the temporal combination will appear to a viewer 2*o* not wearing glasses as a half-intensity-white disguising image 23-*out-d* (depicted as light gray in the present Figure.) As the careful reader will see, if the first graphic image output as 14-*out*-1 representing the input source 1 is all black (i.e. all sub-pixels of all pixels are set to an intensity of 0,) then the complimentary image 14-*out*-2 will necessarily be all white (i.e. all sub-pixels of all pixels are set to an intensity of 255,) thus forming the half-intensity-white disguising image 23-*out-d*. Conversely, if 14-*out*-1 is all white, then 14-*out*-2 must be all black. Hence, there is no assurance that for any given next video frame from an input source 1, that any given combination of corresponding pixels in images 14-*out*-1 and 14-*out*-2 can be set to a particular combined RGB intensity value in order to create a pre-known and recognizable image for the disguising image 23-*out-d*, where for example disguising image 23-*out-d* is a clock or text providing the current weather rather than always a half-intensity-white image.

However, most viewing images 14-*out*-1 created from an on-going input source such as 1 will have contrast between pixels, meaning that the majority of viewer image 14-*out*-1 pixels will not be either black or white. Using this understanding, in at least one embodiment of the present disguising mode, controller 18-2, 18-4 includes a target disguising image for use in determining each next complimentary image 14-*out*-2 such that the perceived temporal combination 23-*out-d* of the viewing image 14-*out*-1 and the complementary image 14-*out*-2 is substantially the target disguising image rather than, for example, a half-intensity-white image. In this embodiment of the controller's 18-2, 18-4 disguising mode, there are two methods for setting for each corresponding complimentary sub-pixel, where a first method is used if a given sub-pixel of the viewing image 14-*out*-1 has an intensity value that is equal to or greater than the intensity value of corresponding sub-pixel from the target disguising image. In this first method, the corresponding sub-pixel value C of the complementary image 14-*out*-2 is set to be equal to the sub-pixel value of the corresponding target disguising image (T) less the difference between the intensity value of the corresponding viewing image sub-pixel (V) and the value of (T), written as a calculation to be: IF V>=T, then C=T−(V−T), where it is also understood that if C<0, C=0. In one example, if a red sub-pixel in the viewing image 14-*out*-1 has an intensity value of 255, and the corresponding red sub-pixel in the target disguising image has an intensity value of 55, than the corresponding red sub-pixel in the complimentary image 14-*out*-2 has an intensity value of: C=55−(255−55), resulting in C=−145, and therefore C=0, such that the temporal combination of V=255 and C=0 results in a corresponding disguising image sub-pixel (D)= (V+C)/2, hence D=127.5=(255+0)/2, which is as close to the target of T=55 as the blended V and C can achieve. In another example, if V=180 and T=120, then since V is >=T, C=120−(180−120)=60, such that the temporal combination of V=180 and C=60 results in a corresponding disguising image D=(180+60)/2=120, which is the target T.

For the preferred second method, where V<T, C=T+(T−V), where it is also understood that if C>the max intensity such as 255, C=the max intensity. For example, if V=0 and T=55, then since V<T, C=55+(55−0)=110, such that the such that the temporal combination of V=0 and C=110 results in a corresponding disguising image D=(0+110)/2=55, which is the target T. In another example where V=50 and T=220, since V<T, C=220+(220−50)=390, and therefore C=255, such that the temporal combination of V=50 and C=255 results in a corresponding disguising image sub-pixel D=(50+255)/2=152.5, which is as close to the target of T=220 as the blended V and C can achieve. As those familiar with image processing will understand, the taught first and second methods for alternatively determining the value of any given sub-pixel in the complimentary image 14-*out*-2 has many possible and useful variations. For example, the perception of a given pixel/sub-pixel comprising disguising image 23-*out-d* is affected by more than the temporal combination of the corresponding pixels/sub-pixels of viewing image 14-*out*-1 and complimentary image 14-*out*-2. Human visual perception will also tend to blend any given pixel within the temporally formed disguising image 23-*out-d* with neighboring spatial pixels of disguising image 23-*out-d*.

For example, given a pixel within the interior rows and columns of disguising image 23-*out-d*, it is well-known that each interior pixel has 8 nearest neighbors, where a nearest neighbor is any pixel with a column number that is 1 less, equal to, or 1 greater than the interior pixel, and a row value that is 1 less, equal to, or 1 greater than the interior pixel. For example, if the interior pixel is located at Row=10, Col=20, i.e. (10, 20), its nearest neighbors are: (1) (9,19); (2) (9,20); (3) (9,21); (4) (10,19); (5) (10,21); (6) (11,19); (7) (11,20) and (8) (11,21). The nearest neighbor determination is flexible, and can be decreased to only those pixels sharing a border with the given pixel (which from the last example would be the 4 pixels of: (1) (9,20); (2) (10,19); (3) (10,21); and (4) (11,20)), or increased to any pixel with a column number that is within 2 less to 2 greater than the interior pixel, and a row value that is within 2 less to 2 greater than the interior pixel. What is important to see is that when setting a given complimentary pixel it is determined that C either is less than 0 or greater than the maximum intensity such as 255, then the corresponding D pixel/sub-pixel will be more intense or less intense, respectively, than the desired intensity of the target T. As those familiar with image processing will understand, it is at least possible to then alter the first and second methods for the neighboring pixels to essentially further decrease intensity or increase intensity, respectively, where the altered methods cause neighboring pixels that work to adjust the perceived color and intensity of the entire group of neighbors to best match that same group in the target image T.

Still referring to FIG. 4*d*, the use of spatial sub-channels is possible for a controller 18-4 providing output to any passive 3D display, all as previously discussed. Given spatial sub-channels, is it possible for the disguising algorithm to provide a viewing image such as 14-*out*-1 to a first spatial sub-channel, such as A, while then also providing the complimentary image to a second spatial sub-channel B, where both A and B are for the same temporal frame, all as will be well understood from a careful reading of the description of the present FIG. 4*d* considering the prior FIG. 4*c*. For example, in reference to FIG. 4*c*, the viewing sub-channel 14-*out*-1A could be assigned to the viewing image V to be seen by a viewer 2, while the viewing sub-channel 14-*out*-1B could be assigned to the complimentary image C, where the simultaneous spatial combination of 14-*out*-1A (V) and 14-*out*-1B (C) form the combined disguising image 23-*out-d* (D). Given a 4k passive 3d display 23-*p3d*, and an HD input 1 source 26 such as a settop box, each next video frame received from source 26 is decoded, scaled and fit into the appropriate pixels representative of the spatial channel A as supported by device 23-*p3d*, where for example the appropriate pixels are all even rows that are output with a right circular polarization. In the case of spatial images A and B within the same temporal image frame, the function of the disguising algorithm is like that prior described for temporal sub-channels, except that the definition of corresponding pixels is altered.

As will be apparent to those skilled in the art of image processing as well as human visual perception, if a viewing image V, such as provided on a spatial sub-channel 14-*out*-A (not depicted) or temporal-spatial sub-channel such as 14-*out*-1A (see FIG. 4*c*,) comprises for example all the pixels in even rows of the output image, it is possible to create corresponding pixels from within all of the odd rows. Considering a viewing image V pixel from an interior row and column, such as row=12, column=10, it is preferable to consider the pixels directly above and below the V pixel as corresponding, e.g. either row=11, col=10 or row=12, col=10. Therefore, in a first spatial disguising embodiment, assuming that the first row of pixels in an image frame is for row=0, which is even, then a corresponding pixel is defined as the pixel in the same column but the next higher number row, i.e. in this case row=1. In a second spatial disguising embodiment, the corresponding pixel is defined as two pixels, where both the first and second corresponding pixels are in the same column as the V pixel (such as column=10,) but where the first corresponding pixel is in the next lower number row, such as row=11, and the second corresponding pixel is in the next higher number row, such as row=13: hence, if the V pixel=(R12, C10) then the first corresponding pixel is (R11, C10) and the second corresponding pixel is (R13, C10).

As will be clear from this example, for spatial disguising it is possible to have a complimentary image C pixel that corresponds to 2 viewing image V pixels, e.g. complimentary image C pixel located at (R13, C10) corresponds to both a first image V pixel (R12, C10) and a second image V pixel (R14, C10). In summary, for the first spatial disguising embodiment there is only 1 V pixel for consideration when determining the R, G, B sub-pixel intensity values of a corresponding C pixel, while in the second spatial disguising embodiment there are potentially 2 V pixels for consideration when determining the R, G, B sub-pixel intensity values of a corresponding C pixel, where potentially means that in the special cases where either the first row or the last row of an image is considered to be a complimentary row (e.g. an odd row,) than any pixel in these special cases will have only 1 corresponding V pixel, whereas in all other complimentary rows each complementary row pixel will have 2 corresponding V pixels.

Still referring to FIG. 4d, at least for use in the second spatial disguising embodiment, whenever there are 2 V pixels corresponding to a given C pixel, it is preferred to first average the R, G, B sub-pixel intensities of the 2 V pixels prior to executing any method for determining the R, G, B sub-pixel intensity values of the 1 corresponding C pixel. For example, if a first V pixel located at (R12, C10) has a red sub-pixel with an intensity of 200 while a second V pixel located at (R14, C10) has a red sub-pixel with an intensity of 220, then it is preferred that the average of 210=(200+220)/2 is used as the red sub-pixel V intensity when determining the red sub-pixel value of the corresponding C (R13, C10) pixel. Furthermore, as will be evident to those skilled in the art of image processing, when using a quad view embodiment of the present invention, it is possible to combine the benefits of both temporal and spatial disguising, where for example in reference to FIG. 4c, a viewing image V could be chosen as 14-*out*-1A, with complimentary images C being both spatial, i.e. 14-*out*-1B and temporal 14-*out*-2A, where it is then also further possible to include the remaining sub-channel of 14-*out*-2B as a complimentary image as well. As those who are both skilled in the art of image processing and aware of the limitation of human visual perception will understand, there are many possible methods for determining any one or more complimentary images C for display on either temporal, spatial, or spatial temporal sub-channels that will combine with one or more viewing images V for display on either temporal, spatial, or spatial temporal sub-channels to form a disguised image D 23-*out*-d, where the disguised image D 23-*out*-d can be further influenced by a target image T, and where the target image T can be a single image that does not change from video frame to video frame, or can be a continuous set of images such that the target image T is itself a video sequence perceptible to the naked eye 2o.

As those familiar with display and projection technology will understand, advancements in pixel resolution, frame rates and refresh rates are expected to continue to advance, for example reaching and exceeding 16k displays with 480 Hz refresh rates and video graphics display processors capable of providing 240 or more frames per second. As the careful reader will see, using a herein taught active polarization layer such as 23-*ply* of FIG. 2a, it is possible to limit the total number of pixels in a given spatial sub-channel such as A, e.g. right circularly polarized pixels, to some sub-set of the total pixels being output by a given video display 23, where the sub-set does not have to be the 50%-50% ratio output by a traditional passive polarization 3D display or projector. Given these advancements and the advantages of the present invention, it is possible to increase the disguising of a viewing image V inside of a public seen image 23-*out*-d. For example, in any given square area of a display, as the display resolution doubles, the square pixels per that area increase by a factor of 4. This means that in the same square area, such as 1.35 mm×1.35 mm of a display, that contains a single HD resolution pixel, it is possible to fit 4 pixels of 4k resolution, 16 pixels of 8k resolution and 64 pixels of 16k resolution. Given the present teachings of an active polarization layer such as 23-*ply* or any of its alternatives, it is also possible that any number or combination of the increased pixels fitting in the same square area of a single HD pixel can be set for an A versus B spatial sub-channel, and hence set for comprising a first spatial sub-channel image such as 14-*out*-1A versus a second spatial sub-channel image such as 14-*out*-1B (see FIG. 4c,) where the first image is for example a V viewing image to be transmitted to a viewer 2 and the second image is a complimentary image to be combined with the first image for creating a disguising image D for the naked eye 2o (as depicted in the present FIG. 4d.)

As is well-known to those familiar with human visual acuity, there is a "detection" limit to the smallest spot or thinnest line that can be seen against a bright or dark background as well as a "resolution" limit to the smallest gap between spots or lines that can be seen, where these limits begin to be reached on the order of 1 arc minute, where an arc minute is $\frac{1}{360}^{th}$ of a degree. As a matter of comparison, for a 65" display measuring 56.7" in width being viewed at a distance of 10 feet, a single arc minute on the surface of the display would include an area of approximately 1.35 mm×1.35 mm that would include roughly 1 HD pixels, 4 4k pixels, 16 8k pixels or 64 16k pixels. As is also well-known, human visual acuity is adversely affected by blurring, where blurring can be caused by reducing the contrast between any two neighboring pixels. Hence, as the number of pixels per square area of a display are increased, using an active polarization layer such as 23-*ply* any combination of these increased pixels can be assigned to either spatial sub-channel A or B, such that it is possible to dynamically affect and maximize the amount of blurring of any given A pixel that is interspersed between B pixels as perceived by the naked eye 2o, where blurring is a reduction in contrast between any to contiguous pixels.

For example, with 4 4k pixels, assume 1 4k pixel is dedicated to sub-channel A comprising the viewing image V, while the remaining 3 pixels are dedicated to sub-channel B comprising complimentary image C. Also assume that the total R, G, B sub-pixel luminous intensity being emitted by the 1 4k pixel A is equal to red=200, green=100 and blue=150 and that the luminous intensity per pixel on any display is substantially proportional to the output surface area of the pixel, where for example 1 4k pixel is 4 times the surface area of 1 8k pixel and therefore roughly emits 4 times the luminous intensity. Given these assumptions, and switching from an 4k display to an 8k display, it will be necessary to choose roughly $\frac{1}{4}^{th}$ of the 16 8k pixels to output red=200, green=100 and blue=150 in order to substantially match the luminous intensity of the 1 4k pixel dedicated to outputting image V. As a careful consideration will show, these 4 8k pixels dedicated to sub-channel A for outputting the same red=200, green=100 and blue=150 as the 14k pixel, may then be more thoroughly dispersed amongst the remaining 12 8k pixels comprising sub-channel B, as compared to dispersing 1 4k pixel between only 3 other 4k pixels. Furthermore, while it is desirable that all the 4 8k pixels assigned to sub-channel A output the same red=200, green=100 and blue=150, it is possible to vary the R, G, B intensity values of the surrounding 12 8k pixels assigned to sub-channel B, thus creating smoother color gradients further increasing the blurring of the A sub-channel to the naked eye 2o, all as will be well understood by those familiar with image processing and human visual perception.

Still referring to FIGS. 4c and 4d, in an alternate embodiment using quad-views, the viewing image V is assigned to a first temporal-spatial sub-channel such as 14-*out*-1A while the complimentary image C is assigned to a second temporal-spatial sub-channel, where the second sub-channel is of the same spatial channel (i.e. A) but of a different temporal sub-channel, e.g. 2, such that in this example the second sub-channel is 14-*out*-2A. In this alternate embodiment, the corresponding pixels between the image V and image C are those of the same row and column address, where any of the prior methods for assigning R, G, B sub-pixel intensities to each corresponding image C pixel are acceptable. What is different is that the pixels of the remaining two temporal-spatial sub-channels, i.e. 14-*out*-1B and 14-*out*-2B, are set to their corresponding pixels in the target image T, where corresponding also means of the same row and column address. As the careful reader will see, using a passive 3D display 23-*p*3*d* that essentially limits each spatial sub-channel A and B to 50% of the total resolution, the disguising image 23-*out*-*d* will comprise 50% of the exact same pixels as the target image T, while the remaining 50% of pixels will at the very least be half intensity white with the effect of slightly brightening or darkening the perception of the target image T based upon the comparative difference between any given portion of image T and half intensity white. Using a display 23 with for example a 4k, 8k or higher resolution that is modified with a polarization layer such as 23-*ply*, as previously discussed, it is then also possible to change the spatial ratio of A to B pixels within a given temporal sub-channel from something other than the fixed 50%-50% ratio of a well-known passive 3d display, such that by changing the ratios in favor of the complimentary sub-channel B, it is possible to further disguise the viewing image V output on spatial sub-channel A.

As those skilled in the various arts and the careful reader will see, the present teachings provide significant opportunities for outputting a viewing image V on any of a first temporal, spatial, or temporal-spatial sub-channel to be transmitted to a viewer 2 wearing appropriately matching eye glasses, where at least one of any remaining temporal, spatial or temporal spatial sub-channels are then dedicated to a complimentary image, such that the naked eye 2*o* seeing the combination of output sub-channels 23-*out*-*d* perceives an disguising image D that is substantially different from the viewing image V, where it is also then possible that the complimentary image(s) C are set to further cause the perception of disguising image D by the naked eye 2*o* to appear substantially like a target image T. Therefore, the present embodiments and alternative embodiments of the present invention should be considered as exemplary rather than as a limitation to the present invention, as many variations and alterations are possible and anticipated without departing from the teaching herein.

Referring next to FIG. 4*e*, there is depicted any controller 18 such as 18-2 or 18-4 for use in outputting dual-view or quad-view sub-channels, respectively. FIG. 4*e* is similar to FIG. 4*c* as follows. The present figure depicts three input sources 1, 2 and 4 providing sufficient content to controller 18-4 for determining and providing four temporal-spatial sub-channels, where input source 4 comprises 2-view mixed content that is decoded, separated and provided to two distinct sub-channels. Also, input source 1 is depicted as a settop box providing sporting event content that is output by controller 18-4 as 14-*out*-1A. FIG. 4*e* is different from FIG. 4*c* as follows: (1) input source 2 that is a PC providing a streaming movie is being routed by controller 18-4 to sub-channel 14-*out*-1B, rather than sub-channel 14-*out*-2A; (2) the 2-view mixed content is being provided from a DVD player rather than a gaming system such as PlayStation; (3) the 2-view mixed content represents two stereoscopic (left-eye/right-eye) views rather than two monoscopic views (such as for 2 gamers each seeing their own scene in the 1$^{st}$ person), and (4) controller 18-4 provides the 2-views determined from the stereoscopic content on two different spatial sub-channels (A and B) for the same temporal sub-channel (2), hence 14-*out*-2A and 14-*out*-2B, rather than on the same spatial sub-channel (B) for two different temporal sub-channels (1 and 2), hence 14-*out*-1B and 14-*out*-2B.

Still referring to FIG. 4*e*, as will be appreciated by those familiar with 3d movie apparatus and methods, the two left-eye and right-eye stereoscopic images could be provided by any controller 18 to a viewer such as 2-3 on any combination of temporal, spatial, or temporal-spatial sub-channels based upon the type of display 23-2*d* or 23-*p*3*d*. As will also be appreciated, it is possible for any controller 18 to provide any first video content received from a first video source 26 to any left or right eye lens of any active system glasses 14 on any first assigned temporal, spatial or temporal-spatial sub-channel. Furthermore, it is possible for any controller 18 to switch from the first video content to a second video content being received from the same first video source 26 while still being provided on the first assigned sub-channel, where for example the first video content is a first monoscopic or stereoscopic view, and the second video content is a second monoscopic or stereoscopic view. It is possible for any controller 18 to switch from the first video content being received from the first video source 26 to a second video content being received from a second video source 26 while still being provided on the first assigned sub-channel, where for example the first video content is a sporting event being provided by a settop box and the second video content is a movie being provided by or through a PC. It is also possible for any controller 18 to switch from the first assigned sub-channel to a second assigned sub-channel at any time prior to or during the output of the given first video content, for example switching from 14-*out*-2B to 14-*out*-1B or 14-*out*-1A, such the viewer 2 receives the same first video content but now on a different second sub-channel with substantially no perception of the switch. It should also be well understood from a careful reading of the present invention that switching a sub-channel means to cause the current first video content to stop being provided on the first assigned sub-channel and to substantially simultaneously start being provided on the second assigned sub-channel, where switching includes determining and providing different control signals to any active system eye glasses 14 assigned to the first current sub-channel such that the glasses 14 then properly filter and transmit to the viewer 2 the second different sub-channel.

Referring next to FIG. 4*f*, there is depicted any controller 18 such as 18-2 or 18-4 for use in outputting dual-view or quad-view sub-channels, respectively. FIG. 4*f* is similar to FIG. 4*e* as follows. The present Figure depicts a controller 18-4 providing 4 sub-channels comprising 14-*out*-1A, 14-*out*-2A, 14-*out*-1B and 14-*out*-2B. FIG. 4*f* is different from FIG. 4*e* as follows: the video content for providing each of the 4 sub-channels is being received from a single input 1 source 26, such as a settop box inputting pre-mixed 4 sub-channel content, rather than 2 input sources 26 each providing video content sufficient for a single sub-channel and 1 input source 26 providing video content sufficient for 2 sub-channels. One anticipated example of pre-mixed 4 sub-channel content is for a live sporting event, where multiple perspectives are provided such as: 1) a home team perspective, 2) an away team perspective, 3) a coaching/training perspective, and 4) a key play with analysis perspective.

As will be well understood by those skilled in the art of video content providers, the vast majority of video content as well as the means and apparatus for capturing the video content is at the HD quality level, with some content available for the 4k quality level. As will also be appreciated, the entire content delivery system is focused on what is herein referred to as a "single traditional channel" paradigm, for which a viewer 2 is responsible for selecting the single traditional channel after which the many necessary system apparatus and methods are responsible for providing the single traditional channel. Given this entrenchment in the single traditional channel paradigm, allowing a viewer to move between multiple perspectives of a single on-going event is problematic. For example, currently all viewers 2 set to select a single traditional channel receive and view the exact same video, video frame by video frame, precluding the idea of allowing any individual viewer to switch to a different perspective while remaining in the same single traditional channel. Given the increased transmission capacities of fiber optics and satellite and cellular systems as well as the increased display capacity of 4k and greater displays, it is possible to provide two to four pleasing video sub-channels by for example pre-mixing two to four different HD video-audio content to be delivered to any system controller 18, where the any system controller 18 first identifies the provided content as pre-mixed content, second decodes the pre-mixed content back into the two to four different HD video-audio content, and then third provides any of the two to four different HD video-audio content to a viewer 2 via a selected viewing sub-channel.

Still referring to FIG. 4*f*, it is anticipated that a single viewer 2 of a video device such as 23-2*d* or 23-*p*3*d* will have a system controller such as 18-2 and 18-4, respectively, for which a single content source 26 such as a settop box will be inputting pre-mixed two or four sub-channel content. Controller 18 is capable of:

1) receiving and operating upon any pre-mix of sub-channel content, for example a four sub-channel mix, regardless of the connected display type, i.e. dual-view capable display 23-2*d* or quad-view capable display 23-*p*3*d*;
2) decoding any of the multiple sub-channels and preferably using information provided by the content source 26 or otherwise determining and automatically selecting one of the multiple sub-channels as the default sub-channel, where the controller 18 then outputs the decoded default sub-channel to an output port 18-*o*, and where if a display such as 23-2*d* or 23-*p*3*d* is connected to the output port 18-*o* then the default sub-channel is displayed to the viewer 2-1 in full spatial and temporal capacity as if the default sub-channel was a traditional single channel where the viewer 2-1 is not required to wear any of system eye glasses 14;
3) scaling any of the decoded sub-channels such as the default sub-channel prior to providing the sub-channel video to the output port 18-*o*;
4) switching the current default sub-channel to a new default sub-channel at any point during the on-going receiving and display of video from the pre-mixed video content source 26, where controller 18 preferably receives or determines a new default sub-channel selection from viewer 2-1 and then stops outputting the current default sub-channel to the output port 18-*o* and starts outputting the new default sub-channel to the output port 18-*o*;
5) disguising the current default sub-channel according to the teachings provided especially in relation to prior FIG. 4*d*, where upon disguising the default sub-channel the viewer 2-1 is then required to wear any of system glasses 14 matched to the type of display 23-2*d*, 23-*p*3*d* to receive the disguised sub-channel V, and where controller 18 then optionally also provides private audio 16-*pa* to the viewer through any of the herein defined private speakers 16;
6) entering either dual-view mode or quad-view mode based upon the type of display 23-2*d* or 23-*p*3*d*, respectively, that is attached to the output port 18-*o*, where upon a second viewer that is not viewer 2-1 may select any of the available sub-channels for receiving through any of system glasses 14 matched to the type of display 23-2*d*, 23-*p*3*d* including the same sub-channel as being currently transmitted to viewer 2-1, and
7) entering 3D mode if the pre-mixed video content input from source 26 includes any of a known 3D content formats and if a second output sub-channel is available or made available at the request of the viewer such as 2-1.

Still referring to FIG. 4*f*, what is also different with respect to FIG. 4*e* is that viewer 2-1 is depicted as providing indications to any controller 18 through a content selector 19, where the selector 19 can be any of external selection devices such as a mobile device running an app (depicted as a cell phone,) or a remote control. As will be apparent to those skilled in the art of content, there are virtually limitless possibilities for transforming traditional single channel video-audio content into pre-mixed video-audio content as herein described such that the present examples including a 4-perspective sporting event should be considered as exemplary, rather than as limitations to the present invention. As also described herein, the present invention provides novel apparatus and methods for supporting new types of adjustable stories, where the adjustable stories are anticipated to include multiple concurrent sub-channels during at least some portion of their content duration (see FIGS. 9*a*, 9*b*, 9*c* and 10*c*.) The present inventor will also shortly describe new gaming opportunities that also involve multiple pre-mixed sub-channels provided by a remoted content source 26. As the careful reader will see, the any controller 18 is capable of receiving and operating upon two or more single traditional channels to determine two or more displayable sub-channels, wherein the controller 18 is further adapted to include a mixing function for combining any of two or more displayable sub-channels into pre-mixed content for storing and/or output, and wherein as least some functions of controller 18 are implemented in a remote capacity such as a cloud server for use by any of traditional single channel content sources 26 for first creating the pre-mixed sub-channel content that is then input by the content source 26 to a controller 18 for receiving and operating upon to provide multiple sub-channels to any viewer 2.

Still referring to FIG. 4*f*, as those familiar with sporting events will understand, there are often key plays where it is desirable for the viewer 2 to see these plays repeated or replayed. These replays are not the entire duration of the sporting event, but rather a segment of time within the event, captured from any one or more camera angles, where it is understood that this generalization of a segment of a show being of unique interest for selection and replay by a viewer extends beyond the present example of sports, as will be well understood by those familiar with tv, shows and movies. With respect to sports broadcasters, they are already creating multi-viewpoint replay clips for use by what is known as the production truck or room that is responsible for determining and outputting the single traditional channel, where the operators of the production room can select any of the replay segments for insertion into the single traditional channel video-audio content.

What is anticipated is that this same production room (and by generalization any production system for use by a creator of single channel content) will be further adapted to have access to a content controller 18 in some form, where the controller 18 is either remote from, or local to the production room, where any local controller 18 is either implemented on a separate computing device or as one or more programs executed on a computing device already present in the production room apparatus, and where the function of the controller 18 is to convert the traditional single channel into preferably the default sub-channel for mixing along with at least one additional sub-channel such as a segment replay sub-channel, where the two or more mixed sub-channels are then provided as a single traditional channel for inputting pre-mixed sub-channel content to a controller 18 available for use by a viewer 2 according to the teachings herein. It is furthermore anticipated that the content source 26 (for example a sports broadcaster) will additionally provide describing datum encoded with the video and audio of at least the replay segment sub-channel using any protocol for mixing non-video-audio data with video-audio data, where the describing datum along with the replay segment sub-channel is then further received by any system controller 18 that is inputting the pre-mixed sub-channel content from the content source 26, where the any system controller 18 is then further adapted to:

1) record any of received sub-channels onto any of internal or external associated memory devices such as a solid-state disk drive;
2) decode and store in association with any recorded sub-channel any describing datum as provided by the content source 26, where describing datum includes naming or other datum sufficient for identifying and assisting a viewer 2 in selecting any of one or more segments of the recorded sub-channel as well as indexing datum sufficient for allowing the controller 18 to retrieve a selected segment of the recorded sub-channel, for example from the controller 18's associated memory device, for providing as output on a selected sub-channel to a video display 23, where a segment is any duration of the recorded sub-channel including the full duration or some lesser duration, and where a segment can for example represent a replay in a sporting event, a chapter or scene in a movie, a person speaking such as giving a speech or a portion of a speech, a commercial, or any number of other possible sub-portions of the recoded sub-channel;
3) present a list to a viewer 2 of one or more selectable segments associated with a recorded sub-channel based upon the describing datum, where the list is preferably presented on any of content selectors 19, and
4) retrieve and provide a viewer 2 selected segment as video on a sub-channel, including either the default sub-channel that is viewable without any system eye glasses 14 or a sub-channel that is only viewable by wearing any system eye glasses 14, where the controller 18 determines or accepts viewer 2 indications from a selector 19 for use at least in part to determine which segment of video to retrieve, and where the controller directs any private audio 16-*pa* associated with the selected and provided video to the private speakers 16 assigned to the viewer 2.

Still referring to FIG. 4*f*, as the careful reader will see, in the most general sense, the present invention 100 teaches apparatus and means for concurrently transmitting additional content mixed into the bandwidth of a single traditional channel for receiving by a device or system being used by a viewer 2 to watch the single traditional channel, where the device or system is adapted to differentiate between the additional content and the content representative of the single traditional channel, where the additional content including video-audio datum and non-video-audio datum such as describing datum is then storable on the device or system for providing access to a viewer 2 through the use of a content selector 19. In the most general sense, the present invention 100 further allows the concurrently transmitted additional content to be visualized by a first viewer 2 watching a video device 23, while a second viewer 2 alternatively watches the single traditional channel, or some other additional transmitted content output, where both viewers 2 are wearing system eye glasses 14 in communication with the controller 18 for appropriately filtering the mixed content.

Regarding controller 18's ability to store multi sub-channel content as it is being received, in a further embodiment controller 18 both automatically determines or selectively allows a given sub-channel being received and recorded to have its output to a device 23 paused and then also restarted. For example, if a viewer 2 is receiving pre-mixed multi sub-channel content from a source 26 comprising 2 sub-channels A and B, such as a sporting event being received through a settop box where sub-channel A is the traditional single channel content of the event and sub-channel B is additional content such as replays with describing datum, if a viewer 2 that is first watching sub-channel A then uses a content selector 19 to select content from sub-channel B, the controller 18 then automatically pauses the content being viewed on sub-channel A to display to the viewer 2 the selected content on sub-channel B, where after if the viewer 2 is desirous of returning to sub-channel A, the content controller 18 then automatically resumes the content of sub-channel A for display to the viewer 2. In the copending application for INTERACTIVE OBJECT TRACKING MIRROR-DISPLAY AND ENTERTAINMENT SYSTEM, the eye glasses 14 (see copending FIG. 5*d*) where described as having apparatus and methods for determining if the glasses 14 where currently being worn by a guest 2 (herein a viewer 2,) where the apparatus for example included "pads 14-*p* that are capable of sensing whether 14-frame is resting on guest 2 nose or not resting on nose," where it should be understood that any of the system eye glasses 14 as herein disclosed can be further adapted to include any of the features as described in the copending applications. Given any system glasses 14 including apparatus and methods for determining if the glasses 14 are currently being worn by a viewer 2 for example watching current content being providing by controller 18 through a video device 23, the present system 100 is further adapted such that glasses 14 communicate wearing datum indicative of the state of being worn or not worn by a viewer 2, where controller 18 at least in part uses the wearing datum to at least automatically pause the current content or restart the current content.

Still referring to FIG. 4*f*, in addition to automatically pausing and resuming the display of content to a viewer 2, the controller 18 is capable of receiving any of the well-known media control indications including pause, play, stop, fast forward, slow forward, slow backward, fast backward, skip forward, skip backward, etc. from a viewer 2 through a content selector 19, where the controller 18 that is storing the received content from a source 26 is enabled to execute the requested indication. Where is it restated that the presently described controller 18 is capable of receiving any type of content including any of traditional single channel content, in any of 2d or 3d formats, any of dual-view gaming content, or any of mixed sub-channel content as herein specified, from any one or more content sources 26, where by storing the received any content the controller 18 provides the traditional media control functions without the requirement of interfacing with any of the content sources 26, for example to request that that the content source 26 execute the media control function, such as pause or resume. It is also restated that the presently described controller 18 provides apparatus and methods for use by any content source 26 to provide any type of content comprising additional content descriptive datum, where the descriptive datum is used at least in part by the controller 18 to provide a list of selectable segments of content, where upon selection by a viewer 2 using a content selector 19 the controller 18 is capable of switching the any type of content currently being displayed to a viewer 2 in favor of the selected segment.

As will be well understood by those familiar with settop boxes, without further adaptation a settop box will display any pre-mixed sub-channel content as if it were a single traditional channel thus creating incoherent visual information for a viewer 2 as output directly on a video device 23. However, by causing the output of the non-adapted settop box to be first input to any system controller 18 for transformation prior to being output to the video device 23, it is possible to transform the incoherent visual information into coherent visual information as herein described. In another embodiment of the present system 100, a settop box is further adapted to detect at least pre-mixed content, for example including two or more mixed sub-channels where at least one of the pre-mixed sub-channels is designated as a default channel, and where the further adapted settop box decodes the pre-mix of sub-channels, selects the default channel, and provides the default channel as coherent visual information to a viewer 2 as output directly on a video device 23, comprising the full temporal and spatial capacity of the output display 23. In yet another embodiment of the present system 100, a settop box is further adapted to include any of the functions of the herein specified any controller 18, for example including the ability to support simultaneous viewing of two or more distinct sub-channels by two or more viewers 2 each wearing any of system glasses.

In still another embodiment of system 100, a traditional settop box is further adapted to receive any of descriptive datum provided with a single traditional channel, whereby the settop box at least in part uses the descriptive datum to present the viewer 2 with a list of segments of the single traditional channel currently being received, such that in addition to the normal media control indications, a viewer 2 is able to select a distinct segment of the already received single traditional channel for replay, where the settop box is further adapted to automatically store the currently received single traditional channel as a data source of the selected distinct segment to be replayed, and otherwise the settop box is further adapted to provide the replay functionality as herein described but applicable only to a single traditional channel.

Referring next to FIG. 4g, there is shown any system controller 18 being used with any polarizing display 23-*p* or non-polarizing display 23-*np* that has been further modified to include an active polarization layer 23-*ply*-2, where active polarization layer 23-*ply* was taught to provide pixel-level control over the distinguishable polarization state of any given pixel (and therefore equally controlling all of the given pixel's sub-pixels,) and where active polarization layer 23-*ply*-2 was taught to provide sub-pixel level control over the distinguishable polarization state of any given pixel, especially as described in relation to prior FIGS. 2d and 2e. The combination of a video device 23-*p* or 23-*np* and active polarization layer 23-*ply*-2 was shown to provide for both a public image 23-*out*-*m* perceivable to the naked eye 2o as some coherent image or video, as well as a coherent demodulated private image 14-*out*-*dm* as seen by a viewer 2 wearing eye glasses such as 14-7 and 14-8. As those skilled in art of at least LCD displays will understand, the total range of colors achievable in the demodulated private image 14-*out*-*m* is limited to any color with a per sub-pixel intensity that is equal to or less than the per sub-pixel intensity of the modulated public image. For instance, if the public image is full intensity white, and therefore all sub-pixels are emitting R, G, B light at for example an intensity of 256, then the private image 14-*out*-*dm* can take on any possible color in the full range of emitted light. Conversely, if the public image is zero intensity black, then the private image 14-*out*-*m* is limited to zero intensity black.

Still referring to FIG. 4g, the system 100 is operated to provide a privacy mode that is like the purposes of the disguising mode as taught in relation to FIG. 4d, where the privacy mode is only available using temporal sub-channels, whereas the disguising mode was shown to be available in using temporal or spatial sub-channels. In operation any content controller such as 18-2 or 18-4 that is inputting any type of content such as a traditional single channel from a content source 26 through a settop box is capable of providing this traditional single channel in the full temporal spatial capacity of the video device 23, including any modified video device 23-*p* or 23-*np* further adapted to comprise active polarization layer 23-*ply*-2, whereby any viewer 2 is capable of perceiving the traditional single channel as coherent information without wearing any of system glasses 14. Similar to disguising mode, any controller such as 18-2 or 18-4 provides a selection via content selector 19 whereby a viewer 2 can indicate the desire to enter privacy mode such that any of the currently display content, such as the traditional single channel or otherwise any default sub-channel, is then hidden from the perception of the naked eye 2o while simultaneously any associated audio is transformed to become private audio 16-*pa* and provided by the any controller 18-2, 18-4 to the viewer via the assigned private speakers 16, all as prior taught.

As those familiar with especially LCD technology will understand, when not in privacy mode, the any controller 18-2, 18-4 receives and decodes the video content as input from the video source 26, providing the decoded video directly to the any display 23-*p*, 23-*np*, where the video content is either a traditional single channel or a default channel in a pre-mix of sub-channels, where display 23-*p*, 23-*np* then uses the video content in a normal and well-known fashion at least in part to adjust the R, G, B or similar sub-pixel intensity levels for each pixel of the display 23-*p*, 23-*np* such that the resulting non-modulated output image 23-*out* is perceived as a coherent image of the video content, and where also the active polarization layer 23-*ply*-2 preferably remains in a non-operative state and thus applying no additional modulation of output image 23-*out*, although any additional modulation would not be noticeable to the naked eye 2*o* as is well-known. In one embodiment, when the controller 18-2, 18-4 is switched into privacy mode, controller 18-2, 18-4 provides a default all white image to the display 23-*p*, 23-*np* to be displayed as 23-*out-m*, where also controller 18-2, 18-4 provides the video content to the active polarization layer 23-*ply*-2, where the active polarization layer 23-*ply*-2 then uses the video content at least in part to adjust the R, G, B or similar sub-pixel intensity levels for each pixel of the polarization layer 23-*ply*-2 wherein such modulation of the default all white image 23-*out-m* is not perceivable to the naked eye 2 while also the resulting modulated 23-*out-m* is demodulated/analyzed by any of appropriately matched system eye glasses such as 14-7 and 14-8 to become a coherent image 14-*out-dm* of the video content. As the careful reader will note, one difference between privacy mode and disguising mode is that in privacy mode the demodulated image 14-*out-dm* can be output at the full temporal-spatial capacity of the display 23-*p*, 23-*np* capacity, whereas in disguising mode it is necessary to use at least one temporal, spatial or temporal-spatial sub-channel to provide a complimentary image C, however, privacy mode requires the further adaptation of a display 23-*p*, 23-*np* to include an active polarization layer 23-*ply*-2, whereas disguising mode can be implemented using any display 23-2*d*, 23-*p*3*d*.

Still referring to FIG. 4*g*, as will be understood by a careful reading of the present invention, in order to modulate video content for demodulation as a private image 14-*out-dm*, it is necessary to variably control the polarization state of each sub-pixel, where the variable control is for example accomplished by the use of a light value and represents any twist of linear polarization from 0 to 90 degrees, therefore 90-state-rotation, all as previously discussed and as will be well understood by those familiar with LCD technology. In embodiments of the present invention 100 supporting two simultaneous spatial sub-channels A and B, it is necessary for each entire pixel (and therefore all of the pixel's sub-pixels such as R, G and B) to take on either one of two possible distinguishable polarization states, for example 0 degrees linear rotation or 90 degrees linear rotation being 2-state-rotation, regardless of whether or not the linearly rotated light was then also passed through a quarter wave plate to produce circularly polarized light. Given the 2-state-rotational limitation required for supporting two simultaneous spatial sub-channels A and B, privacy mode must be implemented for all sub-pixels of a display 23-*p*, 23-*np* and as such in privacy mode the controller such as 18-2 and 18-4 does not also provide the option for two spatial sub-channels. However, controller 18-2 or 18-4 is still capable of providing two or more temporal sub-channels, such that privacy mode can be offered in at least either single or dual view, all as will be well understood from a careful reading of the present invention. As will also be clear, using temporal sub-channels, privacy mode can therefore be provided for a corresponding at least either one or two traditional single channels or default sub-channels, as for example input from two different content sources 26, or privacy mode can be implemented for any dual monoscopic video content provided by a content source 26 such as a gaming console (see especially FIG. 4*c*,) or any of two pre-mixed sub-channels as provided by a content source 26 such as a settop box (see especially FIG. 4*f*.)

Referring next to FIG. 4*h*, there is depicted a local controller 18-1 such as 18-2 or 18-4 for use in outputting dual-view or quad-view sub-channels, respectively. FIG. 4*h* is similar to FIG. 4*f* as follows. There is a content source 26 providing content to the local controller 18-1 such as 18-4, where the example controller 18-4 is receiving a mix of four sub-channel content that is being controllably output to four sub-channels 14-*out*-1A, 14-*out*-2A, 14-*out*-1B and 14-*out*-2B. Each viewer 2 such as 2-1, 2-2, 2-3 and 2-4 is using a content selector 19 such as a mobile device running an app to provide at least one viewer indication datum. FIG. 4*h* is different from FIG. 4*f* as follows: the video content being received is a dynamic mix of four sub-channels rather than a static mix, where dynamic means that the on-going mix of content is alterable based at least in part upon indications from any of each viewers 2, whereas in FIG. 4*f* the pre-mix of four sub-channel content was static and not alterable by any viewer 2, although once received and processed by the any controller 18-2, 18-4, any viewer 2 such as 2-1 was able to switch between any of the provided four sub-channels based at least in part upon indications from the viewer 2-1. In the present Figure, the dynamic mix of four sub-channels is being provided via a wireless connection, but more importantly a 2-way internet connection verses in FIG. 4*f* the 1-way cable connection provided by a settop box, all as will be understood by those familiar with a multiple service operator (MSO) (such as Comcast) versus and over-the-top (OTT) internet operator (such as Netflix.)

Still referring to FIG. 4*h*, as previously discussed in relation to FIG. 4*f*, any content source 26 providing a pre-mix (static or dynamic) of two or more sub-channels uses key components of a content controller 18 to create the pre-mix. In this regard, the present Figure depicts a first remote content controller 18-*r* that is capable of: 1) receiving indications from a viewer 2 such as 2-1, 2-2, 2-3 or 2-4 as provided directly by a content selector 19 or as provided by and through a second local controller 18-1 such as 18-2, 18-4 in communication with content selector 19; 2) causing at least one next content 26-*nc* to be included in at least one provided sub-channel based at least in part upon the received indications of a viewer 2, and 3) providing mixed sub-channel content to the second local controller 18-1 at least including the selected next content 26-*nc*. In the present Figure, remote content controller 18-*r* is depicted as further adapted to comprise: 1) manage and allocate sub-channels part 18-*mng;* 2) interactive gaming system part 48; 3) mix and scale sub-channels/create content datum part 18-*mix*, and 4) image blender and video-audio compression part 18-*comp*.

Manage and allocate sub-channels part 18-*mng* either receives or determines allocation datum regarding the number of sub-channels that can be supported by a local controller 18-1 based upon any video output device 23 connected to the local controller 18-1, where allocation datum includes any one of, or any combination of: video device 23 2d or 3d functions, video device refresh rate and resolution, video device display size and preferred viewing distance, maximum frames per second input to the video device, number of desired viewing sub-channels, number of currently in use viewing sub-channels, recommended or preferred output resolutions, frame rates and refresh rates, as well as any other datum herein mentioned regarding any of the provided modes of operation. Manage and allocate part 18-*mng* at least determines spatial and temporal composition datum for providing as sub-channel allocations datum to mix and scale sub-channels/create content datum part 18-*mix*, where spatial composition datum includes a target graphic image resolution as well as specification of a sub-set of pixels within the target graphic image that comprise either of spatial sub-channel A or B, and where temporal composition includes a target graphic image frame rate and sequence with respect to any and all other target graphic images. Manage and allocate sub-channels part 18-*mng* maintains an allocation table comprising the assignments of: 1) content sources to sub-channels that includes the spatial and temporal composition datum, and 2) sub-channels to viewers that includes identification and communication datum for each viewer 2's paired eye glasses 14 and private speakers 16, where the allocation table is then made available to both the mix and scale sub-channels/create content datum part 18-*mix* and the image blender and ideo-audio compression part 18-*comp*.

Mix and scale sub-channels/create content datum part 18-*mix* receives sub-channel allocations datum including spatial and temporal composition datum for use at least in part to manage one or more target graphic images in computer memory, where a target graphic image is representative of a temporal sub-channel and where a target graphic image can be sub-divided into two sub-sets of pixels forming spatial sub-channels A and B. Mix and scale sub-channels part 18-*mix* also receives next content 26-*nc* from a content repository, where for example next content 26-*nc* is determined, selected and provided by an interactive gaming system 48, where gaming system 48 either comprises or is in communication with a content repository. After receiving content 26-*nc*, mix and scale sub-channels part 18-*mix* at least in part uses any of sub-channel allocations datum to direct the mapping of any video portion of next content 26-*nc* into a target graphic image, where mapping includes determining pixel locations within the target graphic image to store either pixels or scaled pixels comprising next content 26-*nc*, where scaled pixels are either an extrapolation or interpolation of any one or more pixels comprising next content 26-*nc*, all as will be well understood by those familiar with image processing and scaling. Mix and scale sub-channels part 18-*mix* also at least in part uses any of sub-channel allocations datum to determine and provide an stream of output images to image blender and video-audio compression part 18-*comp*, where each output image is at least in part a target graphic image, and where preferably mix and scale sub-channels part 18-*mix* also provides any of audio content corresponding to any of video content represented in the determined target graphic images as well as content related datum for sufficiently describing all video and audio sub-channel content such that a receiving content controller 18-1 is capable of decoding the mix of video-audio sub-channels for provision as video on separate viewing sub-channels and audio as private audio 16-*pa* on private speakers 16 or shared audio on public speakers 17. Image blender and video-audio compression part 18-*comp* receives mixing datum comprising the stream of output images from mix and scale sub-channels part 18-*mix* along with any corresponding audio content and content related datum, where compression part 18-*comp* at least in part uses any of mixing datum to create any of well-known video-audio-data compression streams such as MPEG2, MPEG4, H.264, H.265, etc.

Still referring to FIG. 4*h*, as will be discussed in relation to upcoming FIGS. 9*a*, 9*b* and 9*c*, it is possible to remove interactive gaming system 48 from remote controller 18-*r* for execution on a separate computing device, where removed gaming system 48 provides selection datum usable at least in part to retrieve next content 26-*nc* from a content repository, where the selection datum is either provided to the remote controller 18-*r* for interacting with a content repository in order to receive next content 26-*nc* or selection datum is provided directly to the content repository in order to cause the repository to provide next content 26-*nc* to the remote controller 18-*r*. As will be discussed in relation to FIGS. 9*a*, 9*b* and 9*c*, the removed gaming system 48 can be implemented for example on a gaming device such as a Sony PlayStation or Microsoft Xbox that is local to a viewer 2 and in communications with the local content controller 18-*l*, where the gaming device including an interactive gaming system 48 interacts with one of more viewers 2 using any of viewing sub-channels as provided by local controller 18-*l*, and where interactions include providing video games including virtual environments, herein referred to as open-free scenes as determined or generated using computer processing available on the gaming device, and providing selection datum to either remote content controller 18-*r* or an associated content repository such that next content 26-*nc* is then provided to any of viewers 2 on a viewing sub-channel via local content controller 18-*l*.

As those familiar with computing systems will understand, interactive gaming system 48 in the most generalized sense is a next content 26-*nc* selector, where a next content 26-*c* selector is key component of a remote content controller 18-*r* for providing dynamically mixed sub-channels, where the next content 26-*nc* selector does not necessarily need to be implementing a game such as depicted, and where the minimal requirements of next content 26-*c* selector are: 1) receiving at least one indication from a viewer 2, and 2) selecting and optionally providing next content 26-*c* for inclusion by the remote controller 18-*r* in dynamically mixed sub-channel content based at least in part on the at least one indication. As will also be understood, next content 26-*nc* may be any form of content including video, audio, video-audio, content datum including content descriptive datum, a website or page, a link to a website or page, gaming indications for use with a local gaming system, etc. Each of the copending applications INTERACTIVE OBJECT TRACKING MIRROR-DISPLAY AND ENTERTAINMENT SYSTEM, PHYSICAL-VIRTUAL GAME BOARD AND CONTENT DELIVERY SYSTEM and INTERACTIVE GAME THEATER WITH SECRET MESSAGE IMAGING SYSTEM refer to and provide description for an interactive gaming system 48.

Still referring to FIG. 4*h*, in one embodiment, interactive gaming system 48 comprises gaming logic 48-*log*, game state 48-*gs* datum, a game map 48-*gm*, source content 26-*all* and next content 26-*nc* (see also FIG. 10*b*.) Interactive gaming system 48 preferably communicates with any of local viewers such as 2-1, 2-2, 2-3 or 2-4 through a single two-way communication path provided between the remote content controller 18-*r* and the local content controller 18-*l*, where the communication path: 1) provides viewer indications from local viewers 2 to both the remote content controller 18-*r* and the interactive gaming system 48, and 2) provides gaming indications from the gaming system 48 to the local content controller 18-1, the content selector 19 and therefore any local viewers 2. However, as will be well understood by those skilled in system communications, other communication paths are possible, such as a multiplicity of paths directly between the gaming system 48 and any individual content selector 19 being used by a given viewer 2, and what is important is that viewer indications and gamer indications are exchanged. A gaming indication includes any datum useable by local content controller 18-1 or content selector 19 at least in part for providing or updating a user interface, where a viewer indication is any datum determined or accepted by content selector 19 at least in part from the user interface, where a user interface includes any apparatus and method by which a viewer 2 may cause or provide a distinct datum including a touch screen interface, a keyboard, a mouse, a joystick, a game controller as well as motion sensors of any kind including cameras, accelerometers, gyros and magnetometers.

Gaming indications may be usable directly such as for visible output to a viewer 2 including a question, answer, clue, message, picture, a video, etc., or may be used indirectly, such as for causing a gaming app running on the content selector 19 to execute any of the gaming app's available operations, including starting and stopping the gaming app or any of its internal functions. Viewer indications also include any game output datum from a gaming app running on the content selector 19 with or without the gaming app having determined or accepted any viewer indication, for example where a function of the gaming app includes a countdown clock that is being displayed to the viewer 2 and where upon expiration of the countdown a game output datum is transmitted to the interactive gaming system 48. Other examples of game output datum for inclusion as viewer indications are any of current or on-going game states including scores and other measurements of game progress and results. As will be well understood by those familiar with gaming apps, while it is preferred that any gaming app is implemented on the content selector 19 such as a cell phone or tablet computer, any computing apparatus in communications with local content controller 18-1 is sufficient, including executing some or all of the gaming app on the content controller 18-1.

Still referring to FIG. 4h, content 26-all is associated and available to interactive gaming system 48 as a repository at least including any of static content such as: 1) closed scenes that are video-audio to be provided to all viewer's 2 such as 2-1, 2-2, 2-3 and 2-4; 2) adjustable scenes that are a combination of 2 or more concurrent video-audio to be provided on distinct viewing sub-channels by the local content controller 18-1 to 2 or more distinct viewers 2 such as 2-1, 2-2, 2-3 and 2-4, and 3) open-restricted scenes that are a combination of 2 or more concurrent video-audio to be provided on distinct viewing sub-channels by the local content controller 18-1 to any viewers 2 such as 2-1, 2-2, 2-3 and 2-4, whereupon the local content controller 18-1 determines which sub-channel to provide at any given time throughout the duration of the open-restricted scene to each of viewers 2 based at least in part upon any of gaming indications or viewer indications. All of video-audio comprising any of closed scenes, adjustable scenes or open-restricted scenes are pre-determined prior to being selected as next content 26-nc, where pre-determined means that the video and audio content is pre-known and does not change after being selected. Content 26-all also comprises any of dynamic content such as: 4) open-free scenes that comprise video-audio that is not pre-determined prior to being selected as next content 26-nc, where the open-free scenes are at least in part determined after being selected based at least in part any of on-going gaming indications or viewer indications, and where the open-free scenes are provided to any one or more viewer's 2 such as 2-1, 2-2, 2-3 and 2-4, and 5) advertisements that comprise either pre-determined or not pre-determined video-audio, where the not pre-determined advertisements are at least in part determined after being selected based at least in part any of on-going gaming indications or viewer indications, and where the advertisements are provided to any one or more viewer's 2 such as 2-1, 2-2, 2-3 and 2-4.

Still referring to FIG. 4h, any of static or dynamic video-audio 26-all can be any one of, or any combination of, real or virtual visuals and sounds, as will be well understood by those familiar with movies with real actors including graphic animations or familiar with video games.

In one use of the present invention 100, a viewer 2 is being provided a movie or show comprising a static pre-mix of at least closed and adjustable scenes based at least in part upon a single viewer 2 indication made prior to the commencement of the movie or show, where for example the viewer 2 pre-selects to see the movie or show from any of two to four perspectives as prior described, where each perspective includes at least one scene that is distinct from at least one other perspective.

In another use of the present invention 100, a viewer 2 is being provided a movie or show comprising a dynamic mix of at least closed and adjustable scenes based at least in part upon a single viewer 2 branching indication made after the commencement of the movie or show, where for example the viewer 2 selects during the movie or show to receive any one of a multiplicity of possible scenes, where the selected scene is then incorporated into the movie or show for the single viewer 2 and provided on that viewer 2's assigned viewing sub-channel, where allowing a viewer to dynamically select a next scene is often referred to in the art as a branching narrative.

In another use of the present invention 100, multiple viewers 2 are receiving a dynamic mix of at least closed and adjustable scenes that are a branching narrative, where at least one of the branching indications is determined as a part of an open-free scene that is a video game in which two or more viewers 2 compete, whereupon conclusion of the competition any of gaming indications or viewer indications are then used at least in part by the interactive gaming system 48 to select a next content 26-nc, where for example a gaming indication is datum indicative of a winning or losing team or individual and a viewing indication is a selection made by a winning or losing team or individual, and where for example the selected next content 26-nc is different for a viewer 2 on a winning team than a viewer 2 on a losing team.

In another use of the present invention 100, a movie theater provides two or more distinct movies inside a single auditorium over the same duration of moving show time such that movies goers choose any of the two or more movies, and not a movie perspective, to watch and hear. In this use case, the two or more movies each represent a closed story and are provided throughout the entire duration of the moving showing time on a single sub-channel, where viewer's 2 are assigned a sub-channel based upon there movie selection indication. The two or more movies can be pre-mixed, for example by use of a content controller 18l or 18r, prior to be input into a traditional movie projection system, where two movies can be separately viewed using passive polarizer glasses 14-pp, and where three or more movies can be viewed using any of system active glasses such as 14-as-pp or 14-as-ap. When using system active glasses, control signals are provided by an implementation of the necessary components of a local controller 18l.

As is well-known in the art, some 3d movie projection systems provide alternating left-eye/right-eye images, each at full resolution and full intensity and polarized to a distinct state such as left circular or right circular, where the present system 100 outputs to this type of 3d projector as video device 23 in order to present two on-going spatial sub-channels, where each sub-channel can be a separate movie (or a separate perspective in a single movie.) Using a content controller 18 (or its software equivalents,) two such 3d movie projection systems can be operated in a synchronized fashion such that the first projector simultaneously emits a temporal sub-channel 1 image on a first spatial sub-channel A while the second projector emits a temporal sub-channel 1 image on a second spatial sub-channel B, after which the first projector simultaneously emits a temporal sub-channel 2 image on the second spatial sub-channel B while the second projector emits a temporal sub-channel 2 image on the first spatial sub-channel A. In this two 3d projector arrangement, content controller 18 provides control signals to active system glasses such as 14-*as-pp* or 14-*as-ap* to cause any single pair of glasses to operate its active shutter synchronized to a single temporal sub-channel 1 or 2, after which a passive polarizer or a controller 18 activated polarizer transmits either of spatial sub-channels A or B, all as will be well understood from a careful reading of the present invention.

In another variation, two 2d movie projectors are used, where the reflective movie screen is then changed from the traditional 2d movie screen that has a non-metallic (dielectric) surface that does not substantially maintain polarization states upon reflection to the traditional 3d surface for example comprising metallic paint that does substantially maintain polarization states upon reflection. In this two 2d movie projector with 3d movie screen variation, each of the 2d movie projectors are further adapted with a passive polarization layer for polarizing the emission of their projected light, for example where the first projector emits right circularly polarized light and the second projector emits left circularly polarized light, and where the viewers 2 are wearing either of left or right circular polarizing glasses 14-*pp*. In this arrangement, each of a viewer 2 watches a full temporal and spatial resolution projection of a single movie. In another variation, two 2d movie projectors are used with traditional 2d screen, where each of the 2d movie projectors are further adapted with an active shutter layer for blocking or transmitting their projected light, where controller 181 controls the active shutter layer for each 2d projector so as to cause alternating images from each projector on the 2d movie screen thus mixing each 2d projector's emitted light into two temporal sub-channels, where the control of the active shutters is timed with the emission of images from each of the 2d projectors, and where the controller 181 further provides control signals to active shutter glasses 14-*as* being worn by viewers 2, such that a single viewer 2 is limited to viewing the output of either one but not both of the 2d projectors.

As the careful reader will see, there are many variations possible some portions of which already exist in the marketplace, where the present system 100 uses a content controller 18 to control any one or more of existing 2d or 3d projectors, using any of 2d or 3d movie screens, for causing the output of the one or more projectors to be assignable to a single temporal, spatial or temporal-spatial sub-channel, and where the controller 18 then provides control signals for appropriately operating any active system glasses such as 14-*as*, 14-*as-pp*, 14-*ap* or 14-*as-ap* as required by the arrangement. As will also be understood by a careful reading of the present invention, corresponding with a distinct viewing sub-channel, private audio 16-*pa* is then also provided to each viewer 2, such as by using any of the private speakers 16 as herein taught or similar. Where it is further understood than any of these example variations of 2d and 3d projectors, 2d and 3d screens, polarization layers, active shutter layers or even active shutter/polarization layers placed over the projectors for providing 2 or more temporal, spatial, or temporal-spatial sub-channels outputting video that is coordinated with control signals provided to active system glasses for receiving a single viewing channel, and coordinated with private audio corresponding to the single viewing sub-channel is useable for any of the many possible variations of content from a content source 26.

In another use of the present invention 100, a remote content controller 18-*r* comprising an interactive gaming system 48 is used to dynamically provide next content 26-*nc* according to game logic 48-*log* and game state 48-*gs* to one or more first viewer's 2 viewing a first sub-channel that are in a competition with any 1 or more second viewer's 2 viewing a second sub-channel, wherein the interactive gaming system 48 is providing for example the same branching narrative content 26-*all* to each of the first and second viewers 2, where the competition is for each of the first or second viewers to explore the same game map 48-*gm* connecting various content 26-*all* to answer a question or solve a puzzle. For example, the branching narrative could comprise three hours of any types of scenes, including any one or any combination of closed, adjustable, open-restricted, open-free and advertisements, where the three hours of scenes relate to a mystery or crime show, and where the first and second viewers are presented with next scenes 26-*nc* based at least in part upon any of gaming indications or viewer indications. In a variation of this use of invention 100, gaming or viewer indications related to either of the first or second viewers 2 are used by the interactive gaming system 48 to alter the game map 48-*gm*, such that a first viewer 2 directly or indirectly causes a change it any branching narrative represented at least in part by the game map 48-*gm* available to a second viewer. In yet another variation, game logic 48-*log* accepts, requests and receives, or otherwise determines viewer indications from a first viewer 2 for directing which of any overriding next content 26-*nc* is to be provided for a second viewer 2, where for example a first viewer 2 indicates a given closed, adjustable or open scene to be provided to a second viewer 2 overriding game map 48-*gm*, such as in a competition where each of the first and second viewers attempt to thwart or slow down their opponents by selecting a specific next content 26-*nc*. In another variation, one or more third viewers 2 are an audience that is viewing a third sub-channel, where any viewer indications from the audience such as a vote are used at least in part by the gaming logic 48-*log* for selecting any next content 26-*nc* for any of contestant viewers 2 such as the first viewer 2 or second viewer 2.

As will also be understood, and as depicted in the FIG. 4*h*, any remote content controller 18-*r* can be connected to any one or more local content controllers 18-1, where then each of local content controllers 18-1 provide content to any number of viewer's 2 viewing any one of multiple viewing sub-channels, wherein any remote controller 18-*r* further comprising an interactive gaming system 48 conducts an interactive game across a multiplicity of local content controllers 18-1 and therefore a multiplicity of viewers 2 distributed over the network of local controllers 18-1. In another embodiment of the present invention 100, two or more remote content controllers 18-*r* are in communications such that a multiplicity of remote controllers 18-*r* are providing next content 26-*nc* to different one or more local content controllers 18-1, wherein the multiplicity of remote controller 18-*r* further comprise an interactive gaming system 48 such that the multiplicity of controllers 18-*r* provide the same game to the multiplicity of local controller 18-1 and any associated viewers 2.

Still referring to FIG. 4*h*, open-free scenes include live scenes, for example scenes being recorded live during a live event such as a sporting event, music concert or stage play, or scenes being recorded live from a location, such as a well-known city or architectural structure, where if the one or more remote content controllers 18-*r* include an interactive gaming system 48, then the live scenes are usable in a game, where for example the various viewers 2 receiving content from the system make guesses about or answer questions regarding the live scenes. For a live scene, at least one recording device such as a camera is placed for example at the desired event or location and is in communication with any one of the remote content controllers 18-*r* for providing the live scene content. In one embodiment, the camera is an adjustable view camera that is mounted on any of well-known electro-mechanical apparatus for controllably changing the current pan, tilt or zoom view of the camera in response to provided control signals or datum, where any of the remote content controllers 18-*r* provide the control signals or datum based upon any one of, or any combination of: game logic 48-*log*, game map 48-*gm*, game state 48-*gs*, gaming indications with respect to any one or more viewers 2, or viewing indications with respect to any one or more viewers 2. For example, in one game being played live across a multiplicity of viewers 2 distributed over a multiplicity of local content controllers 181, an adjustable camera is placed in a well-known location with a limited view, where at least one viewer 2 provides any of control signals for controllably changing the current pan, tilt or zoom view of the camera so as to alter the live content being received in the open-free scene, where viewers 2 compete to be the first to recognize any of the scene, objects in the scene, disguised objects, etc.

In another variation of a live scene, one or more contestant cameras are videoing one or more live contestants, where if the contestants are gamers playing a video game, the video-audio content provided by the video game to the gamer's display is useable as the contestant camera output content. In another variation, coaches are either watching the contestants locally or remotely (such as through a contestant camera,) where at least one coach camera captures a live scene of the coach providing instructions to one or more contestants, where any other viewers such as an audience receiving a sub-channel, are controllably provided open-free scenes of the contestants and coaches as next content 26-*nc*.

In another use of the present invention, a content source 26 that provides a tv game show as traditional single channel content 23-*out*, further provides the single channel 23-*out* to at least one remote content controller 18-*r*, where the single channel 23-*out* is either provided as pre-recorded content and therefore closed scenes, or live content and therefore open-free scenes, and where any of game show datum is also provided by the tv game show in association with the closed or open-free scenes. Game show datum includes any information used by the show to conduct the game for its contestants, where the game show datum includes for example questions asked on the show Jeopardy or Wheel of Fortune, including a verbal reading or visual of a text question, a picture of the question such as multiple boxes representing letters in various unknown words, or a picture of a game device such as a wheel spinning to select a next dollar amount, and where the game show datum includes timing datum sufficient for correlating the pre-recorded or live video with any of the contestants experiences including: being presented the question, indicating they have an answer, and providing their answer. In the tv game show use of the present invention, the content source 26 then uses a content controller 18 to provided pre-mixed sub-channel content where one or more viewer's 2 receive the mixed sub-channel content via a local controller 18-*l*, where for example one of the sub-channels is the traditional single channel and the viewer 2 uses their content selector 19 to compete with the game show contestants to provide correct answers, where a game app running on the content selector 19 receives both game show datum and viewer indications, for example allowing a viewer 2 to press a button on the selector 19 which then pauses the sub-channel providing the show while the viewer 2 provides their guess, and where after the guess is provided the paused sub-channel is resumed and the viewer 2 waits to see if any one or more contestants provide an answer and then also the viewer 2's answer is compared to the correct answer that is game show datum.

In the Wheel of Fortune example game show use, a second sub-channel that is not the traditional channel is provided wherein the viewer 2 is able to compete with one or more other viewer 2 using the same game show datum as provided to the show contestants. In this example, the competing viewers 2 see the same phrase with hidden letters but otherwise do not see the show contestants letter guesses or wheel spins. Instead, each viewer 2 contestant is provided the opportunity to guess a letter or spin the wheel timed with the pace of the show contestants. If the viewer 2 contestant losses their turn following the normal game rules, then play is transferred to the next viewer 2 contestant, where preferably the number of viewer 2 contestants matches the number of show contestants, where a viewer 2's turn is either limited to a selected show contestant's turns, or is only limited by the pace of all show contestants turns. The goal of the competing viewer 2 contestants is to solve the question, puzzle or play out the "board" (such as in Jeopardy) prior to the show contestants, where the viewer 2 contestants' game is automatically stopped as soon as the show contestants game ends. The video-audio content provided on this second viewer 2 contestant sub-channel is preferably a computer animation based at least in part upon both the game show datum and the contestant viewer 2's indications, where the animation is preferably created by a scene animator process running within the local controller 18-1.

Still referring to FIG. 4*h*, as the careful reader will see, the present invention offers many exciting and novel opportunities for movies, shows and games, some of which have been discussed as example uses herein, therefore any of the preferred and alternate embodiments of the present invention, or example uses, should be considered as exemplary, rather than as limitations of the present invention or its uses.

In another alternate embodiment and use of the present invention, there is provided a game-branching narrative comprising a multiplicity of sequential scenes 26-*all* wherein at least one of the sequential scenes 26-*all* is connected to two or more other sequential scenes, where the connection is a branch and the determination of which of the two or more other sequential scenes is to be used as next content 26-*nc* is based at least in part upon any of gaming indications or viewer indications. One anticipated use of the game-branching narrative is in a gaming café comprising a local content controller 18-1 in communication with a remote content controller 18-*r* comprising an interactive gaming system 48 for exchanging gaming and viewer indications and for determining next content 26-*nc* for providing to the local controller 18-1, where local controller 18-1 provides the next content 26-*nc* to at least one video output device such as 23-2*d* or 23-*p*3*d*, all as depicted in the present FIG. 4*h*.

What is different regarding the game-branching narrative alternate embodiment is that viewer-gamers such as 2-1, 2-2, 2-3 and 2-4 are divided into two separate groups of viewers 2 verses gamers 2, where viewers 2 optionally interact with a viewer content selector 19 for providing viewer indications and gamers 2 interact with a gamer content selector 19 for competing in video games that are open-free scenes as determined by the interactive gaming system 48. The purpose of the game-branching narrative at the gaming café is to provide a combination of a branching narrative movie where the branching is affected at least in part by the results of one or more competitive video games. For example, if the branching narrative is a Star Wars movie comprising multiple possible scenes representing multiple possible storylines and also alternative endings (see FIGS. 9a, 9b, 9c and 10c,) it is possible to use a game-branching narrative to allow viewers 2 that are the audience to passively watch the Star Wars movie where the outcome is uncertain but at least in part determined by the results of one or more competitive video games conducted by active gamers 2, where for example in one outcome Darth Vader and the Empire prevails and Luke dies, all as will be well understood by those familiar with the Star Wars movies.

Still referring to FIG. 4h, the preferred gaming café further includes a local area network (LAN) for connecting a multiplicity of gamer content selectors 19 to the local content controller 18-1 and/or to the internet for connecting directly to the remote content controller 18-r or an associated cloud gaming service, where a gamer content selector 19 is any computing device such as a PC or gaming console such as a PlayStation or Xbox and allows a gamer 2 to interact with a video game that is initiated as next content 26-nc based at least in part upon gaming indications provided by the interactive gaming system 48. Hence, in one variation the video game is executed on each gamer selector 19. In another variation, the video game is executed on a local or remote game server in communications with the LAN or at least the game content selectors 19, where a preferred remote game server implements what is known as cloud gaming or gaming on demand and where the game content selectors 19 provide a visual interface for the gamer, as will be well understood by those familiar with multiplayer games.

Gaming selectors 19 are preferably also used to register each of gamers 2 with the interactive gaming system 48, where register means to identify a gamer such as 2-1 with a specific gamer content selector 19 and any of zero or more gaming teams, where registration information are gaming indications usable by the interactive gaming system 48 for determining which gamers such as 2-1 are to compete in any of next content 26-nc that are open-free scenes, such as a video game, or limited video game. To initiate game play amongst any number of selected registered gamers 2, interactive gaming system 48 provides gaming indications for communication to each game content selector 19 registered to a selected gamer 2, where the provided gaming indications are used at least in part by the selected gaming selector 19 to start, stop, or limit a specified video game, where limiting a video game includes providing parameters to the video game initiating a specific instance, indicating specific non-player characters (NPCs) to be used in the game, or otherwise limiting the video game's normal operation, as will be well understood by those familiar with video games.

What is important to see is that: 1) the interactive gaming system 48 determines or provides next scenes 26-nc such as closed scenes that are passive for both the viewers 2 and the gamers 2 and are perceived as a traditional movie or show, where the next scenes 26-nc are output to the video output device such as 23-2d or 23-3pd; 2) based at least in part upon the timing of the expiration of any given next scene 26-nc, gaming system 48 then optionally and in accordance with any one of, or any combination of gaming logic 48-log, game state 48-gs or game map 48-gm, selects a next content 26-nc that is an open-free scene such as a video game or a limited video game that is executed directly on any one or more game content selectors 19 or executed on a game server such as a cloud gaming service being interfaced from a game content selector 19; 3) a video-audio representation of the on-going game is provided to the local controller 18-1 for output to the video output device such as 23-np or 23-p3d such that at least passive viewers 2 watch the on-going video game, where the video-audio representation is preferably provided by the game server or cloud gaming service; 4) either the gaming content selector 19 determines or receives from the video game or limited video game any of gaming indications including scores and results for providing to the interactive gaming system 48, or the game server directly provides any of gaming indications to the interactive gaming system 48, and 5) based at least in part upon the provided gaming indications, gaming system 48 selects a next content 26-nc such as one or multiple possible next content 26-nc that are closed scenes.

Still referring to FIG. 4h and the game-branching narrative, in another variation passive viewers 2 are semi-active viewers 2, where semi-active viewers 2 use their associated viewer content selector 19 to provided viewer indications for use at least in part by the interactive gaming system 48 along with gaming indications to select next content 26-nc. Viewer indications include any of: a) datum for determining which open-free scene and therefore which video game is to be played next as next content 26-nc; b) datum for determining which of registered gamers 2 or gamer teams is to compete in a video game; c) datum that are parameters for limiting a video game, for example choosing a preferred instance or NPCs, and d) datum for associating a given viewer 2 with a given gamer 2 or a gamer team.

As the careful reader will see, a game-branching narrative is useful without comprising any adjustable scenes or open-restricted scenes, and therefore without also requiring the local content controller 18-1 to implement two or more viewing sub-channels and without requiring any of system glasses 14 or private speakers 16. A game branching narrative supports a passive viewing experience for a multiplicity of viewers 2, where the outcome of the movie or show is undetermined prior to the commencement of the movie or show and where one or more active gamers 2 compete to provide gaming indications for at least in part determining the final presentation of next content 26-nc that is the movie or show. A game branching narrative further supports accepting indications from one or more viewers for at least in part selecting which video games will be played, how the video game will be limited, and which gamers 2 will compete.

Still referring to FIG. 4h, a game-branching narrative may further comprise an adjustable scene or an open-restricted scene, where therefore the local content controller 18-1 implements two or more viewing sub-channels and at least viewers 2 are required to wear system glasses 14 and preferably receive private audio 16-pa through private speakers 16 (see FIGS. 9a, 9b, 9c and 10c.) In a game-branching narrative that further comprises an adjustable scene or an open-restricted scene, gamers 2 optionally wear system glasses 14 that are preferably operated to: 1) disable viewing channel filters such as 14-cfl when a gamer 2 is interacting with a video game on their game content selector 19, such that the gamer 2 receives maximum temporal-spatial luminance as emitted by their selector 19, and 2)

enable the viewing channel filters such as 14-*cfl* to filter output 23-*out* when a gamer 2 is not interacting with a video game on their game content selector 19 and therefore is watching output 23-*out* as emitted by the video output device such as 23-2*d* or 23-*p*3*d*. Each of viewers 2 or gamers 2 receive a viewing sub-channel with private video and audio based at least in part upon any of viewer or gaming indications, where for example as each team is assigned a viewing sub-channel or viewing sub-channels are assigned based upon movie or gaming character names or roles.

And finally, still with respect to FIG. 4*h* and a game-branching narrative, the preference for a gaming café is exemplary, where it is also possible to provide the same game-branching narrative in a home for example with fewer viewers 2 and gamers 2, or in a movie theater with more viewers 2 or gamers 2. It is also anticipated that an image blender and video-audio compression part 18-*comp* (see FIG. 5*a*) operating preferably within either the remote content controller 18-*r* or the local content controller 18-1 creates a video-audio recording of the game-branching narrative for provision either live or on-demand to a larger audience such as through an on-line streaming service such as Netflix, Amazon or Twitch, all as will be well understood by those familiar with video gaming streaming services and competitive leagues.

Referring now to all FIGS. 4*a*, 4*b*, 4*c*, 4*d*, 4*e*, 4*f*, 4*g* and 4*h*, the presented embodiments are meant to show a range of capabilities and should therefore be considered as exemplary rather than as limitations. For example, input sources 26 can be from any device capable of providing video-audio content as are well-known in the art. Input sources 26 can be coupled to any available controller 18 input using any of well-known or future marketplace connector technologies, ranging from wired connections such as an HDMI cable to wireless connection such as a wireless dongle or wi-fi direct, all as will be well understood by those skilled in the art of systems and communications. Any controller 18 must have at least one connection to an input source 26 for receiving any of traditional single channel content, dual-view monoscopic content as provided for example by a gaming system such as Sony's PlayStation, dual-view stereoscopic content as provided for a 3D passive or active movie, quad-view content as taught herein, or any other mixed view content created by the future marketplace with available decoders for use by the any controller 18 to segment the mixed views into individual views for output onto any of the available viewing sub-channels. Any controller 18 can provide dual-view content to any traditional display or projector 23-2*d* and quad-view content to any passive 3D display 23-*p*3*d* or any polarized display 23-*p* or non-polarized display 23-*np* that has been further adapted to include an active polarizing layer such as 23-*ply* or 23-*ply*-2. Any single view of multi-view content, including dual view monoscopic or stereoscopic content, can be output by any controller 18 on any combination of temporal, spatial or temporal-spatial sub-channels dependent upon the type of video device such as 23-2*d* (allowing temporal sub-channels only) or 23-*p*3*d* (allowing any of temporal, spatial or temporal-spatial sub-channels.)

Figure 5A:
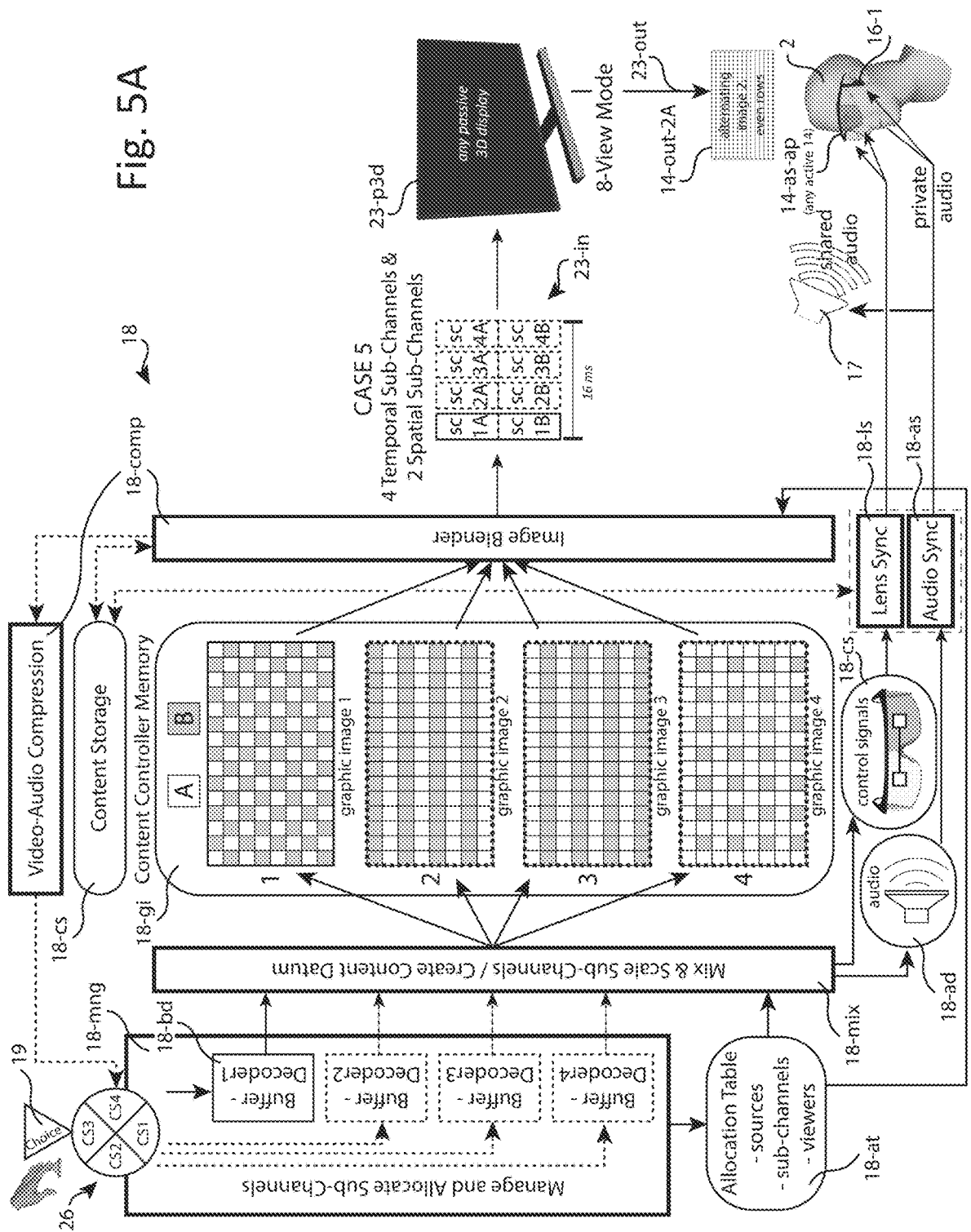
FIG. 5*a* is a block diagram portraying the interconnections between the key parts of a controller 18 including the manage and allocate sub-channels part 18-*mng*, mix and scale sub-channels/create content datum part 18-*mix* and image blender and video-audio compression part 18-*comp*. Controller 18 receives input from one or more content sources 26 and one or more content selectors 19 and provides video stream 23-*in* to a video output display 23 such as 23-*p*3*d*, corresponding shared audio to shared speakers 17, corresponding private audio to private speakers 16 such as 16-1 and control signals to any of eye glasses 14 such as 14-*as-ap*.

Referring next to FIG. 5*a* there is shown a block diagram portraying the interconnections between the parts of a controller 18 including the manage and allocate sub-channels part 18-*mng*, mix and scale sub-channels/create content datum part 18-*mix* and image blender and video-audio compression part 18-*comp*. Manage and allocate sub-channels part 18-*mng* is responsible for interfacing with one or more content sources 26 such as CS1, CS2, CS3 and CS4, where content source interfacing responsibilities include: 1) determining or receiving datum descriptive of the content source 26 such as a settop box, gaming console, PC, internet streaming service, DVD player, etc., and 2) determining or receiving datum descriptive of any video-audio content currently being input from a content source 26 such as encoding format, mix type including single traditional channel, 3D, gaming dual-view or multi sub-channel mix as herein described, native and preferred resolution, frames per second and refresh rate.

Manage and allocate sub-channels part 18-*mng* is also responsible for interfacing with one or more supported devices including content selectors 19, system eye glasses 14, private speakers 16 and shared speakers 17, where supported devices interfacing responsibilities include: 1) establishing or confirming a communications path to the supported device including any of supported device identifiers; 2) determining supported device types including: the type of a content controller 19 and therefore the controller's supported functions, the type of system eye glasses 14 and therefore the glass's supported functions, the type of private speakers 16 and therefore the private speaker's supported functions, and the type of public speakers 17 and therefore the public speaker's supported functions; 3) determining or receiving allocation assignments including: content source 26 to sub-channel assignments, viewer 2 to sub-channel assignments, system eye glasses 14 to viewer 2 assignments and private speakers 16 to viewer 2 assignments, and 4) receiving desired sub-channel video specifications including preferences for frames per second, refresh rates and resolutions.

Manage and allocate sub-channels part 18-*mng* is also responsible for interfacing with at least one video output device 23 such as 23-*p*3*d*, where video output device interfacing includes: 1) determining the type of video output device 23 such as a display versus a projector, and 2) determining device 23 features such as support for active 3D output, support for passive 3D output, support for active polarization such as provided by a layer 23-*ply*, support for active polarization and modulation such as provided by a layer 23-*ply*-2, support for two or more color separations such as triplets R1G1B1 and R2G2B2, maximum input image frame rate, maximum refresh rate, display size and resolution, maximum pixel luminance, and support for variable pixel luminance.

Still referring to FIG. 5*a*, manage and allocate sub-channels part 18-*mng* maintains an allocation table 18-*at* comprising any of content source interfacing datum, supported devices interfacing datum and video output device interfacing datum, where the allocation datum comprising the allocation table 18-*at* is available for use by both the mix and scale sub-channels/create content datum part 18-*mix* and the image blender and video-audio compression part 18-*comp*. For each connected content source 26, manager part 18-*mng* preferably instantiates one buffer-decoder process 18-*bd*, where some content sources 26 provide decoded video-audio content and therefore the decoder function of 18-*bd* is disabled, and where other content sources 26 provide encoded video-audio content and therefore the decoder function 18-*bd* serves to translate the encoded content into a decoded format, all of which will be well understood by those familiar with video audio computer processing. Each of any instantiated buffer-decoder processes 18-*bd* provides content in a decoded format to mix and scale sub-channels/create content datum part 18-*mix*.

Still referring to FIG. 5*a*, mix and scale sub-channels/create content datum part 18-*mix* receives allocation datum from manager part 18-*mng* or accesses the allocation table 18-*at* to determine allocation datum and receives any ongoing decoded content from each instantiated buffer-decoder processes 18-*bd*. Using at least in part any of allocation datum, mix part 18-*mix* determines and creates any one of, or any combination of: 1) a graphic image 18-*gi* comprising content source 26 video datum; 2) content source 26 audio datum 18-*ad* corresponding to a graphic image 18-*gi*, and 3) eye glasses 14 control signals datum 18-*cs* corresponding to a graphic image 18-*gi*. Mix part 18-*mix* preferably creates 1 graphic image such as 1, 2, 3 or 4 for each allocated temporal sub-channel such as 1, 2, 3 or 4, where each graphic image 1, 2, 3 or 4 optionally includes two to four sub-sets of pixels forming two to four spatial sub-channels, where two sub-channels are shown as A and B based upon polarization, and where 4 sub-channels are possible such as A.1, B.1, A.2 and B.2 based upon a combination of polarization and color separation preferably using RGB triplets 1 and 2 (see especially FIG. 2*j*, 2*k*, 2*l*.) Mix part 18-*mix* scales the on-going decoded content received from each instantiated buffer-decoder 18-*bd* to be mapped into the pixels of a graphic image 18-*gi* according to the assigned temporal, spatial or temporal-spatial sub-channel as received from the manager part 18-*mng* or retrieved from allocation table 18-*at*, where mapping includes determining pixel locations within the target graphic image 18-*gi* to store either pixels or scaled pixels comprising the decoded video content, where scaled pixels are either an extrapolation or interpolation of any one or more pixels comprising the decoded video content, all as will be well understood by those familiar with image processing. Mix part 18-*mix* preferably shares content controller memory 18-*gi* for forming one or more graphic images with image blender and video-audio compression part 18-*comp*, where mix image part 18-*mix* is synchronized with image blender part 18-*comp* using any of well-known methods such that as graphics images 18-*gi* are prepared image blender 18-*comp* accesses each of the graphic images 18-*gi* for blending into a video stream 23-*in* for input into video display 23 such as 23-*p3d*.

As will be well understood by those skilled in the art of real-time video processing, mix image part 18-*mix* alternately maintains two graphic images for each of any temporal sub-channels, where for example "graphics image 1" is implemented as a buffer of two images such as "graphics image 1*a*" and "graphics image 1*b*." During this alternate operation, mix part 18-*mix* has exclusive access to image 1*a* for mapping content source video datum, where upon completion of mapping, mix part 18-*mix*: a) releases exclusive access of image 1*a* to be exclusively accessed by image blending part 18-*comp*, and then b) takes exclusive access of image 1*b* for mapping the next content source video datum. As a careful consideration will show, in this alternate operation, mix part 18-*mix* cycles between mapping every-other image frame received from a buffer-decoder 18-*bd* into graphics images 1*a* and 1*b* and likewise image blending part 18-*comp* cycles between blending every other graphics images 1*b* and 1*a* into the video stream 23-*in*. As will be well understood by those skilled in the art of real-time video processing, in yet another embodiment, mix image part 18-*mix* maintains and shares with image blender 18-*comp* a larger buffer of three or more graphic images for each temporal sub-channel, such as what is known as a first-in-first-out buffer.

Still referring to FIG. 5*a*, image blender part 18-*comp* either receives or retrieves graphics image datum 18-*gi* such as graphic images 1, 2, 3 or 4, and sequences the graphic images 18-*gi* into stream of video image 23-*in* in any of well-known formats such as HDMI signals or Display Port signals for outputting to a video output device 23. Image blender part 18-*comp* either receives allocation datum from manager part 18-*mng* or accesses the allocation table 18-*at* to determine blending datum indicative of the preferred blend of temporal, spatial or temporal-spatial sub-channels, where blending datum includes the rate of graphic images such as 1, 2, 3 or 4 that are to be output per second within the possible full-frame rate supported by the video output device 23. For example, the preferred video device 23 as portrayed in Case 5 of the present Figure is capable of receiving 240 image frames per second, such that one possible blend as depicted is to output each of graphics images 1, 2, 3 and 4 in repeating sequence until there is a change in the allocation of the temporal, spatial or temporal-spatial sub-channels. As prior discussed, it is also possible that a given graphics image such as 1 is to be output at a frame-rate that is twice that of a graphics image 2 and 3, thus creating a sequence of 1, 2, 1, 3. Image blender 18-*comp* includes any of shared audio datum intended for the video output device 23 as additional audio signals such as in the HDMI or Display Port format, where video device 23 or its attached devices are performing the function of a public speaker 17.

Referring still to FIG. 5*a*, for any private audio 16-*pa* corresponding to a graphics image such as 1, 2, 3 or 4, image blending part 18-*comp* further comprises an audio synch process 18-*as* for outputting synchronized private audio 16-*pa* to assigned private speakers such as 16-1 as indicated in the allocation datum, such that a viewer 2 receives private audio 16-*pa* substantially synchronized with received private video such as 14-*out*-2A. The audio synch process 18-*as* also outputs any shared audio to any of assigned public speakers 17 that are not included with or attached to the video output device 23 as indicated in the allocation datum. Image blending part 18-*comp* further comprises a lens sync process 18-*ls* for providing synchronized control signals to assigned eye glasses such as 14-*as-ap* (based upon two spatial sub-channels,) or eye glasses such as 14-*as-ap-pc* (based upon four spatial sub-channels) as indicated in the allocation datum, where the control signals correspond to and are synchronized with graphics image such as 1, 2, 3 or 4. Eye glasses such as 14-*as-ap* or 14-*as-ap-pc* at least in part use the provided synchronized control signals to filter the output 23-*out* of a video device such as 23-*p3d*, where output 23-*out* comprises a multiplicity of graphics images 1, 2, 3 and 4, such that viewer 2 substantially perceives the intended viewing sub-channel such as 14-*out*-2A.

Image blending part 18-*comp* along with included processes for audio synch 18-*as* and lens sync 18-*ls* optionally output their respective datum to content storage 18-*cs* as recorded content datum. As discussed herein, by storing content datum related to any of the provided viewing sub-channels, a content controller 18 provides any of the well-known media control indications including pause, play, stop, fast forward, slow forward, slow backward, fast backward, skip forward, skip backward, etc. using at least in part the recorded content datum. Using the taught apparatus and methods, controller 18 provides the well-known functions of a digital-video-recorder (DVR.) As will be understood by those skilled in the art of media playback system, image blending part 18-*comp* along with included processes for audio synch 18-*as* and lens sync 18-*ls* optionally retrieves recorded content datum from storage 18-*cs* for output rather than outputting newly generated content such as 18-*gi*, 18-*ad* or 18-*cs*, respectively, where the newly generated content such as 18-*gi*, 18-*ad* or 18-*cs* is concurrently output to content storage 18-*cs* as recorded content datum. Using the well-known settop box feature referred to as a "return path," content controller 18 also provides any of the well-known media control indications including pause, play, stop, fast forward, slow forward, slow backward, fast backward, skip forward, skip backward, etc. using functionality provided by a connected content source 26, such as a cable tv settop box or a DVD player. And finally, video-audio compression part 18-*comp* includes an optional video-audio compression process that compresses any of generated content such as 18-*gi*, 18-*ad* or 18-*cs* corresponding to any of the on-going viewing sub-channels using any of well-known compression methods, where for example the resulting compressed viewing sub-channel content forms either static pre-mixed four sub-channel content such as a sporting event provided in 4 perspectives (see FIG. 4*f*,) or dynamically mixed 4 sub-channel content such as an interactive game with distinct content for a gamer 1, 2, 3 and 4 (see FIG. 4*h*.)

Still referring to FIG. 5*a*, as those familiar with computing systems and devices will understand, the preferred embodiment of content controller 18 as described in FIG. 5*a* specifies key processes and datum, where the execution of these process and the storage of the datum is deployable across several variations of computing elements including what are generally referred to as CPUs and GPUs. It is also possible that some key processes can be further broken into sub-processes or combined to form new key processes and therefore the preferred embodiment should be considered as exemplary, rather than as a limitation of the present invention.

Figure 5B:
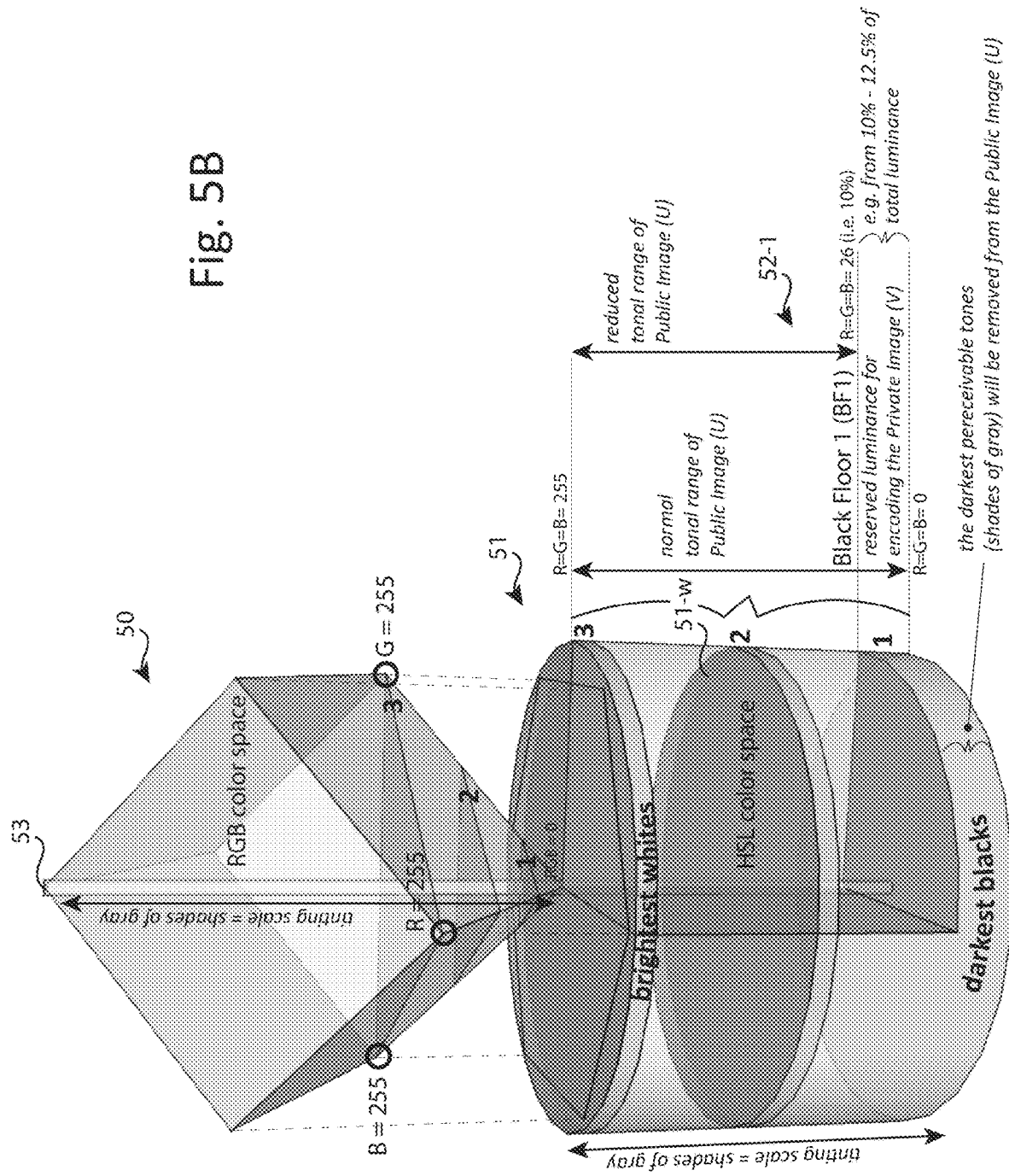
FIG. 5*b* depicts the projection of the RGB color space cube onto the HSL color space cylinder. Running perpendicular through the cylinder and cube is the vertical tinting scale 53 defining the levels on which each of tri-stimulus colors red (R), greed (G) and blue (B) are of the same value, where for an 8-bit depth modulation scheme comprising intensity values from 0 to 255, there are 256 distinct tinting levels. For each distinct tinting level there is also then the equivalent of a color wheel 51-1 defining both a hue (H) and saturation (S). There is also shown a Black Floor 1 (BF1) of for example R=G=B=26 underneath which a public image (U) will be restricted from having any assigned values, such that the illumination necessary for forming the darkest blacks of the public image U are reserved for providing illumination of a private image (V).
Figure 5C:
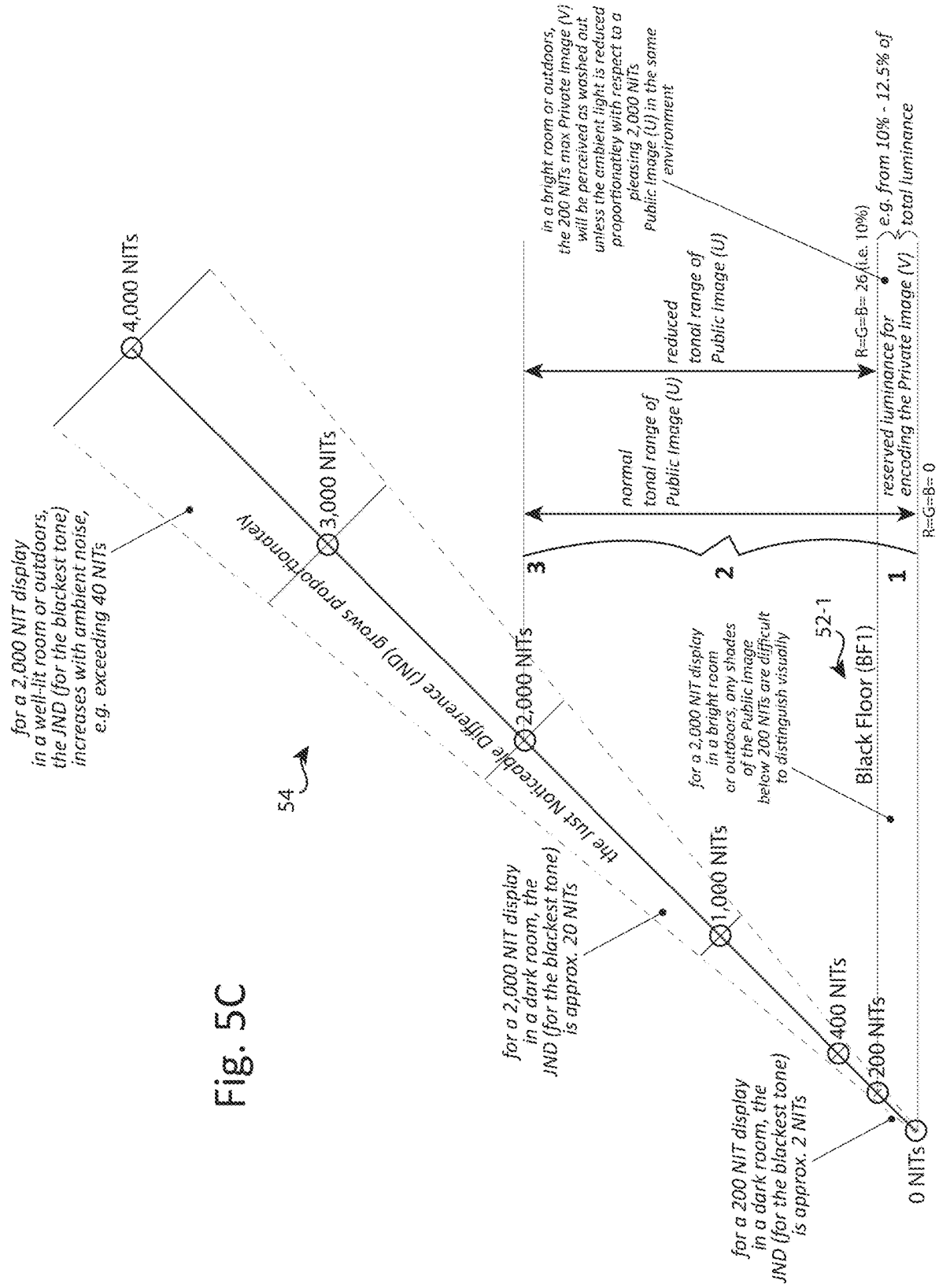
FIG. 5*c* is a visualization of the concept of a just noticeable difference (JND) that when applied to the human vision system corresponds with the Weber-Fechner Law of Contrast. What is shown is that a just noticeable difference with respect to illumination emitted from a display 23 or projector 21-*p* is proportional to the initial stimulus, where the initial stimulus in the present system includes the light emitted by the display 23 or projector 21-*p* along with any other ambient light being seen by an observer of the public or private images. Accordingly, as the initial stimulus rises from for example a television outputting 200 NITs of luminance in a dark room to a display outputting 2,000 NITs in a well-lit room, the human eye's ability to detect changes in the darkest blacks of the public image U that are underneath the Black Floor 1 (BF1) decreases proportionately. Likewise, a viewer of the private image V will be substantially unable to differentiate that darkest tones unless the initial stimulus is significantly reduced by limiting the ambient lighting while also not limiting the luminance of the private image V.
Figure 5E:
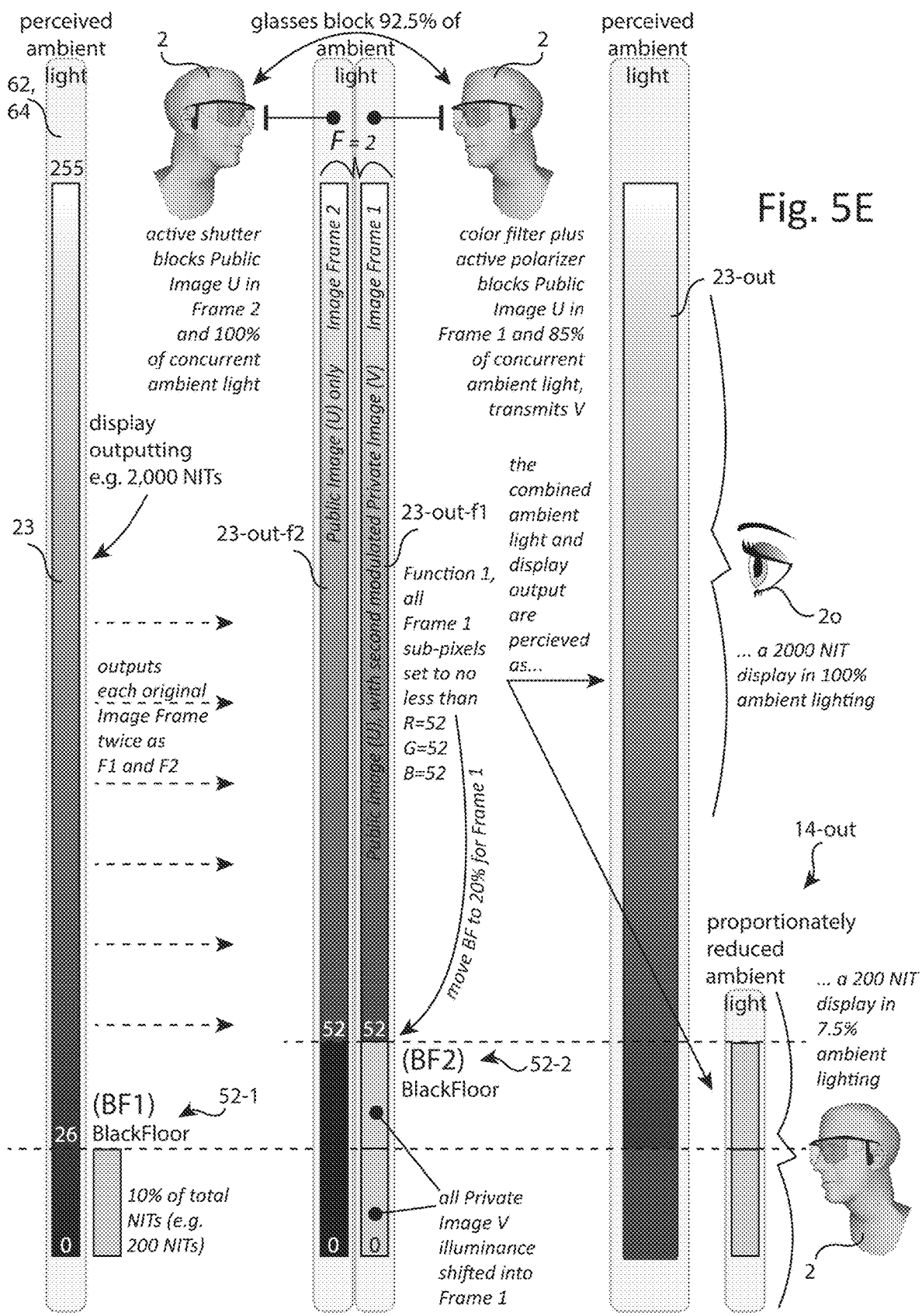
FIG. 5*e* there is depicted a side-view of a display 23 outputting 2,000 NITs of illumination forming a public image U represented by two sequential frames 1 and 2. In frame 1, the sub-pixels of the public image U are controllably limited to being greater than or equal to a Black Floor 2 (BF2) that is calculated as the value of the Black Floor 1 (BF1) multiplied by the number of frames F, which in the present example is 2, whereas in frame 2, these same sub-pixels of the public image U are reset as necessary to be underneath the Black Floor 1 (BF1) such that an observer 2*o* with the naked eye perceives the temporal combination of frames 1 and 2 to be the public image U without the darkest blacks that are underneath the BF1. Also depicted is a viewer 2 wearing system glasses that are controllably blocking frame 2 illumination along with all concurrent ambient lighting while then also transmitting private image V illumination provided through a process of second modulation within frame 1 along with substantially 15% of all concurrent ambient lighting, such viewer 2 receives substantially 100% of the private V illumination and only 7.5% of any concurrent ambient lighting. The reduction of image lighting (i.e. U vs. V NITs) for the viewer 2 is on the order of 90% while the corresponding reduction of ambient lighting is on the order of 92.5%, such that the relative perception of the brightness of the public image U by the naked eye 2*o* is similar to the relative perception of the brightness of the private image V by a viewer 2.
Figure 5F:
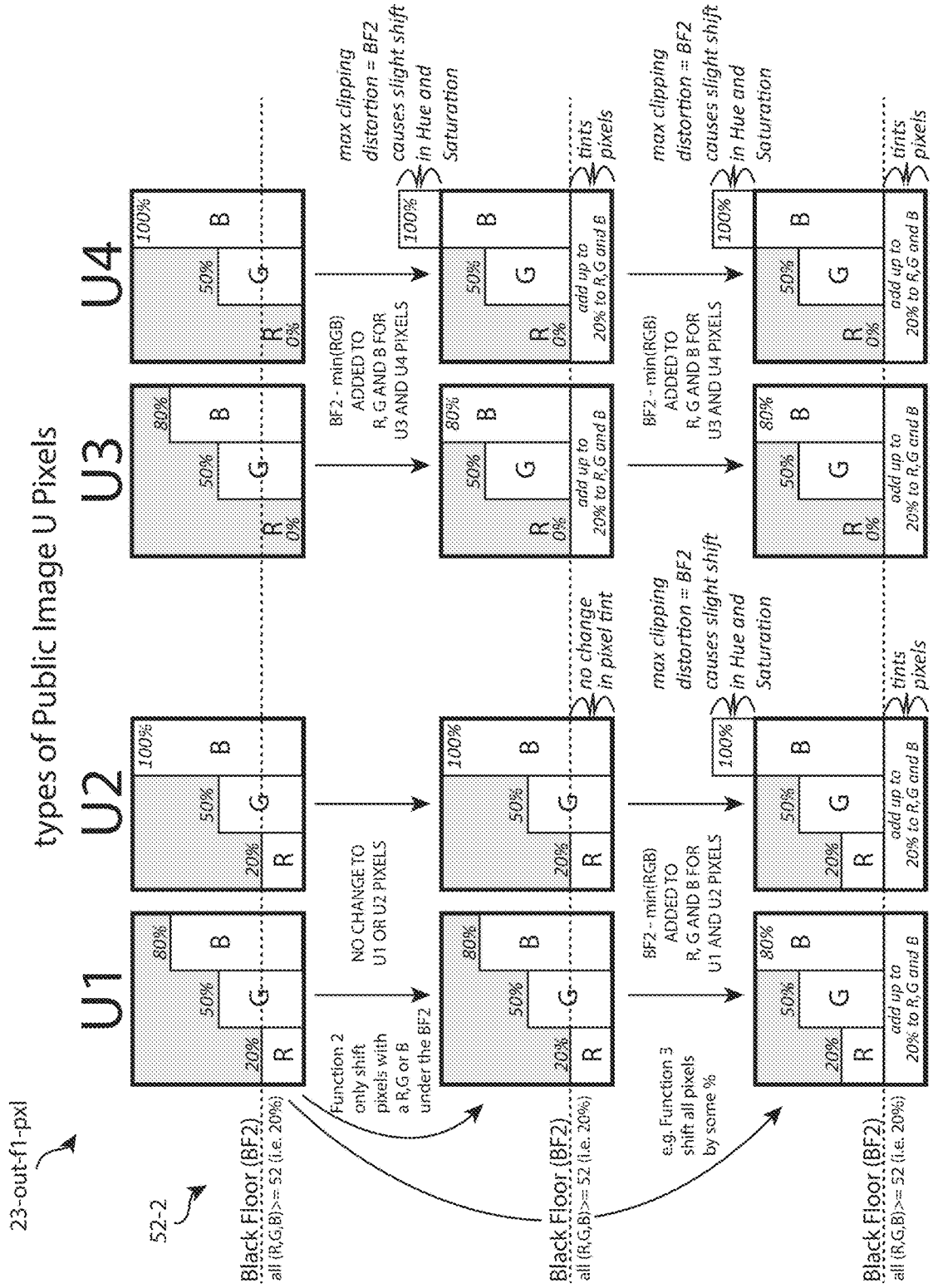
FIG. 5*f* depicts the four types of pixels in any public image U, where types U3 and U4 have at least 1 sub-pixel underneath the Black Floor 2 and where types U2 and U4 have at least 1 sub-pixel that is above the maximum intensity less the BF2. A Function 1 was taught in relation to FIG. 5*e* that resets any individual sub-pixel in a U3 or U4 type that is below BF2 to be equal to BF2. A Function 2 is taught in relation to FIG. 5*f* that resets all sub-pixels in any U3 or U4 type to be equally raised by an amount of BF2−min(RGB), where min(RGB) is the lowest intensity value of any of the R, G or B sub-pixels, and where equally raising all sub-pixels may result in clipping and hue H or saturation S distortion in type U4 pixels. A Function 3 is also taught to perform a similar transformation as provided by Function 2 on all pixels U1, U2, U3 and U4, where types U2 and U4 are susceptible to clipping and distortion.
Figure 5G:
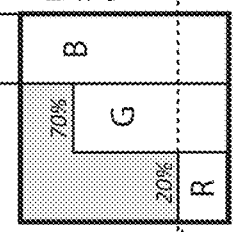
FIG. 5*g* depicts an exemplary worst-case U4 pixel being transformed by a Function 2*a* wherein the original proportionality of the relationship between the R, G and B sub-pixels is maintained such that the distortion of hue H is substantially eliminated. The teachings of Function 2*a* are likewise applicable to a Function 3*a* for the benefit of worst-case U2 type pixels.
Figure 5H:
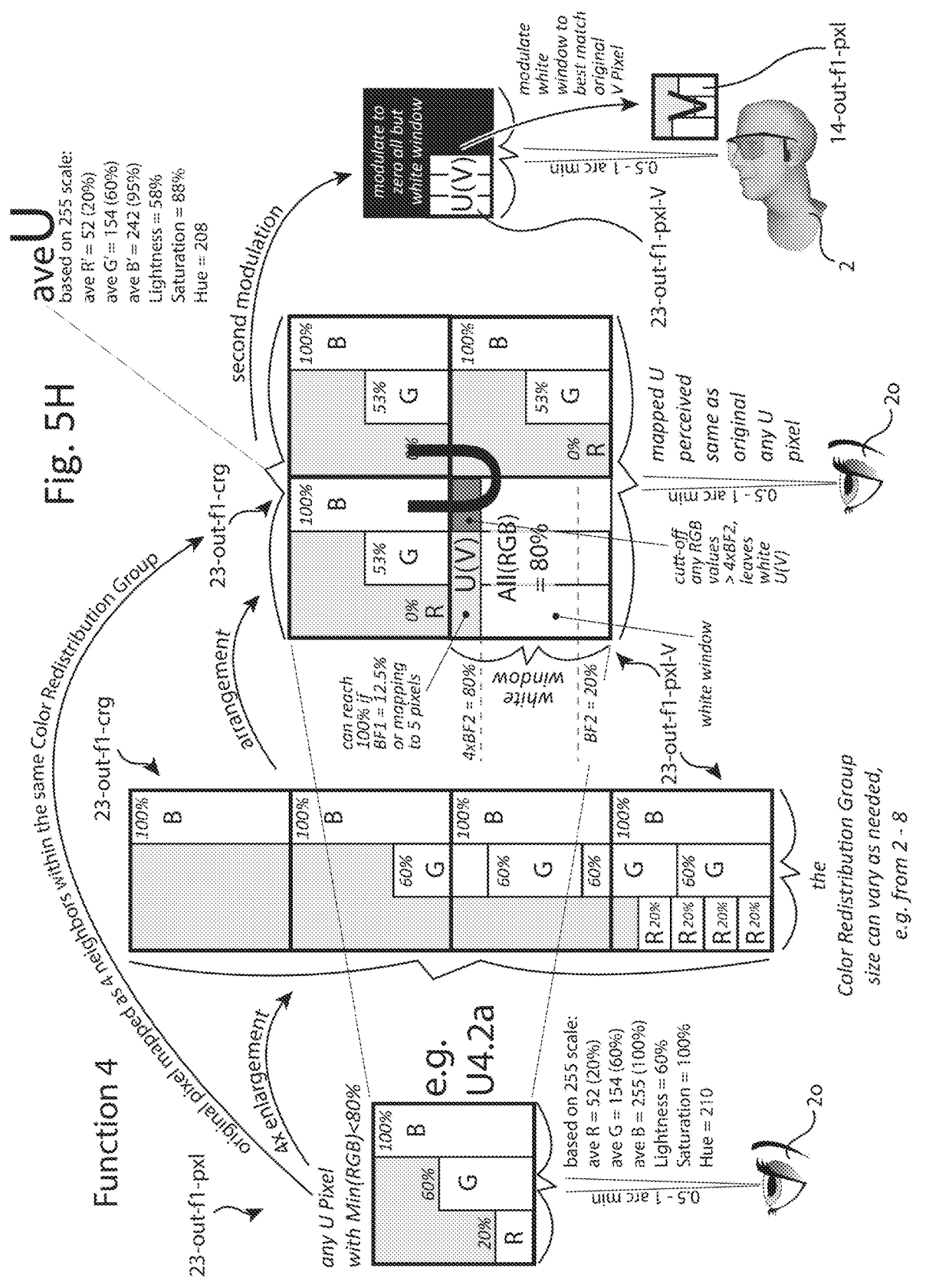
Figure 5J:
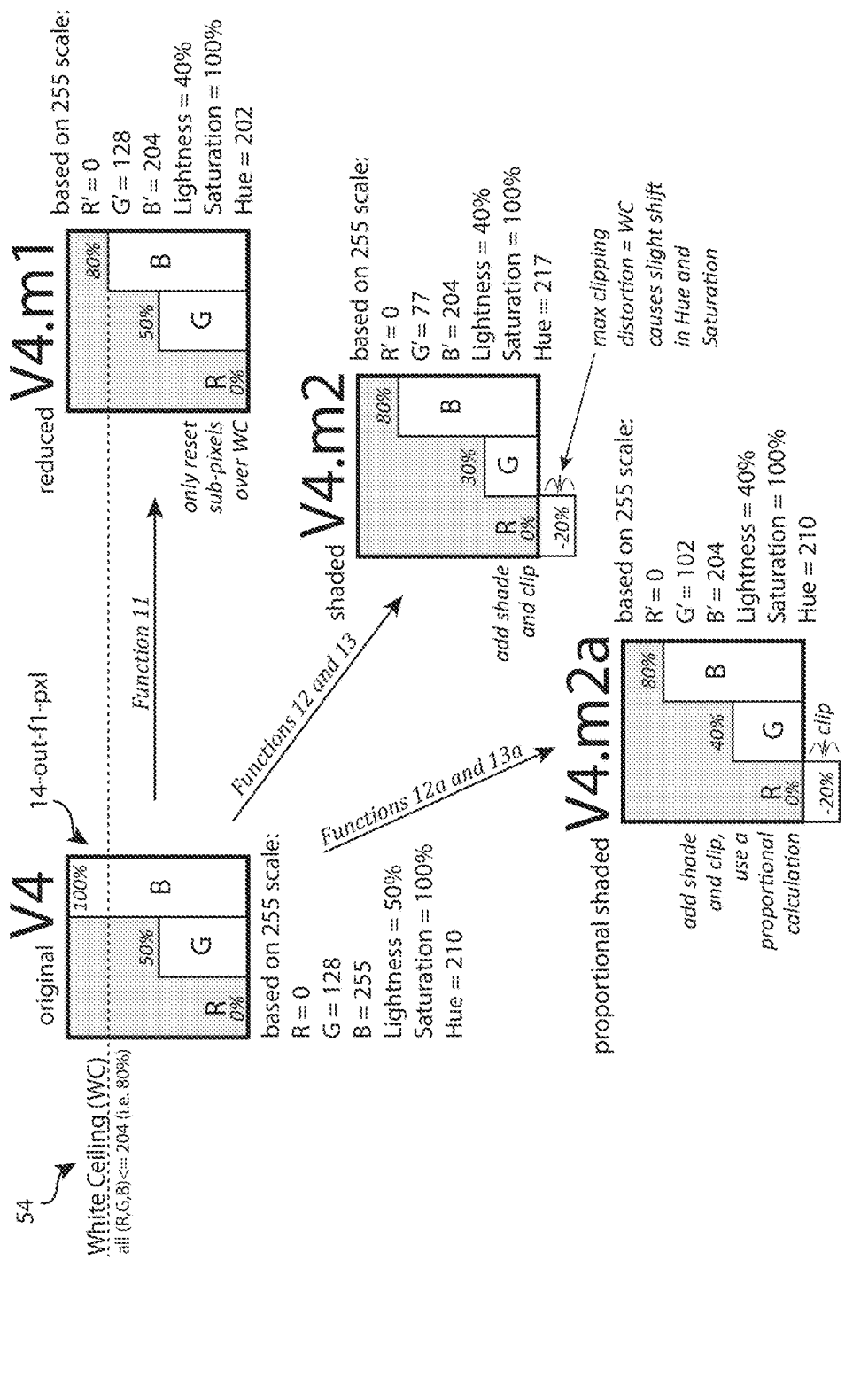
FIG. 5*j* depicts the transformation of a white-window U(V) pixel such as 23-*out-f*1-*pxl*-V that has less than 100% intensities through a process of second modulation to become a best representation of a V pixel 14-*out-f*1-*pxl* that may comprise at least one sub-pixel R, G or B with an intensity value greater than the available in the white window. Transformation Functions 11, 12, 13, 12*a* and 13*a* are taught as similar to corresponding Functions 1, 2, 3, 2*a* and 3*a*, respectively, where the preferred Functions are 12*a* and 13*a* providing for a proportional representation of the original V pixel 14-*out-f*1-*pxl*'s R, G and B sub-pixel intensity values.

FIG. 5*a* in general discussed the parts of controller 18 for receiving, decoding, mixing and outputting 2 or more sub-channels for accomplishing any of a multiplicity of modes including multi-view modes such as dual (primarily FIG. 4*b*) or quad view (primarily FIG. 4*c*,) disguising mode (primarily FIG. 4*d*,) and 2D or 3D content modes (primarily FIG. 4*e*) using any of pre-mixed content (primarily FIG. 4*f*) or dynamically mixed content (primarily FIG. 4*g*,) where the preferred best mode includes a display 23 (primarily FIG. 2*a*) or projector 21-*p* (primarily FIG. 2*c*) further adapted with a polarization layer 23-*ply* (primarily FIG. 2*a*) operating at the pixel level as well as matched system glasses comprising at least an active shutter combined with an active polarizer glasses 14-5 (primarily FIG. 2*b*), that are also classified as glasses' specie 14-*as-ap* (primarily FIG. 2*g*.) A preferred alternate best mode of operation further adapted the display 23 (primarily FIGS. 2*k* and 2*l*) and projector 21-*p* (primarily FIG. 2*h*, FIG. 2*i* and FIG. 2*j*) for outputting a pattern of RGB1 ("0.1") and RGB2 ("0.2") triplets combinable with "A"/"B" 2-state polarization for forming any of four simultaneous spatial sub-channels within each given temporal sub-channel, including spatial sub-channels "A.1", "B.1", "A.2" and "B.2", where this alternate best mode also further adapts active shutter/active polarizer glasses 14-5 to comprise a color filter pattern of RGB1 and RGB2 triplets forming glasses 14-9, 14-10, 14-11 (primarily FIG. 2*h*, FIG. 2*i* and FIG. 2*k*, respectively,) that are also classified as glasses' specie 14-*as-ap-pc* (primarily FIG. 2*m*.) The upcoming FIGS. 5*b*, 5*c*, 5*d*, 5*e*, 5*f*, 5*g*, 5*h*, 5*i*, 5*j*, 5*k*, 5*l* and 5*m* address further understandings and adaptations to controller 18 for supporting privacy mode (primarily FIG. 4*g*,) where the best mode for accomplishing privacy includes the use of sub-pixel polarization layer 23-*ply*-2 (primarily FIG. 2*d*, FIG. 2*e* and FIG. 2*f*,) as well as the use of active shutter/active polarizer glasses 14-5 (primarily FIG. 2*b*) or their variants 14-7 (primarily FIGS. 2*d*) and 14-8 (primarily FIG. 2*f*.) Privacy mode can also be further adapted to take advantage of the 4 simultaneous spatial sub-channels of A.1, B.1, A.2 and B.2 as output by display 23-*pc-ap* (primarily FIG. 2*k*) with the use of glasses 14-10, 14-11 (primarily FIG. 2*i* and FIG. 2*k*.) These upcoming Figures address the following key understandings for best implementing privacy mode:

1) FIG. 5*b*—Just as pixels can be controlled to form spatial sub-channels and image frames can be controlled to form temporal sub-channels, the luminous intensity range of every pixel can be divided between public image luminance (e.g. ranging from 27 to 255 on the 8-bit intensity scale) and private image luminance (e.g. ranging from 0 to 26 on the same scale,) where the private image luminance is underneath a Black Floor 1 and represents the darkest tones in a color space;

2) FIG. 5*c*—In accordance with the Weber-Fechner Law of Contrast and the theory of just noticeable differences (JND,) the darkest tones of a color space (being removed from the public image) will otherwise become less and less perceivable to the naked eye 2*o* as the average ambient light surrounding the display is increased, where these same darkest tone (being reserved to encode the private image) will also be less perceivable to a viewer 2 wearing system glasses unless the ambient lighting can be reduced proportionately;

3) FIG. 5*d*—The spectral output of a typical tri-stimulus RGB display covers roughly 30% of the total range of visible light frequencies, such that adding a matched color filter to system glasses provides for near 100% transmission of the spectral output of a display 23 while simultaneously blocking 70% of other unwanted ambient frequencies, where the transmitted 30% of unwanted frequencies are then further reduced 50% by the glasses' linear polarizers, resulting in a net blockage of 85% of ambient light with respect to the private image, where the blockage is proportional to the reduced luminance of the private image thus supporting perceived brightness of the private image on par with the public image;

4) FIG. 5*e*—A same public image U is output in two successive image frames 1 and 2, where frame 1 using a Function 1 restricts all public image U sub-pixels to individual RGB values equal to or exceeding a Black Floor 2 calculated as 2× Black Floor 1, and where frame 2 counterbalances frame 1 providing RGB values below Black Floor 1 such that the naked eye 2*o* perceives the temporal combination of frames 1 and 2 (with all concurrent ambient light) to be a single public image without detail in the darkest tones below Black Floor 1 while at the same time a viewer 2 wearing system glasses is: 1) blocked by the active shutter from seeing frame 2 and 100% of any concurrent ambient light, and 2) allowed to see frame 1 wherein all public image pixels have been set to exceed the Black Floor 2 in illumination and as to be discussed in upcoming Figures, this reserved illumination is then reapportioned spatially such that for example 25% of all public image pixels transformed to be 80%-100% white (referred to as "U(V)" pixels,) where these 25% U(V) white pixels are then second modulated to encode private image pixels V for transmission through the system glasses to the viewer, where the remaining 75% non-U(V) pixels are second modulated to zero illumination, and where 85% of the concurrent frame 1 ambient light is also blocked by the system glasses;

5) FIG. 5*f*—A Function 2 is depicted for upshifting (tinting) the intensity of at least any frame 1 public image pixels (U) where at least one of the R, G or B sub-pixels is less than the Black Floor 2 and a Function 3 for additionally upshifting other public image pixels in frame 1 (or 2) whose R, G or B sub-pixels are all already equal to or exceed Black Floor 2, where it is shown that upshifting can result in R, G or B intensity clipping leading to distortion in either or both hue and saturation;

6) FIG. 5g—A shifting Function 2a (and by implication 3a) is depicted where, in the event of clipping, the relative proportionality of R to G to B is maintained thereby eliminating any distortion of hue and minimizing distortion in saturation;

7) FIG. 5h—Using the described Functions 2a and 3a with the preferred proportional upshifting, all pixels U of frame 1 can be ensured to comprise R, G and B sub-pixel intensities equal to or greater than the Black Floor 2. By remapping a single public image source pixel into a Color Redistribution Group for example comprising 4 pixels, the total RGB luminance of 4× the original public pixel U is maintained, while the luminance is shifted such that at least 1 pixel U(V) in the Color Redistribution Group is at least 80% white, where this resulting pixel contributes to the correct perception of the public image pixel U while also providing a white window for second modulating a private image pixel V, and where the second modulation is therefore limited to 80% of the full dynamic range;

8) FIG. 5i—Using a Color Redistribution Group of 5 pixels (based upon a Black Floor 1 of 10% and Black Floor 2 of 20%,) it is possible to create a single pixel U(V) with a 100% white window providing for the second modulation of private pixel V without any loss of dynamic range. A Color Redistribution Group of 16 pixels alternately provides 3 U(V) pixels and 1 normal U pixels (that has not been redistributed,) where the combination of these 4 pixels can be second modulated into a single V pixel with near-full dynamic range and a spatially-temporally averaged illumination proportional to the Black Floor 1. Thus, for example using a 4k display outputting 2000 NITs, an HD public image can be output with a minimal loss of 10% in the darkest tones, where each of the HD public image pixels U are redistributed into groups of four 4k pixels each then providing a single U(V) pixel with at least 80% of full intensity, the combination of U(V) pixels of which are usable to second modulate a HD private image V output at 200 NITs and viewed through system glasses that reduce the ambient lighting by a similar 90% thus creating a pleasing private image V that is undetectable to the naked eye 2o and is illuminated to normal TV lighting;

9) FIG. 5j—In preparation for the second modulation of the white-window pixel U(V) for the encoding of a private image pixel V, especially if the white window is less than 100% of the full dynamic range, than Functions 11, 12, 12a, 13 and 13a are provided for converting the less than 100% white-window illumination into a best representation of the private pixel V (that may require the full dynamic range, such as when the minimum value of at least one V sub-pixel is =0% and while the maximum value of at least one other V sub-pixel is 100%,) where Functions 11, 12, 12a, 13 and 13a are similar to Functions 1, 2, 2a, 3 and 3a;

10) FIG. 5k—Function 4 is shown as applied to an original U pixel that has been first upshifted using Function 2 (which resulted in clipping and distortion,) where the RGB luminance of upshifted pixel U is then multiplied by 4× and redistributed into a color group of 4 pixels within a frame 1, thus resulting in 1 white-window pixel U(V) along with 3 remaining pixels for best representing the color and saturation of the original U pixel. There is also the same color distribution group of 4 pixels now within frame 2 (that does not represent the private image V) being set according to the teachings of a Function 5 such that the spatial-temporal perception of the color redistribution group within frames 1 and 2 averages both spatially (within a frame) and temporally (across frames) to best represent the original U pixel;

11) FIG. 5l-Based upon the present inventor's experimentation, it is possible to set a Black Floor 1 of 20% while still maintaining a pleasing public image U, such that the BF2 is 40% formed by temporal shifting illumination from frame 2 into frame 1 (Function 1,) where the BF2 can then be further spatially aggregated within frame 1 using a color redistribution group comprising only 2 pixels (Function 4). FIG. 5l is like FIG. 5k where it is shown that with the increased BF1 and the decreased color redistribution group size (i.e. from 4 pixels to 2 pixels,) it is possible to double the perceived luminance of the private image V from 10% to 20%, and 12) FIG. 5m—A Function 4d is shown using a depiction like FIG. 5h describing Function 4, where Function 4d uses a 3× enlargement (rather than 4×) of a Function 2 tinted U pixel still redistributed into a color redistribution group of 4 pixels. The BF1 is set to 16.5% (that is under the acceptable level determined by experimentation) such that the BF2 is set to 33%, where the 3× enlargement then creates a 100% white-window for the second modulation of the V pixel providing full dynamic range. The maximum possible distortion from the Function 2 tinting creates a 33% exceeding of the maximum intensity value (e.g. 255) (see the original U Blue sub-pixel as depicted,) where this 33% exceeding enlarged by 3× is then fully recaptured within the 4-pixel color redistribution group such that there is no distortion in hue. These settings of a BF1 to 16.5%, a color redistribution group size to 4, and an enlargement factor of 3× not only create a 100% white-window pixel U(V) for the full dynamic range second modulation of a private image pixel V, but also serve to reduce by 25% the maximum illumination of the public image U while also ensuring a maximum illumination of the private image V of 12.5%, where in the example of a 2,000 NITs display, the public image is reduced in luminance to 1,500 NITs max while the private image is increased from prior examples to 250 NITs max such that the difference between the public and private image luminance is reduced from 90% to 83% easing requirements for the filtering of ambient light by any of system glasses.

Referring next to FIG. 5b, there is shown the well-known projection of the cube-shaped RGB color space model 50 onto the cylindrical-shaped HSL color space model 51. What is of primary interest for the present invention is the vertical axis 53 running up the center of both the HSL cylinder and the RGB cube (that has been tilted onto its RGB=0 corner,) where this tinting scale 53 is also called the tonal range that describes the shades of gray or tints of white that can be added to any hue (H) and saturation (S) to change what is referred to as the lightness (L). It is well-known that the human visual system detects a greater range of colors HS (defining each color wheel 51-*w*) than lightness L (defining tones/shades/tints) of these same colors HS, where the changes in lightness essentially move the color wheel 51-*w* along the tinting axis. It is generally accepted that the human vision system can see millions of colors versus hundreds of tones, also called shades of gray, or grayscale/monochromatic vision. Several studies indicate that on average human vision can detect from 50 to 100 shades of gray. As a practical matter, the RGB color system used by tri-stimulus displays and projectors, typically provides at least 256 steps of tinting, where each step is defined as an equal intensity of red, green and blue.

Still referring to FIG. 5*b*, to provide a private image 14-*out-dm* (now referred to as "V") hidden with a public image 23-*out-m* (now referred to as "U") all as herein defined, there are several key system aspects to be understood as follows:

1) LCDs create public images U by reducing the respective intensities of individual R, G and B sub-pixels using a light valve to step (modulate) the maximum (e.g. 255) intensity down to a desired intensity (with a minimum of 0);
2) A pleasing public image U is generally accepted to require 1,920×1,080 points of light, where each point of light is created using at least one pixel that spatially fits within the limit of human spatial acuity, hence between 0.5 to 1.0 arc minutes;
3) Given a LCD light valve's ability to step between 0-255 intensities of R, G and B, there are over 16.7 M=256³ possible colors, and 256 possible tints (such as R=G=B=127, which defines the mid-tone depicted as color wheel 51-*w* in the present Figure,) and
4) The extent of possible colors and tints within an image define the images dynamic range (DNR).

In privacy mode, controller 18 determines a Black Floor 1 (BF1) 52-1 representing a reserved minimum R, G or B value for each sub-pixel in a public image U 23-*out-m*, where at least some of the reserved illumination (i.e. potential U pixel output) associated with the public image U 23-*out-m* is second modulated to encode a private image V 14-*out-dm*, where second modulation is understood to be provided by a polarization layer 23-*ply-2* (primarily FIG. 2*d*, FIG. 2*e* and FIG. 2*f*,) comprised within a display 23 or projector 21-*p*. In the present Figure, the BF1 52-1 is set to 26, where a value of 26 represents 10% of 255 possible intensity value based upon an 8-bit modulating system. Using a BF1 52-1 value of 26 and assuming normal human vision detects 50 to 100 shades of gray, substantially 5 to 10 of the darkest tones will effectively be removed from the public image U and therefore reserved for encoding the private image V. (The present inventor notes that 10% of 255 is 25.5 which is being rounded up to 26 for clarity and conformance to image processing data formats. This choice of rounding that will impact further equations and calculations based upon the BF1, or similar system variables, should be understood as not substantially impacting any of the intended performance of the present invention, where different rounding choices can be made with respect to BF1 and other system variables while staying within the spirit of the present teachings. The reader is instructed that many of the percentage depictions, e.g. 10%, 50%, etc. in the Figures now being discussed are also rounded for clarity, where the rounding differences have no substantial effect on the performance of the taught apparatus and methods.)

Referring next to FIG. 5*c*, there is depicted a visualization of the concepts of a just noticeable difference (JND,) where when applied to the human vision system is associated with the Weber-Fechner Law of Contrast. What is important to understand is the general observation that a perceived change in the luminous output of a display (e.g. two to four steps on the RGB intensity on the tinting scale 53 of FIG. 2*b*) is proportional to the initial stimulus, where for the purposes of understanding the present invention, the initial stimulus includes both the light emitted by a display and all other ambient light being concurrently received by the observer. As a practical matter, if the initial stimulus is a low intensity gray of for example R=G=B of 8, than a change of four steps represents a highly detectable 50%=4/8 of the initial stimulus, whereas for an initial stimulus of R=G=B of 200, a change of four steps represents 2% of the stimulus, where studies of human vision have shown that a 2% change is substantially the just noticeable difference with respect to the average person.

However, as prior stated, the initial stimulus is a combination of both the display's output luminance and any concurrent ambient lighting also being received by the human vision system. Thus, it is instructive to consider the JND in terms of the total combined luminance that forms the initial stimulus for the human eye. For example, if a display outputs a maximum of 200 NITs in a dark room, where the display comprises roughly 25% of the viewers field-of-view, then the initial stimulus is on the order of 50 NITs=200 NITs*25%. In this case, a change of 2% of 50 NITs equals 1 NIT and would be a just noticeable difference. Assuming the same 200 NIT display is in a typical house room contributing an equal luminance to the display (and therefore not a dark room,) then the initial stimulus is on the order of 200 NITs, where a JND of 2% equals 4 NITs. If the same 200 NITs display is in a bright office building contributing a comparative 1,000 NITs of surrounding illumination, then the initial stimulus is 800 NITs=1000 NITs*75% of the FOV and 200 NITs*25% of the FOV. In this brighter office example, a JND of 2% equals 16 NITs.

Still referring to FIG. 5*c*, if the Black Floor 1 is set to 10% of a 2,000 NIT display's potential illumination, then the 200 NITs reserved for encoding the private image V is expected to remove the darkest black tonal information from the public image U (see FIG. 5*b*,) information that otherwise is noticeable to the average human eye. In practice, the present inventor has found through experimentation that when an image is manipulated to effectively limit the lowest R, G or B values to 26 (i.e. 10% of a maximum 255 intensity), the typical observer does not then realize any significant difference in image quality. Essentially, full-black becomes R=G=B=26 and while for example a change of 13 steps darker, to R=G=B=13, would be a noticeable change in tone, since the change is restricted from the public image it is rather to be considered as "not being missed" rather than "not being noticed." Compare this to a public image where the Black Floor 1 is set to R=G=B=128, thus removing 50% of the tonal scale. In such a case, even though no "changes" exist in the image below the 128 BF1, a human observer using their memory of typical image dynamic range would clearly recognize the public image as washed-out, or otherwise would only consider the image to be an acceptable quality if the image is of a bright scene, such as sky on a sunny day with doves flying in the air.

Referring still to FIG. 5*c*, if the same 2,000 NIT display comprises 25% of an observer's FOV and is taken into a bright room or outdoor setting that provides a surrounding reflectivity on the order of 4,000 NITs, then the initial stimulus would be 3,500 NITs=4,000 NITs*75% of the FOV and 2,000 NITs*25% of the FOV. In this case, the 200 NITs of reserved illumination for the private image V represents just under 6% of the initial stimulus. If the same 2,000 NITs display was in a typical house setting with 200 NITs of surrounding reflectivity, then the initial stimulus would be 650 NITs=200 NITs*75% of the FOV and 2000 NITs*25% of the FOV and therefore the 200 NITs of reserved illumination for the private image V represents a much more significant 34% of the initial stimulus. It is therefore to be understood that when using the division of illumination as output by a display 23 or projector 21-*p* to provide a private image V using second modulation, it is preferable that the ambient lighting match or exceed the maximum luminance level of the display 23 or projector 21-*p*, and it is further desirable that the initial stimulus in consideration of the factors of at least the display/projector luminance and % FOV as well as concurrent ambient lighting maintains an effective luminance 20× the BF1, such that the BF1/(initial stimulus) is on the order of 5% of the darkest noticeable illumination. The present inventor notes that at least in the desired use cases of a public display setting including museums, theme parks, airports, office buildings, etc. and especially any outdoor setting, achieving this desirable BF1 to (initial stimulus) ratio is easily achievable.

And finally, still referring to FIG. 5*c*, it should also be understood that while a display is rated for a maximum illuminance, the average luminance of the output images will be substantially less, e.g. 1,000 NITs or 50% of the 2,000 NIT maximum. Thus, in the prior example of a bright setting contributing effectively 4,000 NITs of reflected luminance concurrent with 1,000 NITs of display average luminance occupying 25% of the observer's FOV, the initial stimulus would drop from 3,500 NITs to 3,250 NITs=4000 NITs*75% of the FOV and 1000 NITs*25% of the FOV. However, this causes only a minor change to the ratio of private V illumination (e.g. 200 NITs) to initial stimulus (e.g. 3,250 NITs,) where the ratio is still on the order of 6%, an amount considered by the present inventor to be well within the range of "not being missed" with respect to the typical human observer. It is also important to understand that with respect to the viewer 2 receiving the private image V comprising a maximum of 200 NITs, and on average only 100 NITs, the tonal range of the private image V will otherwise be difficult to perceive in ambient lighting on the order of the desirable lighting discussed above, e.g. contributing a concurrent 4,000 NITs of stimulus over 75% of the FOV. Therefore, it is highly desirable to limit the ambient lighting transmitted by any system glasses being worn by the intended viewer 2 of a private image V.

Referring next to FIG. 5*d* there is shown the juxtaposition of the four spectral graphs aligned to the visible spectrum ranging from 400 nm to 700 nm. The uppermost graph 64-*so* shows the spectral output of the sun 64 that produces consistent illumination across the entire visible spectrum, thus providing what is referred to as white light and best illumination. The second graph 62-*so* shows the spectral output of an exemplary LED lighting 62 preferred for use in a museum setting, where the output spans all visible frequencies but intentionally limits the blue frequencies in the frame from roughly 400 nm to 500 nm. The third graph 23-*so* shows the spectral output of a typical tri-stimulus display, where the peak emissions are designed to output blue in the range of 460 nm, green in the range of 540 nm and red in the range of 640 nm. The fourth graph depicts the band-pass filters B1G1R1 and B2G2R2 proposed by Jorke and Fritz in their paper entitled INFITEC—A NEW STEREOSCOPIC VISUALISATION TOOL BY WAVELENGTH MULTIPLEX IMAGING, where these filters are intended for use in a stereographic projection system that for example emits left-eye images using light filtered into bands B1G1R1 and right-eye images using light filtered into bands B2G2R2. What is important to recognize is that the R, G and B sub-pixels of a traditional display 23 or projector 21-*p* are color filtered such that the emitted light comprises some fraction of the visible spectrum, where this fraction is substantially less than 50% of the visible spectrum, and the with respect to the present graphs is estimated to be on the order of only 30% of the visible spectrum. It is also important to recognize that by further adapting any of the system glasses herein taught to comprise color filters substantially aligned with the tri-stimulus output of the display 23 or projector 21-*p*, it is possible to both transmit roughly 100% of the signal (i.e. the emission of the display 23 or projector 21-*p*,) while then also blocking substantially 70% of the noise (i.e. all other visible light frequencies being emitted by ambient light sources such as the sun 64 and LED lighting 62.)

Still referring to FIG. 5*d*, the ambient white-light as output by the sun 64 and the exemplary lighting 62 is well-known to be unpolarized, whereas the tri-stimulus RGB light output by a preferred display 23 or projector 21-*p* is linearly polarized, all as taught herein (especially when using the preferred sub-pixel polarization layer 23-*ply*-2.) As also taught herein, system glasses such as active shutter/ active polarizers of the specie 14-*as*-*ap* include linear polarizers substantially aligned to, or align able with, the emitted linearly polarized light. As those familiar with linear polarization will understand, the unpolarized ambient light passing through a tri-stimulus color filter such as 14-*cf* will then be further attenuated by substantially 50% as it also passes through the linear polarizers included within the system glasses. Thus it can be seen that approximately 100% of the linearly polarized tri-stimulus light that is the output of the display 23 will be transmitted by system glasses such as 14-5 that are further adapted to include a color filter 14-*cf*, where the color filter 14-*cf* is substantially aligned with the RGB emission peaks of the display 23's spectral output such as 23-*so*. It can also be seen that approximately 70% of the unpolarized ambient light will be blocked by the same color filter 14-*cf*, and that of the remaining 30% of unpolarized ambient light that is not blocked by the filter 14-*cf*, less than 50% will be transmitted to the viewer due to the effect of passing through the glass's 14-5's linear polarizers. The net result is a drop in ambient light noise on the order of 85%, which compares favorably with the associated 90% reduction in illumination provided for the private image V as described in the prior FIGS. 5*b* and 5*c*.

Referring next to FIG. 5*e*, there is depicted a side view of a display 23 emitting frames 1 and 2 (23-*out*-*f*1 and 23-*out*-*f*2, respectively) that are temporally averaged and perceived as a single public image U 23-*out* by the naked eye 2*o*. (For ease of readability, frame 1 23-*out*-*f*1 and frame 2 23-*out*-*f*2 will simply be referred to as frame 1 and frame 2 with respect to FIG. 5*e* and other upcoming Figures.) In a traditional movie, distinct image frames are typically updated at a rate of 24 fps while each distinct image is output three times in succession, providing an overall display rate of 72 frames per second. Using a computer and monitor, a distinct image frame (e.g. from a video game) is typically updated at least 30 times per second (30 fps,) where each distinct image is then refreshed once, yielding a 60 Hz flicker-free rate, where refreshing is simply redisplaying the exact same image comprising the exact same pixels.

In one embodiment of the present teachings, in each frame pair 1 and 2 representing the same distinct public image U, the pixels comprising the public image U are not all identical from frame 1 to frame 2, where the differences in the frame 1 versus frame 2 U pixel encoding best support the second modulation of a private image V comprised exclusively within frame 1, all as to be explained in detail. As those familiar with temporal integration performed by the human eye will understand, it does not matter which frame 1 or 2 comprises the private image V, where the present depiction will include V hidden within frame 1. The same functions described herein are applicable if frame 2 comprises the private image V rather than frame 1, or even if the private image V alternates between frame 1 and 2 within successive frame pairs. Furthermore, as will be clear from a careful reading, the functions taught herein are applicable and have other advantages if the frame pair 1 and 2 is a triplet of frames 1, 2 and 3, where again any one of these frames carries the private image V. It is also possible to use four frames, 1, 2, 3 and 4, and that when using more than 2 frames, multiple frames may carry the private image V. Thus, the present teachings should be considered as exemplary rather than as limitations of the present invention.

Still referring to FIG. 5e, the exemplary display 23 (or projector 21-*p*) performs 8-bit modulation thus providing sub-pixel intensity values ranging from 0 (no intensity) to 255 (full intensity) and is further adapted to include sub-pixel-based polarization layer 23-*ply*-2 (see FIGS. 2d, 2e and 2f.) Exemplary display 23 outputs 2,000 NITs, where in today's market a typical HDR display is 1,000 NITs. A 1,000 to 2,000 NITs display is preferable for bright indoor settings such as museums, office building and air ports, or outdoor settings such as theme parks. As will also be clear, the present teachings can be applied using any type of display 23 or projector 21-*p* regardless of features such as the type of technology including OLED, LCD, Quantum Dot, etc., the output luminance in NITs, the modulation bit depth, the display resolution, input frames per second or the refresh rate, and as such the depictions and teachings should be considered as exemplary, rather than as a limitation of the present invention. What is most important with respect to the novel functions of privacy mode is:

1) further adaptation of a display 23 or projector 21-*p* to comprise a sub-pixel polarization layer 23-*ply*-2 for performing a further modulation on the visible public image comprising U pixels, where the further modulation is not detectable to the naked eye 2o and encodes a private image V (see FIGS. 2d, 2e, 2f, 2k and 4g,) and where the further modulation is herein referred to as a "second modulation;"
2) further adaptation of controller 18 to reserve a minimum luminance within every public image U by setting a minimum intensity level for every sub-pixel within preferably every U pixel, where this minimum intensity level is herein referred to as the "Black Floor 1" (see FIGS. 5e, 5f, 5g, 5h, 5i, 5j, 5k, 5l, and 5m;)
3) further adaptation of controller 18 to spatially and/or temporally redistribute and therefore aggregate the reserved minimum luminance comprised within the set of all U pixels thereby forming a sub-set of U(V) pixels and a sub-set of non-U(V) pixels, where the U(V) pixels comprise preferably equal amounts of red, green and blue sub-pixel intensities (such as R=G=B=204 that is 80% of a maximum of 255) and the non-U(V) pixels comprise a balance of R, G and B intensities such as that the visual perception by the naked eye of the combination of U(V) and non-U(V) pixels is substantially the same as the perception of the original set of all U pixels (see FIGS. 5h, 5i, 5k, 5l and 5m,) where the U(V) pixels are herein referred to as "white-window" pixels, and where the ratio of U(V) to non-U(V) pixels range for example from 1:1 to 1:4;
4) further adaptation of controller 18 to calculate both a first graphic image in memory for output of the public image U comprising the U(V) and non-U(V) pixels using the traditional apparatus of the display 23 or projector 21-*p* and a second graphic image in memory for the second modulation of the output public image U by the polarization layer 23-*ply*-2 into a private image V, where all U(V) "white-window" pixels are second modulated to best represent a private image V pixel while all non-U(V) pixels are second modulated to be substantially black (see FIGS. 5h, 5k, 5l and 5m;)
5) further adaptation of a controller 18 to calculate for each distinct public image U a first frame 1 comprising both the first graphic image representing public image U and the second graphic image representing the private image V followed by a second frame 2 comprising a first graphic image representing the public image U, where the frame 1 first graphic image comprises different U pixel settings than the frame 2 first graphic image, and where the naked eye 2o perceives the combination of the frame 1 first graphic image and frame 2 first graphic image to be substantially like the distinct public image U (with the limitation of the Black Floor setting,) (see FIGS. 5e, 5k and 5l;)
6) further adaptation of controller 18 to alternately encode the second graphic image representative of the private image V to form alternating and inverted representations of V described as V and R(V) (see FIGS. 2d, 2e, 2f and 6c) such that an observer using a passive polarizer (including polarized sun-glasses) sees a substantially neutral image as the combination of V (a first private image) and R(V) (a second inverted private image);
7) further adaptation of controller 18 to communicate an inversion control signal to system glasses comprising a spatial channel filter 14-*scf* such that inverted private images R(V) are then re-inverted to thereby return to the original private image V for receiving by a viewer 2 wearing system glasses (see FIG. 6c;) and
8) limiting the ambient light being transmitted through system glasses such as 14-5 comprising both a spatial channel filter 14-*scf* and a temporal channel filter 14-*tcf* with respect to the received private images V and R(V), where limiting includes the controller 18 communicating a temporal channel close signal for blocking public images U that do not further comprise the second modulated private image V and/or further adapting the system glasses such as 14-5 to comprise a color filter 14-*cf* aligned for maximumly transmitting the narrow red, green and blue emissions of a display 23 or projector 21-*p* and maximally blocking all other visible frequencies (see FIG. 5d.)

As has also been discussed herein, using the present method of the division of luminance (rather than the division of whole spatial or temporal pixels,) it is useful to model and control the level of ambient light 62, 64 perceived both by the naked eye 2o looking at the public image 23-*out* as well as the viewer 2 looking at the private image 14-*out* through system glasses.

In a preferred embodiment, black floor 1 (BF1) 52-1 is set to at least 10% such that all public images U are formed using pixels that are perceived in the temporally combined output 23-*out* by the naked eye to lack image detail in the darkest tones made possible using sub-pixel intensity values ranging from 0 to 26 (using 8-bit modulation.) As mentioned, in the brighter ambient light settings, these darkest tones are also more difficult for the naked eye 2o to perceive. It is further anticipated based upon the present inventor's own testing, that BF1 52-1 is easily set to 12.5% without any substantial awareness of the casual observer looking at the public image 23-*out* with the naked eye 2o. Experimentation has further determined that a BF1 of 20% represents a reasonable maximum, after which any further raising of the Black Floor 1 is preferably accomplished within a controlled setting wherein the public image U is intentionally created to be lighter in tones such that the darker tones are not substantially "missed" by the observer using the naked eye 2o. As will be explained using the present Figure as well as upcoming FIGS. 5f, 5g, 5h, 5i, 5j, 5k, 5l and 5m, it is desirable to spatially and/or temporally aggregate this private image V illumination reserved by the setting of the BF1 52-1, where the aggregation functions to be discussed ultimately create a sub-set of U(V) pixels (such as one in every two to four pixels comprising the public image U) that have R, G and B sub-pixel intensity values equal to or greater than 80%, where these U(V) white-window pixels can then be modulated with full or near full dynamic range for creating a pleasing V image.

In the first step of this aggregation, a number of frames (F) is chosen for repeating the same distinct public image U, where in the present example F=2, and where a first frame 1 is intended to carry the aggregated white-window U(V) pixels for second modulation into the private image V while a second frame 2 is intended to carry U pixels with sub-pixel intensities set to blend with the frame 1 U(V) and non-U(V) pixels so as to cause the perception of the original distinct public image U to the naked eye 2o. Using this BF1=26 and F=2 example, within frame 2 substantially all sub-pixels with an intensity value<BF1 are reset to have an intensity value=BF1=26 (thus losing the information encoded between 0 and 26.) Using F=2, a Black Floor 2 (BF2) 52-2 is set equal to the F*BF1, or in this example BF2=52. Like frame 2 with respect to the BF1, within frame 1 substantially all sub-pixels with an intensity value<BF2 are reset to have an intensity value=BF2=52 (thus losing the information encoded between 0 and 52.)

Hence, the BF1 requirement effects substantially all U pixels comprising frame 2, and the BF2 requirement effects substantially all U pixels comprising frame 1. As will be well understood by those familiar with image processing, the majority of sub-pixels in both frames 1 and 2 will already have intensity value well above the BF2 let alone BF1, where then some lesser amount of pixels will have one or more of the R, G or B sub-pixels below the BF2 while them some fewer amount will have all R, G and B sub-pixels below the BF1. What is most important with respect to the present Figure is to see this limitation as guaranteeing 20% "full-white" in every U pixel across the entire frame 1 public image, where it is understood that if all R, G and B frame 1 sub-pixels have at least intensity values above 52, then collectively the U pixel formed by the combination of R>52, G>52 and B>52 can always provide the color white ranging from R=G=B=1 to R=G=B=52. In the exemplary case of a 2,000 NIT display, this means that the private image V can be modulated from 200 NITs of illumination, which is generally understood to be the equivalent of a traditional (i.e. non-HDR) tv or display.

As those familiar with image processing will also understand, this resetting of frame 1 and 2 sub-pixels may cause shifts in the hue (H) and saturation (S) of the given public image U pixel, where the lightness (L) will also shift but that is the desired result. In the upcoming FIGS. 5f, 5g, 5h, and 5i, functions for reducing the distortion of saturation S, as well as eliminating the distortion of hue H will be taught in relation to the U pixels in frame 1, where it is to be understood that these same functions are then also similarly applicable in relation to resetting the U pixels in frame 2. In relation to U pixels of frame 1, and without concern for any distortions, an exemplary sub-pixel resetting Function 1 is taught as follows. If any R, G or B sub-pixel has the intensity value X=40, where BF1<X<BF2, then the intensity value of this sub-pixel is reset=BF2. For the same sub-pixel that is then activated during the output of frame 2, that sub-pixel's value is also then reset from its original value X=40, to a new value Y=F*(X−BF1)/(F−1), where then Y=28=2*(40−26)/(2−1)=2*14/1. As the careful reader will see, with a frame 1 intensity of 52 and a frame 2 intensity of 28, the combined intensity of 80 is temporally divided by F (=2) and returns the perceived intensity of the given sub-pixel to its original value 40. As the careful reader will also see, if a sub-pixel has a value X=BF1=26, then its new Y value would be Y=2*26-52 which is 0. Hence, any frame 1 sub-pixel with a value X>BF1 but <BF2 can be reset in frame 1 to BF2 while then still also being perceived by the naked eye 2o in the temporal combination output 23-*out* as having the original intensity value X, such that the present teachings serve to limit the loss of tones to those established between sub-pixels of values 0 to BF1. Providing the same example X=40 subpixel value, where F=3 frames rather than 2, then BF2 then =78=3*26, and Y=21=3*(40−26)/(3−1), such that the successive frame 1, 2 and 3 intensities of 78, 21 and 21, respectively, yield an average of 40.

Still referring to FIG. 5e, a viewer 2 wearing system glasses such as active shutter/active polarizer 14-5 further adapted with color filter 14-*cf* (see FIG. 5d) will perceive the following: 1) only the second modulated V image 14-*out* as comprised within frame 1 along with 15% of any frame 1 concurrent ambient lighting 62, 64, and 2) none of the frame 2 output luminance 23-*out* or any frame 2 concurrent ambient lighting 62, 64 due to the closing of glasses 15-4's active shutter. As the careful reader will see, the perceived visual experience of the viewer 2 will be 200 NITs of illumination of a private image V 14-*out* along with substantially 7.5% of the ambient light 62, 64 concurrent with frame 1 and frame 2, where the 200 NITs is a 90% reduction in the luminance available for the presentation of the public image U 23-*out* to the naked eye 2o and the 7.5% of ambient light is a proportional 92.5% reduction in ambient lighting with respect to the experience of the naked eye 2o. Thus, the perceived brightness of the private image V 14-*out* to the viewer 2 will be like the perceived brightness of the public image U 23-*out* to the naked eye 2o, where it is understood that perceived brightness is significantly affected by any ambient lighting.

Referring next to FIG. 5f, within any given frame such as frame 1 or frame 2, there are a multiplicity of U pixels that collectively comprise the public image U, where these pixels operate under all traditional understandings, e.g. including three sub-pixels for each of the colors red, green and blue. When considering the present teachings that require a BF2 to be set across all pixels for the image frame that is to be used to second modulate the private image V (in this example frame 1,) the U pixels can be categorized into four groups including: 1) type "U1," where all sub-pixels such as R, G and B have intensity values X that lie within the range BF2<=X<=Max−BF2, where Max is the maximum intensity of the bit-depth, e.g. 255; 2) type "U2," where all sub-pixels such as R, G and B have intensity values X that are >=BF2, and at least one sub-pixel has an intensity value X>Max−

BF2; 3) type "U3," where all sub-pixels such as R, G and B have intensity values X that are <=Max−BF2, and at least one sub-pixel has an intensity value X that is <BF2, and 4) type "U4," where and at least one sub-pixel has an intensity value X that is <BF2, and at least one sub-pixel has an intensity value X that is >Max−BF2. As the careful reader will see, for type U1 and U2 pixels, there is no requirement that any given sub-pixel be reset to equal BF2, since all sub-pixels for U1 and U2 pixels already satisfy the requirement that X>=BF2. It is also clear that for type U3 and U4 pixels, at least 1 sub-pixel must be reset such that X=BF2, where this resetting function serves to both increase lightness L as desired, and to cause distortion in either or both the hue H and saturation S of the altered U3 or U4 pixel, where this distortion is addressed further in upcoming FIGS. 5g, 5h and 5l.

Still referring to FIG. 5f, there are taught two functions, Function 2 and Function 3, that are different from Function 1 described in FIG. 5e, for the transformation of any given frame 1 (again, where frame 1 is meant to ultimately comprise illumination intended for the second modulation of the private image V.) In Function 2, only the U3 and U4 pixels are transformed, since all U1 and U2 pixels already comprise sub-pixels at or above the BF2 floor, so these U1 and U2 pixels remain unchanged. The present inventor has noted that it is reasonable to anticipate that a majority of U pixels in any average frame 1 will be of type U1 and U2, since the average intensities of pixels (and therefore their sub-pixels) will generally be a distribution centered around 50% of Max, e.g. centered around an intensity of 128=50%*255. In Function 2, each sub-pixel comprising a U3 and U4 type, will have its intensity X increased by an amount Y=BF2−min(RGB), where the min(RGB) is the minimum X in consideration of R(X), G(X) and B(X). For example, if a U3 pixel has R, G, and B sub-pixels values of R=12, G=13 and B=150, then the min(RGB)=12, i.e. the value of the R sub-pixel. As depicted in the present Figure, the exemplary U3 pixel has RGB sub-pixel values of: R=0 (0% of 255,) G=128 (50% of 255) and B=204 (80% of 255,) where min(RGB)=0, where this is meant specifically to represent the boundary case, as those familiar with mathematics and logic will understand.

Thus, in this example, Y=52=52-0, and the sub-pixels of the original U3 pixel are reset to be: R=52, G=180 and B=255. Note that the hue H of the original pixel is 202, the saturation is 100% and the lightness L is 40% (using traditional RGB to HSL conversion,) whereas the reset pixel has a hue H of 202, saturation of 100% and lightness L of 60%. It is also important to see that the increase in lightness L from the original U3 pixel to the reset U3 pixel is 20%, which is the full amount of the BF2 due to the fact that min(RGB)=0, and therefore all sub-pixels were increased by essentially 20% of the possible 255 scale. It is also important to see, that using the per sub-pixel reset Function 1 as described in FIG. 5e, the reset U3 pixel would have sub-pixels of: R=52, G=128 and B=204, where this pixel would have a hue H of 210, a saturation S of 60%, and a lightness L of 50%, where the lightness L of 50% is less of an increase than with Function 2 where the lightness increased to 60%, which is due to the fact that the G and B sub-pixels were not likewise increased in Function 1 vs. 2. It is also noted that in this exemplary case, both Functions 1 and 2 accomplish the desired goal ensuring that all sub-pixels R, G and B to have intensities X>=BF2, and that Function 2 causes no distortion of either hue or saturation, whereas Function 1 distorts both hue and saturation.

In another instructive example, if a U3 pixel has R, G, and B sub-pixels values of R=12, G=13 and B=150, then the min(RGB)=12, i.e. the value of the R sub-pixel. Thus, in this example, Y=40=52-12, and the sub-pixels of the original U3 pixel are reset to be: R=52, G=53 and B=190. Note that the hue H of the original pixel is 240, the saturation is 85% and the lightness L is 32%, whereas the reset pixel has a hue H of 240, saturation of 57% and lightness L of 47%. It is also important to see that with a min(RGB)=12, the lightness L of the original R=12, G=13 and B=150, which when scaled based upon 0 to 255 (rather than 0% to 100%) is equal to 5%=12/255. Since the desired BF2 is 20% on the 0 to 255 intensity scale, it is then necessary to add lightness L=15%, which is the reset lightness of 47% less the original lightness of 32%. It is also important to see, that using the single sub-pixel reset Function 1 as described in FIG. 5e, the reset pixel would have sub-pixels of: R=52, G=52 and B=150, where this pixel would have a hue H of 240, a saturation S of 49%, and a lightness L of 40%, where the lightness L of 40% is less of an increase than with Function 2 where the lightness increased to 47%, which is due to the fact that the B sub-pixel was not likewise increased in Function 1 vs. 2. It is also noted that in this exemplary case, both Functions 1 and 2 accomplish the desired goal ensuring that all sub-pixels R, G and B to have intensities X>=BF2, both Functions 1 and 2 do not alter the hue H=240 of the original pixel, and that Function 2 causes less distortion of the original saturation.

Still referring to FIG. 5f, and now to an example of the transformation by Function 2 of a U4 frame 1 pixel, the exemplary U4 pixel has RGB sub-pixel values of: R=0 (0% of 255,) G=128 (50% of 255) and B=255 (100% of 255,) where min(RGB)=0, and where this is example is meant specifically to represent another of the boundary cases. Thus, in this example, Y=52=52-0, and the sub-pixels of the original U4 pixel are reset to be: R=52, G=180 and B=307, where B=307 is then clipped based upon the maximum possible value of 255 such that B=255. Note that the hue H of the original pixel is 210, the saturation is 100% and the lightness L is 50%, whereas the reset pixel has a hue H of 202, saturation of 100% and lightness L of 60%. It is also important to see that the increase in lightness L from the original U4 pixel to the reset U4 pixel is only 10%, which is due to the clipped sub-pixel B value, even though the desired goal has been accomplished that all sub-pixels have an intensity value X>=BF2. It is also important to see, that using the per sub-pixel reset Function 1 as described in FIG. 5e, the reset U4 pixel would have sub-pixels of: R=52, G=128 and B=255, where this pixel would have a hue H of 218, a saturation S of 100%, and a lightness L of 60%. It is also noted that in this exemplary case, both Functions 1 and 2 accomplish the desired goal ensuring that all sub-pixels R, G and B to have intensities X>=BF2, and both Functions 1 and Function 2 distort the hue H and not the saturation S. (As stated previously, upcoming FIG. 5g will address changes to Function 2 providing a Function 2a that reduces any substantial distortion of hue H even in the event of clipping.)

Referring still to FIG. 5f, in Function 2 only the U3 and U4 pixels of frame 1 are altered. In Function 3, at least some of the U1 and U2 are also altered using the same mathematical approach as just described for Function 2. Thus, the main difference between Functions 2 and 3 is that in an average to brighter public image U, comprising a majority of U1 and U2 pixels, with Function 2 there is less overall "lightening" of the public image U. However, Function 3 offers a more uniform change by lightening the entire public image U, avoiding a case where some of the darker portions of the public image are lightened while the average and brighter parts of the image are not, thus decreasing the contrast between the dark and light regions, as will be well understood by those familiar with image processing. In Function 3, like the U4 pixels with respect to Function 2, U2 pixels will also undergo some clipping and therefore potential hue distortion. As mentioned, upcoming FIG. 2g describes at least on alteration of Function 2, referred to as Function 2a, for minimizing the distortion of hue H caused by clipping. It is here noted that upcoming Function 2a then has a similar Function 3a that addresses the changing of all U1, U2, U3 and U4 pixels.

What is most important to see is that Functions 1, 2 and 3 are possible for ensuring that an image frame 1 comprises U pixels with sufficient lightness to ensure RGB sub-pixels values greater than the BF2. It will be clear to those familiar with image processing that functions other than Function 1, 2 and 3 are possible while still conforming to the basic requirement that substantially all sub-pixels in frame 1 have intensity values equal to or greater than a determined BF2. Thus, the present Functions 1, 2 and 3 beyond the BF2 minimum RGB requirement should be considered as exemplary rather than as limitations to the present invention. As will also be understood and as prior mentioned, any frame such as 2 that is not intended for comprising U pixels to be second modulated into V pixels must conform to the BF1 minimum RGB requirement, and as such any of Functions 1, 2 or 3 are likewise adaptable to these "type 2" frames 2, wherein the adapted Function 1, 2 or 3 BF1 replaces the variable BF2.

Referring next to FIG. 5g, there is shown a U4 pixel with original RGB values of 0, 128 and 255 as also described in an example with relation to FIG. 5f. As in the prior examples, BF1=26, F=2 and therefore BF2=F*BF1=52. Thus, the desired tinting shift (T) (that effectively changes the lightness L of a pixel) is denoted as T=52=(BF2–R)= (52–0). The original U4 pixel with values R=0 (0% of 255,) G=128 (50% of 255) and B=255 is transformed by Function 2 to become pixel U4.2 with R'=52, G'=180 and B'=307, that is clipped to 255 so as to not exceed the maximum value of 255, all as prior discussed in relation to FIG. 5f. It is noted that in Function 2, the middle G' sub-pixel value is determined to be G'=T+G. What is different about Function 2a that transforms pixel U4 into pixel U4.2a is that G'=(G–R)/ (B–R)*(B'–R')+R', where it is understood that in the generalized version of the Function 2a formula for G', R=min (RGB), G=mid(RGB) and B=max(RGB). Those familiar with mathematics will see that the revised formula for calculating G' in Function 2a is derived to best maintain the proportionality between the new R'G'B' sub-pixels to be substantially equal to the proportionality between the original RGB sub-pixels. This new Function 2a formula results in a pixel U4.2a with R'=52, G'=154 and B'=255. By way of comparison, the original U4 pixel has a hue H of 210, saturation S of 100% and lightness L of 50%. The Function 2 calculated U4.2 pixel distorts the hue H to be 202, whereas the Function 2a calculated U4.2a pixel substantially maintains the original hue H of 210, thus improving upon Function 2.

The present inventor also notes that a change in tint T is meant to be an equal increase in all sub-pixels R, G and B, to the extent that these sub-pixels do not then exceed the maximum intensity value and therefore need to be clipped. Hence, adding a 20%=52/255 means adding 52 to the sub-pixels values of R, G and B (again, assuming no clipping.) By tinting, or shifting all sub-pixels by the same tint value such as 52, it is shown in a comparison of Function 2 vs. Function 1, that distortions can be minimized. It is possible to increase the lightness L of a pixel without equally tinting all sub-pixels, such that while the increase in lightness L is proportional to tinting T, it is not identical in mathematical derivation. What is most important to see is that a BF1 is ensured in all U pixels of a type "frame 2" that is not meant to second modulate a private V image, and that a BF2 is ensured in all U pixels for a type "frame 1" that is meant to second modulate a private V image, and that functions such as Function 1 ensure the minimum respective Black Floor by increasing only sub-pixels beneath the floor, thus increasing lightness L but not adding a tint per se, whereas Functions 2, 2a, 3 (and the implied Function 3a) all increase each sub-pixel of a U pixel by equal intensity amounts and thereby are considered to be adding tints.

Referring next to FIG. 5h, there is described a Function 4 that is preferably applied to all U1, U2, U3 and U4 pixels comprised within any type "frame 1," and it not necessary to be applied to any of type "frame 2" U pixels. This Function 4 is to be performed on all U1, U2, U3 and U4 pixels, such as U4.2a, after the application of any of Functions 1, 2, 2a, 3 or 3a, or any other similar functions that meet the minimum requirement of ensuring that each U pixel has R, G and B sub-pixel intensity values X>=BF2, all as prior discussed. Preferably, to best accomplish Function 4, an original public image U is received in a resolution that is 25% of the available resolution for providing a scaled public image on any given spatial, temporal or spatial-temporal sub-channel as described herein. For example, if the original public image U is a frame from an HD video source 26 being input by into controller 18, it is preferable that the sub-channel assigned to the HD source by controller 18 comprises a resolution of at least 4k, where this HD to 4K relationship ensures that for each 1 U pixel of the original HD frame, there are 4 4k pixels into which 1 HD pixel can be enlarged and redistributed. It is possible that the 4k sub-channel represents the entire spatial resolution of a display, or that the 4k sub-channel is for example one of two or even four spatial sub-channels on at least an 8k display, all as herein taught. It is also possible that four different neighboring HD pixels from a public image U are remapped using Function 4 into the same spatial neighborhood of four pixels, hence there is a redistribution of U sub-pixel intensities without an enlargement of these same intensities. However, to best illustrate the purpose of Function 4 for aggregating all type "frame 1" ensured U pixel illumination underneath the BF2 into a single U(V) pixel 23-*out-f1-pxl*-V capable of being second modulated into a full, or near-full dynamic range V pixel 14-*out-f1-pxl*, the present Figure assumes a 1 to 4 ratio between any Function 1, 2, 2a, 3 or 3a reset original U pixel 23-*out-f1-pxl*, such as U1, U2, U3 or U4, and the mapped color redistribution group 23-*out-f1-crg* as depicted.

Figure 5M:
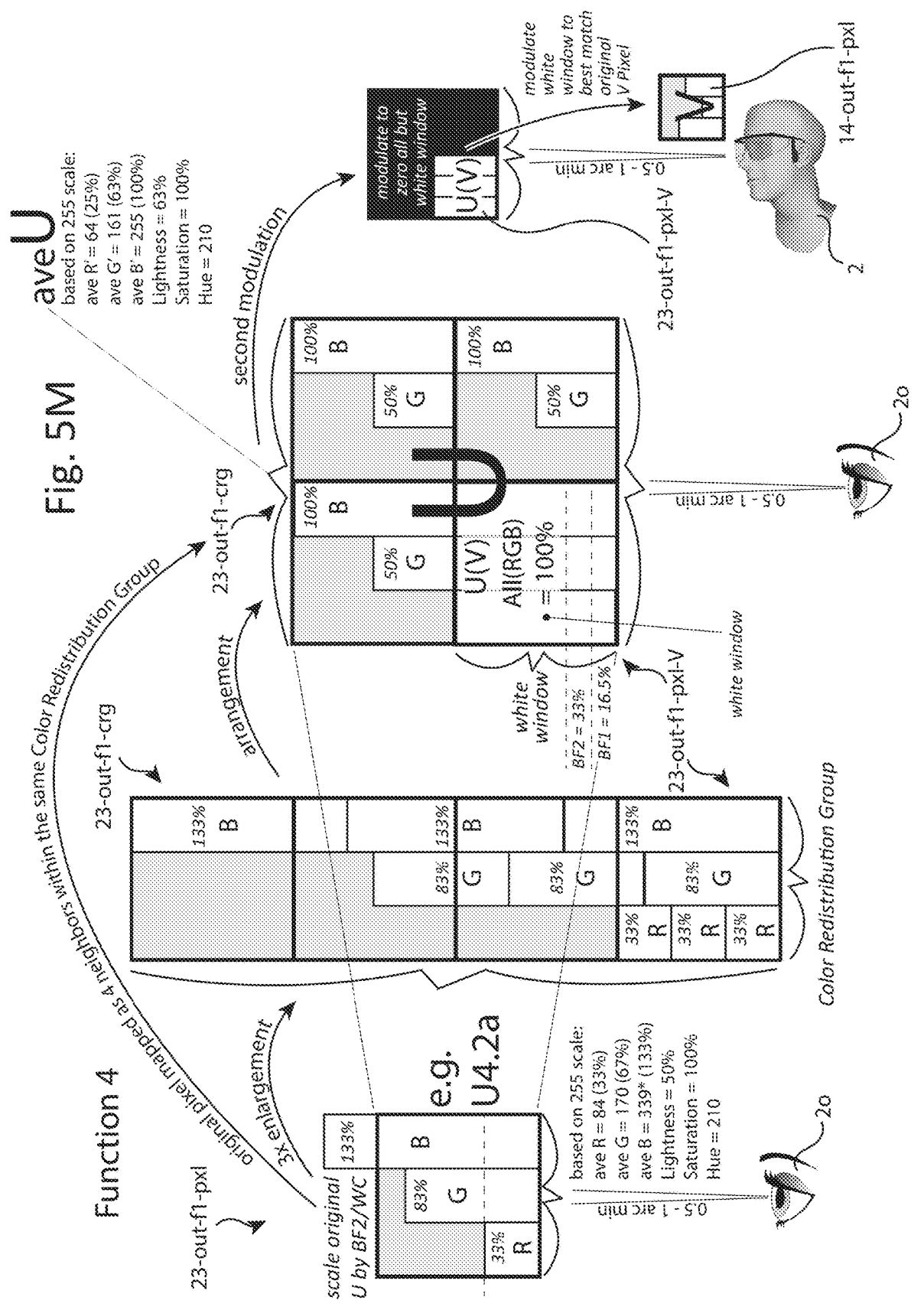

Still referring to FIG. 5h, the exemplary U pixel 23-*out-f1-pxl* to be mapped into a corresponding pixel color group 23-*out-f1-crg* comprising a neighborhood of preferably at least 4 pixels, is depicted as the same U4.2a pixel described in relation to prior FIG. 5g, namely R'=52 (20%), G'=154 (60%) and B'=255 (100%.) For clarity, the pixel color group 23-*out-f1-crg* is shown to comprise 4 pixels, but other group sizes are possible varying for example from 2 to 8 pixels, where the spirit of the teachings of all Functions 1, 2, 2a, 3, 3a and 4 are thus still maintained, all as will be understood by a careful reading of the present teachings and by those having skill in the art of image processing and human visual perception. What is shown in the present Figure is that conceptually the exemplary reset pixel U4.2a 23-*out-f1-pxl* is multiplied by 4 with respect to the sub-pixel intensities which are then stacked allowing the resulting 4× sub-pixel intensities to aggregate into the lowest displayed color group pixel U(V) 23-*out-f1-pxl*-V. Using this visualization, it is made clear that 4× the R sub-pixel value of 20% provides a total of 80% illumination within the entire color redistribution group 23-*out-f1-crg*, and that all of this 80% of intensity can be included within the U(V) pixel 23-*out-f1-pxl*-V, such the other 3 non-U(V) pixels in group 23-*out-f1-crg* have R sub-pixel values of 0%. Using this same reasoning, 4× the G sub-pixel in U4.2*a* yields a total of 240% that provides 80% of G that may be assigned to the U(V) pixel 23-*out-f1-pxl*-V, where the remaining 160% can be distributed in any way across the remaining 3 non-U(V) pixels in the color group, such as evenly providing each non-U(V) pixel with 53% green. And finally, 4× the B sub-pixel in U4.2*a* yields 400% thus requiring the setting of B=100% in all pixels of the color redistribution group 23-*out-f1-crg*. Thus, Function 4 results in the creation of a new U(V) pixel 23-*out-f1-pxl*-V with R=80%, G=80% and B=100%. Given that the U(V) pixel is to be best modulated into a V pixel 23-*out-f1-pxl*-V, it is further desirable to first clip the B=100% sub-pixel value in U(V) to be B=80% such that the U(V) pixel is "full-white" and there is no loss of dynamic range due to the need to use the second modulation to first clip the B sub-pixel. Given this desirable full-white 80% U(V) pixel and depicted non-U(V) pixels, it can be seen that the average U values of the group 23-*out-f1-crg* are: R'=52 (20%), G'=154 (60%) and B'=242 (95%,) where this combination results in a hue H=208, saturation S=88% and lightness L=58%, which compares favorably with the original H, S and L values of the enlarged and redistributed U4.2*a* pixel 23-*out-f1-pxl*. The present inventor also notes that by raising the BF1 to 12.5%, the BF2 would then rise to 25% given F=2, and then the new U(V) pixel 23-*out-f1-pxl*-V would have R=100%, G=100% and B=100%. However, this increase of the BF1 to 12.5% would also cause the B sub-pixel to undergo further clipping and distortion as discusses in relation to Functions 2 and 2*a*. In upcoming FIG. 5*l*, there is shown another Function 4*a* for achieving a similar R=100%, G=100% and B=100% U(V) pixel without further distortion of the B=100% U4.2*a* sub-pixel, where Function 4*a* increases the size of the color redistribution group from 4 to 5, and them compacts three groups of five into a larger group of 16 along with one original U4.2*a* pixel. Upcoming FIG. 5*m* provides a preferred alternative approach for minimizing distortion by enlarging any original U pixel by 3× (without any sub-pixel clipping) and then redistributing the total sub-pixel intensities into a group of four.

Referring still to FIG. 5*h* and then also to the prior teachings herein, the greater resolution of the color redistribution group 23-*out-f1-crg* should be understood to preferably occupy a similar 0.5-1.0 arc minutes as occupied by the original enlarged and redistributed U pixel. Thus it will be understood by those familiar with the human vision system, that the 4 pixels comprising the color redistribution group 23-*out-f1-crg* will be perceived as a single spatially blended pixel wherein the total 4× intensities of R, G and B are perceived substantially the same whether the 4 neighboring pixels are exactly the same as U4.2*a*, thus comprising 4 of [R'=52 (20%), G'=154 (60%) and B'=255 (100%)], or as depicted comprising 1 of [R=80%, G=80% and B=80%] and 3 of [R=0%, G=53% and B=100%]. Function 4 then accomplishes the goal of aggregating into the U(V) pixel a maximum white-window of R, G and B intensities, where as those familiar with the operations of an LCD light valve will understand that this maximum intensity white light can then be modulated across the full bit-depth, such as 256 steps assuming an 8-bit depth system. Without such aggregation into the U(V) pixel, while each frame 1 U pixel is ensured to comprise at least 20% of white light, this 20% can only be modulated across a reduced 20% of the full dynamic range. This is most evident by considering an original U pixel with R=G=0 and B=255 that is transformed by all of the Functions 1, 2, 2*a*, 3 and 3*a* into R=G=52 and B=255, where then a second modulation must first operate the second light valve to trim B=255 down to B=52 thus achieving an R=G=B first state for then modulating the V pixel 14-*out-f1-pxl*, where the second light valves controlling the second modulations of R, G and B will only have sufficient rotation remaining for modulating 52 additional steps (0 to 52) rather than the entire 8-bit dynamic range of 0 to 255. A thoughtful consideration will realize that it is possible that for instance the intended V pixel 14-*out-f1-pxl* has the sub-pixels values of R=G=0 and B=255 or similar, and thus further modulation is not necessary an in this sense this example pixel can be considered to have the full dynamic range. However, while more sophisticated functions are envisioned, the present Functions 1, 2, 2*a*, 3, 3*a* and 4 described a universally applicable approach that always ensures 1 in 4 pixels of every color redistribution group has at least an 80% full-white-window for the modulation of V to 80% of the full dynamic range, with also the possibility of achieving 100% white window by a number of means including raising the BF1 to 12.5%, applying a Function 4*a* as to be described in relation to FIG. 5*i*, or relying upon at least a majority of brighter original U pixels that do already comprise all R, G and B sub-pixels greater than 25% such that while there is no requirement for the application of Functions 1, 2, 2*a*, 3 and 3*a*, using Function 4 is useful for aggregating the minimal 25% light into a full 100% white window, as the careful reader will understand.

Still referring to FIG. 5*h*, as those familiar with the human vision system will understand, the naked eye 2*o* will perceive the color redistribution group 23-*out-f1-crg* as equivalent to 4× the luminance of the original U pixel such as U4.2*a*, hence there is no further distortion in hue or saturation caused by Function 4 (accept in consideration of the clipping of the exemplary Blue sub-pixel in U(V) from 100% down to 80%.) As will also be understood, if each of the 3 non-U(V) pixels are second modulated to 0% while the white widow U(V) 23-*out-f1-pxl*-V is modulated to best represent an intended private image V pixel 14-*out-f1-pxl*, then a viewer 2 wearing system glasses such as 14-5 will perceive the V pixel surrounded by three black pixels. Given that this redistribution group 23-*out-f1-crg* is preferably within the 0.5-1.0 arc min spatial acuity limit of the average human vision system, the net perception is a "100% V illumination pixel" reduced in intensity to 20%-25% by the three surrounding black pixels, based upon a white window of 80%-100% respectively. As the careful reader will also note, in the present example of F=2, this V pixel 14-*out-f1-pxl* will then be reduced in perceived intensity by 4 corresponding black pixels in frame 2, thus being perceived by viewer 2 with a corresponding intensity of 10%-12.5%, that is the chosen black floor 1. As prior discussed, the 87.5% to 90% reduction in the luminance of the private image V with respect to the luminance of the public image U is problematic unless the ambient lighting is proportionately reduced, where the present teachings provide apparatus and methods for this proportionate reduction as described herein. As taught with respect to FIG. 5*e*, using a 2,000 NITs display in a bright indoor room or outdoors provides a pleasing public image U while then also providing a second modulated private image V reduced to 200 NITs with less than 90% concurrent ambient lighting, such that the private image V is perceived with a similar resolution and brightness to the public image U. Using these and other functions described in up-coming Figures, the present inventor believes that a reasonable maximum illumination of the private image is ranges between 12.5% and 20% of the total illuminance of a display 23 or projector 21-*p*, such that in the best case a 2,000 NITs display can substantially provide a private image with 400 NITs of illumination that remains undetectable to the naked eye 2*o* while at the same time providing a pleasing public image U.

Referring next to FIG. 5*i*, there is shown Function 4*a* transforming the U4.2*a* pixel based upon a BF1 of 10% into a set of five mapped color redistribution group pixels 23-*out-f1-crg*-2. Also shown is Function 4*b* transforming the U4.2*a* pixel into three groups of 5 (23-*out-f1-crg*-2) combined with a single U4.2*a* pixel to form a color redistribution group of 16 pixels 23-*out-f1-crg*-3. As will be clear from a careful comparison of the four mapped pixels of 23-*out-f1-crg* in FIG. 5*h*, with the present five pixel group 23-*out-f1-crg*-2, using the extra 5th pixel it is possible to multiply the 20% BF2 min(RGB) sub-pixel (in this example Red) by 5× to become 100% along with the remaining sub-pixels (i.e. in this example Green and Blue) forming 100% white-window pixel U(V) 23-*out-f1-pxl-*V-2. As will also be clear to those familiar with LCD light valves, by rearranging the RGB light within a given U pixel such as U4.2*a*, it is possible to form a full-white and therefore R=100%, G=100% and B=100% U pixel from which a V pixel such as 14-*out-f1-pxl* can be second modulated using a polarization layer such as 23-*ply*-2 without any loss in dynamic range. As prior described, as long as all of the pixels within the color redistribution group such as 23-*out-f1-crg*-2 and 23-*out-f1-crg*-3 remain substantially within an area of 0.5 to 1.0 arc mins with respect to an observer, the human eye will tend to blur the light from all of these pixels together into a perceived single hue, saturation and lightness, such that in the present depiction a cluster of five remapped pixels within color redistribution group 23-*out-f1-crg*-2 will be perceived to have a combined H=210, S=100% and L=60% with five times the total luminance of the original U pixel such as U4.2*a*, even though none of the five pixels in the group has the same individual RGB sub-pixel intensities as the original U4.2*a* pixel.

Still referring to FIG. 5*l*, as will be well understood by those familiar with image processing, a group of five mapped pixels representing a single source pixel is problematic to maintain as a repetitive pattern. Assuming for example that the source pixel is from an HD resolution image and that the mapped pixels are from an 8k display, then the 1 HD pixel can be mapped into a color redistribution group 23-*out-f1-crg*-3 comprising 16 8k pixels as depicted. As will also be clear from a careful consideration of the present Figure, these 16 8k pixels form 3 groups of 5 pixels plus 1 additional pixel, where each of the 3 groups of 5 can be treated as a color redistribution group 23-*out-f1-crg*-2 while the remaining 1 additional pixel can be set equal to the original pixel U4.2*a*. In such a configuration, where all the 16 group 23-*out-f1-crg*-3 pixels lie within a 0.5-1.0 arc min area with respect to the average observer, each of the 16 pixels can be placed within any of the 16 possible locations. However, for the sake of clarity, the present depiction shows each of the three white-window pixels U(V) 23-*out-f1-pxl*-V2 from each of the three groups 23-*out-f1-crg*-2 of five pixels, as being placed within the interior of the 16-pixel group 23-*out-f1-crg*-3 along with the one additional original pixel U4.2*a*. It is then also clear by a careful consideration of the mathematics presented herein, that the combined luminance of the 3 U(V) pixels and the 1 U4.2*a* pixel is equivalent to 20% of the total possible illumination from the 16 pixel group 23-*out-f1-crg*-3, where for example if the 8k display outputs 2,000 NITs, then on a proportional basis the 16 pixel group has reserved a full 20% of possible illumination being 400 NITs for the second modulation of the private image V. In further consideration of temporal averaging with a corresponding 16-pixel group comprised within a second frame 2, this 400 NITs is then averaged into 200 NITs, which is the exemplary setting of the BF1, namely 10%=200 NITs/2,000 NITs. As will also be clear from a careful consideration of the present teachings, the use of functions such as Function 1, 2, 2*a*, 3, 3*a*, 4, 4*a* and 4*b* not only reserves a selectable percentage (such as BF1=10%) of the total display illuminance (such as 2,000 NITs) for the second modulation of a private image V, this reserved illumination can be shifted into a sub-set of full-white-window U(V) pixels including 100% RGB intensities such that the second modulation of the private image V has substantially the full dynamic range, all as will be well understood by those familiar with at least LCD technology.

Given this teaching of the reservation and aggregation of illumination, the present examples provided herein especially with respect to FIG. 5*b* through upcoming FIG. 5*m* should be considered as exemplary rather than as limitations of the present invention. What is most important in this regard is that a consistent illumination is reserved and therefore always available across the entire display/projector image area intended for the output of a private image V, and that this illumination is available as substantially a sub-set of full-white pixels U(V) for a second modulation of V pixels with substantially full dynamic range, where these full-white pixels U(V) can be assured through a function of light aggregation as described herein. It is also important that care be taken to minimize any distortions of hue and saturation within the public image U as output over the same image area, as can be assured through functions of proportional sub-pixel shifting as described herein.

Referring in general to the prior teachings related to FIG. 5*b* through FIG. 5*l*, the examples where given with respect to a display 23 further comprising a sub-pixel polarization layer 23-*ply*-2, where this layer 23-*ply*-2 was prior described as being applied to any technology such as OLED or LCD, and even to those technologies within projector 21-*p* systems. As will also be understood by those familiar with 3D movies provided using projection systems, since the reflective surface of the screen is metallic, the polarization characteristics of the projected light are maintained. Thus, the privacy mode teachings that are provided herein are applicable to the movie theater setting, where a movie then comprises both a public image U that is viewable by the naked eye 2*o* along with at least one private image V that is only viewable with glasses such as the specie 14-*as-ap*, where this private image V is second modulated from projector 21-*p* illumination that is reserved and aggregated to form a sub-set of substantially full-white public image pixels U(V) from which the private image V can be encoded, all as prior described.

Referring next to FIG. 5*j*, there is shown an exemplary 80% white-window U(V) pixel 23-*out-f1-pxl*-V being second modulated using any of Functions 11, 12, 12*a*, 13 and 13*a* to be encoded as a best representation such as V4.*m*1, V4.*m*2 or V4.*m*2*a* of an original V pixel V4 14-*out-f1-pxl*. Key to these teachings is the concept of a white ceiling WC

54 shown with respect to the original V4 14-*out-f1-pxl*. The WC 54 is similar in concept to the BF1 52-1, in that it serves as a dynamic range limit on the original image pixel (such as V in the case of WC and U in the case of BF1) within which modulation is to take place, i.e. second modulation with respect to V limited by the WC and first modulation with respect to U limited by the BF1. It is noted that the BF1 serves to acceptably limit the darkest tones of the public image U in order to reserve illumination for the second modulation of the private image V, and that the WC serves to acceptably limit the brightest tones of the public image V in order to minimize the loss of darkest tones in the public image U (i.e. by requiring for example the aggregation of a white-window U(V) pixel to reach only 80% white rather than 100% white.) Similar to the understanding that the public image U is preferably output within greater ambient lighting such that the initial stimulus is increased and therefore the just noticeable difference JND with respect to the darkest tones is also increased thereby minimizing the perceptibility of the darkest tones to the benefit of the public image U, since the private image V is preferably received through system glasses such as 14-5 with a color filter such as 14-*cf* together significantly limiting any ambient lighting it will be then clear that the JND of the brightest tones is decreased thereby maximizing perceptibility of the brightest tones to the benefit of the private image V.

Still referring to FIG. 5*j*, Function 11 is like Function 1 where any V4 sub-pixel>WC is reset equal to the WC, thus potentially also introducing distortion of H and S. Like Function 2, Function 12 is only applied to original V pixels comprising at least one sub-pixel with an intensity value X>WC, where by analogy these would be referred to as V3 and V4 pixels (see the U3 and U4 pixels of FIG. 5*f*.) Analogous to Function 2, Function 12 reduces the tint of all sub-pixels by an amount equal to the max(RGB) intensity (in the present Figure being B=255) less the WC 54 setting (in the present Figure being 204,) where in the present Figure this change in tint=51=255-204. During this reduction, it is possible that that a given sub-pixel with an intensity value X<(Max−WC) (in this example less than 100%−80%) such that the reduction in tint causes the sub-pixel to have a negative intensity value, where in such a case the intensity is then set=0 and distortion is introduced. Like Function 3, Function 13 is applied to other V pixels that do not comprise any sub-pixels with an intensity value X>WC, where by analogy these would be referred to as V1 and V2 pixels. Function 12*a* and 13*a* are like Functions 2*a* and 3*a* and introduce proportional scaling of all sub-pixels based upon the necessary decrease of the maximum valued sub-pixel (in this example B=225 (100%) must be scaled to B'=204 (80%),) to substantially remove any distortion of H and minimize distortion of S.

Referring next to FIG. 5*k*, there is shown on the lower half of the drawing the exemplary color redistribution group 23-*out-f1-crg* as first depicted in relation to FIG. 5*h*, where the 4-pixel group held the enlarged color redistribution of an exemplary U4.2*a* pixel 21-*out-f1-pxl* as contained with frame 1 and in accordance with the teachings of Function 4. Based upon these teachings, it was shown to be possible to create 1 80% white-window pixel U(V) along with 3 non-U(V) pixels for example carrying an even redistribution of the balance of the enlarged R, G, and B intensities comprising [R=0%, G=53% and B=100%.] The average H, S and L values of the group 23-*out-f1-crg* are shown as H=208, S=88% and L=58% that compare to the U4.2*a* pixel with H=210, S=100% and L=60%, where it is also understood that the original U4 pixel prior to the processing by Function 2*a* had the values of H=210, S=100% and L=50% (see also FIG. 5*g*.) Further depicted in FIG. 5*k* are the same 4 pixels of group 23-*out-f1-crg* reset according to a Function 5 within frame 2 group 23-*out-f2-crg* to the new R, G and B intensity values of [R=0%, G=40% and B=100%.]

The purpose of Function 5 is to determine appropriate sub-pixel intensity values for a frame (such as 2) that is not constructed to carry illumination such as U(V) for the second modulation of a private image V, all as prior discussed, such that it is also understood that Function 5 is operable on a single frame 2 where F=2 but then also operable for example on frames 2 and 3 where F=3, etc. The appropriate sub-pixel intensity values are those that when temporally combined with other corresponding groups such as 23-*out-f1-crg* (carrying U(V)) or a frame 3 (if F>2,) etc., cause the average hue and saturation to best represent the original U pixel. In the present Figure, the original U pixel has average sub-pixel intensities of [R=0%, G=50% and B=100%] that are equivalent to values of H=210, S=100% and L=50% while the temporally average U.f1+U.f2 has average sub-pixel intensities of [R"=10%, G"=50% and B"=97.5%] that are equivalent to values of H=213, S=95% and L=54%, where these U.f1+U.f2 values compare favorably with the original U values. It is also noted that B"=97.5% due to the clipping of B' from 100% to 80% within the U(V) pixel 23-*out-f1-pxl*-V as prior discussed in relation to FIG. 5*h*. (The present inventor notes that choosing not to clip B' leads to either: 1) some loss in the dynamic range of the V pixel 14-*out-f1-pxl*, or 2) a proportional 20% increase in the Blue coloration of the V pixel, but then otherwise allows for the temporally averaged U.f1+U.f2 to have sub-pixel intensities of [R"=10%, G"=50% and B"=100%] that are equivalent to values of H=213, S=100% and L=55% that are even closer to the original values while still providing sufficient illumination for the provision of the private image V.

Still referring to FIG. 5*k*, it is noted that the perceived V illumination based upon frame 1 is 20%, and that the perceived illumination after temporally averaging with frame 2 is 10%, also equal to the BF1. As a useful adaptation of Function 5, it is possible to use a frame 2 pixel with sub-pixel intensities of [R=0%, G=20% and B=100%] to better corresponding to the frame 1 U(V) pixel with intensities of [R=80%, G=80% and B=80%,] such that the average of the two corresponding pixels is then [R=40%, G=50% and B=90%] which the careful reader will see is closer to the original U pixel with values of [R=0%, G=50% and B=100%.] Using further adapted Function 5 that first determines a corresponding frame 2 pixel to best offset a U(V) frame 1 pixel, the further adapted Function 5 second determines the best average R, G and B intensities of the frame 2 pixels corresponding to non-U(V) pixels, such that the average of all frame 1 and frame 2 intensities best matches the original U intensities. Using the present example, the frame 2 pixels corresponding to non-U(V) frame 1 pixels would be set to [R=0%, G=47% and B=100%.] The present inventor notes that the four equally set frame 2 pixels in the present Figure have a total illumination of: 4× [R=0%, G=40% and B=100%], where the further adapted Function 5 pixels would have substantially the same total illumination comprising a different combination of 1×[R=0%, G=20% and B=100%]+3×[R=0%, G=47% and B=100%.]

Referring next to FIG. 5*l*, during experimentation by the present inventor it was determined that even when adjusting the BF1 to introduce as much as 20% loss in the darkest tones of the public image U, the observer still finds the tinted public image U to be pleasing and to that extent the darkest tones were substantially "not missed." Given F=2 and BF1=20% then BF2=40%=2*20%. With BF2=40%, it is then possible to proportionally tint the original U pixel comprising [R=0%, G=50% and B=100%] by 40% resulting in [R=0%, G=70% and B=100%] (after clipping B from 140% back to 100% and then proportionally scaling G from 90% back to 70%, all as discussed in relation to Function 2*a* in FIG. 5*g*.) The proportionally tinted U4.2*a* pixel is then enlarged using Function 4 into the 2-pixel group 23-*out-f1-crg*-4 to become the U(V) pixel [R1=80%, G=80% and B=80%] and the non-U(V) pixel [R=0%, G=60% and B=100%.] These two pixels create the average pixel U.f1 comprising [R'=40%, G'=70% and B'=90%] sub-pixel values corresponding to H=204, S=72% and L=65%. Using Function 5, the 2-corresponding frame 2 pixels 23-*out-f2-crg*-4 for example could be given equal [R'=0%, G'=30% and B'=100%] sub-pixel values, with a resulting H=222, S=100% and L=50%. As depicted, the average of the frame 1 and frame 2 pixels yields sub-pixel values of [R"=20%, G"=50% and B"=95%] with a resulting H=216, S=88% and L=58% which the present inventor has determined to appear substantially similar to the original U pixel. What is then important to see is that using the two U(V) pixels now provided within frame 1 as compared to 1 U(V) pixel as shown in FIG. 5*k*, the maximum modulated V illumination has doubled from 20% to 40%, where after frame 2 averaging remains 20%=BF1. Using the exemplary 2,000 NITs display, 20% illumination reserved for the private image V amounts to 400 NITs, which is equivalent to an HDR display.

Again, the public image U will appear brightened but to an acceptable level that still provides for pleasing darker tones, especially when considering that the display is preferably situated within ambient lighting substantially equal to or greater than the luminance of the display, or that even the public image U is specially crafted to be on average a brighter image (for example the controlled use case of a museum or theme park.) All the light reserved for the output of the private image V is second modulated and therefore the naked eye will not perceive the private image V in any way. As will be apparent from a careful consideration, using the arrangement as depicted in the present Figure as compared to FIG. 5*k*, the effective output resolution of the both the public image U and the private image V has been doubled, since only two (rather than four) pixels are required to represent each of any U and V pixels. The present inventor also notes that an exemplary worst case original U pixel given the present arrangement of FIG. 5*l* would have sub-pixels values of [R=0%, G=0% and B=100%] which when tinted become [R=40%, G=40% and B=100%] such that the Blue intensity is maximally impacted by the increase in Red and Green intensities. However, this exemplary worst-case original U pixel has a H=240, S=100% and L=50% whereas the combined frame 1 and 2 pixels would average to [R=20%, G=20% and B=100%] with H=240, S=100% and L=60%, which will be perceived as substantially the same to the observer.

Referring next to FIG. 5*m*, there is shown another embodiment of the present teachings with respect to best implementing privacy mode where the BF1 is set to 16.5% that is below the experimental maximum of 20% (without using controlled use case content) and 100% white-window U(V) pixels are created by enlarging the tinted U pixels by 3× for color redistribution into a group of four pixels. As depicted in the present Figure, exemplary original U4 pixel 23-*out-f1-pxl* with sub-pixels values of [R=0%, G=50% and B=100%] (see FIG. 5*g*) when tinted by the BF2=2*BF1=33% becomes U4.2*a* as shown with sub-pixels values of [R=33%, G=83% and B=133%.] Rather than clipping the excess 33% of illumination associated with the Blue pixel during Function 2*a*, Function 4 enlarges the U4.2*a* by a factor of 3× and then redistributes the resulting R, G and B illumination across four pixels in the color redistribution group 23-*out-f1-crg*. As depicted, this allows for the formation of a 100% white-window U(V) pixel 21-*out-f1-pxl*-V, along with three non-U(V) balancing pixels, in this case shown with an equal balance of the remaining R, G and B illumination such that each non-U(V) pixel has sub-pixels values of [R=0%, G=50% and B=100%.] Also as depicted, the resulting aveU pixel has sub-pixels values of [R=25%, G=63% and B=100%] resulting in H=210, S=100% and L=63% as compared to the original U pixel with H=210, S=100% and L=50%, where there is no distortion of H or S and L changes by the desired 25%.

Still referring to FIG. 5*m*, although not depicted, a corresponding frame 2 color group 23-*out-f2-crg* as determined by Function 5 generates a set of RGB values to best combine with the aveU hue, saturation and lightness to restore the original U hue, saturation and lightness. An evenly balanced set of four pixels in such a group 23-23-*out-f2-crg* would comprise pixels with sub-pixels values of [R=0%, G=37% and B=100%,] which then temporally averages with the frame 1 aveU pixel to create a combined and perceived pixel with sub-pixels values of [R=12.5%, G=50% and B=100%.] The perception of this spatially and temporally combined four frame-1 and four frame-2 pixels would then have H=214, S=100% and L=56% that is substantially identical in perception to the original U pixel H=210, S=100% and L=50%.

Another important distinction of the 3-into-4 enlargement ratio is that this results in a decrease of the maximum luminance of the U public image by 25%, where for example if the display's maximum luminance is 2,000 NITs, then the public image U is limited to a maximum of 1,500 NITs. This decrease has advantages where the ambient light is not as bright. However, the private image V will still have maximum luminance equal to the BF1 which is this example is 16.5% of 2,000 NITs, or 330 NITs, which exceeds the typical luminance of a non-HDR tv. Hence, the ratio of luminance is further balanced between the public and private images, where the reduction in luminance from public to private is now on the order of 78% rather than 90% (using a BF1=10% as shown in FIG. 5*e*.) As prior mentioned in relation to FIG. 5*e*, it is desirable to reduce the ambient lighting transmitted through the system glasses such as 14-5 along with the private image V luminance such that the relative ratio of the private image V luminance to the transmitted ambient lighting 62, 64 is substantially the same as the ratio of the public image U luminance to the ambient lighting 62, 64 as perceived by the naked eye 2*o*. For this reason, when the BF1 is set to 10% and there is a 90% reduction in image U-into-V luminance, it is desirable to cut the ambient lighting associated with V also by 90%. It was shown that by adding a color filter 14-*cf* to system glasses 14-5 a reduction of roughly 92.5% is anticipated (see FIGS. 5*d* and 5*e*.)

As discussed, using a BF1 of 16.5% and a 3:4 enlargement ratio, the maximum U luminance drops to 75% (i.e. 1,500 NITs) while the net perceived luminance of the private image V increases to 16.5% (i.e. 330 NITs,) resulting in a net decrease in the ratio of U to V illumination from 90% down to 78%=(1,500−330)/(1,500). Using system glasses 14-5 without a color filter 14-*cf*, 100% of the ambient lighting associated with frame 2 is dropped by closing the active shutter, while at least 50% of the unpolarized ambient lighting 62, 64 associated with frame 1 is cut during transmission of frame 1 by the linear polarizers included in the system glasses 14-5, resulting in a reduction of at least 75%, which is substantially similar to 78%, especially when considering that linear polarizers typically block 55% rather than 50% of unpolarized light. Using system glasses such as 14-5 further adapted to include a color filter 14-*cf* that effectively block 92.5% of the ambient lighting 62, 64, the ratio of U to V illumination remains 78% while the corresponding drop in ambient lighting is 92.5%. Thus, with or without the adaptation of a color filter 14-*cf*, system glasses 14-5 can provide a private image V with a perceived brightness on par with the public image U as seen by the naked eye 2*o*.

Referring next to FIG. 6*a*, there is depicted an alternate embodiment of the present invention combining components of the present system 100 with components described for a game access point such as 30-1 in the copending application INTERACTIVE GAME THEATER WITH SECRET MESSAGE IMAGING SYSTEM. A game access point such as 30-1 is meant for use at a destination such as a theme park or museum where viewers 2 become gamers 2 under the direction of an interactive gaming system 48. A preferred destination includes several game access points such as 30-1 where gamers 2 receive secret messages through a video display 23 using teachings from both the copending and present application. The video display 23 is shown combined with a gamer/device detector 30-*det*, where the purpose of the detector 30-*det* is to automatically detect, identify and locate a gamer 2 as the gamer 2 approaches the video device 23, where gamer tracking datum is provided by detector 30-*det* to a remote content controller 18-*r*2 comprising an interactive gaming system 48. Gaming system 48 uses the gamer tracking datum at least in part to determine next content 26-*nc* for the gamer 2, such as a secret message related to an on-going game. Remote controller 18-*r*2 provides next content 26-*nc* to local controller 18-1 along with gaming indications including any of gamer tracking datum indicative of the gamer 2's spatial location with respect to the video device 23. Local controller 18-1 then provides the next content 26-*nc* to video device 23 for output on a select viewing sub-channel and a select sub-set of pixels, where the sub-set of pixels has been determined to be substantially in front of the gamer 2 with respect to the video display 23 such that multiple gamers such as 2-1, 2-2, 2-3, 2-4 and 2-5 are able to each receive next content 26-*nc* substantially at the same time using combinations of viewing sub-channels and sub-sets of pixels. For the purposes of the present Figure, a gamer 2 is exactly like a viewer 2 with the additional understanding that the gamer 2 is currently engaged with interactive gaming system 48 to play a game such as those described in the copending applications INTERACTIVE OBJECT TRACKING MIRROR-DISPLAY AND ENTERTAINMENT SYSTEM, THEME PARK GAMIFICATION, GUEST TRACKING AND ACCESS CONTROL SYSTEM and INTERACTIVE GAME THEATER WITH SECRET MESSAGE IMAGING SYSTEM.

Gamer/device detector 30-*det* automatically detects any one or more gamers such as 2-*x* within the zone of detection 76*a* near video device 23, for potentially summoning a gamer 2-*x* to approach video device 23. As gamer 2-*x* approaches video device 23, whether summoned or self-motivated, game access point 30-1 is capable of automatically engaging a specific gamer such as 2-1, 2-2, 2-3, 2-4 or 2-5 within a zone of engagement 76*b* to provide content via a combination of: 1) a unique viewing sub-channel such as temporal channels 1, 2 and 3 or spatial sub-channels A or B, and b) a sub-set of video device 23 pixels. It is important to see that the entire video device 23 is outputting situational, individualized, private, on-demand content to one or more concurrent gamers 2, where a first gamer 2 is receiving first distinct next content 26-*nc*, where the first distinct next content 26-*nc* is limited to any combination of temporal, spatial and temporal-spatial sub-channels as well as a distinct sub-sets of the total pixels comprising device 23, where the sub-set covers a display area that is less than the total display area of the video device 23, and where a second gamer 2 is substantially unable to perceive the first distinct next content 26-*nc*, where these capabilities are significantly different than a traditional display system that outputs the same content to all on-lookers across at least the total display area if not also all of the total pixels. It is also important to understand that the entire display 23 is concurrently providing one or more public images or video while providing private next content 23-*nc* to one or more gamer's 2, where an observer using the naked eye 2*o* perceives the public image preferably displayed across the entire display 23 and does not substantially perceive any of the private next content 23-*nc*.

Still referring to FIG. 6*a*, private next content 26-*nc* is selected by interactive gaming system 48 for the engaged gamer 2 based at least in part upon any one of, or any combination of: 1) gamer tracking datum, where gamer tracking datum is as described in the copending applications INTERACTIVE OBJECT TRACKING MIRROR-DISPLAY AND ENTERTAINMENT SYSTEM, THEME PARK GAMIFICATION, GUEST TRACKING AND ACCESS CONTROL SYSTEM and INTERACTIVE GAME THEATER WITH SECRET MESSAGE IMAGING SYSTEM, and where gamer tracking datum includes any datum determined about or relating to a gamer 2 for example using any of detectors that are cameras, RFID sensors or pressure sensors such as pressure sensing flooring materials such as carpets or tiles; 2) gaming indications, where gaming indications are as described in relation to FIG. 4*h*, or 3) gamer indications, where gamer indications are like viewer indications as described in relation to FIG. 4*h* and include any of inputs made by a gamer 2 using any interfaces provided by the game access point 30-1 or provided by a mobile gaming device being used by the gamer 2 including system eye glasses 14, magnifying glass 15, or gaming devices especially as described in the copending application INTERACTIVE GAME THEATER WITH SECRET MESSAGE IMAGING SYSTEM.

In the copending patent THEME PARK GAMIFICATION, GUEST TRACKING AND ACCESS CONTROL SYSTEM the present inventor taught in detail the use any one of, or any combination of: 1) RFID smart tickets (see especially FIG. 1*a* of copending app, elements 2, 2*b*, 2*c*) that preferably implement passive RFID technology detectable within a medium range such as 3-35 feet by RFID transponders (such as RFID reader 6 also in copending FIG. 1*a*), where a guest (e.g. gamer 2-*x*) carrying a smart ticket 2 is automatically detected within a proximity 76*a* allowing pre-known or associated information about the guest to be recalled including e.g. biometric data such as facial images or facial meta-data; 2) cameras for detecting gamer 2-*x* presence at a specified fixed physical location (such as a ride car seat, see e.g. copending FIGS. 8*a* and 8*b*) further capable of determining or confirming gamer 2-*x* identity, where especially the determined identity is based upon a smaller list of potential facial images or facial meta-data predetermined as a consequence of RFID smart ticket detection, and 3) either a combined pressure sensor and (RFID) exciter (see element 20 of copending FIG. 5b) or some implementation of a pressure sensor mat (see element 14 of copending FIG. 5b) for further determining the physical location and movement of a gamer 2-x by detecting the pressure of the gamer 2-x applied to the sensor such as by walking on the mat or sitting in a pressure sensing seat. These elements (1), (2) and (3) in any combination are herein referred to as gamer/device detection 30-det, where specifically element 30-det was taught in the copending application entitled INTERACTIVE GAME THEATER WITH SECRET MESSAGE IMAGING SYSTEM (see e.g. copending FIG. 7a.) Element 30-det was introduced along with a game access point (see element 30 e.g. in copending FIG. 10c) such as 30-1, where any gamer such as 2-1 is preferably but not necessarily playing a game that at least in part is managed by an interactive gaming system 48, for example, game access point 30-1 could alternatively be a self-contained system where the functions included within remote content controller 18-r2 are included within local content controller 18-l, where rather than playing a game, visitors 2 at a convention center or airport are wearing or carrying RFID detectable badges or tickets and are being provided customized private information (i.e. next content 26-nc) at a shared video output device 23.

Still referring to FIG. 6a, the preferred remote content controller 18-r2 is like the remote gaming platform described in the copending applications INTERACTIVE OBJECT TRACKING MIRROR-DISPLAY AND ENTERTAINMENT SYSTEM and INTERACTIVE GAME THEATER WITH SECRET MESSAGE IMAGING SYSTEM, wherein controller 18-r2 receives gamer tracking datum from game access points 30-1 including gamer proximity, identity and location such as determined by gamer/device detection 30-det. Once identified, interactive gaming system 48 (as originally taught with respect to the remote gaming platform of the copending applications) provides the gamer 2 with questions, clues, pictures, answers as well as any other digital content associated with an on-going game. The specific teachings for a remote gaming platform 10 and gamer/device detection 30-det remain as described in the copending application where other descriptions included video devices referred to as a secret message output device (see element 22 in copending app FIG. 7a,) where the present video display device 23 is a further adaptation of the teachings regarding the secret message output devices, and where the secret message output device was itself a further adaptation upon teachings related to a mirror/display (see element 20 in FIGS. 1, 2a of copending app entitled INTERACTIVE OBJECT TRACKING MIRROR-DISPLAY AND ENTERTAINMENT SYSTEM.) Also taught along with the secret message output device was secret message magnifying glass (see element 15 especially in FIGS. 3, 4, 5 and 6 of copending application INTERACTIVE GAME THEATER WITH SECRET MESSAGE IMAGING SYSTEM,) where the magnifying glass was itself a further adaptation of secret message eye glasses (see element 14 in especially FIGS. 5a, 5b, 5c and 5d of copending application INTERACTIVE OBJECT TRACKING MIRROR-DISPLAY AND ENTERTAINMENT SYSTEM,) and where the present eye glasses 14-5 are a further adaptation of both the secret message eye glasses (14) and magnifying glass (15.) What is important to see is that present application is a continuation in part of a chain of applications detailed as the related copending applications, where core teachings have been introduced and are hereby incorporated.

Still referring to FIG. 6a, as a gamer 2-x enters a zone of detection 76a, for example within 35 feet of the video device 23, gamer/device detection 30-det uses any combination of RF, cameras and pressure sensors to detect, identify and locate the gamer 2-x all as taught in the copending applications, where locating is at least with respect to the video device 23 such that it is possible to determine that a particular gamer such as 2-1 or 2-4 is currently standing within an engagement zone 76b, for example 6 feet of the video device 23 and with an un-obstructed view of device 23. One preferable detection sequence of gamer 2-x is as follows:

1) a gamer 2-x is wearing or carrying a mobile gaming device (see element 60 of FIG. 2 in copending application INTERACTIVE GAME THEATER WITH SECRET MESSAGE IMAGING SYSTEM) such as eye glasses 14-5, 14-7, 14-8, 14-9, 14-10 or 14-11 (or copending magnifying glass 15 further adapted as necessary by the teachings herein);
2) the mobile gaming device implements preferably a wi-fi network connection or Bluetooth communications such that it is automatically detectable by communication devices comprised within the gamer/device detection 30-det of the game access point 30-1;
3) each mobile gaming device has a unique ID that has been pre-associated with a gamer ID such that once connected to detector 30-det, detector 30-det receives and transmits the mobile device ID to the interactive gaming system 48 as gamer tracking datum along with a unique ID associated with the game access point 30-1, where the interactive gaming system 48 then at least in part uses the mobile device ID to retrieve the gamer ID for example from a database of gamers 2 as maintained in association with the interactive gaming system 48 and otherwise available to gaming system 48;
4) the interactive gaming system 48 uses the gamer ID and the current game state 48-gs to retrieve or determine related gaming indications associated with the gamer ID;
5) the interactive gaming system 48 at least in part uses gaming indications to determine whether or not to summon the gamer 2 to the video display device 23 in order to receive next content 26-nc, and if so determined communicates with a mobile gaming device associated with gamer 2 including any of a cell phone, any of system eye glasses 14, or any of other wearable or carried devices that for example causes output detectable by the gamer 2 including any of flashing lights, vibration and sounds such that the gamer 2 is alerted and then proceeds towards an unobstructed opening in front of video device 23, where for example the gamer 2 might walk into any unoccupied engagement location 76c such as ground markings including colored circles located for example 6 feet in front of the video device 23;
6) where the flooring or ground area preferably including all of engagement locations 76c in front of the video device 23 is further covered with pressure sensing materials that at least determines the pressure and therefore presence of a gamer 2's feet, even if the exact gamer 2 ID is not detected by the materials, and more specifically detects that some gamer 2 is standing or has just entered for example a previously unoccupied engagement location 76c;

7) one or more cameras included within gamer/device detector 30-*det* provide images of any gamers 2 occupying any of locations 76*c*, where the provided images are usable at least in part by computing elements such as included within detector 30-*det* to determine or confirm the identity of a gamer 2 occupying a specific location 76*c*, where the determination or confirmation is made using any of facial recognition or body recognition, and where the timing of the determination or confirmation is preferably triggered by the detections that some gamer 2 is standing or has just entered for example a previously unoccupied engagement location 76*c*;

8) one or more RFID transponders included within gamer/device detector 30-*det* provide identification signals of any gamers 2 occupying any of locations 76*c*, where the provided identification signals are usable at least in part by computing elements such as included within detector 30-*det* to determine or confirm the identity of a gamer 2 occupying a specific location 76*c*, where the identification signals are respective of a RFID being carried by a gamer 2, where a carried RFID is located upon, within or otherwise physically associated with any of a ticket or mobile gaming device, and where the timing of the determination or confirmation is preferably triggered by the detections that some gamer 2 is standing or has just entered for example a previously unoccupied engagement location 76*c*;

9) using at least in part the determined or confirmed gamer ID of a gamer such as 2-1 occupying a location such as 76*c*, interactive gaming system 48 determines and provides any of game next content 26-*nc* including video or audio to local content controller 18-1 along with gaming indications including any of gamer tracking datum received from detector 30-*det* such as the specific engagement location 76*c* being occupied by the gamer such as 2-1, where content controller 18-1 at least in part uses the specific engagement location 76*c* to determine a sub-set of pixels within video device 23 for outputting the provided game content 26-*nc*, where the selected sub-set of pixels are located substantially in front of the determined physical location 76*c* and therefore in front of the gamer such as 2-1, and 10) where the content controller 18-1 then further selects a viewing sub-channel comprising any of temporal or spatial sub-channels for outputting as private images/video the provided game video content 26-*nc* to the gamer such as 2-1 occupying location such as 76*c*, where the selected viewing sub-channel is preferably different from any other viewing sub-channel currently being used to output any different next content 26-*nc* to another adjacent gamer such as 2-2 or otherwise preferably any gamer sufficiently in view of the sub-set of pixels selected for output to gamer 2-1, where content controller 18 also provides control signals to system eye glasses such as 14-5, 14-7, 14-8, 14-9, 14-10, 14-11 or magnifying glass 15 associated with the gamer such as 2-1 sufficient of filtering the selected viewing sub-channel and therefore selected next content 26-*nc* intended for gamer 2-1, and where content controller 18-1 preferably also provides game audio content associated with the game video content 26-*nc* as any of private audio 16-*pa* using any of private speakers 16 or shared audio using any of public speakers 17.

Still referring to FIG. 6*a*, it is important to understand that the present teachings of a video device 23 further adapted to include a polarization layer such as 23-*ply* or 23-*ply*-2 allow controller 18-1 to limit the display of any next content 26-*nc* to only a sub-set of pixels, thereby providing a significant advantage for spatially dividing the display area of a given video output device 23 across one or more engagement locations 76*c*. Furthermore, it is important to see that while concurrently outputting private next video content 26-*nc* as viewing images V to one or more gamers such as 2-1, 2-2, 2-3, 2-4 and 2-5 using any combination of viewing sub-channels and sub-sets of pixels, controller 18-1 is cable of dynamically determining a complimentary image C for display across all pixels of video device 23 such that the naked eye 2*o* substantially perceives either of a disguising image D or target image T (see FIG. 4*d*.) It is also important to see that using a video output device 23 further adapted to include active polarizing and modulating layer 23-*ply*-2, controller 18-1 is capable of causing any of next video content 26-*nc* to be output as private modulated images 23-*out-m* that are only perceivable to a gamer such as 2-1 as private demodulated images 14-*out-dm* using any of system glasses such as 14-7 or 14-8, where the naked eye 2*o* substantially perceives only the public image 23-*out* (see FIG. 4*g*.)

And finally, still with respect to FIG. 6*a*, as taught in the copending applications, game access point 30-1 may be further equipped with an object tracking component (see element 30-*ot* in FIG. 7*a* of copending application INTERACTIVE GAME THEATER WITH SECRET MESSAGE IMAGING SYSTEM,) where the object tracking component uses cameras to track articles such as a wizard's wand (see element 12 in FIG. 1*a* of copending application INTERACTIVE OBJECT TRACKING MIRROR-DISPLAY AND ENTERTAINMENT SYSTEM,) where the tracked trajectory of the article is then interpreted by a computing process preferably being executed within detector 30-*det* to be gamer 2 indications such as commands, where either or both the tracked trajectory of the article is communicated to gaming system 48 as gamer tracking datum or the gamer 2 indications are communicated to gaming system 48 as gamer indications, where gaming system 48 then provides gaming indications to controller 18-1 based at least in part upon any of gamer tracking datum or gamer indications, where controller 18-1 at least in part uses gaming indications for adjusting the next content 26-*nc*, where adjusting means changing the output color or intensity of any one or more pixels in the next content 26-*nc*.

Referring next to FIG. 6*b*, there is depicted an alternative embodiment 30-2 of game access point 30-1 taught in relation to FIG. 6*a*, where game access point 30-1 has been further adapted to omit gamer/device detector 30-*det* and comprise gamer stations 30-*sta* such as stations 1, 2, 3, 4 and 5. Like access point 30-1, multiple gamers 2-*x* approach video display device 23 in a random queue with random spacing. Unlike access point 30-1, access point 30-2 does not provide for automatic gamer engagement where a gamer such as 2-*x* is first detected within a zone of detection 76*a*, second summoned to approach the video device 23 and then third detected as occupying an engagement location such as 76*c* within an engagement zone 76*b*. Alternatively, access point 30-2 provides gamer controlled engagement where a gamer such as 2-1 self-determines to approach a gamer station 30-*sta* such as station 1, where the engagement location such as 76*c* of each of gamer stations 30-*sta* is pre-known and calibrated with respect to video device 23, where each station 30-*sta* provides at least one identification interface for identifying a gamer 2, where the gamer such as 2-1 uses the identification interface to identify themselves by providing gamer indications, where stations 30-*sta* provide gamer indications and gamer tracking datum including the engagement location 76c to interactive gaming system 48, and where gaming system 48 then provides next content 26-nc as prior described in the preferable detection sequence steps (9) and (10).

With respect to the identification interface provided by each gamer station 30-sta, each station 30-sta comprises technology for uniquely identifying a respective gamer 2, where preferably the technology includes any of a near field communication (NFC) or RFID reader capable for detecting encoded gamer 2 identification information contained within or related to other information contained within any electronic encoding means embedded within any of the gamer's smart ticket (see element 2 in FIG. 1 of copending application THEME PARK GAMIFICATION, GUEST TRACKING AND ACCESS CONTROL SYSTEM) or mobile gaming devices (see element 60 in FIG. 2 of copending application INTERACTIVE GAME THEATER WITH SECRET MESSAGE IMAGING SYSTEM,) where mobile gaming devices include for example any of herein described eye glasses 14-5, 14-7, 14-8, 14-9, 14-10, 14-11 or copending eye glasses (see element 14 in FIGS. 5a, 5b, 5c and 5d of copending application INTERACTIVE OBJECT TRACKING MIRROR-DISPLAY AND ENTERTAINMENT SYSTEM,) copending described magnifying glass (see element 15 in FIG. 3 of copending application INTERACTIVE GAME THEATER WITH SECRET MESSAGE,) or for any of mobile gaming devices such as a wand article (see element 12 in FIG. 10Dd of copending application INTERACTIVE GAME THEATER WITH SECRET MESSAGE) or a game toy sword article (see element 62-swd in FIG. 11 of copending application INTERACTIVE GAME THEATER WITH SECRET MESSAGE.) Alternately, the identification interface also includes any of manual identification apparatus and methods such as a screen interface for entering gamer ID related codes, a bar code interface for scanning a gamer ID related bar code, or a card swipe interface for scanning a magnetically encoded gamer ID related code. It is anticipated that a gamer 2 using an identification interface provided by a given station 30-sta presents any of materials such as their smart ticket or a mobile gaming device to the given station 30-sta that detects the contained encoded datum such as a gamer ID or mobile device ID for transmitting to the interactive gaming system 48 as gamer indications, where the contained encoded datum either already uniquely identifies the gamer 2 or where the interactive gaming system 48 then at least in part uses the mobile device ID to retrieve the gamer ID for example from a database of gamers 2 as maintained in association with the interactive gaming system 48 and otherwise available to gaming system 48.

Still referring to FIG. 6b, each station 30-sta preferably includes a station ID that is transmitted to interactive gaming system 48 as gamer tracking datum along with the gamer ID as gamer indications, where the station ID is used at least in part by gaming system 48 to associate with the pre-known and calibrated engagement locations 76c of each station 30-sta to determine a first sub-set of pixels spatially aligned with the station 30-sta from within the total pixels comprising video device 23, where the first sub-set of pixels are then used for displaying a secret/private image to the respective gamer 2.

Still referring to FIG. 6b, as the careful reader will see, game access point 30-1 (of FIG. 6a) has advantages in that it automatically detects and engages gamers 2 based largely upon gamer tracking datum acquired by gamer/device detector 30-det whereas the present game access point 30-2 has advantages in that gamers 2 self-control their own access thus obviating the need for device detector 30-det. Both access points 30-1 and 30-2 allow a gamer 2 to interact with the gaming system 48 and receive at least secret message/private images or video as next content 26-nc and optionally also private audio 16-pa using any of private speakers 16. As those familiar with these technologies will understand, and based upon a careful reading of the present and copending inventions, it is possible to combine the functionalities of game access points 30-1 and 30-2. For example, access point 30-2 could be further adapted to include a game/device detector 30-det comprising for example sufficient technology such as RFID transponders for automatically detecting the presence of gamers 2-x within the zone of detection. Furthermore, access point 30-2 could also further include wi-fi or Bluetooth communications for communicating with gamer glasses such as 14-5, 14-7, 14-8, 14-9, 14-10, 14-11 or 15, so as to provide indications to the gamer 2 for summoning the gamer to a specific station such as 1, 2, 3, 4 or 5, where for example the indications are any of flashing lights, vibrations, or audible sounds. Therefore, the preferred and alternate embodiments described herein should be considered as exemplary rather than as a limitation of the present invention, as many variations are possible and beneficial without departing from the present teachings or the teachings of the copending applications.

Referring next to both FIGS. 6a and 6b, as those familiar with computing systems and communication will understand, it is possible that the functions of the remote content controller 18-r2 are provided locally for example at a destination such as a theme park comprising a multiplicity of game access points such as 30-1 and 30-2, where locally means on a local area network verses at wide area network that includes a cloud-based implementation of remote controller 18-r2 as depicted. It is also possible for the functions of 18-r2 are incorporated into local controller 18-l. What is important to see is the specified functionality for allowing one or more gamers 2 to simultaneously engage a video output device 23 for receiving next content 26-nc via a sub-set of pixels restricted to a physical portion of the video device 23 determined to be substantially in front of an engaging gamer 2, where the apparatus and methods for gamer 2 engagement with the game access point range from automatic to manual, where automatic means that the access point such as 30-1 determines the gamer 2 identity by detecting datum being carried or worn by the gamer 2 such as an RFID embedded in a ticket, and where manual means that the access point such as 30-2 determines gamer 2 identity by detecting datum being physically presented (such as placing a ticket near a reader) or otherwise physically input (such as entering a code through a screen) by the gamer 2.

As will be well understood by those familiar with crowd interface systems such as a game access point as described both herein and in the copending applications, the ability to divide the total display area of a video device 23 into sub-sets of pixels for outputting secret messages or otherwise private information to a select viewer 2 has many uses and possibilities within and beyond entertainment. For example, the present invention anticipates multiple gamers 2 standing together in a crowd and all watching the same first viewing sub-channel being display across the entire display area of the video device 23, where the game access point such as 30-1 is determining general locations of the multiplicity of gamers 2 with respect to the video device 23, and where the remote controller 18-r2 uses at least in part the determined general location of an identified gamer 2 to deliver an individualized private next content 26-*nc* to the gamer 2 using a second viewing sub-channel and a selected sub-set of pixels such that the gamer 2 either does not realize that they are receiving individualized content 26-*nc* or is surprised by the content 26-*nc* and therefor is motivated to take some action that is different from the remaining gamers 2 forming the crowd. Therefore, game access points 30-1 and 30-2 should be considered as exemplary rather than as limitations of the present invention as many variations are possible without departing from the teachings of the present and copending applications.

Referring next to FIG. 6*c*, there is shown a preferred display 23 with sub-pixel polarization layer 23-*ply*-2 being used at either of automatically detecting game access point 30-1 (primarily FIG. 6*a*) or gamer self-engaged game access point 30-2 (primarily FIG. 6*b*.) What is most important to see with respect to the current Figure is that the display 23 and layer 23-*ply*-2 are operated to provide a multiplicity of physically separated streams such as Stream 1, 2, 3, 4, 5, 6, 7, 8, and 9 comprising private video of Types V1, V2 and V3 that are: 1) not substantially perceivable to the naked eye 2*o*; 2) not substantially perceivable to an observer wearing sunglasses or passive polarizer glasses, and 3) only perceivable to viewers such as 2-*v*2 wearing system glasses of specie 14-*ap* (see FIG. 2*g*) or a similar specie such as 14-*as-ap* comprising at least an active polarizer that are receiving control signals indicative of the rotational state of an entrance light valve (see FIG. 2*a*,) where each of the Streams 1 through 9 are associated with a distinct station 76*c* for receiving a secret/private message as next content 26-*nc*. Each Type V1, V2 and V3 of a private video V stream comprises a temporal secession frames including reserved V illumination based upon F=1, where preferably BF1>=20% and each pixel of the public image U is being enlarged by a factor of 3× or 4× and redistributed over a color group of size four such that 25% of the U pixels are transformed into U(V) pixels with a white window of at least 80% for the second modulation of private V pixels, all as will be understood by a careful reading of FIGS. 5*b* through 5*m*.

Still referring to FIG. 6*c*, there are shown three tables across the top of the Figure describing the relationship of rotation states of the first light valve of active polarizer glasses such as 14-*ap* with respect to the rotation state of the second polarizer layer 23-*ply*-2 during the encoding of the private image V within the public image 23-*out-m* (see FIGS. 2*d* and 2*e*.) In prior FIGS. 2*d* and 2*e*, it was shown that with respect to each sub-pixel, the rotational state of the second modulation layer 23-*m* can be alternately set based upon a 0 or complementary 90 degree starting rotation for encoding each sub-pixel, where for example starting with a 0 degree rotation provides what is shown in the tables as "V" and starting with a complimentary 90 degree rotation provides what is shown in the tables as "R(V)," where also as prior taught any of system glasses such as 14-*ap* including a first light valve of an active polarizer receive coordinated control signals such that all V encoded public images 23-*out-m* are not further rotated as they transmit through the first light valve thus remaining "V," whereas all R(V) encoded public images 23-*out-m* are further rotated by 90 degrees as they transmit through the first light valve transforming into "V" encoding. Based upon the teachings in relation to prior FIGS. 2*d* and 2*e*, an observer wearing polarized sunglasses or otherwise passive polarizer glasses that are incapable of having their axis of linear polarization rotated in coordination with the output of Streams of Type V1, V2 and V3, will substantially perceive neutral gray light as the non-rotated private image V combines with its complimentary 90 degree rotated R(V).

The leftmost table at the top of the present Figure indicates three Streams V1, V2 and V3 being output side-by-side via a display 23 and polarization layer 23-*ply*-2 such as at stations 76*c* providing Private Streams 1, 2 and 3, Private Streams 4, 5 and 6, or Private Streams 7, 8 and 9. In a Stream of Type V1, starting from the bottom of the table going to the top, the private image V (14-*out-dm* of FIGS. 2*d* and 2*e*) is encoded within public image U (23-*out-m* of FIGS. 2*d* and 2*e*) using an on-going pattern of rotations V1, R(V1), V1, R(V1), whereas a Stream of Type V2 is encoded using a pattern of rotations V2, V2, R(V2), R(V2) and the Stream of Type V3 is encoded using a pattern of rotations R(V3), V3, V3, R(V3). Referring to the centermost tables at the top of the present Figure, there is shown from top to bottom three successive tables, one for each of three viewers 2-*v*1, 2-*v*2 and 2-*v*3. As shown in the top of the three centermost tables, the entrance light valve of system glasses such as 14-*ap* are controllably rotated in coordination with the output of the Streams V1, V2 and V3 (as shown in the leftmost table,) where starting from the bottom of the table going to the top, the entrance light valve is "Rotated?" in the pattern of No, Yes, No, Yes. As the careful reader will see, when this pattern of No, Yes, No, Yes rotations to the entrance light valve is applied to Stream V1, the result is a stream of final private images V1, V1, V1 and V1, such that viewer 2-*v*1 substantially perceives the private images encoded as V1. As the careful reader will also see, when this pattern of No, Yes, No, Yes rotations to the entrance light valve is applied to Stream V2, the result is a stream of final private images V2, R(V2), R(V2) and V2, where, as prior discussed in relation to FIGS. 2*d* and 2*e*, complimentary rotations V2 and R(V2) temporally combine to form neutral gray light such that viewer 2-*v*1 substantially does not perceives the private images encoded as V2. Similar to Stream of Type 2, based upon the pattern of No, Yes, No, Yes light valve rotations with respect to Stream of Type 3, viewer 2-*v*1 receives R(V3), R(V3), V3, V3 and thus also does not substantially perceive any of private stream V3.

Still referring to FIG. 6*c*, the middle of the centermost tables indicates the preferred light valve rotation pattern of No, No, Yes and Yes for a viewer 2-*v*2 while the bottom of the centermost tables indicates the preferred light valve rotation of Yes, No, No, Yes for viewer 2-*v*3. As the careful reader will see based upon a similar comparison of the centermost tables to the leftmost table, after the indicated light valve rotations, viewer 2-*v*2 will substantially perceive streams of Type V2 and substantially not perceive streams of Type V1 or V3, whereas viewer 2-*v*3 will substantially perceive streams of Type V3 and substantially not perceive streams of Type V1 or V2. Referring next to the rightmost table shown at the top of the present Figure, the binary numbers from 0 to 16 are shown, where each of bit3, bit2, bit1 and bit0 represent the possible rotation states of the light valve of any system glasses such as 14-*ag* with respect to the output of private image frames V as depicted in the leftmost table. What is clear from a consideration of the possible combinations of the light valve setting to 0 or 90 degrees rotation, only combinations corresponding to the decimal numbers of 3, 5, 6, 9, 10 and 12 provide both 2 states of 0 degree rotation and 2 states of 90 degree rotation, where an even combination of 0 and 90 degree rotation is most effective for causing a private image V to be neutralized by its complimentary image R(V). As a careful observer will see, the combination of "0101" associated with decimal number 5 corresponds with the rotation of the light valve in the system glasses 14-*ap* being worn by a viewer 2-*v*1, hence "0101" indicates rotations "No, Yes, No, Yes." Similarly, combination 3 corresponds to viewer 2-*v*2 while combination 9 corresponds to viewer 2-*v*3.

A careful consideration will also show that the combinations "1010" corresponding to decimal number 10 are simply the inverse of the combination "0101" that is decimal number 5, such that if a viewer 2-*v*1 had their system glasses 14-*ap* rotated in the pattern of "1010"=Yes, No, Yes, No, the viewer 2-*v*1 would receive R(V1), R(V1), R(V1), R(V1), which is substantially identical to the a demodulated V1, V1, V1, V1, thus the combination corresponding to number 10 provides no additional value over the combination 5. In a similar consideration, combination 12 is the inverse of 3 while combination 6 is the inverse of 9. Thus, when considering the Streams of Combinations Table in the preset Figure, it is clear that three streams V1, V2 and V3 can be modulated side-by-side using a display 23 with polarization layer 23-*ply*-2 such that three side-by-side viewers 2-*v*1, 2-*v*2 and 2-*v*3 will each only perceive the private video 1, 2 or 3 output on the display 23's pixels spatially corresponding to an assigned station 76*c* such as station 4, 5 or 6, respectively. By strategically arranging each station such as Station 5, to have each of the next two neighboring Stations (such as Stations 6 and 7 to the right of Station 5, or Stations 4 and 3 to the left of Station 5) be of a different rotation type (such as V1 or V3,) there is a maximum distance created between the center-of-view of a viewer such as 2-*v*2 standing at a Station 5 and the pixels of another Type V2 stream, such as being displayed at either Stations 2 or 8, where the maximum distance helps ensure that the viewer 2-*v*2 does not substantially perceive any secret message being output at Stations 2 or 8.

Still referring to FIG. 6*c*, the purpose of the present Figure is to show that various combinations of rotational states coordinated between regions of a display 23 corresponding to access-point stations 76*c* and the entrance light valves comprised within system glasses such as 14-*ap* being worn by a viewer standing at the access-point station 76*c* can be used to enable privacy between viewers such as 2-*v*1, 2-*v*2 and 2-*v*3. As will be also understood by a careful reading of the present invention, it is possible to create various patterns of successive streams comprising any of Types V1, V2 and/or V3, such that the present depiction should be considered as exemplary, rather than as a limitation of the present invention. It is also possible to combine the use of an active shutter using glasses such as 14-*as-ap* where for example half of the image frames (such as the first combination of V1 and R(V1)) in any given stream (such as Stream 5 corresponding to Station 5) are restricted to a first viewer of a Type such as V2, such that this restricted first half of frames are then blocked from any viewer of another Type V2 stream at a next adjacent Type V2 station (such as Stream 2 at Station 2 or Stream 8 at Station 8,) whereas these next adjacent viewers of Type V2 streams receive for example the second half of V2 stream frames that are then blocked from the viewer 2-*v*2 standing in the middle station 5. As a careful consideration will show, this active shutter/active polarizer (rotation) method further limits a given viewer such as 2-*v*2 standing a particular station such as 5 from being able to see any other private images of the same Type (in this case V2,) while simultaneously having the effect of cutting the refresh rate for the viewer 2-*v*2 by 50% along with the associated illumination.

Referring next to FIG. 7*a*, there is shown game access point 30-1 of FIG. 6*a* from two separate viewpoints, view 1 and view 2. As will be well understood by those familiar with video display technology, flexible displays are now possible using technologies such as AMOLED developed by the Chinese manufacturer Royole. Using any technology supporting flexible or curved displays, game access point 30-1 alternately includes video output device 23 in a pillar style form 30-1-*pir* as depicted in views 1 and 2. Combined into the pillar 30-1-*pir* to which video device 23 is attached, there is also shown gamer/device detector RF technology 30-*det-rf* and camera technology 30-*det-cam* in exemplary locations. Pressure sensing mat 30-*det-ps* preferably surrounds pillar 30-1-*pir* for engaging the footsteps of one or more gamers such as 2-1, 2-2, 2-3 and 2-4. As the careful reader will see, the curved video device 23 of pillar 30-1-*pir* performs and behaves exactly like the non-curved traditional/rectangular video device 23, thus further allowing gamers 2-1, 2-2, 2-3 and 2-4 to approach from all directions. As prior taught, gamers 2-*x* (not depicted) can be first detected at a greater distance from pillar 30-1-*pir* within some zone of detection 76*a* (not shown,) where after any of gamers 2-*x* may be summoned or self-directed to approach pillar 30-1-*pir*. Also as explained, using the various combinations of RF, camera and pressure sensing, it is possible to determine when and where a particular gamer such as 2-1 is standing for example within 4 feet of pillar 30-1-*pir* with an unobstructed view of the pillar, where the engagement location of where the gamer is standing is then used at least in part to select a sub-set from within the total pixels comprising video device 23 as being substantially located in front of gamer 2-1, all as prior described in relation to FIG. 6*a*. The selected sub-set of pixels are then used to display first next content 26-*nc* as provided by interactive gaming system 48 and as determined to be relevant to the gamer such as 2-1, where for example the first next content 26-*nc* is provided over a spatial sub-channel such as A, all as prior described.

Also depicted is example adjacent gamer 2-2 viewing pillar 30-1-*pir* and simultaneously receiving second next content 26-*nc* as provided by interactive gaming system 48 and as determined to be relevant to the gamer such as 2-2, where for example the second next content 26-*nc* is provided over a spatial sub-channel such as B. In this depicted example, the selected sub-set of total pixels for displaying video content to gamer 2-1 at least partially overlaps the sub-set of total pixels for displaying video content to gamer 2-2, where each gamer perceives only their selected sub-channel A or B, respectively. In view 1, gamer 2-1 is depicted as receiving a riddle that is a next question in a game being played by the gamer 2-1 as managed by the interactive gaming system 48, where the present inventor discussed this type of gaming in copending application INTERACTIVE GAME THEATER WITH SECRET MESSAGE IMAGING SYSTEM (e.g. see FIG. 8*c*,) and where gamer 2-1 might then either enter an answer for example using a game app running on their cell phone, or might take a picture with any of the game app running on the cell phone, a camera embedded in their eye glasses such as 14-5, 14-7, 14-8, 14-9, 14-10, 14-11 or a magnifying glass (see element 15 in FIG. 8*c* of copending app INTERACTIVE GAME THEATER WITH SECRET MESSAGE IMAGING SYSTEM,) where the picture is then analyzed using well-known software tools such as Google Photos that interprets the picture providing for example object classification or identification of all objects recognized by the software, and where the provided object classification or identification is usable by the interactive gaming system 48 as an actionable response from the gamer, all as prior described in the copending application.

Also in view 1, gamer 2-2 is depicted as receiving a secret message from an avatar, where for example gamer 2-2 simultaneously sees the avatar as output by video display device 23 while also hearing a message from the avatar as output by any of private speakers 16 or public speakers 17. The present inventor notes the special effect that can be caused by outputting shared audio over public speakers 17 that might be musically associated to the avatar or in some way a sound effect that nearby gamers and/or on-lookers hear, while a private audio 16-*pa* message is provided from the avatar exclusive to the gamer 2-2.

Still referring to FIG. 7*a*, now view 2, there is shown the same moment in time where two other gamers 2-3 and 2-4 are simultaneously receiving third and fourth video content as output on other select sub-sets of pixels within video display device 23. For example, gamer 2-3 is viewing a secret lock symbol (see 48-*sym-lock* in FIG. 14 of copending application INTERACTIVE GAME THEATER WITH SECRET MESSAGE IMAGING SYSTEM,) where gamer 2-3 may then use for example a camera included in their eye glasses 14 or magnifying glass 15, such that the camera captures an image of the lock symbol (48-*sym-lock*.) As discussed in the copending application, the gamer 2-3 has already been given a key symbol (see 48-*sym-key* also in FIG. 14) for which the combination of key and lock fit together to form the clue symbol (see 48-*sym* also in FIG. 14.) The present inventor anticipates that a special cell phone case similar to that taught in relation to FIG. 7*c* of copending application INTERACTIVE OBJECT TRACKING MIRROR-DISPLAY AND ENTERTAINMENT SYSTEM can be provided for a gamer such as 2-3 to use with their cell phone and game app, such that the game app using the originally equipped cell phone camera receiving images through a channel filtering lens such as 14-*cfl*, 14-*cfl*-3, 14-*cfl*-4, 14-*cfl*-5 can capture images substantially similar to what the gamer 2-3 would also perceive using for example eye glasses such as 14-5, 14-7, 14-8 or 14-11, respectively, as well as glasses 14-9 and 14-10. And finally, gamer 2-4 is shown as simultaneously receiving a map for obtaining directions to for example a next game access point to which gamer 2-4 is being directed by the interactive gaming system 48. The mapping functions are principally described in relation to FIGS. 9*a*, 9*b*, 9*c*, 9*d* and 9*e* of copending application INTERACTIVE GAME THEATER WITH SECRET MESSAGE IMAGING SYSTEM.

Referring next to FIG. 7*b*, there is shown a preferred alternate pillar 30-1-*pir*-2 for use with a game access point such as 30-1 that automatically detects the presence and identities of gamers such as 2-1 and 2-3. What is different about pillar 30-1-*pir*-2 as compared to pillar 30-1-*pir* (as depicted in FIG. 7*a*) is that: 1) pillar 30-1-*pir*-2 comprises an arrangement of a multiplicity of adjacent flat displays 23 with polarization layers 23-*ply*-2, e.g. in a hexagon arrangement, that substantially form a pillar shape without requiring curved displays 23; 2) each of the flat displays such as 30-1-*pir-d*1, 30-1-*pir-d*2 and 30-1-*pir-d*3 are operated to output a private stream of either Type V1, V2 or V3 as taught in relation to FIG. 6*c*, where for example the three Types of private streams V1, V2 and V3 are ideally separated by a hexagonal column arrangement where any given viewer such as 2-1 of a private stream Type such as V1 is opposite from any other viewer such as 2-4 of the same stream Type V1 and therefore physically restricted to viewing only a single stream of Type V1, and 3) the pillar 30-1-*pir*-2 includes structures for preferably holding directional private speakers such as 16-4 (see FIG. 3*d*) thereby allowing the substantially overhead projection of a modulated ultrasound such as 16-4-*ds*-1 and 16-4-*ds*-3 for providing private audio 16-*a* corresponding to private video V of types V1, V2 and V3.

As prior described, the combination of flat displays such as 30-1-*pir-d*1, 30-1-*pir-d*2 and 30-1-*pir-d*3 each also provide a public image U viewable to the naked eye 2*o*, where it is also possible that the public image U can be continuous across all flat displays of the pillar 30-1-*pir*-2 even though the private images V are restricted to single flat panels. Also as prior described, viewers such as 2-1, 2-3 and 2-4 are preferably automatically detected as they enter a detection zone 76*a* (see FIG. 6*a*) surrounding pillar 30-1-*ply*-2 (for example by detecting the viewer's system glasses comprising a communications link such as Bluetooth,) where after the viewers are optionally summoned according the state of an on-going game to approach and engage the pillar 30-1-*ply*-2 by occupying an available station such as 76*c*-1, 76*c*-2 and 76*c*-3. In one embodiment of the pillar 30-1-*pir*-2, pressure sensing mats automatically detect the presence of a gamer such as 2-1 standing at a station 76*c*-1, after which the game access point 30-1 determines the identity of the gamer 2-1 using any one of, or any combination of: 1) RF detectors such as 30-*det-rf* for detecting preferably a passive RFID embedded on either a ticket or device being worn or held by the viewer 2-1, where the RFID is usable to uniquely identify the gamer, or 2) cameras 30-*det-cam* for capturing images of the gamer 2-1 for comparison with a list of possible pre-known gamer images, where the comparison is usable to uniquely identify the gamer. Identified gamers are then provided with next content 26-*nc* according to the on-going state of an interactive gaming system 48, where the next content 26-*nc* preferably comprises private video V output as a stream Type V1, V2 or V3 with corresponding private audio 16-*a* preferably output as modulated ultrasound column 16-4-*ds*-3.

Still referring to FIG. 7*b*, as will be clear from a careful consideration of the present teachings, both pillars 30-1-*plr* and 30-1-*pir*-2 can also be adapted for use with a game access point 30-2 that allows gamers to self-engage rather than being automatically detected, such that the present Figure should be considered as exemplary rather than as a limitation of the present invention, where other modifications are also possible without departing from the scope and spirit of the present teachings.

Referring now to FIGS. 6*a*, 6*b*, 6*c*, 7*a* and 7*b*, as the careful reader will see it is also possible to implement video display device 23 using projectors rather than displays and it is also possible to implement video device 23 as a multiplicity of smaller video devices 23 collectively acting a single video output device 23 as is commonly referred to as a video wall. Therefore, the preferred embodiments and alternatives should be considered as exemplary rather than as limitations to the present invention. Those familiar with the underlying technologies and the environments for using video device 23 will understand that some implementations are best served using a display technology configured as a single display or a video wall while others are best served using projector technology.

Referring next to FIG. 8 there is shown an alternate embodiment of the present invention combining components of the present system 100 with components described for a physical/virtual game board 10 in the copending application PHYSICAL-VIRTUAL GAME BOARD AND CONTENT DELIVERY SYSTEM, where the combination forms game access point 30-3. A game access point such as 30-3 is meant for use in a home or small group setting such as a café where viewers 2 are playing a physical board game as represented by the interchangeable board game overlay 11, where the overlay is in the format of a game such as Monopoly or Clue. Overlay 11 rests upon a game base 10gb capable of detecting and tracking the locations of multiple game pieces 8, where game base 10gb is in communication with a computing device such as a mobile tablet including a gaming app 19 and provides the piece locations as gamer tracking datum to a device 19. Computing device 19 is also serving as a content selector 19 and is in communication with a local content controller 18-1 for exchanging any of gamer tracking datum, gaming indications or gamer indications, where local controller 18-1 is in communications with and provides the same datum and indications to remote controller 18-r2. Remote controller 18-r2 includes an interactive gaming system 48 that at least in part uses any of the provided datum and indications to select next content 26-nc for transmission to local controller 18-1, where local controller 18-1 then selects a viewing sub-channel such A or B to provide the next content 26-nc to a gamer using any of video output devices such as 23-2d or 23-p3d, where for example the next content 26-nc is provided in response to a gamer such as 2-10 moving their game piece 8 onto a new game board location.

Still referring to FIG. 8, along with a video display device such as 23-2d, 23-p3d there is shown example private speakers 16-1 that are bone speakers attached to eye glasses 14 being worn by each of example gamers 2-10 and 2-11 for receiving private audio 16-pa corresponding to next content 26-nc that includes private video such as 14-out-1 and 14-out-2.

As taught in the copending application, physical-virtual game 10 differs from a traditional game board such as Monopoly in many ways including: 1) game board 10 comprises piece tracking game board 10gb that uses electronics to determine and communicate the on-going locations and unique ID of all game pieces 8 with respect to board 10gb and therefore also registered overlay 11; 2) game base 10gb also comprises a communications path 10c such as a wireless Bluetooth technology for transmitting game piece tracking datum as gamer tracking datum to a computing device 19 such as a PC, smart phone or tablet, where the computing device 19 also serves as a content selector 19 as defined herein and is therefore also capable of transmitting game piece tracking datum to at least the local content controller 18-1, exchanging gamer questions and answers and receiving game content, ads, and device commands as both gaming indications and gamer indications, all as taught in the copending application; 3) game board 10 uses any of a multiplicity of game board overlays 11 to represent the actual game layout and game piece paths, where for example one overlay 11 could be made to look like a Monopoly game while another overlay 11 could be made to look like the game of CLUE, where the overlay 11 is registered to the game base 10gb by the gaming app running on computing device 19 such that device 19 is capable of translating generic game base 10gb detected piece locations into specific game overlay 11 locations; and 4) many other features not presently depicted such as automatically communicating with gamer wearables such as eye glasses 14-5, 14-7, 14-8, 14-9, 14-10, 14-11, 15 or necklaces, where the wearables are made to present output to any of the gamer(s) 2-10 and 2-11 in response to the game state, where output is for example flashing lights, sounds, vibrations, etc.

Still referring to FIG. 8, in the copending patent the physical-virtual board game 10 was described as automatically providing virtual content 26-nc to any of gamers 2-10 and 2-11 including secret messages via connected computing devices including cell phones or tablets such as a content selector 19, where the virtual content 26-nc was relevant to the game state 48-gs and preferably provided by the interactive gaming system 48 as included within a gaming platform such as remote controller 18-r2. The present invention extends these copending teachings to additionally incorporate the use of herein taught video display device 23 and any of private speakers 16 such as 16-1 along with all other necessary components as also herein taught such as a content controller 18 and channel filtering eye glasses such as 14-5, 14-7, 14-8, 14-9, 14-10 and 14-11. In one example where gamers 2-10 and 2-11 are playing the board game Clue, based upon a gamer 2-10 landing their game piece 8 upon a certain location of game board 10gb, interactive gaming system 48 determines and provides next content 26-nc to gamer 2-10 that is a first scene being provided on a first viewable sub-channel 14-out-1. Similarly, based upon a gamer 2-11 landing their game piece 8 upon a certain location of game board 10gb, interactive gaming system 48 determines and provides next content 26-nc to gamer 2-10 that is a second scene being provided on a second viewable sub-channel 14-out-2. As the careful reader of the present and copending applications will see, there are many possibilities and benefits for novel gaming interactions using the unique combination of the present application and copending physical/virtual board game 11.

Referring next to FIG. 9a there is shown an alternative embodiment of the present invention, where like the embodiment described in FIG. 4h there is a remote content controller 18-r acting as a content source providing multi sub-channel content to a local content controller 18-1, where local controller 18-1 then provides video content to a video output device such as 23-p3d, audio content to audio output devices such as public speakers 17, and where viewers 2-10 and 2-11 provide viewer indications using content selectors 19 for use at least in part for determining next content such as a closed scene 26-nc-cs. Unlike the embodiment described in FIG. 4h, in the alternate embodiment of the present Figure the interactive gaming system 48-1 is local with respect to the local content controller 18-1, where local means that the communications path between the gaming system 48-1 and the controller 18-1 is not over a wide area network. For example, the local interactive gaming system 48-1 could be implemented on a gaming console such as a Sony PlayStation or a Microsoft Xbox. Gaming system 48-1 could also be implemented on the local content controller 18-1. It is further possible that either or both of the local content controller 18-1 and the local interactive gaming system 48-1 could be implemented on either a settop box or in a smart tv, all as will be well understood by those familiar with computing and network systems. Also unlike the embodiment described in FIG. 4h, the local controller 18-1 determines and provides both private audio content 16-pa and control signals for eye glasses 14 to interactive gaming system 48-1, where interactive gaming system 48-1 provides both private audio content 16-pa and control signals for eye glasses 14 to the content selectors 19, and where content selectors 19 then provide the private audio content 16-pa to private speakers such as 16-1 and control signals to eye glasses 14.

Still referring to FIG. 9a and also in reference to FIG. 4h, a main function of the interactive gaming system such as 48 and 48-1 is to select next content such as 26-nc and 26-nc-cs based at least in part upon viewer indications. Once selected, a content repository in communication with gaming system 48-1 provides next content such as 26-nc and 26-nc-cs, where the repository is either included within or external to the interactive gaming system such as 48-1, where an example external repository is a content database located on a local or wide area network that is in communications with the gaming system 48-1. In one example, the content database is on a local area network and is queried by a process running on the gaming system 48-1, where the query is based at least in part upon the selection datum determined by system 48-1 and where in response to the query the repository provides next content such as 26-$nc$ and 26-$nc$-$cs$ to either system 48-1 or a local controller 18-1 for providing to a viewer 2. In another example, the content database is on a wide area network in a cloud based configuration, where the gaming system 48-1 provides selection datum to a remote content controller 18-$r$, and where remote controller 18-$r$ is in communications with and queries the content repository and the receives the next content such as 26-$nc$ and 26-$nc$-$cs$ for providing to either of the gaming system 48-1 or a local controller 18-1. As those familiar with computing systems will understand, many arrangements are possible and therefore the preferred and alternate embodiments described herein should be considered as exemplary rather than as limitations to the present invention. What is important is that a process such as the interactive gaming system 48-1 receives and at least in part uses viewer indications to select next content such as 26-$nc$ and 26-$nc$-$cs$, after which selected next content is provided to controller 18 for outputting on a viewing sub-channel assigned to a viewer 2 along with control signals being output to eye glasses 14 being worn by the assigned viewer 2.

Still referring to FIG. 9$a$, in the portrayed alternative embodiment, interactive gaming system 48-1 is in communications with remote controller 18-$r$, local controller 18-1 and any of eye glasses 14 or content selectors 19 being used by viewers such as 2-10 and 2-11. Gaming system 48-1 provides gaming datum to selectors 19 sufficient for providing and updating a user interface. Viewers 2-10, 2-11 interact with the user interface as provided by selector 19, where the interactions are at least in part used to determine viewer indications. A selector 19 provides viewer indications to gaming system 48-1, where in a first use the gaming system 48-1 then further updates the user interface implemented on a selector 19 based at least in part upon the viewer indications. In a second use, gaming system 48-1 determines and otherwise selects a next content such as closed scene 26-$nc$-$cs$, where the selection is provided to remote controller 18-$r$ as mixing indications. Remote controller 18-$r$ receives mixing indications and provides next content such as 26-$nc$-$cs$ to local content controller 18-1 based at least in part upon the mixing indications, where controller 18-$r$ provides an on-going mix of multiple sub-channels of next content 26-$nc$, where multiple sub-channels are sequentially or concurrently provided, and where sub-channels are optionally compressed prior to providing.

Still referring to FIG. 9$a$, local content controller 18-1 receives and decodes the on-going mix of multiple sub-channels, where the decoded mix is provided as video content on one or more viewing sub-channels to a video output device 23 such as a passive 3d tv 23-$p3d$ and audio content on either a public speaker 17 or a private speaker 16 such as ear buds 16-$a$ connected to a content selector 19 that is a cell phone. Based at least in part upon datum provided in the decoded on-going mix, local controller 18-1 also determines and provides control signals to interactive gaming system 48-1, where interactive gaming system 48-1 is paired with any of system glasses 14 being used by any of viewers such as 2-10 and 2-11, and where gaming system 48-1 further provides the control signals to the paired glasses 14 such that glasses 14 properly filter output 23-$out$ provided by the video device such as 23-3$dp$ to cause a viewer such as 2-10 or 2-11 to receive a selected or otherwise determined sub-channel such as 1A, 1B, 2A or 2B. It is noted that audio content comprised within the on-going mix is decoded and provided by local controller 18-1 to gaming system 48-1 for further communication to private speakers such as ear buds 16-2 via content selector 19.

As the careful reader will see, in this alternate embodiment, all communications with viewer 2 devices such as content selector 19, private speakers 16-$a$ and eye glasses 14 are performed by gaming system 48-1, thus providing efficiencies that will be well-known to those skilled in the art of network device communications. However, it is also possible that local controller 18-1 pairs with eye glasses 14 and directly provides control signals to the eye glasses 14. It is also possible that eye glasses 14 include bone speaks such as taught in relation to private speakers 16-1 of FIG. 3$a$ and that either controller 18-1 or gaming system 48-1 further provides private audio to eye glasses 14 for output on bone speakers 16-1. It is also possible that a viewer 2 is receiving directed audio for example from any of private speakers 16-3, 16-4 or 16-5 of FIGS. 3$c$, 3$d$ and 3$e$, respectively, and that either controller 18-1 or gaming system 48-1 further provides private audio to private speakers 16-3, 16-4 or 16-5. As those familiar with computing and networking systems will understand, many communication paths are possible and therefore the preferred and alternate embodiments should be considered as exemplary, rather than as limitations of the present invention. What is important is that an on-going mix of sub-channel content comprising video-audio content and related content datum is received by a computing element such as a content controller 18 capable of decoding the content, where then the decoded video is provided along some communication path to a video output device 23, the audio content is provided along some communication path to either or both of private speakers 16 and public speakers 17, and related content datum including control signals are provided along some communication path to eye glasses 14.

Still referring to FIG. 9$a$, as the careful reader will see, gaming system 48-1 also provides viewer indications to local controller 19-1. As prior discussed in relation to FIG. 4$f$, a content source 26 can input a static on-going pre-mix of 4 sub-channel content to a local controller such as 18-1. Examples were provided, and will be further discussed in relation to upcoming FIG. 10$c$, of a static pre-mixed multi perspective movie, where after the static on-going pre-mix is initiated, each of any multiple perspectives are provided directly to the local controller 18-1 without any use in part of a viewer 2 selection indication by the remote controller 18-$r$ to determine a next content 26-$nc$. Local controller 18-1 receives the on-going mix from the content source remote controller 18-$r$ and uses any of viewer 2 selection indications to either: 1) alter video content allocated to a viewing sub-channel assigned to the viewer 2, or 2) switch the viewer 2 assignment from a first viewing sub-channel to a second viewing sub-channel, where in either case controller 18-1 then provides corresponding control signals along some communications path to the eye glasses 14 being worn by the viewer 2 such that the video and private audio content received by a viewer 2 is altered. For example, remote content controller 18-$r$ as portrayed in FIGS. 9$a$, 9$b$ and 9$c$ can be a digital movie projection system that provides the static on-going mix of multi sub-channel content to a local content controller 18-1, where controller 18-$r$ is not responsive to any mixing indications provided by gaming system

48-1, and where local controller **18-*r* receives mixing indications from gaming system 48-1 and then alters the assignment from a first viewing sub-channel to a second viewing sub-channel for any given viewer such as 2-10 or 2-11** based at least in part upon the viewer indications or mixing indications.

Still referring to FIG. **9*a*, closed scene 26-*nc-cs* comprises video-audio that can be of any composition with respect to the division of sub-channels. For instance, closed scene 26-*nc-cs* might be included on four sub-channels, where two are temporal and for each temporal sub-channel there are provided two spatial sub-channels, all as prior discussed. Alternately, a single sub-channel can be provided where all temporal images comprising closed scene 26-*nc-cs* are for example right circularly polarized into a sub-channel A, where all eye glasses such as 14-5, 14-7, 14-8, 14-10 and 14-11 are operated to receive sub-channel A. In this regard, zero sub-channels can be considered identical to one sub-channel that includes 100% of the frame rate and 100% of the spatial resolution, all as will be well understood by those familiar with 3D displays and projection systems as well as a careful reading of the present invention. What is most important is that for a closed scene, all of any viewers such as 2-10 and 2-11 wearing channel filtering glasses 14 receive the same video 14-*out* and the same private audio 16-*pa*, irrespective of any particular sub-channel such as temporal sub-channels 1, 2 or 3 and spatial sub-channels A or B that are selected by any of the viewers 2**.

As there are many ways of accomplishing this requirement in terms of combinations of sub-channels, it is important to see that the breakdown of video-audio content during the duration of any of a closed, open or adjustable story is controllably alterable, such that at any given time, either for an entire scene or within a given scene, it is possible that the total number of sub-channels are altered, for example from one to six sub-channels, where all that is necessary is that sufficient control signals and private audio content is determined and provided to glasses 14 and private speakers 16, respectively, or their implemented equivalents, such that a viewer 2 is limited to receiving only **14-*out* and 16-*pa*** based upon their selected or assigned sub-channel.

Referring next to FIG. **9*b*, the alternate embodiment of the present invention as depicted in FIG. 9*a* is further shown to additionally providing an adjustable scene 26-*nc-as* of video-audio. The exemplary adjustable scene 26-*nc-as* comprises four sub-channels such as 1A, 1B, 2A and 2B. Each of sub-channels 1A and 1B are shown as transmitting identical video-audio content, e.g. a third person scene that might be preferred by a given viewer that is not associated with any of the characters in the scene, where association, whether assigned by any component in the system or specifically chosen by the viewer is a viewer indication as earlier discussed. Also depicted, for example, is a different viewpoint of the same scene as transmitted by sub-channel 2A, where a viewer such as 2-11 has selected a male-lead character perspective and therefore sees the scene through the male-lead's viewpoint. There is also shown, for example, a sub-channel 2B selected by viewer 2-10 comprising a scene viewpoint as might be appropriate for a female-lead character. As the careful reader of the present invention will see, there are many possible opportunities for using adjustable scenes, where an adjustable scene can be considered as including two or more simultaneously provided sub-channels of closed video-audio. Furthermore, there is no requirement that any of the video-audio provided at any given time on a given sub-channel within a multiplicity of sub-channels be contextually related to the video-audio on any other simultaneously output sub-channel. For example, in the present FIG. 9*b*** the sub-channels are contextually related in that they are two distinct viewpoints of the same story scene. It is also possible that these could be entirely different scenes, for example a first simultaneously provided sub-channel might show a scene related to the protagonist while a second simultaneously provided sub-channel might show a scene related to the antagonist, while a third simultaneously provided sub-channel might show an advertisement.

What is also important to understand is that under certain preferred operations the system is both determining the number of sub-channels to provide and selecting which viewers are assigned to and therefore will receive which sub-channels, while under other preferred circumstances the viewer is selecting which of the multiplicity of provided sub-channels they wish to view, where the selection can be made in any manner that is ultimately interpretable as a distinct sub-channel, where any manner includes: a) directly indicating a sub-channel; b) selecting information that is directly relatable to a sub-channel, and c) providing any other input, such as for instance operating a game app interface on a content selector 19 that is a mobile device such as a cell phone, where the provided input is usable at least in part to uniquely determine a sub-channel. It is also important to understand that there is no requirement that during any given adjustable scene, the viewer is then locked into a single sub-channel and as such prohibited from switching sub-channels or being automatically switched, the benefits of which will be made more apparent in upcoming FIG. **9*c***.

For the purposes of allowing producers and storytellers to control the emotional experience of a viewer, in combination with allowing a viewer some volition and therefore perceiving some autonomy in an otherwise closed story, it is preferred (but not required) that for the duration of an adjustable scene the viewer will remain fixed to the selected sub-channel. As a careful reading of the present invention will also make clear, any story such as a movie or show that includes at least one adjustable scene is therefore an adjustable story, even if the entire remainder of the scenes in the adjustable story are closed. As will also be clear, an open-restricted scene is another form of an adjustable scene, and therefore any otherwise closed story comprising an open-restricted scene is considered an adjustable story. There are no system restrictions on the total number of scenes or the total duration of the adjustable story. Likewise, there are no restrictions on the total number of sub-channels used to provide any of an adjustable of open scene, except that the total number of sub-channels is limited by the desired quality resulting from the temporal and spatial sub-division of the single channel output **23-*out***.

As the as those familiar with video games will understand and based upon a careful reading of the background of the present invention, what is important to see is that the viewer of a traditional closed story can now experience some autonomy and relatedness, where the autonomy is for example provided by picking a character roll or even advising the protagonist via for example an user interface provided on or by the content selector 19 to proceed down one path versus another, where the paths are represented by one or more upcoming adjustable scenes, all of which will be discussed in greater detail with respect to upcoming FIG. **10*c***. The increased relatedness is expected as a viewer selects the story/character viewpoint that they prefer, where the viewer presumably selects the story/character viewpoint to which they most personally relate or identify.

Referring next to FIG. 9c, the alternate embodiment of the present invention as depicted in FIG. 9a is further shown to additionally provide an open-restricted scene 26-*nc-os* of video-audio. The exemplary open-restricted scene 26-*nc-os* comprises four sub-channels such as 1A, 1B, 2A and 2B, where each sub-channel is related to the same scene and provides slightly different video and or audio information, and where the scene is a space fight between opposing forces. Depicted in sub-channel 1A is a current moment in time when there are substantially two enemy space craft (see the white circles added for clarity to the surface of video display device 23,) each space craft of which is shown to be fully in tack. Depicted in sub-channel 1B is the identical scene where the first enemy fighter that is positioned above and to the left of the second enemy fighter is shown as exploding. In sub-channel 2A, the first enemy fighter is still intact whereas the second fighter positioned below and to the right is exploding, and in sub-channel 2B both the first and second enemy fighters are shown to be exploding. Given these example sub-channels, the present Figure teaches a game where for some amount of time such as 1-2 seconds, a number X of targets (in this case space ships) are displayed on all N sub-channels, where $N=2^x$ and as such serves to limit the number of simultaneous targets, where for example two targets requires four sub-channels and three targets requires eight sub-channels, both considered to be supportable by the present invention. As the careful reader will see, by ensuring that the total number of targets is $\log_2 N$ or less, it is possible to simultaneously represent each of the targets exploding in and out of combination with all other targets. The present example depicts two targets displayed on four sub-channels, such that it is possible to display all combinations of the targets either being missed by a gamer such as 2-10 or 2-11, or hit by a gamer 2-10 or 2-11. The present inventor notes the subtle distinction between a viewer that is generally passive while receiving closed or adjustable scenes that becomes a gamer that is generally active while receiving an open scene such as open-restricted scene 26-*nc-os*.

Still referring to FIG. 9c, content selectors 19 as controlled by each of gamers 2-10 and 2-11, include a gaming app or gaming app interface and are in communications with interactive gaming system 48-*l*. The preferred content selector 19 comprises a touch input screen as well as the ability to provide any of audible or tactile feedback, where audible feedback can be provided by the speakers included within the selector 19 such that the sounds are public and shared amongst gamers, but is preferably provided as output mixed into the audio channel that provides private audio 16-*pa* to a single gamer such as 2-10 or 2-11, and where the tactile feedback at least includes haptic vibrations. It is preferred that content selector 19 automatically senses orientation and therefor automatically flips screen UI orientation between what is known as portrait or landscape mode, which is a commonly available function in a typical mobile computing device. It is further preferred that the gaming app or gaming app interface has a calibrated correlation between the spatial area of the video output device such as 23-*p3d* and the spatial area of the respective UI screens on selectors 19, such that for example the lower right portion of a UI screen is generally representative of the lower right portion of the video being output by video device 23-*p3d*.

Still referring to FIG. 9c, during the anticipated and exemplary adjustable story there is some combination of closed and adjustable scenes that lead up to the open-restricted scene 26-*nc-os* such as presently depicted, where for example the audio track for providing private audio 16-*pa* to all viewers such as 2-10 and 2-11 includes a tone indicating that an open scene is either being displayed or about to be displayed, where the viewer now gamer such as 2-10 and 2-11 is then already aware of how to play the game. Once receiving the audible tone, all of gamers such as 2-10 and 2-11 will start off open-restricted scene 26-*nc-os* assigned to and therefore watching for example sub-channel 1A and seeing all of two enemy fighters, neither of which has been hit yet. It is anticipated that the enemy fighters are flying through the video scene for example staying visible for only a brief duration of 1 to 2 seconds. Each of gamers such as 2-10 or 2-11 then independently notice the enemy fighters and attempt to touch the screen surfaces of their controllers 19 before the fighters exit the scene, while still looking up at the video device 23-*p3d*. If for example gamer 2-11 decides to "fire" at the enemy fighter in the upper left portion of the video output 23-*out*, then gamer 2-11 would press the screen of their selector 19 in substantially that same area, where for example the more on target the gamer 2-11 is in terms of matching the press-point to the actual spatial location of the enemy fighter, the more points they may be awarded. It is also preferred that the gamer 2-11 receive any of audible and tactile feedback for each pressing of the screen, for example hearing a sound representative of a "miss," "partial hit," or "direct hit." If for example the gaming app has determined that gamer 2-11 has made a partial or direct hit in sufficient time, then the gaming app transmits indicative gaming datum to gaming system 48, where system 48 at least in part uses the indicative gaming datum to determine a new sub-channel assignment for gamer 2-11, such as sub-channel 1B, and where gaming system 48 then also provides altered control signals to the eye glasses 14 being worn by gamer 2-11 such that gamer 2-11 then stops receiving sub-channel 1A and begins receiving sub-channel 1B and as a result perceives that they have partially or directly hit an enemy fighter.

Still referring to FIG. 9c, likewise the gamer 2-10 may have chosen to "fire" at the enemy ship in the lower right portion of the video output 23-*out*, and similarly, if a partial or direct hit is determined by the gaming app, then the gaming app transmits indicative gaming datum to gaming system 48, where system 48 at least in part uses the indicative gaming datum to determine a new sub-channel assignment for gamer 2-10, such as sub-channel 2A, and where gaming system 48 then also provides altered control signals to the eye glasses 14 being worn by gamer 2-10 such that gamer 2-10 then stops receiving sub-channel 1A and begins receiving sub-channel 2A and as a result perceives that they have partially or directly hit an enemy fighter. It is also possible that a gamer such as 2-10 or 2-11 presses their screen twice in succession or in the case of a multi-touch screen twice at once sufficiently to hit both enemy fighters, in which case that gamer is then switched to sub-channel 2B where both enemy fighters are shown as exploding.

The presently described activity by the gamers 2-10 and 2-11 with respect to the open-restricted scene 26-*nc-os* could continue for some extended time, where for example every 2 to 3 seconds additional enemy fighters fly through the scene, such that for example over 20 seconds of an open-restricted scene such as 26-*nc-os* a gamer might have the opportunity to hit 40 to 60 targets, each with partial or direct points awarded. As a careful consideration of the present teachings will show, what is necessary for creating a pleasurable experience is that the gamer such as 2-10 or 2-11 is afforded some time to make a choice and press the screen of their content selector 19 as soon as they notice the enemy ship but before the enemy ship leaves the screen. For a most convincing effect, it is preferred that for example the enemy ship shown in sub-channel 1B is depicted as progressively exploding such that a gamer that is automatically switched to the 1B sub-channel immediately perceives that the enemy ship is exploding starting from the time of switching, where it is also possible that the exploding of the enemy ship even oscillates for the duration of the time that it passes through the 1B sub-channel and that the gamer is switched at a point in time where the oscillation is at a low explosion point.

Still referring to FIG. 9c, as those familiar with video games will understand and based upon a careful reading of the background of the present invention, what is important to see is that the viewer of a traditional closed story can now become a gamer, and therefore potentially more deeply engaged with the content through the intrinsic motivations of competency, autonomy and relatedness, where for relatedness it is anticipated that: 1) gamers may form teams and compete with other gamers or even a story character, and 2) gamers may be coached by a story character, where for example the audible sounds letting the gamer know the results of their hit attempts are not tones but rather words spoken by the story character. Regarding (1,) during the example 1-2 seconds a given fighter is displayed on the video out 23-*out*, it is possible that the fighter always explodes, where the assumption is that if the gamer such as 2-10 or 2-11 does not hit the fighter (and therefore also receive some feedback,) then as the ship explodes the gamer understands that the ship was hit by the story character, where for example the character might then provide some different audio output to the gamer such as "I got 'em for you!"

Still referring to FIG. 9c, as the careful reader will see there are many possibilities for implementing an open-restricted scene using the herein described apparatus and methods such that the example as provided in relation to the present Figure should be considered as exemplary rather than as a limitation of the present invention.

What is important to see is that: 1) a multiplicity of sub-channels may be provided within an open-restricted scene 26-*nc-os* such that any one or more gamers 2 are automatically switched between sub-channels as a part of a game, thus changing their private filtered video-audio content 14-*out* and 16-*pa* and therefore also their perception of the scene; 2) the sub-channel assigned to a gamer 2 can be automatically switched based at least in part upon any viewer (i.e. gamer 2) indications determined about or accepted from the gamer 2, such as information determinable by content selector 19 using any of built-in sensors and/or viewer indications input by the gamer 2 such as through UI provided by selector 19; 3) the sub-channel assigned to a gamer 2 can be automatically switched based at least in part upon the combination of gaming datum and viewer (i.e. gamer 2) indications, where gaming datum includes any of: a) timing information relatable to the start and stop times of a scene, or a multiplicity of frames within a scene; b) timing information relatable to the start and stop times of an object appearing or disappearing in a scene; c) scene or object related information including descriptions especially indicative of the visual aspects of the scene or object such as size, shape, color, object type or even object identity, where objects are animate or inanimate; and d) any other information usable for relating a scene to a gamer 2's perception of the scene, including visual or audible perception.

Referring next to FIG. 10a, there is provided an abstraction using block symbols to represent various well-known relationships between a content source 26 providing content such as a static closed scene or dynamic open-free scene to a video output device 23. Six abstractions are provided left-to-right, top-to-bottom, where the abstractions approximate an evolution of video-audio content in relation to a content source 26 and video output device 23. In each of the abstractions, there is a 1-to-1 relationship between a content source 26 and a video output device 23, where the content provided by the source 26 is portrayed below the horizontal line and then again within the video device 23 above the horizontal line. What is important to see is the general types of scenes including closed scenes and open-free scenes and how they have developed to impact the final display of content to a viewer through a video device 23. Starting in the top left, there is represented a closed scene such as a scene in a movie or the entire move (comprising multiple closed scenes) that is pre-determined by a producer or storyteller and does not change its video-audio content in response to choices or inputs from a viewer, where therefore a closed scene is referred to as static and is displayed in white.

Still referring to FIG. 10a, in the top middle, there is represented an open-free scene such as an ongoing battle scene in a video game where the entire duration of the video game is not pre-determined by the producer or storyteller and does change its video-audio content in response to choices or inputs from a gamer, where therefore an open-free scene is referred to as dynamic and is displayed in gray. As represented on the top right, some video games include closed scenes mixed with open-free scenes, where the closed scene is often referred to as a "cut scene" in a video game and typically introduces the video game to provide the gamers with background and motivation. Represented in the bottom left are closed scenes that are provided with associated left-eye/right-eye video for implementing traditional 3D closed scenes, where traditional 3D closed scenes are separated to the left and right eye of viewer using either of active shutter glasses or passive polarizer glasses, all as is well-known in the art.

Represented in the bottom middle, video games such as provided by Sony PlayStation implement what is referred to as a dual-view video game where each of left-eye and right-eye stereoscopic images become gamer 1 and gamer 2 monoscopic perspectives that are on-going and related to the same virtual environment game. As mentioned in the background of the present invention, in U.S. Pat. No. 9,516,292 Bickerstaff et al. describes an IMAGE TRANSFER APPARATUS AND METHOD where "the left and right images of a stereoscopic output are replaced with first and second viewpoints of first and second players of a game, and each player has a pair of active shutter glasses where, instead of the left and right lens alternately becoming opaque, both lenses blink in synchrony with display of the respective player's viewpoint. As a result, both players can see a full-screen monoscopic image of the game from their own viewpoint on the same 3D TV."

And finally, still with respect to FIG. 10a, on the bottom left there is represented a succession of closed scenes that are interactively provided to a viewer based at least in part on the viewers choices and inputs in a technique called a branching narrative. One example of branching narrative technology is a app known as Mosaic produced by PodOp in combination with HBO and the director Steven Soderbergh. The app provides access to a "7-plus-hour miniseries about a mysterious death," where "viewers have some agency over what order they watch it in and which characters' stories they follow."

Referring next to FIG. 10b, there are depicted key components and functional differences between the present invention 100 and the existing marketplace content apparatus and methods depicted in FIG. 10a, where the components and differences are shown using the same and additional block symbols as shown in the prior Figure. In one difference, video output device 23 in combination with eye glasses 14 is capable of providing any of 2 or more temporal, spatial or temporal-spatial sub-channels to either left or right lenses of glasses 14 at any time during the presentation of video content. As is well-known in the art, current apparatus and methods support either 2 temporal sub-channels using active shutter glasses or 2 spatial sub-channels using passive polarizer glasses but do not support either active polarization glasses or a combination of either active shutter and passive polarization or active shutter and active polarization glasses, all as herein described. Unlike prior marketplace solutions that support only 2 viewing sub-channels that are statically set to a single sub-channel for the duration of the provided video content, the present invention provides for 2 or more viewing sub-channels, where each of the left and right eye lenses of the present system eye glasses 14 can be operated independently to receive or block any given temporal, spatial or temporal-spatial sub-channel and where each lens can be operated dynamically during the presentation of any video content such that the lens switches from a first viewing sub-channel to a second viewing sub-channel in timed synchronization with changes in the provided video content, all as prior described herein.

Still referring to FIG. 10b, this novel capability of the present system 100 provides for two new types of scenes beyond the well-known closed scenes (C) and open-free scenes (F), including static adjustable scenes (A) and static open-restricted scenes (R), where the combination of all 4 types of scenes C, F, A and R is usable to form a content repository 26-all that is a content source 26. As defined herein, adjustable scenes A are a static composition of two or more otherwise closed scenes meant to be concurrently provided on two or more viewing sub-channels for a fixed and pre-known duration, where for example the two scenes are for different MPAA ratings in an ongoing movie or represent two different movie characters such as the protagonist and the antagonist. An adjustable scene A is shown with four segments that are concurrent scenes represented by four different geometric shapes including a square, triangle, circle and rhombus, indicative of different content, different viewing sub-channels and/or different viewers, where it is also understood that the present invention 100 provides sufficient support for two or more concurrent viewing sub-channels given sufficient graphics card and video output device features. It is taught herein that an adjustable scene is presented on a number of sub-channels matching the number of segments in the adjustable scene A, and that any given viewer 2 assigned to a given sub-channel and therefore segment of scene A remains assigned to that given sub-channel for the pre-known duration, see for example prior FIG. 9b. The video-audio of any segment of an adjustable scene A can be related to the same primary scene, such as different perspectives or even a left-eye versus right-eye view or can be distinct video-audio with no contextual relationship.

Open-restricted scenes R are like adjustable scenes A accept that the segments of an open-restricted scene R are meant to be variations or perspectives of a same primary on-gong closed scene, and therefore include a very tight contextual relationship, such as described in relation to FIG. 9c. The purpose of an open-restricted scene R is to provide a means for a producer or story teller to achieve a feeling of agency within a viewer like an open-free scene F, while allowing the R scene to be restricted to static content with a pre-known time duration while the F scene is free to be dynamically constructed without necessary time constraints based at least in part upon gamer indications. An open free F scene requires significant computer processing at the concurrent time of generation and display whereas an R scene moves the requirement for any computer processing to a time prior to the display of the content, hence generation and display are not concurrent. Therefore, the segments of an open-restricted scenes are depicted with the same geometric symbol of a square, where a horizontal line joins all of the segments indicating that any given viewer 2 can be dynamically switched from any first assigned sub-channel outputting a first restricted scene R segment to any second sub-channel outputting a second restricted scene R segment within the pre-known duration of the open-restricted scene, where the switching is at least in part based upon viewer and/or gaming indications such that a viewer-gamer perceives some sense of agency, all as prior described especially in relation to FIG. 9c. With respect to open-free scenes F, the present system supports open-free scenes F comprising two or more segments, such as four portrayed, whereas the state-of-the art supports only dual-view and therefore two segments. In one advantage, using the present system four gamers can be viewing a single open-free scene F in a $3^{rd}$ person view and then be automatically switched to each of the four gamers viewing the same scene F in the $1^{st}$ person on each of four viewing sub-channels.

Still referring to FIG. 10b, a content source 26 comprising any one of, or any combination of scenes C, F, A or R that are collectively 26-all, may further comprise a branching process for allowing the selection of a next content 26-nc from amongst the available scenes 26-all. Like the current marketplace implementations of a branching process for selecting between any two or more next content 26-nc, the present invention provides that in at least one embodiment the branching process determines the next scene based at least in part upon any of viewer indications. Unlike current marketplace implementations, in another embodiment the branching process determines the next scene based at least in part upon any of gaming indications as provided by an interactive gaming system 48, where gaming system 48 can determine or select a next scene based upon any one of, or any combination of a gaming logic, game state, game map or viewer indications. In yet another embodiment, the branching process associated with the content source determines or selects next content 26-nc based at least in part upon any one of, or any combination of viewer indications provided by a viewer 2 or gamer 2 or gaming indications provided by a gaming system such as 48. In current marketplace implementations of a branching narrative, the selected next scenes 26-nc are limited to closed scenes C, whereas the present invention allows for a selected next scene 26-nc to be any of type C, F, A or R. The branching process can alternatively be implemented on either the content controller 18 or the interactive gaming system 48, such that the content source 26 does not actively determine next content 26-nc but rather retrieves and provides next content 26-nc based upon external requests, all as will be well understood by those familiar with software systems and databases. The present implementations of the branching process support unique combinations of a traditional branching narrative and a traditional gaming system.

Referring still to FIG. 10b, in another difference between the state-of-the-art and the present invention 100, the present invention provides for a many-to-1 relationship between content sources 26 and the video output device 23, whereas prior systems provide only a 1-to-1 relationship. The many-to-1 relationship between content sources 26 and a video output device 23 are implemented and managed by the herein taught content controller 18, where controller 18 receives indications (depicted as "choices" for convenience) from viewer 2 for use at least in part in determining which of content 26-*all* from which of multiple content sources 26 such as CS1, CS2, CS3 or CS4 is provided on which of the two or more viewing sub-channels. In the many-to-1 relationship, any given content 26-*all* from any given content source 26 such as CS1, CS2, CS3 or CS4 can be provided on any given viewing sub-channel mixed with any other any given content 26-*all* either from the same content source 26 or any other content source 26. The content-to-sub-channel-to-viewer assignments can be dynamically adjusted by the controller 18 based at least in part upon any of viewer 2 indications, where adjustments include setting a variable spatial sub-channel resolution (in terms of the video output device 23 total available pixels) and/or a variable temporal sub-channel resolution (in terms of either the fps or refresh rate supported by the video output device 23.) Controller 18 also provides apparatus and methods for dynamically determining the novel complimentary image C, that when combined with a given viewing sub-channel image V causes the perception of the naked eye to be a disguising image D (see FIG. 4*d*.) Using a video output device 23 further adapted to include an active polarization and modulation layer 23-*ply*-2, controller 18 is also able to provide at least two temporal sub-channels in a privacy mode such that a private image is displayed at full spatial resolution while at the same time the naked eye cannot perceive the private image (see FIG. 4*g*.)

And finally, still referring to FIG. 10*b*, in yet another difference, controller 18 provides private audio 16-*pa* to a viewer 2 using any of private speakers 16, where private audio corresponds to the private video provided to the viewer 2 on a viewing sub-channel (see FIGS. 3*a*, 3*b*, 3*c*, 3*d* and 3*e*.)

Referring next to FIG. 10*c*, there is shown a block diagram depicting an exemplary adjustable story 27, where an adjustable story 27 is any combination of scenes 26-*all* that includes at least one of an adjustable scenes A or one of an open-restricted scenes R. Exemplary adjustable story 27 is representative of a movie with alternate scenes and endings as well as open scenes in which viewers have the opportunity to participate in games. The adjustable story 27 is represented as a series of blocks, starting at the bottom of the present Figure and working up to the top, starting at scene 1 and ending with scene 12. There are shown three closed scenes including 1, 3 and 10, where closed scenes are discussed especially in relation to FIG. 9*a*. There are shown 7 adjustable scenes including 2, 4, 5, 7, 8, 9 and 12, such as discussed in FIG. 9*b*. And there are shown two open scenes 6 and 11, such as discussed in FIG. 9*c*. The purposes of the present Figure include visualizing how an adjustable story 27 might be composed, emphasizing a mix of closed C, adjustable A and open scenes (R or F) ordered in some sequence. The individual blocks should be considered as placeholders for content including any of video, audio, content timing information and otherwise any information directly discussed herein or anticipated, such as information relating to a gaming system including scores, status, instructions, responses such as clues, questions, any other information addressed in the copending application for an INTERACTIVE GAME THEATER WITH SECRET MESSAGE IMAGING SYSTEM.

Still referring to FIG. 10*c*, as those familiar with software and hardware systems will understand, the content is digital and therefore must be translated into a physical form before it can be perceived by any of viewers or gamers, where translation includes converting into and of the sensory modes of sight, hearing, touch, scent and taste, where the converted physical output is any of video, audio, tactile sensations, smells and flavors. What is important to understand is that an adjustable story 27 can contain and provide information intended to fully and deeply engage the viewer with experiences and is not merely the video-audio as is found in the traditional movie or show, although adjustable stories have significant value even when they are so limited. In the copending applications especially including THEME PARK GAMIFICATION, GUEST TRACKING AND ACCESS CONTROL SYSTEM as well as an INTERACTIVE GAME THEATER WITH SECRET MESSAGE IMAGING SYSTEM, the present inventor described physical-virtual games where guests at destinations such as theme parks and resorts play out games over longer periods of time and across physical space, i.e. rather than sitting in a movie auditorium for 2 hours. It should be understood that the concept of an adjustable story 27 is not limited to the traditional paradigms including sitting in a seat and viewing or even gaming for some fixed or indefinite period of time, although adjustable stories 27 provide significant value even when they are so limited.

Referring still to FIG. 10*c*, closed scene 1 might be the traditional introductory scene to a show or movie, for example introducing the storyline and conflicts in a broad scope that encompass all character perspectives. Adjustable scene 2 might then comprise four distinct scenes, one for each of four main characters such as the hero, the hero's supporting friend, the villain, or the villain's supporting friend, where each of these scenes represent entirely different settings, including different images and sounds. In such a use case, the anticipated audio content of the present invention will emphasize private audio 16-*pa* transmitted to each viewer through any of private speakers 16. There is no requirement or limit to the number of distinct scenes represented on different sub-channels of an adjustable scene, other than the support of the system for providing pleasing video, all as prior described. As prior mentioned, given the state-of-the-art in video and projection systems with video output at 4k to 8k and frames rates of 240 Hz to 480 Hz, it is anticipated that two to four temporal and two spatial channels will be combinable for providing four to eight electronically selectable, pleasing video experiences for a viewer-gamer. Adjustable scene 2 is shown as being provided on sub-channels 1, 2, 3 and 4, labeled as SC1, SC2, SC3 and SC4. Adjustable scene 2 might alternatively comprise video and audio from the same basic scene as provided from four different character viewpoints, like the three distinct viewpoints depicted in relation to adjustable scene 26-*nc-as* depicted in FIG. 9*b*. In such a use case, it is anticipated that for example background sounds will be transmitted through public speakers 17 providing shared audio for all viewers to hear and that conversation will be transmitted as private audio 16-*pa* through any of private speakers 16, although in such a shared scene with only different viewing perspectives, it is also anticipated that all audio including conversations are presented as shared audio through public speakers 17.

Still referring to FIG. 10*c*, closed scene 3 might then depict multiple of the characters in some joint action sequence. Adjustable scenes 4 and 5 are depicted as overlapping as an example of what is possible and anticipated. Adjustable scene 4 is provided on sub-channel 1 and is followed on SC1 by adjustable scene 5. Sub-channel SC2 provides a longer duration scene 4-5 overlapping the time for separate scenes 4 and 5 being provided on SC1. The difference in content presented on SC1 versus SC2 is for example that SC1 changes at least the background settings if not then also the characters between scenes 4 and 5, whereas SC2 keeps the same background settings and characters such that it would be considered as a single traditional scene 4 (and then not also scene 5,) where the numbering depicted of as "scene 4-5" is simply provided to help visualize the possibilities for overlapping and adjustable scene times. Also shown is an adjustable scene 5 on SC3 corresponding to scene 5 on SC1 and the later portion of scene 4-5 on SC2. As will be understood by a careful reading of the present invention, there are many possibilities for adjustable scene arrangements for which the current Figure should be understood as exemplary, rather than as any limitation on the present invention.

Referring still to FIG. 10c, open-restricted scene 6 is provided on four sub-channels SC1, SC2, SC3 and SC4, where an additional symbol of lines connecting circles across the four sub-channels is meant to represent that the game being played in the open-restricted scene dynamically switches a viewer-turned-gamer from any one given sub-channel to another given sub-channel at any given point in time based at least in part upon the game rules and state as well as viewer-gamer input of any kind. This example representation is meant to correspond to the depictions as provided for an open-restricted scene in FIG. 9c. Open-restricted scene 6 is depicted has having two exit paths 1 and 2, where in path 1 a given viewer-gamer is determined to have lost the game, and as such the next scene they are shown is for example adjustable scene 7 on SC1 that might be a subdued scene where the characters' moods are representative of the loss. Path 2 is depicted as the winning path, where a gamer is then for example taken to an adjustable scene 7-8 where the characters are in an upbeat mood and celebrating. Like the discussion related to adjustable scenes 4 and 5, adjustable scenes 7, 8 and 9 are shown as not necessarily equal in time duration across any particular sub-channel. The present example block diagram shows that the losing path goes from a common adjustable scene 7 into a two-perspective adjustable scene 8 being shown on sub-channels SC1 and SC3, where for example two of the characters might be having their own private scene as they deal with the loss. It is further anticipated, that in any scene, an individual character might be looking directly at the viewer as if they are speaking directly to them, perhaps even in this example giving them a pep-talk or otherwise encouraging the viewer. The present invention anticipates that for example when a viewer chooses a role at the beginning of the adjustable story, they might then also be given the option of choosing from several different names, where the viewers chosen name is then used by a character in an adjustable scene increasing the sense of viewer relatedness, and where for example the producers and storytellers have captured the same adjustable scene with different audio tracts using the different character names to provide the desired effect.

Still referring to FIG. 10c, in adjustable scene 9 on SC1, for example the characters rally themselves and prepare to finish their quest as they perhaps receive information that some of their friends or compatriots ended up defeating the opponent that they lost to in the open scene 6, such that now both the losing and winning paths are essentially back on equal track in the storyline. In adjustable scene 8-9 on SC2, for example the happy characters learn that the opponents just won a significant battle and all is not as good as it seemed, again working to put both the losing and winning paths back to a balanced emotional perspective in order to continue the storyline with a joined closed scene 10 that works both for the loser and winners of open scene 6. After this joint closed scene 10, there is shown a final open-free scene 11, where the game is now for example individualized per each of the character rolls. There are many possibilities including that the interactive gaming system 48 communicates and directs the gaming app running on the personal computing device such 19 to present a different challenge for each character, where in this case the viewers-turned-gamers switch their primary attention to the gaming app on their personal computing device 19 and play a short game. This distinction of an open-free game that does not dynamically switch sub-channels is depicted by not including the additional symbols of lines connecting circles across the 4 sub-channels. The present invention anticipates that the gaming experience of an open-free scene is conductible at least on either or both the video display device 23 and any of another computing device 19 that provides an interface such as a personal computing device including a tablet as displayed in FIG. 8 as 19, or as a smart phone as displayed in FIGS. 9a, 9b and 9c as 19.

Still referring to FIG. 10c, after individually playing the game provided with open-free scene 11, each viewer-gamer is then shown one of the possible alternative endings to the adjustable story based for example upon whether they individually lost (e.g. path 1,) or won (e.g. path 2.) Or, the adjustable story might simply end with different adjustable scenes 12 on SC1 and SC2 for any other reasons, where the more the reason for the different ending is based upon choices and gaming activities of a viewer-gamer, the greater the anticipated emotional experience and sense of personal agency for the viewer-gamer, all as will be understood by those familiar with motivational theory especially as it relates to video games. The combination of closed, adjustable and open scenes is collectively referred to as an adjustable story 27, where a closed story includes only closed scenes and an open-free story (i.e. a video game) includes any of open-free scenes and closed ("cut") scenes.

The present Figure is meant as an example to portray some of the numerous creative opportunities provided to producers and storytellers for both maintaining substantial control over the storyline and the personal emotional experience of the viewer, while also gaining deeper viewer engagement by providing the viewer-gamer with personal volition and agency for effecting the storyline, and using the intrinsic motivational tools of competency, autonomy and relatedness well-known within the video game world. Therefore, as will be well understood by those familiar with the art of storytelling in combination with a careful reading of the present and copending applications, the preferred and alternative embodiments presented herein, along with the exemplary use cases, should be considered as exemplary rather than as limitations of the present invention.

CONCLUSION AND RAMIFICATIONS

Thus, based upon a careful reading of the present Figures and specification, the reader will see that the present invention teaches new apparatus and methods for providing multiple electronically selectable spatial, temporal and spatial-temporal sub-channels comprising private video and audio delivered within a single traditional channel. New apparatus and methods have been shown to provide a pleasing private image using the second modulation of light concurrently contributing to a pleasing public image, where there is no loss of signal due to color complementation often used to hide the private image from the naked eye. Universal sun glasses are taught to provide all the herein described modes including privacy mode such that a broader market is addressable. As the reader will also see, using the electronically selectable sub-channels, the present invention teaches an adjustable story and delivery platform, where adjustable stories comprise at least one adjustable scene and any of closed, open-free, and open-restricted scenes, and where selection is based upon any one of, or any combination of viewer/gamer indications or gaming system indications. The present invention teaches movie theater projector systems for providing two or more concurrent movies or movie perspectives, where it was also shown that 4 concurrent spatial sub-channels are possible allowing for four concurrent movies without temporal sub-division. The present invention also teaches enhanced video gaming systems that go beyond dual-views without private audio that are locked to a single sub-channel without consideration of gamer selections. The present invention teaches enhanced game access points used with an interactive gaming system at a destination that provides private video/secret messages on determined sub-sets of pixels allowing for multiple concurrent gamer access. The present system also teaches new types of hybrid gaming systems that combine adjustable stories that include branching narratives, which are then further combinable with physical-virtual game boards.

Those familiar with open story gaming systems as well as closed story movies and shows will appreciate the many possible opportunities for the composition of a new type of adjustable story that more deeply engages the viewer. For example, when providing an adjustable story such as discussed in relation to FIGS. 9a, 9b, 9c and 10c to be played at a movie theater, it is anticipated that the viewer-gamer will bring their own personal computing device such as a cell phone or tablet that already comprises a downloaded gaming app for automatically paring with the viewer-gamer's eye glasses as well as the content controller and interactive gaming system as necessary. Alternatively, it was shown that special movie theater seats further provide touch screen user interfaces that are likewise usable for providing a viewer-gamer with their own personal computing device for interacting with the system. The viewer-gamers are anticipated to either provide their own eye-glasses or pick up returnable eye glasses at the theater.

Using the gaming app on their personal computing device, or the theater provided seat computing device with included camera, viewers are anticipated to capture self-images as a part of selecting a preferred character, where at least their face is adapted into a character avatar or image that can be reviewed and adjusted prior to the start of the movie. One anticipated use for this character picture using at least the viewer's face is to include the viewer in on or more pictures that are automatically generated by the interactive gaming system in combination with the content repository, for example from an exciting scene in the movie, thus inserting the viewer into a movie image or scene. Another anticipated use is that as the viewer is exiting the movie, the system automatically sends a snapshot to the viewer's email or text number, where the snapshot is of the viewer in character costume with their favorite chosen role/character, the lead character or the entire cast, and where special signature messages are overlaid onto the image with congratulatory or otherwise personal notes that may be different for each movie goer, where for instance using an algorithm that at least in part accounts for the various inputs made by the movie goer during the movie as a means for best selecting the image and personal message they receive.

The present inventor further anticipates that during the adjustable story, for an open-free scene, the viewer-turned-gamer is switched to viewing and operating a traditional video game on their personal or provided computing device, or otherwise the video output device is switched to providing a traditional video game where all viewers-turned-gamers are now competing using any input apparatus such as a personal or provided computing device and the video content is a third person view of the action. Hence, during any adjustable story, it is possible to turn the video content provider, such as a large screen display or a movie theater screen, back into a traditional single channel output device wherein all gamers are now competing at least for some duration as they would using a shared video device for example at a gamer competition, and where at the end of the open-free scene that is a traditional video game the results are useable at least in part by the system for then selecting the next adjustable or closed scene to be provided to the gamers-now-turned-viewers.

Regarding the new opportunities for movie going experience now including open-restricted as well as open-free gaming, it is possible to determine in real-time the game state of multiple viewer-gamers with respect to an "in-movie game," where the present system also knows the individual seats occupied by each of the gamers, were it is anticipated that winners are selected during a single open gaming scene, and while the movie is still being displayed, the theater has an employee come an provide food thus surprising and rewarding any winning gamer.

The present inventor anticipates that producers and storytellers will be able to offer commercial free movies and shows for example in home or public settings, where the traditional single channel comprises two sub-channels, one non-paid sub-channel provides video-audio that includes commercials while a second paid sub-channel provides video-audio without commercials. These paid and non-paid sub-channels can be selected by a viewer based upon a security code linked with for example verification of subscription or payment, where the sub-channel is not provided as private video but rather decoded by the controller and provided as the default channel that is viewable without system glasses. The present invention also anticipates that advertisers will be able to provide commercials as adjustable scenes, where the commercial includes for example 4 sub-channels each comprising a different variation of the commercial, where the variation is dynamically chosen for the viewer based at least in part upon any information provided by or determined about the viewer.

Another possible use of the present invention is to provide for real-time graphic overlays during sporting events, where for example it is well-known that the NHL attempted to provide a graphic line showing the path of the puck and where some viewers appreciated the graphic while others did not. Using two viewing sub-channels, it is possible for a viewer of a sporting event to select if they would like the enhanced graphics, thus being switched to the appropriate sub-channel. Again, these provided sub-channels can be selected as a default channel such that they are viewable without system glasses.

Regarding the potential of adjustable stories and varied content, it is well-known that for example, at least Disney Productions offers multi-level comedy in their family-oriented movies. Many of the jokes spoken by the animated characters are perceived as funny to both parents and children, and to this extent are enjoyable to both. Using the presently taught apparatus and methods, it is now possible for content producers such as Disney to provide movies with short portions of varied video-audio content, therein providing content to adults without concern that a child will be watching or hearing and with simultaneous content for children without concern of boring the adults, thus relieving the need for what is commonly referred to as double entendre. It is further anticipated that a private sub-channel visual and/or audible cue is provided to alert the parent that they are receiving different content from the children. It is anticipated that the present system and teachings for an adjustable story provide significant opportunities and benefits to the producers, directors, writers and actors, where various script dialogue problems can be avoided using a less costly approach of providing two or more simultaneous content variations, as opposed to for example paying larger budgets for more experienced writers capable of better crafting subtle meaning and double entendre.

In yet another example of the benefits of providing an adjustable story, it is well-known (or at least believed) that in general men for example prefer a slant of action whereas women prefer a slant of romance with respect to their movie going experience, where it is often discussed that some movies are expected to appeal to one audience versus another, where the demographics include any of sex, age, race, religion, nationality, etc., and where now a producer or storyteller may include variation scenes even selectable as the "Action Cut" versus the "Romance Cut," thus offering a new experience of appealing to multiple demographics with a single movie release. Regarding the notion of believing versus having hard data that one particular demographic such as men or women, or young or old, prefer one given movie slant versus another, the present invention has also shown that it is now possible to capture valuable demographic information including the viewer sex and approximate age (e.g. using facial recognition,) as well as their conscious choices regarding any offered content slants, e.g. if offered in an adjustable story, will in fact more men choose the "Action Cut" while more women choose the "Romance Cut" ? The present invention went further to provide means for capturing on-going images of the viewer during the movie for determination for example of the viewer's emotional state using any of well-known facial analysis algorithms, where the determined changes in emotional state are time-correlated to the specific video-audio content provided, where the specific video-audio content is known based at least in part upon the information regarding the viewer selected sub-channel. For example, it is now possible to gather critical data concerning at which points during a movie are viewers emotionally affected, e.g. at what points are they laughing, crying, appearing unemotional, or appearing scared?

It is further anticipated that any of the now available or forthcoming advancements for providing augmented reality (AR) through eye glasses are combinable with the present teachings, such that the anticipated channel filtering/AR eye glasses are capable of both filtering multi sub-channel output and augmenting the final received sub-channel.

Using the present as well as copending teachings, the present inventor anticipates displays in public settings that for example have a still image, or moving image of colors and shapes, or a looping video advertisement, wherein if a shopper or observer stops and views the advertisement using special eye glasses, or a lens based upon any of the teachings herein, they will see a new image that is fun or exciting and for example continues the advertisement, even to the extent of including the viewers captured image in the advertisement in some arrangement. It is also anticipated that the present teachings will provide for pleasing white or colored lighting sources for public spaces where an individual viewer may approach and receive a private messages including video and audio that is not shared with any of the surrounding individuals, even if the surrounding individuals are also wearing special eye glasses, where for example the private message might be in response to a question provided by the individual viewer such as through their cell phone via a text message to the system. This same type of display is anticipated to be useful in corporate settings where there are different clearance levels for the types of information to be received, such that a corporate or military presentation using the present system outputs information across multiple sub-channels, where each sub-channel is restricted to a different clearance level and providing different private video-audio.

From the many descriptions provided including those of the copending applications, the careful reader familiar with the necessary technologies will understand that many embodiments are possible for implementing the functional teachings of the present invention. As such, it will be well understood that the preferred and alternate embodiments of the presently taught apparatus and methods, as well as the many taught use cases, should be considered as exemplary, rather than as limitations to the present invention. Indeed, the present inventor anticipates many other useful variations of the present teachings as well as many additional use cases.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A system for selectively providing game content as private video to one or more players in conjunction with interactive game play using a shared viewing device, comprising:

one or more shared viewing devices for simultaneously emitting either a public video and a private video or multiple private videos, where each of the shared viewing devices comprises a display or a projector;

one or more electronically controllable filtering glasses for use by one or more players, where each of the one or more glasses comprises at least one electronically controllable component and receives control signals for at least in part operating the at least one electronic component, where operation of the glasses is switchable between substantially transmitting an emitted private video through the glasses to be seen by a player or substantially blocking an emitted private video from passing through the glasses so as to not be seen by a player;

one or more game objects, where each one or more game objects comprises an electronically readable unique identifier;

one or more game object tracking apparatus, where the tracking apparatus determines the unique identifier for any of the one or more game objects placed or otherwise located by a player within a sufficient proximity to the tracking apparatus;

an interactive gaming system comprising:

communication means for either directly or indirectly communicating with any one of or any combination of the one or more shared viewing devices, the one or more electronically controllable filtering glasses, the one or more game objects, and the object tracking apparatus;

computer memory and database means or remote database access means for use in determining or otherwise maintaining any of game logic or rules, a current game state, or game content, and computing means for (a) determining a relationship between a given player and any one or more game objects, and (b) executing game play logic or rules and for providing game content as any of shared or private content to the one or more players based at least in part upon the game state and at least in part upon the relationship between a given player and any one or more game objects associated with the player.

\* \* \* \* \*